US012047603B2

(12) United States Patent
Iguchi et al.

(10) Patent No.: US 12,047,603 B2
(45) Date of Patent: Jul. 23, 2024

(54) THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

(71) Applicant: Panasonic Intellectual Property Corporation of America, Torrance, CA (US)

(72) Inventors: Noritaka Iguchi, Osaka (JP); Toshiyasu Sugio, Osaka (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 357 days.

(21) Appl. No.: 17/405,329

(22) Filed: Aug. 18, 2021

(65) Prior Publication Data
US 2021/0377566 A1    Dec. 2, 2021

Related U.S. Application Data

(63) Continuation of application No. PCT/JP2020/008542, filed on Feb. 28, 2020.
(Continued)

(51) Int. Cl.
*H04N 19/597* (2014.01)
*H04N 19/119* (2014.01)
(Continued)

(52) U.S. Cl.
CPC ......... *H04N 19/597* (2014.11); *H04N 19/119* (2014.11); *H04N 19/184* (2014.11); *H04N 19/70* (2014.11); *H04N 19/88* (2014.11)

(58) Field of Classification Search
CPC .. H04N 19/597; H04N 19/119; H04N 19/184; H04N 19/70; H04N 19/88; H04N 19/54; G06T 9/001; G06T 9/00
(Continued)

(56) References Cited

U.S. PATENT DOCUMENTS 11,582,483 B2 * 2/2023 Iguchi .................. H04N 19/70
2014/0375638 A1 12/2014 Tomaru et al.
(Continued)

FOREIGN PATENT DOCUMENTS

EP    3 654 293    5/2020
EP    3 883 246    9/2021
(Continued)

OTHER PUBLICATIONS

International Search Report (ISR) dated Apr. 14, 2020 in International (PCT) Application No. PCT/JP2020/008542.
(Continued)

*Primary Examiner* — Tung T Vo
(74) *Attorney, Agent, or Firm* — Wenderoth, Lind & Ponack, L.L.P.

(57) ABSTRACT

A three-dimensional data encoding method includes: dividing point cloud data into pieces of sub point cloud data by dividing a three-dimensional space into subspaces; shifting each of the pieces of sub point cloud data in accordance with a predetermined shift amount; and generating a bitstream by encoding the pieces of sub point cloud data shifted. The bitstream includes first control information common to the pieces of sub point cloud data, and pieces of second control information for each of the pieces of sub point cloud data, the first control information including first information about a shift amount of each of the pieces of sub point cloud data.

12 Claims, 103 Drawing Sheets

Related U.S. Application Data

(60) Provisional application No. 62/811,788, filed on Feb. 28, 2019.

(51) Int. Cl.
  H04N 19/184 (2014.01)
  H04N 19/70 (2014.01)
  H04N 19/88 (2014.01)

(58) Field of Classification Search
  USPC .................................................. 375/240.26
  See application file for complete search history.

(56) References Cited

U.S. PATENT DOCUMENTS

| | | | |
|---|---|---|---|
| 2019/0325614 A1* | 10/2019 | Melkote Krishnaprasad | H04N 19/119 |
| 2019/0394496 A1* | 12/2019 | Tourapis | G06T 9/00 |
| 2020/0175726 A1* | 6/2020 | Kuma | H04N 19/119 |
| 2020/0252657 A1* | 8/2020 | Lasserre | H04N 19/597 |
| 2021/0021869 A1* | 1/2021 | Wang | H04N 19/91 |
| 2021/0166435 A1* | 6/2021 | Lasserre | G06T 9/40 |
| 2021/0218969 A1* | 7/2021 | Lasserre | H04N 19/517 |

FOREIGN PATENT DOCUMENTS

| | | |
|---|---|---|
| JP | 2017-126890 | 7/2017 |
| WO | 2014/020663 | 2/2014 |
| WO | 2015/179695 | 11/2015 |
| WO | 2019/012975 | 1/2019 |

OTHER PUBLICATIONS

George P. Gerdan, et al., "Transforming Cartesian coordinates X,Y,Z to Geographical coordinates φ, λ, h", The Australian Surveyor, vol. 44, No. 1, Jun. 1999.

Extended European Search Report dated Apr. 11, 2022 in corresponding European Patent Application No. 20763311.6.

* cited by examiner

| | GEOMETRY INFORMATION | ATTRIBUTE INFORMATION |
|---|---|---|
| n = 1 | $G(1) = (x_1, y_1, z_1)$ | $A(1) = (R_1, G_1, B_1)$ |
| n = 2 | $G(2) = (x_2, y_2, z_2)$ | $A(2) = (R_2, G_2, B_2)$ |
| ⋮ | ⋮ | ⋮ |
| n = N | $G(N) = (x_N, y_N, z_N)$ | $A(N) = (R_N, G_N, B_N)$ |

FIG. 35

```
EXAMPLES OF SEMANTICS OF pcc_nal_unit_type
(1) if pcc_codec_type == Codec 1
    0:Codec1 Goemetry
    1:Codec1 AttributeX
    2:Codec1 AttributeY
    3:Codec1 Geom. PS
    4:Codec1 AttrX. PS
    5:Codec1 AttrX. PS
    6:Codec1 Geometry Sequence PS
    7:Codec1 AttributeX Sequence PS
    8:Codec1 AttributeY Sequence PS
    9:Codec1 AU Header
    10:Codec1 GOF Header
    11~:Codec1 reserved for future use (2) if pcc_codec_type == Codec 2
    0:Codec2 DataA
    1:Codec2 MetaDataA
    2:Codec2 MetaDataB
    3~:Codec2 reserved for future use
```

FIG. 58

```
TileMetaData{
    type_of_divide  1:top_view, 2:other
    if(type_of_divide == 1){ //top_view
        topview_shape    //1: square, 2:circle
        tile_overlap_flag  //1:true, 2:false
        if(tile_overlap_flag){
            type_of_overlap
        }
        independent_tile_height_flag
        if(independent_tile_height_flag){
            tile_height //1: road, flyover
        } tile_number for(tile_number){
            global_position or relative_position
            if(independent_tile_height_flag){
                tile_height
            }
        }
    }
}
```

FIG. 60

```
SliceMetaData{
    type_of_divide    1:object, 2:other
    if(type_of_divide == 1) {   //object
        slice_overlap_flag    //1:true, 2:false
        if(slice_overlap_flag){
            type_of_overlap
        } slice_number for(slice_number){
            global_position or relative_position
            slice_bounding_box_size
        }
    }
}
```

FIG. 67

```
TileMetaData{
    type_of_divide
    type_of_divide_null
    if(type_of_divide== A){
        number_of_tiles
        for(number_of_tiles){
            tile_null_flag
            if(tile_null_flag=false){
                origin_x
                origin_y
                origin_z
            }else if (tile_null_flag==true){
                //no data
            }
        }
    }
    }else if (type_of_divide== B){
        //tile_number, origin, null_flag
        divide_information_B();
    }
}
```

```
GPS0(){
  gps_idx ..PCC frame number
  sps_idx gps_information();
  octree_partition_flag;
  if(octree_partition_flag){
    depth;
  }
  gheader_BBmin_present_flag;
  gheader_BBsize_present_flag;
}
```

FIG. 106

```
Geometry_header(){
  gps_idx
  partition_id
  if(gheader_BBmin_present_flag){
    BB_min_x;
    BB_min_y;
    BB_min_z;
  }
  if(gheader_Bbsize_present_flag){
    BB_size;
  }
}
```

FIG. 132

```
GPS0{
  gps_idx ..PCC frame number
  sps_idx gps_information();
  gheader_origin_present_flag;
  gheader_origin2_present_flag;
  origin_shift_bit_present_flag;
  if(origin_shift_bit_present_flag){
    origin_shift_bit;
  }
}
```

FIG. 133

```
Geometry_header(){
  gps_idx
  partition_id
   if(gheader_origin_present_flag){
    BB_origin_x;
    BB_origin_y;
    BB_origin_z;
     if(origin_shift_bit_present_flag){
       origin_shift_bit;
     }
   }
   if(gheader_origin2_present_flag){
     BB_origin2_x;
     BB_origin2_y;
     BB_origin2_z;
     origin2_shift_bit;
   }
}
```

THREE-DIMENSIONAL DATA ENCODING METHOD, THREE-DIMENSIONAL DATA DECODING METHOD, THREE-DIMENSIONAL DATA ENCODING DEVICE, AND THREE-DIMENSIONAL DATA DECODING DEVICE

CROSS REFERENCE TO RELATED APPLICATIONS

This application is a U.S. continuation application of PCT International Patent Application Number PCT/JP2020/008542 filed on Feb. 28, 2020, claiming the benefit of priority of U.S. Provisional Patent Application No. 62/811,788 filed on Feb. 28, 2019, the entire contents of which are hereby incorporated by reference.

BACKGROUND

1. Technical Field

The present disclosure relates to a three-dimensional data encoding method, a three-dimensional data decoding method, a three-dimensional data encoding device, and a three-dimensional data decoding device.

2. Description of the Related Art

Devices or services utilizing three-dimensional data are expected to find their widespread use in a wide range of fields, such as computer vision that enables autonomous operations of cars or robots, map information, monitoring, infrastructure inspection, and video distribution. Three-dimensional data is obtained through various means including a distance sensor such as a rangefinder, as well as a stereo camera and a combination of a plurality of monocular cameras.

Methods of representing three-dimensional data include a method known as a point cloud scheme that represents the shape of a three-dimensional structure by a point cloud in a three-dimensional space. In the point cloud scheme, the positions and colors of a point cloud are stored. While point cloud is expected to be a mainstream method of representing three-dimensional data, a massive amount of data of a point cloud necessitates compression of the amount of three-dimensional data by encoding for accumulation and transmission, as in the case of a two-dimensional moving picture (examples include Moving Picture Experts Group-4 Advanced Video Coding (MPEG-4 AVC) and High Efficiency Video Coding (HEVC) standardized by MPEG).

Meanwhile, point cloud compression is partially supported by, for example, an open-source library (Point Cloud Library) for point cloud-related processing.

Furthermore, a technique for searching for and displaying a facility located in the surroundings of the vehicle by using three-dimensional map data is known (for example, see International Publication WO 2014/020663).

SUMMARY

There has been a demand for reducing a code amount in a three-dimensional data encoding process.

The present disclosure has an object to provide a three-dimensional data encoding method, a three-dimensional data decoding method, a three-dimensional data encoding device, or a three-dimensional data decoding device that is capable of reducing a code amount.

A three-dimensional data encoding method according to one aspect of the present disclosure includes: dividing point cloud data into pieces of sub point cloud data by dividing a three-dimensional space into subspaces; shifting each of the pieces of sub point cloud data in accordance with a predetermined shift amount; and generating a bitstream by encoding the pieces of sub point cloud data shifted. The bitstream includes first control information common to the pieces of sub point cloud data, and pieces of second control information for each of the pieces of sub point cloud data, the first control information including first information about a shift amount of each of the pieces of sub point cloud data.

A three-dimensional data decoding method according to one aspect of the present disclosure includes: decoding, from a bitstream, pieces of sub point cloud data each shifted in accordance with a predetermined shift amount, the pieces of sub point cloud data being pieces of data into which point cloud data indicating three-dimensional positions is divided by dividing a three-dimensional space into subspaces; obtaining first information about a shift amount of each of the pieces of sub point cloud data from first control information that is included in the bitstream and is common to the pieces of sub point cloud data; calculating the shift amounts of the pieces of sub point cloud data using the first information; and reproducing the pieces of sub point cloud data by shifting each of the pieces of sub point cloud data decoded and shifted, in accordance with one of the shift amounts corresponding to the sub point cloud data.

The present disclosure provides a three-dimensional data encoding method, a three-dimensional data decoding method, a three-dimensional data encoding device, or a three-dimensional data decoding device that is capable of reducing a code amount.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 35 is a diagram illustrating a semantics example of pcc_nal_unit_type according to Embodiment 4;

FIG. 58 is a diagram illustrating an example of syntax of tile additional information according to Embodiment 6;

FIG. 60 is a diagram illustrating an example of syntax of slice additional information according to Embodiment 6;

FIG. 67 is a diagram illustrating an example of syntax of tile additional information according to Embodiment 7;

FIG. 68 is a diagram illustrating an example of index information according to Embodiment 7;

FIG. 105 is a diagram illustrating an exemplary syntax of a GPS according to Embodiment 8;

FIG. 106 is a diagram illustrating an exemplary syntax of a header of geometry information according to Embodiment 8;

FIG. 119 is a diagram illustrating another exemplary data structure according to Embodiment 8;

FIG. 120 is a flowchart of an encoding process according to Embodiment 8;

FIG. 121 is a flowchart of a decoding process according to Embodiment 8;

FIG. 122 is a diagram showing an example of an individual position shift amount and a divisional area position shift amount according to Embodiment 9;

FIG. 123 is a flowchart of a process of calculating a shift amount according to Embodiment 9;

FIG. 124 is a diagram schematically showing a process of dividing a minimum positional coordinates value according to Embodiment 9:

FIG. 125 is a diagram showing an example of the calculation of the shift amount in a three-dimensional data decoding device according to Embodiment 9;

FIG. 126 is a flowchart of a process of calculating the shift amount according to Embodiment 9;

FIG. 127 is a diagram schematically showing a process of dividing the minimum positional coordinates value according to Embodiment 9;

FIG. 128 is a diagram showing an example of the calculation of the shift amount in the three-dimensional data decoding device according to Embodiment 9;

FIG. 129 is a diagram showing an example of the setting of lower-order bits according to Embodiment 9;

FIG. 130 is a flowchart of a process of calculating the shift amount according to Embodiment 9;

Figure 131:
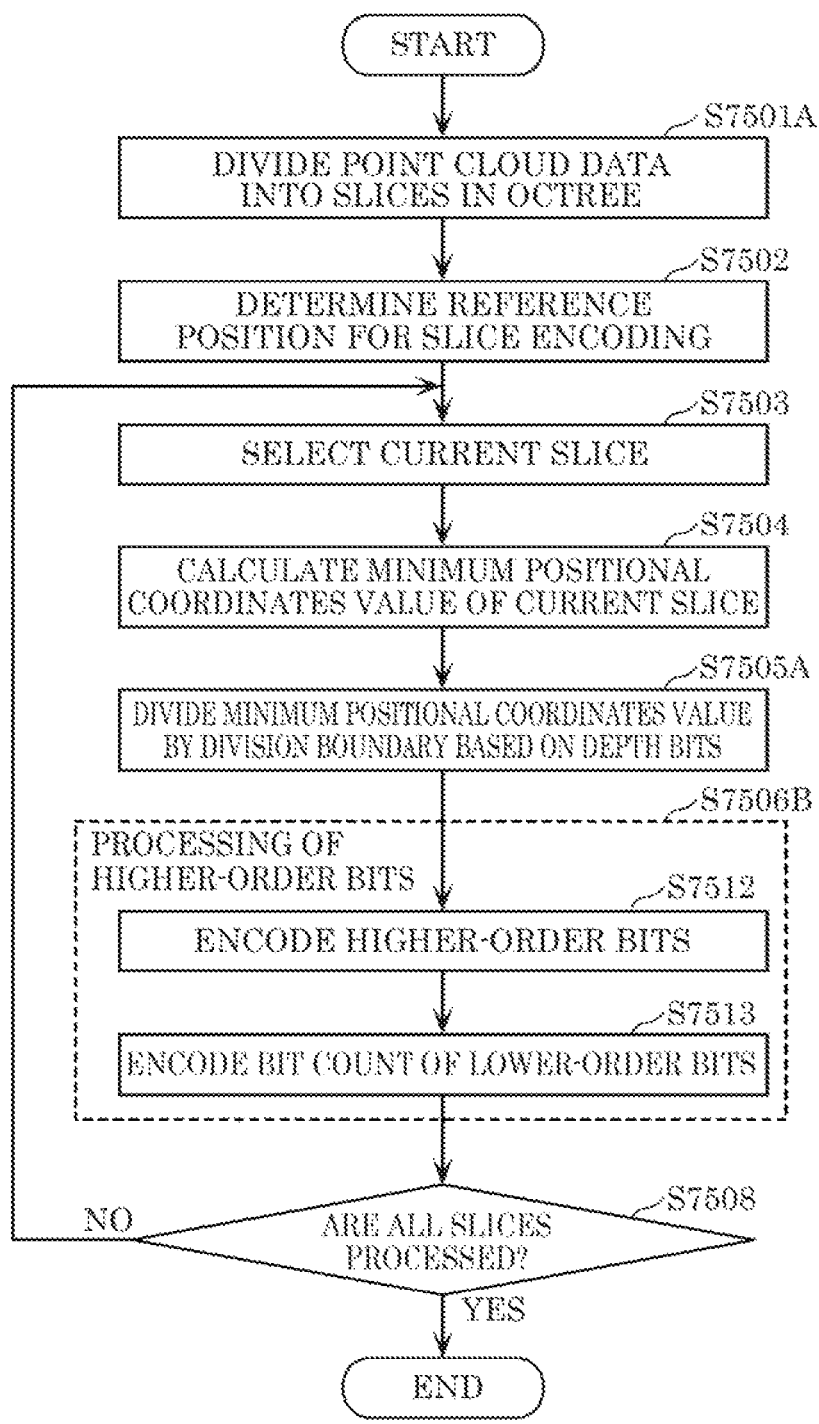
Figure 134:
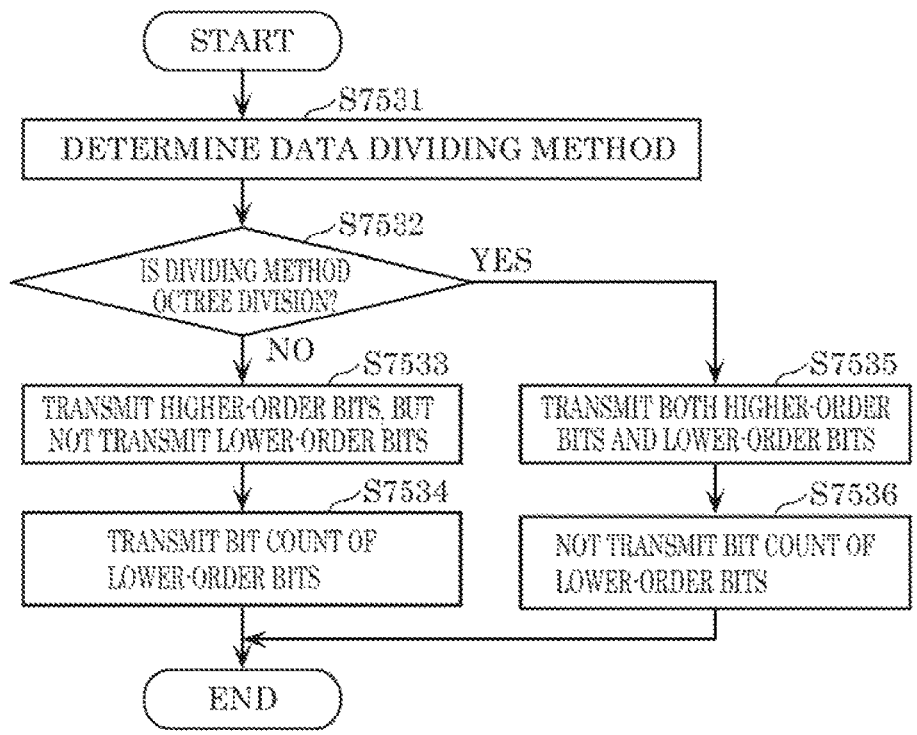
Figure 135:
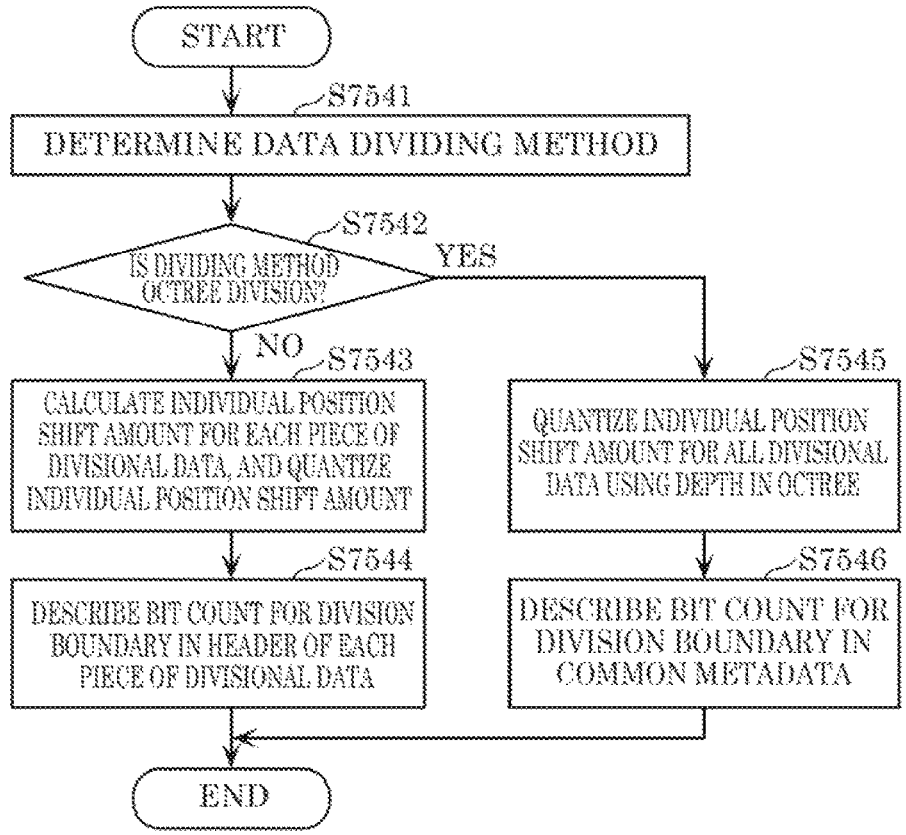
Figure 136:
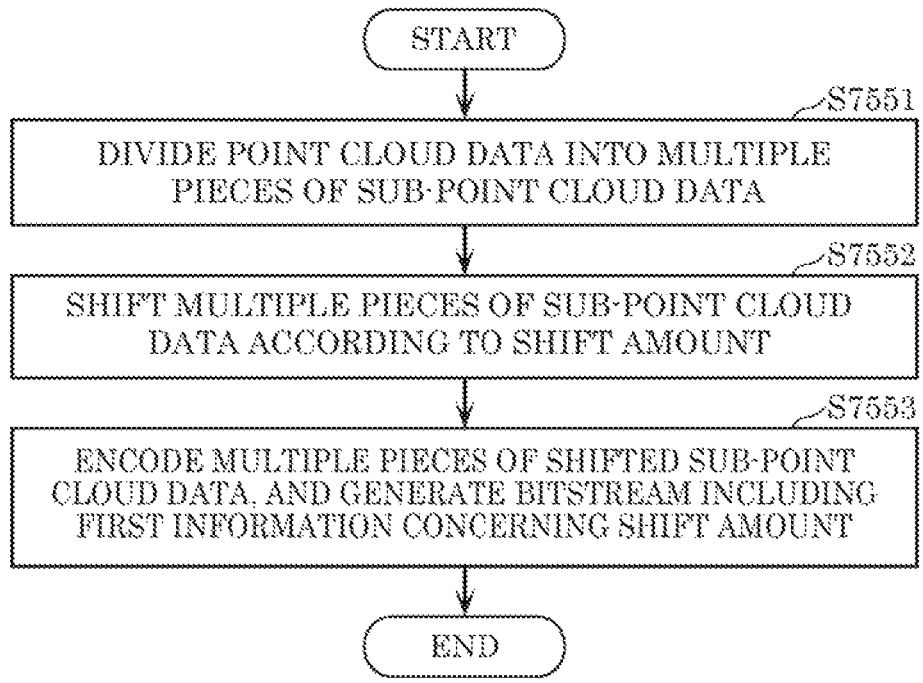
Figure 137:
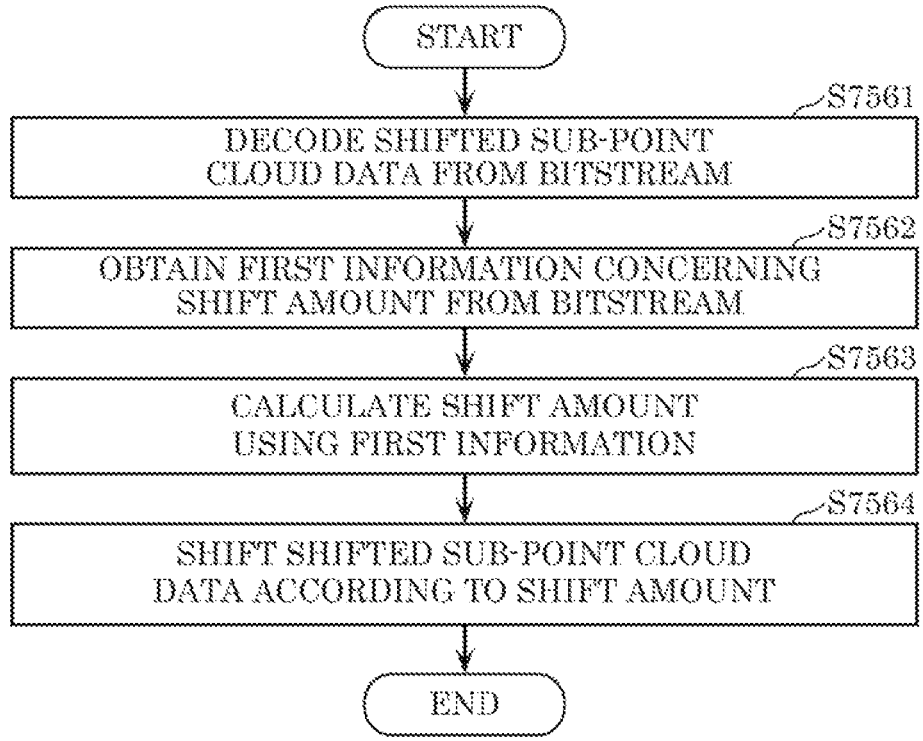

FIG. 131 is a flowchart of a process of calculating the shift amount according to Embodiment 9;

FIG. 132 is a diagram showing a syntax example of a GPS according to Embodiment 9:

FIG. 133 is a diagram showing a syntax example of a geometry information header according to Embodiment 9;

FIG. 134 is a flowchart of a process of transmitting the shift amount according to Embodiment 9;

FIG. 135 is a flowchart of a process of calculating the shift amount according to Embodiment 9;

FIG. 136 is a flowchart of a three-dimensional data encoding process according to Embodiment 9; and FIG. 137 is a flowchart of a three-dimensional data decoding process according to Embodiment 9.

DETAILED DESCRIPTION OF THE EMBODIMENTS

A three-dimensional data encoding method according to one aspect of the present disclosure includes: dividing point cloud data into pieces of sub point cloud data by dividing a three-dimensional space into subspaces; shifting each of the pieces of sub point cloud data in accordance with a predetermined shift amount; and generating a bitstream by encoding the pieces of sub point cloud data shifted. The bitstream includes first control information common to the pieces of sub point cloud data, and pieces of second control information for each of the pieces of sub point cloud data, the first control information including first information about a shift amount of each of the pieces of sub point cloud data.

With such a configuration, according to the three-dimensional data encoding method, the three-dimensional data decoding device can be notified of a shift amount via the first information. In addition, since the first information is common to a plurality of pieces of sub point cloud data, the code amount can be reduced.

For example, the shift amount may be based on one of the pieces of sub point cloud data or one of subspaces including the sub point cloud data.

For example, the shift amount may include higher-order bits and lower-order bits, the first information may be common to the pieces of sub point cloud data and indicates a bit count of the lower-order bits, and each of the pieces of second control information may include second information indicating a value of the higher-order bits included in the shift amount of one of the pieces of sub point cloud data corresponding to the second control information.

With such a configuration, according to the three-dimensional data encoding method, the three-dimensional data decoding device can be notified of a shift amount via the first information and the second information. In addition, since the first information is common to a plurality of pieces of sub point cloud data, the code amount can be reduced.

For example, the first control information may include a flag that indicates whether information indicating the bit count of the lower-order bits is included in the first control information or each of the pieces of second control information, when the flag indicates that the information indicating the bit count of the lower-order bits is included in the first control information, the first control information may include the first information, and each of the pieces of second control information does not include the information indicating the bit count of the lower-order bits, and when the flag indicates that the information indicating the bit count of the lower-order bits is included in each of the pieces of second control information, the second control information may include third information indicating the bit count of the lower-order bits included in the shift amount of one of the pieces of sub point cloud data corresponding to the second control information.

With such a configuration, according to the three-dimensional data encoding method, whether to share the first information between a plurality of pieces of sub point cloud data or not can be selected, so that the encoding can be appropriately performed.

For example, all bits included in the lower-order bits may have a value of zero, and the bitstream need not include information indicating a value of the lower-order bits.

A three-dimensional data decoding method according to one aspect of the present disclosure includes: decoding, from a bitstream, pieces of sub point cloud data each shifted in accordance with a predetermined shift amount, the pieces of sub point cloud data being pieces of data into which point cloud data indicating three-dimensional positions is divided by dividing a three-dimensional space into subspaces; obtaining first information about a shift amount of each of the pieces of sub point cloud data from first control information that is included in the bitstream and is common to the pieces of sub point cloud data; calculating the shift amounts of the pieces of sub point cloud data using the first information; and reproducing the pieces of sub point cloud data by shifting each of the pieces of sub point cloud data decoded and shifted, in accordance with one of the shift amounts corresponding to the sub point cloud data.

With such a configuration, the three-dimensional data decoding method is capable of calculating a shift amount using the first information. In addition, since the first information is common to a plurality of pieces of sub point cloud data, the code amount can be reduced.

For example, the shift amount may be based on one of the pieces of sub point cloud data or one of subspaces including the sub point cloud data.

For example, the shift amount may include higher-order bits and lower-order bits, the first information may be common to the pieces of sub point cloud data and indicates a bit count of the lower-order bits, the three-dimensional data decoding method may further include: obtaining, from pieces of second control information for each of the pieces of sub point cloud data included in the bitstream, pieces of second information indicating a value of the higher-order bits of the shift amount of each of the pieces of sub point cloud data, and in the calculating, the shift amounts of the pieces of sub point cloud data may be calculated using the first information and the pieces of second information.

With such a configuration, the three-dimensional data decoding method is capable of calculating a shift amount using the first information and the second information. In addition, since the first information is common to a plurality of pieces of sub point cloud data, the code amount can be reduced.

For example, the first control information may include a flag that indicates whether information indicating the bit count of the lower-order bits is included in the first control information or each of the pieces of second control information, and when the flag indicates that the information indicating the bit count of the lower-order bits is included in the first control information, the first information may be obtained from the first control information, and the shift amounts of the pieces of sub point cloud data may be calculated using the first information and the pieces of second information; and when the flag indicates that the information indicating the bit count of the lower-order bits is included in each of the pieces of second control information, pieces of third information may be obtained from each of the pieces of second control information, the pieces of third information indicating the bit count of the lower-order bits of the shift amount of each of the pieces of sub point cloud data, and the shift amounts of the pieces of sub point cloud data may be calculated using the pieces of second information and the pieces of third information.

With such a configuration, according to the three-dimensional data decoding method, whether to share the first information between a plurality of pieces of sub point cloud data or not can be selected, so that the decoding can be appropriately performed.

For example, in the calculating, all bits included in the lower-order bits may be set to a value of zero.

A three-dimensional data encoding device according to one aspect of the present disclosure is a three-dimensional data encoding device that encodes point cloud data indicating three-dimensional positions in a three-dimensional space, the three-dimensional data encoding device including a processor and memory. Using the memory, the processor: divides the point cloud data into pieces of sub point cloud data by dividing the three-dimensional space into subspaces; shifts each of the pieces of sub point cloud data in accordance with a predetermined shift amount; and generates a bitstream by encoding the pieces of sub point cloud data shifted. The bitstream includes first control information common to the pieces of sub point cloud data, and pieces of second control information for each of the pieces of sub point cloud data, the first control information including first information about a shift amount of each of the pieces of sub point cloud data.

With such a configuration, the three-dimensional data encoding device is capable of notifying the three-dimensional data decoding device of a shift amount via the first information. In addition, since the first information is common to a plurality of pieces of sub point cloud data, the code amount can be reduced.

A three-dimensional data decoding device according to one aspect of the present disclosure includes a processor and memory. Using the memory, the processor: decodes, from a bitstream, pieces of sub point cloud data each shifted in accordance with a predetermined shift amount, the pieces of sub point cloud data being pieces of data into which point cloud data indicating three-dimensional positions is divided by dividing a three-dimensional space into subspaces; obtains first information about a shift amount of each of the pieces of sub point cloud data from first control information that is included in the bitstream and is common to the pieces of sub point cloud data; calculates the shift amounts of the pieces of sub point cloud data using the first information; and reproduces the pieces of sub point cloud data by shifting each of the pieces of sub point cloud data decoded and shifted, in accordance with one of the shift amounts corresponding to the sub point cloud data.

With such a configuration, the three-dimensional data decoding device is capable of calculating a shift amount using the first information. In addition, since the first information is common to a plurality of pieces of sub point cloud data, the code amount can be reduced.

Note that these general or specific aspects may be implemented as a system, a method, an integrated circuit, a computer program, or a computer-readable recording medium such as a CD-ROM, or may be implemented as any combination of a system, a method, an integrated circuit, a computer program, and a recording medium.

The following describes embodiments with reference to the drawings. Note that the following embodiments show exemplary embodiments of the present disclosure. The numerical values, shapes, materials, structural components, the arrangement and connection of the structural components, steps, the processing order of the steps, etc. shown in the following embodiments are mere examples, and thus are not intended to limit the present disclosure. Of the structural components described in the following embodiments, structural components not recited in any one of the independent claims that indicate the broadest concepts will be described as optional structural components.

Embodiment 1

When using encoded data of a point cloud in a device or for a service in practice, required information for the application is desirably transmitted and received in order to reduce the network bandwidth. However, conventional encoding structures for three-dimensional data have no such a function, and there is also no encoding method for such a function.

Embodiment 1 described below relates to a three-dimensional data encoding method and a three-dimensional data encoding device for encoded data of a three-dimensional point cloud that provides a function of transmitting and receiving required information for an application, a three-dimensional data decoding method and a three-dimensional data decoding device for decoding the encoded data, a three-dimensional data multiplexing method for multiplexing the encoded data, and a three-dimensional data transmission method for transmitting the encoded data.

In particular, at present, a first encoding method and a second encoding method are under investigation as encoding methods (encoding schemes) for point cloud data. However, there is no method defined for storing the configuration of encoded data and the encoded data in a system format. Thus, there is a problem that an encoder cannot perform an MUX process (multiplexing), transmission, or accumulation of data.

In addition, there is no method for supporting a format that involves two codecs, the first encoding method and the second encoding method, such as point cloud compression (PCC).

With regard to this embodiment, a configuration of PCC-encoded data that involves two codecs, a first encoding method and a second encoding method, and a method of storing the encoded data in a system format will be described.

Figure 1:
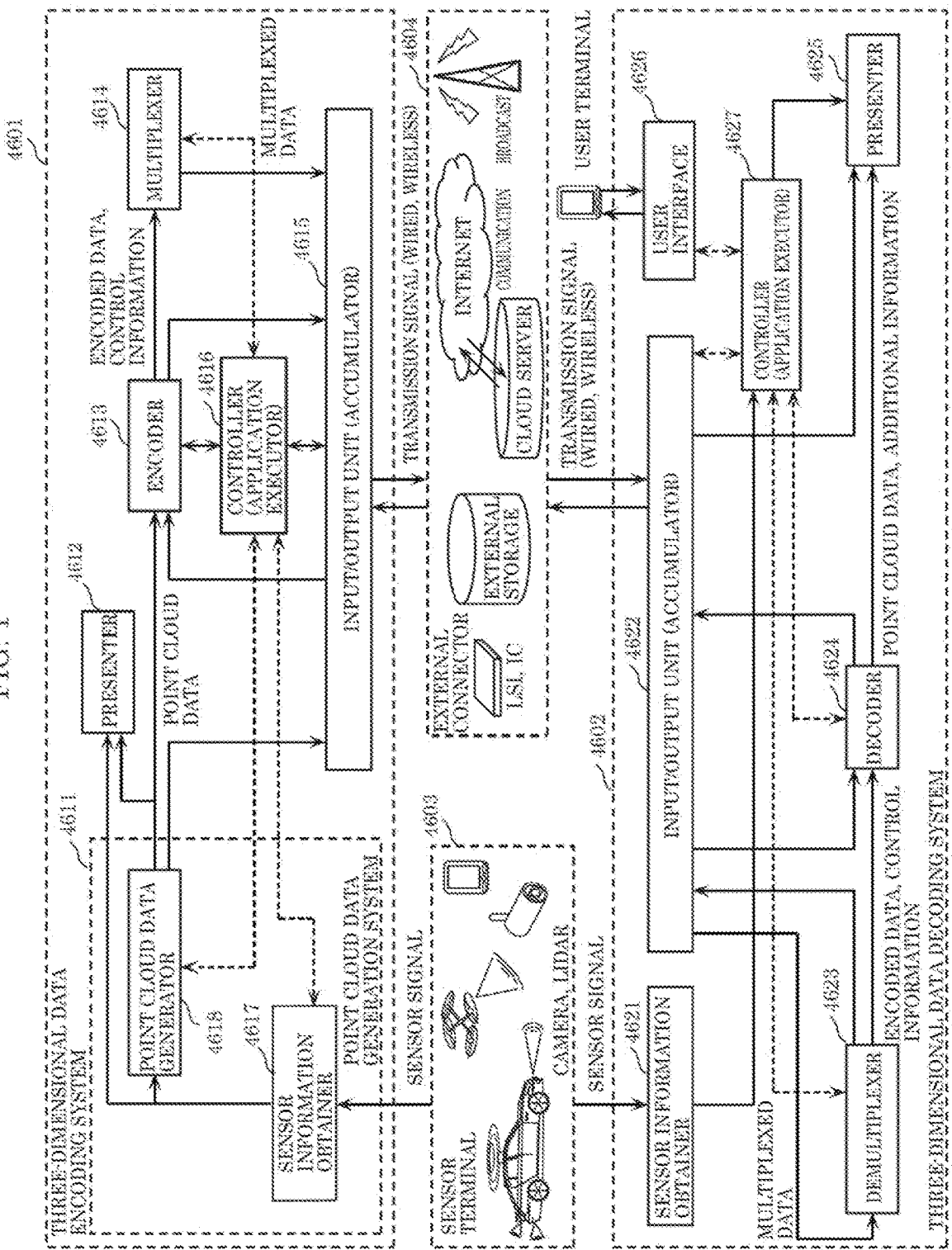
FIG. 1 is a diagram illustrating a configuration of a three-dimensional data encoding and decoding system according to Embodiment 1.

A configuration of a three-dimensional data (point cloud data) encoding and decoding system according to this embodiment will be first described. FIG. 1 is a diagram showing an example of a configuration of the three-dimensional data encoding and decoding system according to this embodiment. As shown in FIG. 1, the three-dimensional data encoding and decoding system includes three-dimensional data encoding system 4601, three-dimensional data decoding system 4602, sensor terminal 4603, and external connector 4604.

Three-dimensional data encoding system 4601 generates encoded data or multiplexed data by encoding point cloud data, which is three-dimensional data. Three-dimensional data encoding system 4601 may be a three-dimensional data encoding device implemented by a single device or a system implemented by a plurality of devices. The three-dimensional data encoding device may include a part of a plurality of processors included in three-dimensional data encoding system 4601.

Three-dimensional data encoding system 4601 includes point cloud data generation system 4611, presenter 4612, encoder 4613, multiplexer 4614, input/output unit 4615, and controller 4616. Point cloud data generation system 4611 includes sensor information obtainer 4617, and point cloud data generator 4618.

Sensor information obtainer 4617 obtains sensor information from sensor terminal 4603, and outputs the sensor information to point cloud data generator 4618. Point cloud data generator 4618 generates point cloud data from the sensor information, and outputs the point cloud data to encoder 4613.

Presenter 4612 presents the sensor information or point cloud data to a user. For example, presenter 4612 displays information or an image based on the sensor information or point cloud data.

Encoder 4613 encodes (compresses) the point cloud data, and outputs the resulting encoded data, control information (signaling information) obtained in the course of the encoding, and other additional information to multiplexer 4614. The additional information includes the sensor information, for example.

Multiplexer 4614 generates multiplexed data by multiplexing the encoded data, the control information, and the additional information input thereto from encoder 4613. A format of the multiplexed data is a file format for accumulation or a packet format for transmission, for example.

Input/output unit 4615 (a communication unit or interface, for example) outputs the multiplexed data to the outside. Alternatively, the multiplexed data may be accumulated in an accumulator, such as an internal memory. Controller 4616 (or an application executor) controls each processor. That is, controller 4616 controls the encoding, the multiplexing, or other processing.

Note that the sensor information may be input to encoder 4613 or multiplexer 4614. Alternatively, input/output unit 4615 may output the point cloud data or encoded data to the outside as it is.

A transmission signal (multiplexed data) output from three-dimensional data encoding system 4601 is input to three-dimensional data decoding system 4602 via external connector 4604.

Three-dimensional data decoding system 4602 generates point cloud data, which is three-dimensional data, by decoding the encoded data or multiplexed data. Note that three-dimensional data decoding system 4602 may be a three-dimensional data decoding device implemented by a single device or a system implemented by a plurality of devices. The three-dimensional data decoding device may include a part of a plurality of processors included in three-dimensional data decoding system 4602.

Three-dimensional data decoding system 4602 includes sensor information obtainer 4621, input/output unit 4622, demultiplexer 4623, decoder 4624, presenter 4625, user interface 4626, and controller 4627.

Sensor information obtainer 4621 obtains sensor information from sensor terminal 4603.

Input/output unit 4622 obtains the transmission signal, decodes the transmission signal into the multiplexed data (file format or packet), and outputs the multiplexed data to demultiplexer 4623.

Demultiplexer 4623 obtains the encoded data, the control information, and the additional information from the multiplexed data, and outputs the encoded data, the control information, and the additional information to decoder 4624.

Decoder 4624 reconstructs the point cloud data by decoding the encoded data.

Presenter 4625 presents the point cloud data to a user. For example, presenter 4625 displays information or an image based on the point cloud data. User interface 4626 obtains an indication based on a manipulation by the user. Controller 4627 (or an application executor) controls each processor. That is, controller 4627 controls the demultiplexing, the decoding, the presentation, or other processing.

Note that input/output unit 4622 may obtain the point cloud data or encoded data as it is from the outside. Presenter 4625 may obtain additional information, such as sensor information, and present information based on the additional information. Presenter 4625 may perform a presentation based on an indication from a user obtained on user interface 4626.

Sensor terminal 4603 generates sensor information, which is information obtained by a sensor. Sensor terminal 4603 is a terminal provided with a sensor or a camera. For example, sensor terminal 4603 is a mobile body, such as an automobile, a flying object, such as an aircraft, a mobile terminal, or a camera.

Sensor information that can be generated by sensor terminal 4603 includes (1) the distance between sensor terminal 4603 and an object or the reflectance of the object obtained by LIDAR, a millimeter wave radar, or an infrared sensor or (2) the distance between a camera and an object or the reflectance of the object obtained by a plurality of monocular camera images or a stereo-camera image, for example. The sensor information may include the posture, orientation, gyro (angular velocity), position (GPS information or altitude), velocity, or acceleration of the sensor, for example. The sensor information may include air temperature, air pressure, air humidity, or magnetism, for example.

External connector 4604 is implemented by an integrated circuit (LSI or IC), an external accumulator, communication with a cloud server via the Internet, or broadcasting, for example.

Figures 2, 3:
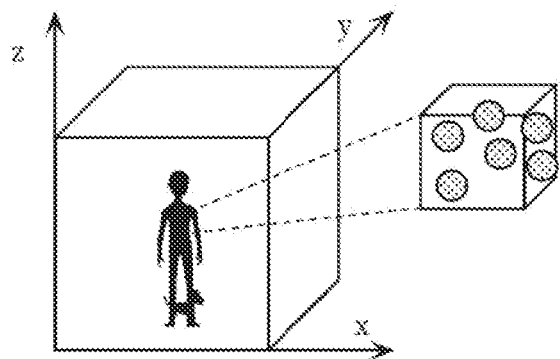
FIG. 2 is a diagram illustrating a structure example of point cloud data according to Embodiment 1.
FIG. 3 is a diagram illustrating a structure example of a data file indicating the point cloud data according to Embodiment 1.

Next, point cloud data will be described. FIG. 2 is a diagram showing a configuration of point cloud data. FIG. 3 is a diagram showing a configuration example of a data file describing information of the point cloud data.

Point cloud data includes data on a plurality of points. Data on each point includes geometry information (three-dimensional coordinates) and attribute information associated with the geometry information. A set of a plurality of such points is referred to as a point cloud. For example, a point cloud indicates a three-dimensional shape of an object.

Geometry information (position), such as three-dimensional coordinates, may be referred to as geometry. Data on each point may include attribute information (attribute) on a plurality of types of attributes. A type of attribute is color or reflectance, for example.

One piece of attribute information may be associated with one piece of geometry information, or attribute information on a plurality of different types of attributes may be associated with one piece of geometry information. Alternatively, a plurality of pieces of attribute information on the same type of attribute may be associated with one piece of geometry information.

The configuration example of a data file shown in FIG. 3 is an example in which geometry information and attribute information are associated with each other in a one-to-one relationship, and geometry information and attribute information on N points forming point cloud data are shown.

The geometry information is information on three axes, specifically, an x-axis, a y-axis, and a z-axis, for example. The attribute information is RGB color information, for example. A representative data file is ply file, for example.

Figure 4:
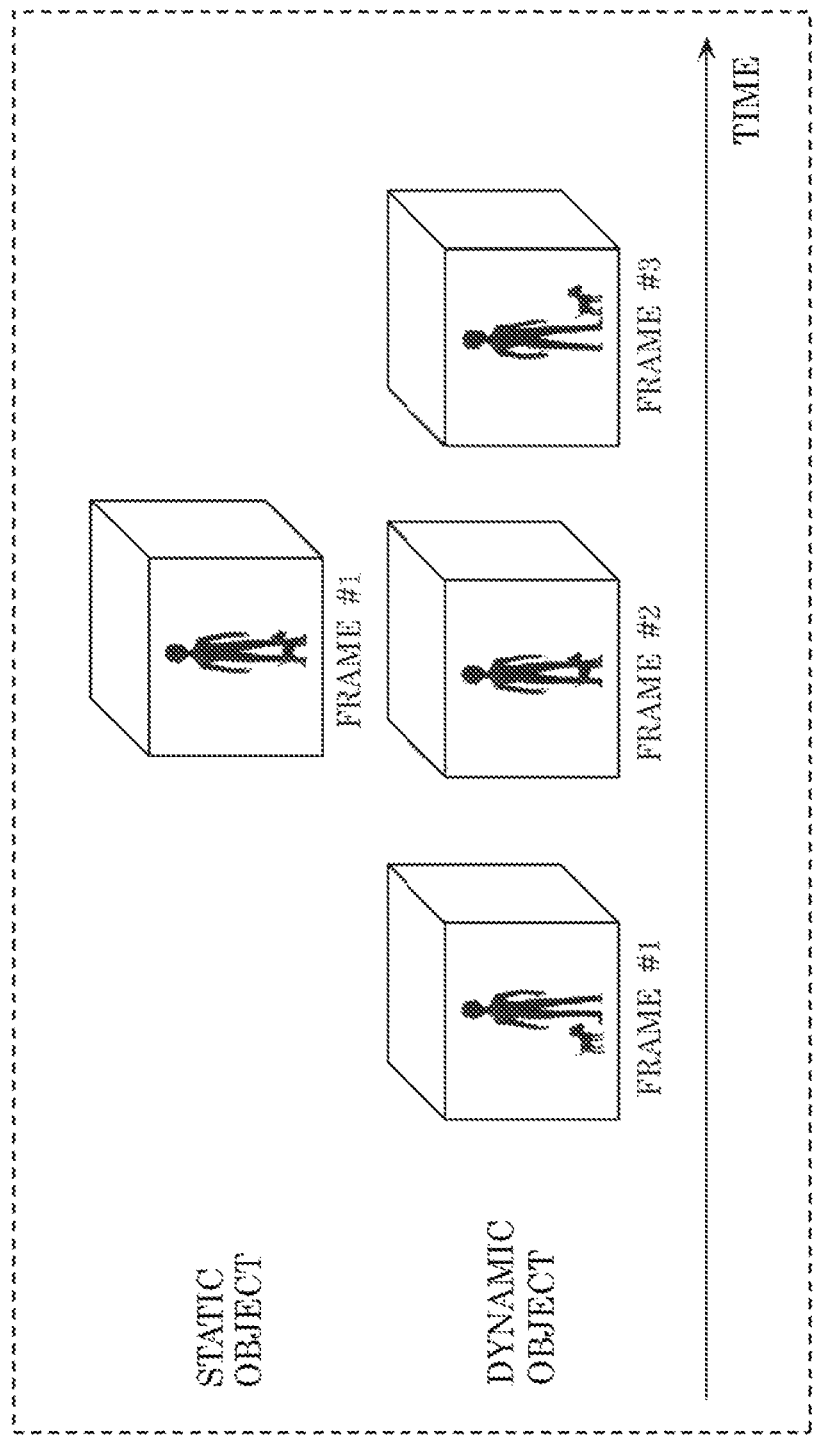
FIG. 4 is a diagram illustrating types of the point cloud data according to Embodiment 1.

Next, types of point cloud data will be described. FIG. 4 is a diagram showing types of point cloud data. As shown in FIG. 4, point cloud data includes a static object and a dynamic object.

The static object is three-dimensional point cloud data at an arbitrary time (a time point). The dynamic object is three-dimensional point cloud data that varies with time. In the following, three-dimensional point cloud data associated with a time point will be referred to as a PCC frame or a frame.

The object may be a point cloud whose range is limited to some extent, such as ordinary video data, or may be a large point cloud whose range is not limited, such as map information.

There are point cloud data having varying densities. There may be sparse point cloud data and dense point cloud data.

In the following, each processor will be described in detail. Sensor information is obtained by various means, including a distance sensor such as LIDAR or a range finder, a stereo camera, or a combination of a plurality of monocular cameras. Point cloud data generator 4618 generates point cloud data based on the sensor information obtained by sensor information obtainer 4617. Point cloud data generator 4618 generates geometry information as point cloud data, and adds attribute information associated with the geometry information to the geometry information.

When generating geometry information or adding attribute information, point cloud data generator 4618 may process the point cloud data. For example, point cloud data generator 4618 may reduce the data amount by omitting a point cloud whose position coincides with the position of another point cloud. Point cloud data generator 4618 may also convert the geometry information (such as shifting, rotating or normalizing the position) or render the attribute information.

Note that, although FIG. 1 shows point cloud data generation system 4611 as being included in three-dimensional data encoding system 4601, point cloud data generation system 4611 may be independently provided outside three-dimensional data encoding system 4601.

Encoder 4613 generates encoded data by encoding point cloud data according to an encoding method previously defined. In general, there are the two types of encoding methods described below. One is an encoding method using geometry information, which will be referred to as a first encoding method, hereinafter. The other is an encoding method using a video codec, which will be referred to as a second encoding method, hereinafter.

Decoder 4624 decodes the encoded data into the point cloud data using the encoding method previously defined.

Multiplexer 4614 generates multiplexed data by multiplexing the encoded data in an existing multiplexing method. The generated multiplexed data is transmitted or accumulated. Multiplexer 4614 multiplexes not only the PCC-encoded data but also another medium, such as a video, an audio, subtitles, an application, or a file, or reference time information. Multiplexer 4614 may further multiplex attribute information associated with sensor information or point cloud data.

Multiplexing schemes or file formats include ISOBMFF, MPEG-DASH, which is a transmission scheme based on ISOBMFF, MMT, MPEG-2 TS Systems, or RMP, for example.

Demultiplexer 4623 extracts PCC-encoded data, other media, time information and the like from the multiplexed data.

Input/output unit 4615 transmits the multiplexed data in a method suitable for the transmission medium or accumulation medium, such as broadcasting or communication. Input/output unit 4615 may communicate with another device over the Internet or communicate with an accumulator, such as a cloud server.

As a communication protocol, http, ftp, TCP, UDP or the like is used. The pull communication scheme or the push communication scheme can be used.

A wired transmission or a wireless transmission can be used. For the wired transmission, Ethernet (registered trademark), USB, RS-232C, HDMI (registered trademark), or a coaxial cable is used, for example. For the wireless transmission, wireless LAN, Wi-Fi (registered trademark), Bluetooth (registered trademark), or a millimeter wave is used, for example.

As a broadcasting scheme, DVB-T2, DVB-S2, DVB-C2, ATSC3.0, or ISDB-S3 is used, for example.

Figure 5:
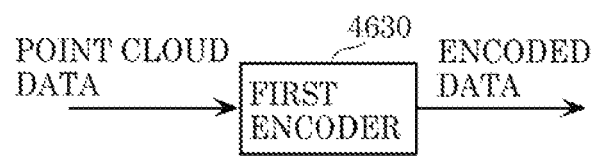
FIG. 5 is a diagram illustrating a structure of a first encoder according to Embodiment 1.
Figure 6:
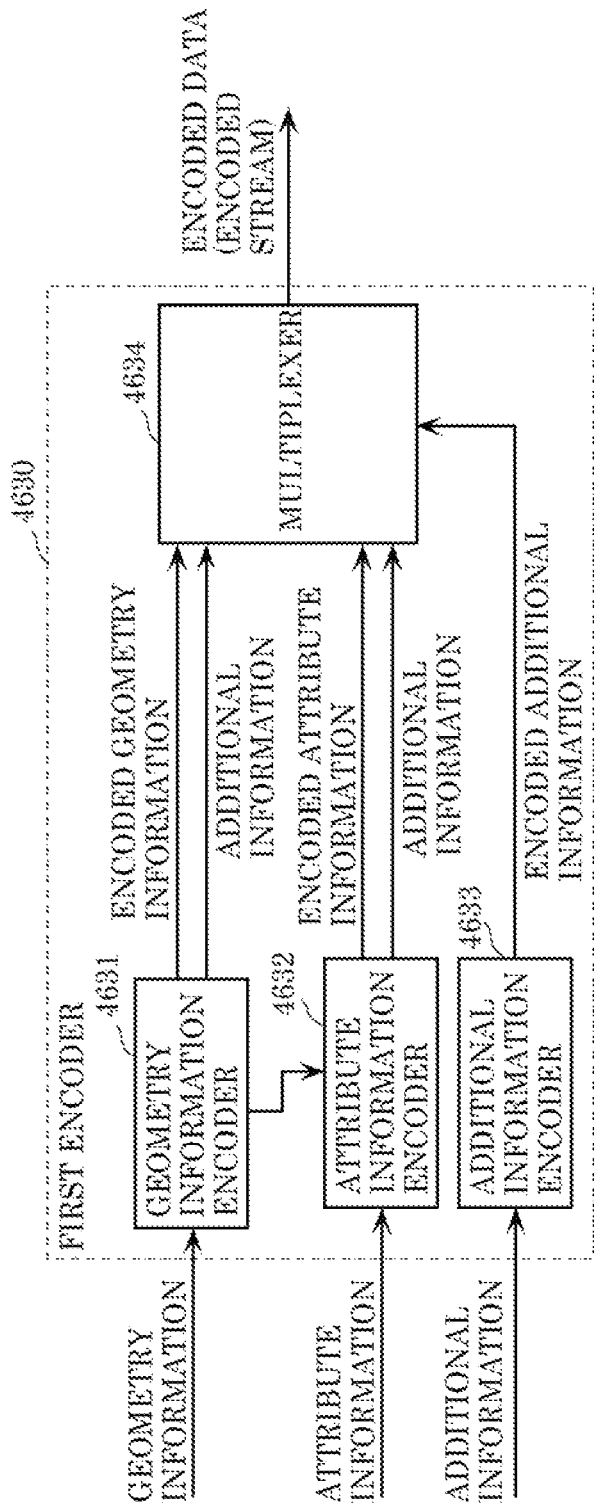
FIG. 6 is a block diagram illustrating the first encoder according to Embodiment 1.

FIG. 5 is a diagram showing a configuration of first encoder 4630, which is an example of encoder 4613 that performs encoding in the first encoding method. FIG. 6 is a block diagram showing first encoder 4630. First encoder 4630 generates encoded data (encoded stream) by encoding point cloud data in the first encoding method. First encoder 4630 includes geometry information encoder 4631, attribute information encoder 4632, additional information encoder 4633, and multiplexer 4634.

First encoder 4630 is characterized by performing encoding by keeping a three-dimensional structure in mind. First encoder 4630 is further characterized in that attribute information encoder 4632 performs encoding using information obtained from geometry information encoder 4631. The first encoding method is referred to also as geometry-based PCC (GPCC).

Point cloud data is PCC point cloud data like a PLY file or PCC point cloud data generated from sensor information, and includes geometry information (position), attribute information (attribute), and other additional information (metadata). The geometry information is input to geometry information encoder 4631, the attribute information is input to attribute information encoder 4632, and the additional information is input to additional information encoder 4633.

Geometry information encoder 4631 generates encoded geometry information (compressed geometry), which is encoded data, by encoding geometry information. For example, geometry information encoder 4631 encodes geometry information using an N-ary tree structure, such as an octree. Specifically, in the case of an octree, a current space is divided into eight nodes (subspaces), 8-bit information (occupancy code) that indicates whether each node includes a point cloud or not is generated. A node including a point cloud is further divided into eight nodes, and 8-bit information that indicates whether each of the eight nodes includes a point cloud or not is generated. This process is repeated until a predetermined level is reached or the number of the point clouds included in each node becomes equal to or less than a threshold.

Attribute information encoder 4632 generates encoded attribute information (compressed attribute), which is encoded data, by encoding attribute information using configuration information generated by geometry information encoder 4631. For example, attribute information encoder 4632 determines a reference point (reference node) that is to be referred to in encoding a current point (current node) to be processed based on the octree structure generated by geometry information encoder 4631. For example, attribute information encoder 4632 refers to a node whose parent node in the octree is the same as the parent node of the current node, of peripheral nodes or neighboring nodes. Note that the method of determining a reference relationship is not limited to this method.

The process of encoding attribute information may include at least one of a quantization process, a prediction process, and an arithmetic encoding process. In this case, "refer to" means using a reference node for calculating a predicted value of attribute information or using a state of a reference node (occupancy information that indicates whether a reference node includes a point cloud or not, for example) for determining a parameter of encoding. For example, the parameter of encoding is a quantization parameter in the quantization process or a context or the like in the arithmetic encoding.

Additional information encoder 4633 generates encoded additional information (compressed metadata), which is encoded data, by encoding compressible data of additional information.

Multiplexer 4634 generates encoded stream (compressed stream), which is encoded data, by multiplexing encoded geometry information, encoded attribute information, encoded additional information, and other additional information. The generated encoded stream is output to a processor in a system layer (not shown).

Figure 7:
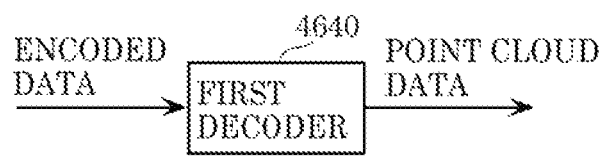
FIG. 7 is a diagram illustrating a structure of a first decoder according to Embodiment 1.
Figure 8:
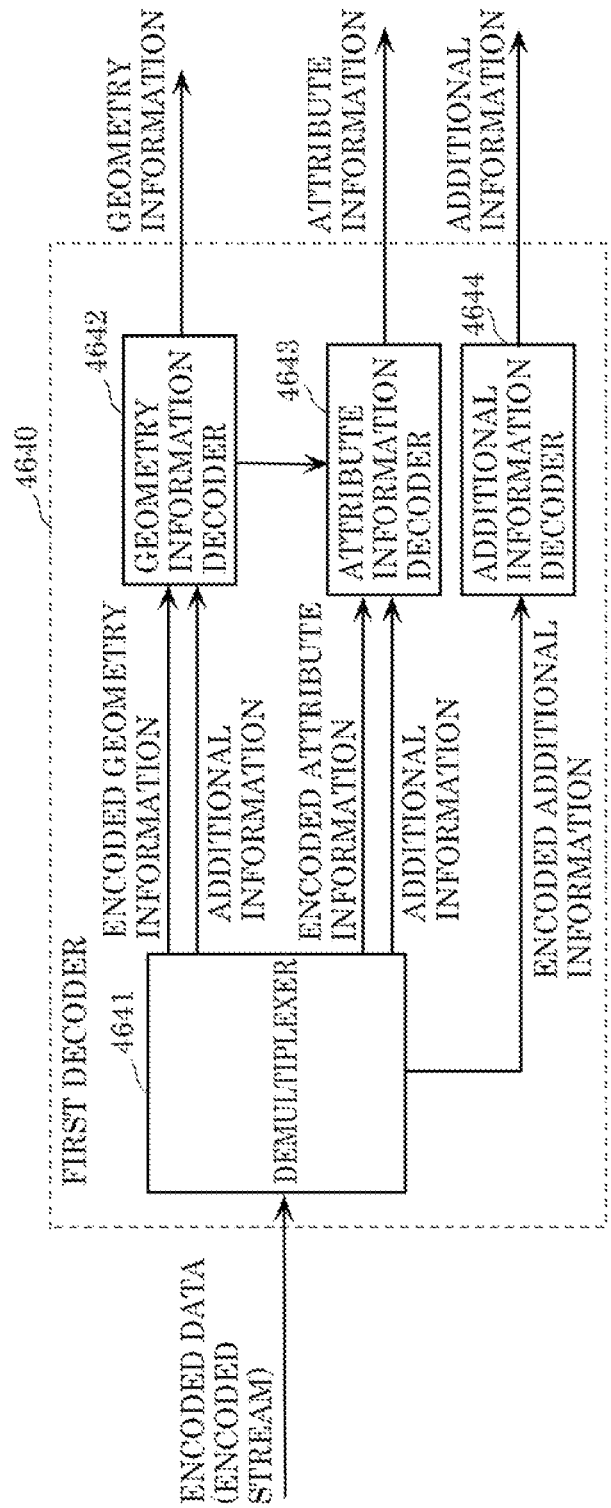
FIG. 8 is a block diagram illustrating the first decoder according to Embodiment 1.

Next, first decoder 4640, which is an example of decoder 4624 that performs decoding in the first encoding method, will be described. FIG. 7 is a diagram showing a configuration of first decoder 4640. FIG. 8 is a block diagram showing first decoder 4640. First decoder 4640 generates point cloud data by decoding encoded data (encoded stream) encoded in the first encoding method in the first encoding method. First decoder 4640 includes demultiplexer 4641, geometry information decoder 4642, attribute information decoder 4643, and additional information decoder 4644.

An encoded stream (compressed stream), which is encoded data, is input to first decoder 4640 from a processor in a system layer (not shown).

Demultiplexer 4641 separates encoded geometry information (compressed geometry), encoded attribute information (compressed attribute), encoded additional information (compressed metadata), and other additional information from the encoded data.

Geometry information decoder 4642 generates geometry information by decoding the encoded geometry information. For example, geometry information decoder 4642 restores the geometry information on a point cloud represented by three-dimensional coordinates from encoded geometry information represented by an N-ary structure, such as an octree.

Attribute information decoder 4643 decodes the encoded attribute information based on configuration information generated by geometry information decoder 4642. For example, attribute information decoder 4643 determines a reference point (reference node) that is to be referred to in decoding a current point (current node) to be processed based on the octree structure generated by geometry information decoder 4642. For example, attribute information decoder 4643 refers to a node whose parent node in the octree is the same as the parent node of the current node, of peripheral nodes or neighboring nodes. Note that the method of determining a reference relationship is not limited to this method.

The process of decoding attribute information may include at least one of an inverse quantization process, a prediction process, and an arithmetic decoding process. In this case, "refer to" means using a reference node for calculating a predicted value of attribute information or using a state of a reference node (occupancy information that indicates whether a reference node includes a point cloud or not, for example) for determining a parameter of decoding. For example, the parameter of decoding is a quantization parameter in the inverse quantization process or a context or the like in the arithmetic decoding.

Additional information decoder 4644 generates additional information by decoding the encoded additional information. First decoder 4640 uses additional information required for the decoding process for the geometry information and the attribute information in the decoding, and outputs additional information required for an application to the outside.

Figure 9:
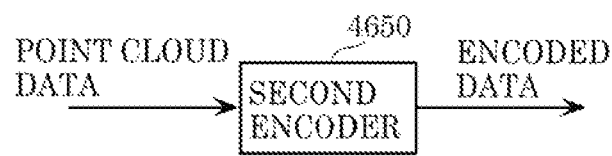
FIG. 9 is a diagram illustrating a structure of a second encoder according to Embodiment 1.
Figure 10:
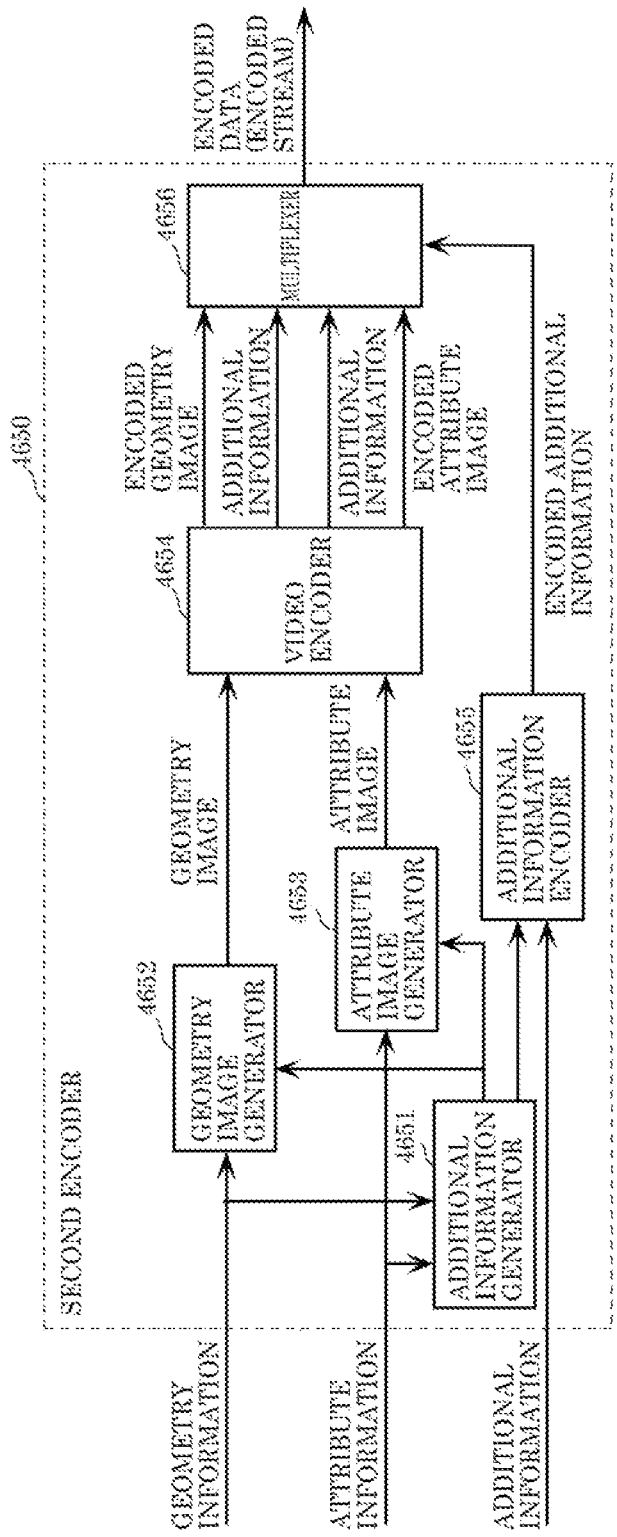
FIG. 10 is a block diagram illustrating the second encoder according to Embodiment 1.

Next, second encoder 4650, which is an example of encoder 4613 that performs encoding in the second encoding method, will be described. FIG. 9 is a diagram showing a configuration of second encoder 4650. FIG. 10 is a block diagram showing second encoder 4650.

Second encoder 4650 generates encoded data (encoded stream) by encoding point cloud data in the second encoding method. Second encoder 4650 includes additional information generator 4651, geometry image generator 4652, attribute image generator 4653, video encoder 4654, additional information encoder 4655, and multiplexer 4656.

Second encoder 4650 is characterized by generating a geometry image and an attribute image by projecting a three-dimensional structure onto a two-dimensional image, and encoding the generated geometry image and attribute image in an existing video encoding scheme. The second encoding method is referred to as video-based PCC (VPCC).

Point cloud data is PCC point cloud data like a PLY file or PCC point cloud data generated from sensor information, and includes geometry information (position), attribute information (attribute), and other additional information (metadata).

Additional information generator 4651 generates map information on a plurality of two-dimensional images by projecting a three-dimensional structure onto a two-dimensional image.

Geometry image generator 4652 generates a geometry image based on the geometry information and the map information generated by additional information generator 4651. The geometry image is a distance image in which distance (depth) is indicated as a pixel value, for example. The distance image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Attribute image generator 4653 generates an attribute image based on the attribute information and the map information generated by additional information generator 4651. The attribute image is an image in which attribute information (color (RGB), for example) is indicated as a pixel value, for example. The image may be an image of a plurality of point clouds viewed from one point of view (an image of a plurality of point clouds projected onto one two-dimensional plane), a plurality of images of a plurality of point clouds viewed from a plurality of points of view, or a single image integrating the plurality of images.

Video encoder 4654 generates an encoded geometry image (compressed geometry image) and an encoded attribute image (compressed attribute image), which are encoded data, by encoding the geometry image and the attribute image in a video encoding scheme. Note that, as the video encoding scheme, any well-known encoding method can be used. For example, the video encoding scheme is AVC or HEVC.

Additional information encoder 4655 generates encoded additional information (compressed metadata) by encoding the additional information, the map information and the like included in the point cloud data.

Multiplexer 4656 generates an encoded stream (compressed stream), which is encoded data, by multiplexing the encoded geometry image, the encoded attribute image, the encoded additional information, and other additional information. The generated encoded stream is output to a processor in a system layer (not shown).

Figure 11:
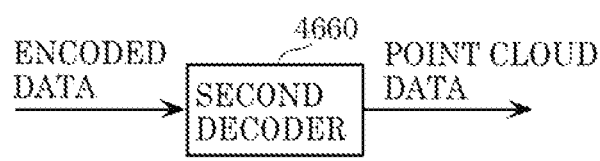
FIG. 11 is a diagram illustrating a structure of a second decoder according to Embodiment 1.
Figure 12:
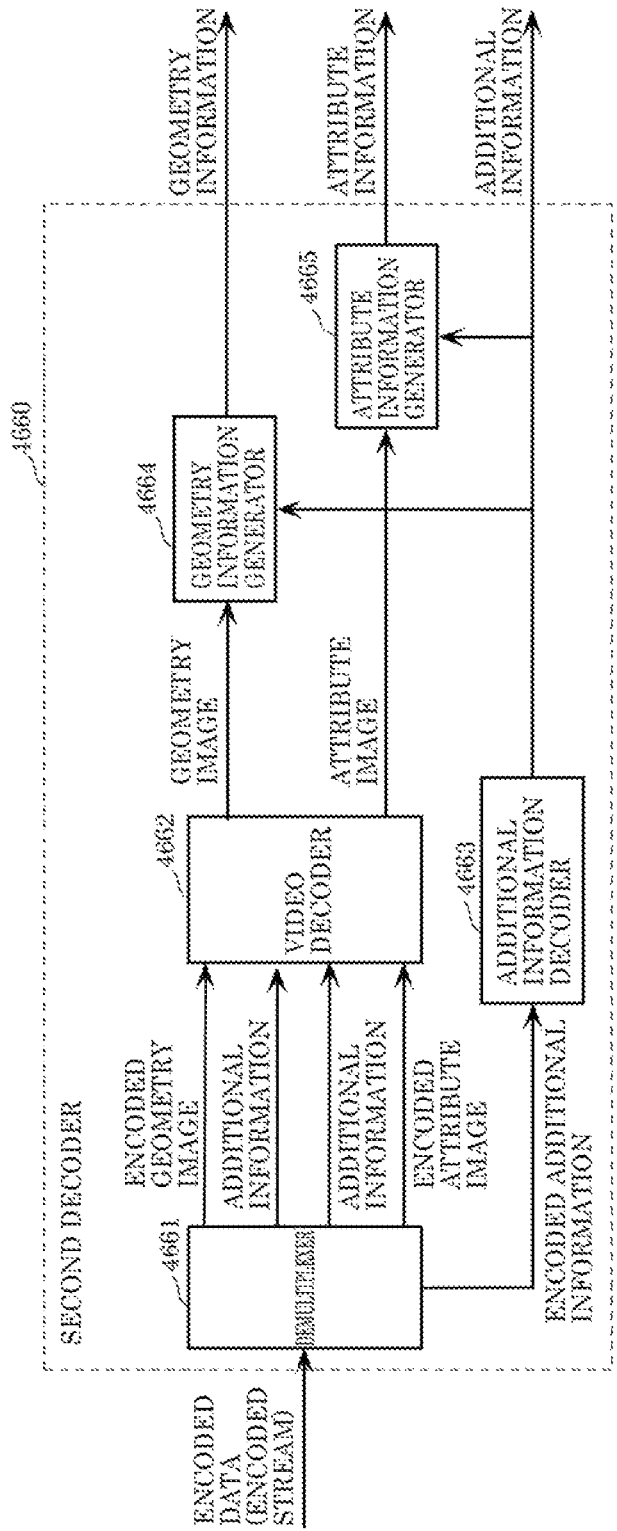
FIG. 12 is a block diagram illustrating the second decoder according to Embodiment 1.

Next, second decoder 4660, which is an example of decoder 4624 that performs decoding in the second encoding method, will be described. FIG. 11 is a diagram showing a configuration of second decoder 4660. FIG. 12 is a block diagram showing second decoder 4660. Second decoder 4660 generates point cloud data by decoding encoded data (encoded stream) encoded in the second encoding method in the second encoding method. Second decoder 4660 includes demultiplexer 4661, video decoder 4662, additional information decoder 4663, geometry information generator 4664, and attribute information generator 4665.

An encoded stream (compressed stream), which is encoded data, is input to second decoder 4660 from a processor in a system layer (not shown).

Demultiplexer 4661 separates an encoded geometry image (compressed geometry image), an encoded attribute image (compressed attribute image), an encoded additional information (compressed metadata), and other additional information from the encoded data.

Video decoder 4662 generates a geometry image and an attribute image by decoding the encoded geometry image and the encoded attribute image in a video encoding scheme. Note that, as the video encoding scheme, any well-known encoding method can be used. For example, the video encoding scheme is AVC or HEVC.

Additional information decoder 4663 generates additional information including map information or the like by decoding the encoded additional information.

Geometry information generator 4664 generates geometry information from the geometry image and the map information. Attribute information generator 4665 generates attribute information from the attribute image and the map information.

Second decoder 4660 uses additional information required for decoding in the decoding, and outputs additional information required for an application to the outside.

Figure 13:
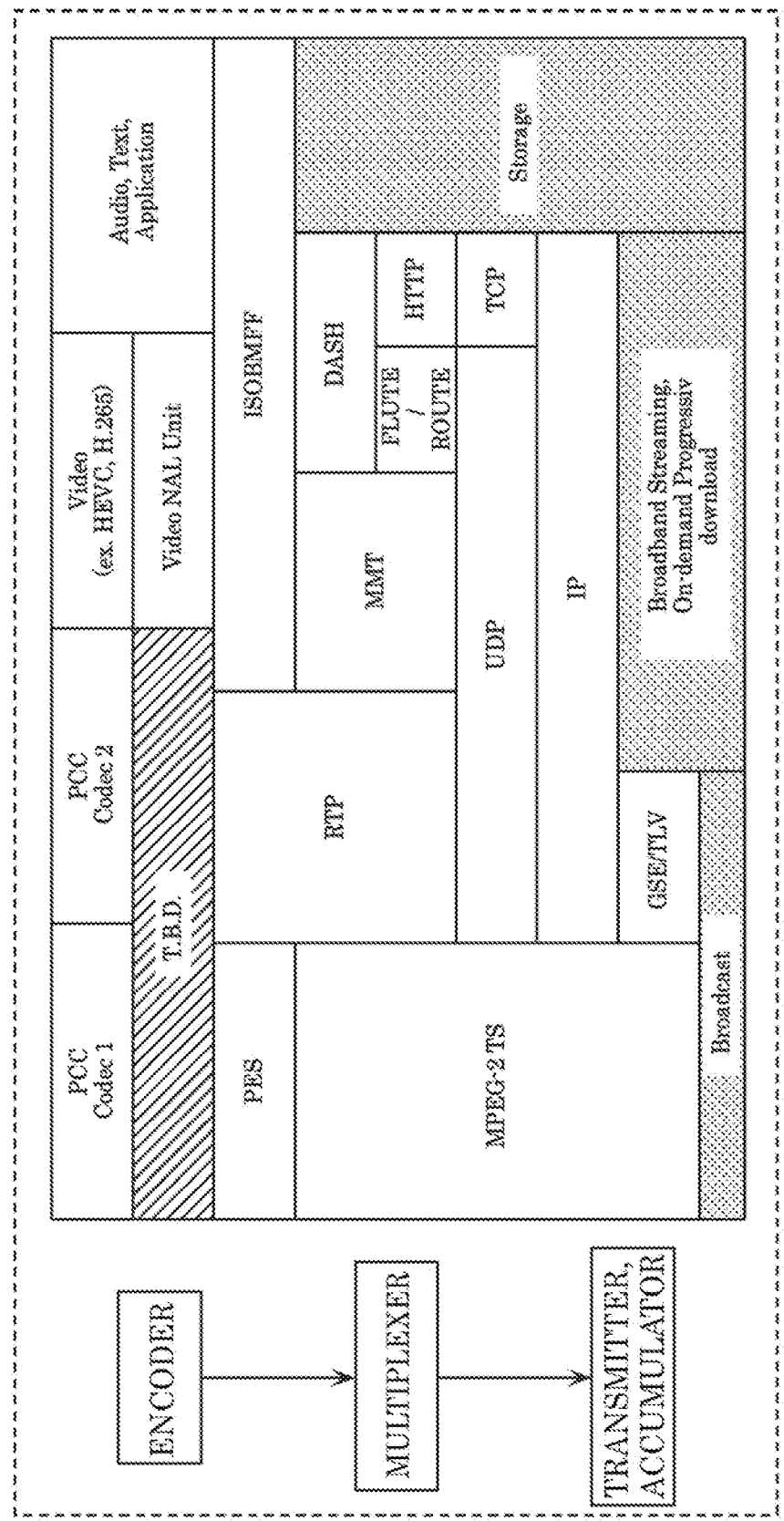
FIG. 13 is a diagram illustrating a protocol stack related to PCC encoded data according to Embodiment 1.

In the following, a problem with the PCC encoding scheme will be described. FIG. 13 is a diagram showing a protocol stack relating to PCC-encoded data. FIG. 13 shows an example in which PCC-encoded data is multiplexed with other medium data, such as a video (HEVC, for example) or an audio, and transmitted or accumulated.

A multiplexing scheme and a file format have a function of multiplexing various encoded data and transmitting or accumulating the data. To transmit or accumulate encoded data, the encoded data has to be converted into a format for the multiplexing scheme. For example, with HEVC, a technique for storing encoded data in a data structure referred to as a NAL unit and storing the NAL unit in ISOBMFF is prescribed.

At present, a first encoding method (Codec1) and a second encoding method (Codec2) are under investigation as encoding methods for point cloud data. However, there is no method defined for storing the configuration of encoded data and the encoded data in a system format. Thus, there is a problem that an encoder cannot perform an MUX process (multiplexing), transmission, or accumulation of data.

Note that, in the following, the term "encoding method" means any of the first encoding method and the second encoding method unless a particular encoding method is specified.

Embodiment 2

In Embodiment 2, a method of storing the NAL unit in an ISOBMFF file will be described.

ISOBMFF is a file format standard prescribed in ISO/IEC14496-12. ISOBMFF is a standard that does not depend on any medium, and prescribes a format that allows various media, such as a video, an audio, and a text, to be multiplexed and stored.

A basic structure (file) of ISOBMFF will be described. A basic unit of ISOBMFF is a box. A box is formed by type, length, and data, and a file is a set of various types of boxes.

Figures 14, 15:
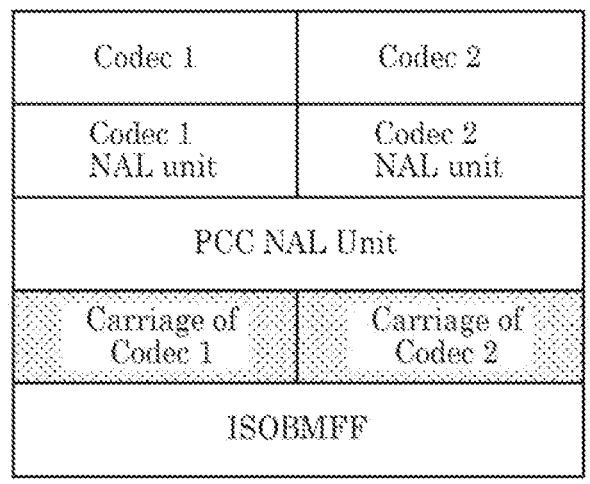
FIG. 14 is a diagram illustrating a basic structure of ISOBMFF according to Embodiment 2.
FIG. 15 is a diagram illustrating a protocol stack according to Embodiment 2.

FIG. 14 is a diagram showing a basic structure (file) of ISOBMFF. A file in ISOBMFF includes boxes, such as ftyp that indicates the brand of the file by four-character code (4CC), moov that stores metadata, such as control information (signaling information), and mdat that stores data.

A method for storing each medium in the ISOBMFF file is separately prescribed. For example, a method of storing an AVC video or an HEVC video is prescribed in ISO/IEC14496-15. Here, it can be contemplated to expand the functionality of ISOBMFF and use ISOBMFF to accumulate or transmit PCC-encoded data. However, there has been no convention for storing PCC-encoded data in an ISOBMFF file. In this embodiment, a method of storing PCC-encoded data in an ISOBMFF file will be described.

FIG. 15 is a diagram showing a protocol stack in a case where a common PCC codec NAL unit in an ISOBMFF file. Here, a common PCC codec NAL unit is stored in an ISOBMFF file. Although the NAL unit is common to PCC codecs, a storage method for each codec (Carriage of Codec1, Carriage of Codec2) is desirably prescribed, since a plurality of PCC codecs are stored in the NAL unit.

Figure 16:
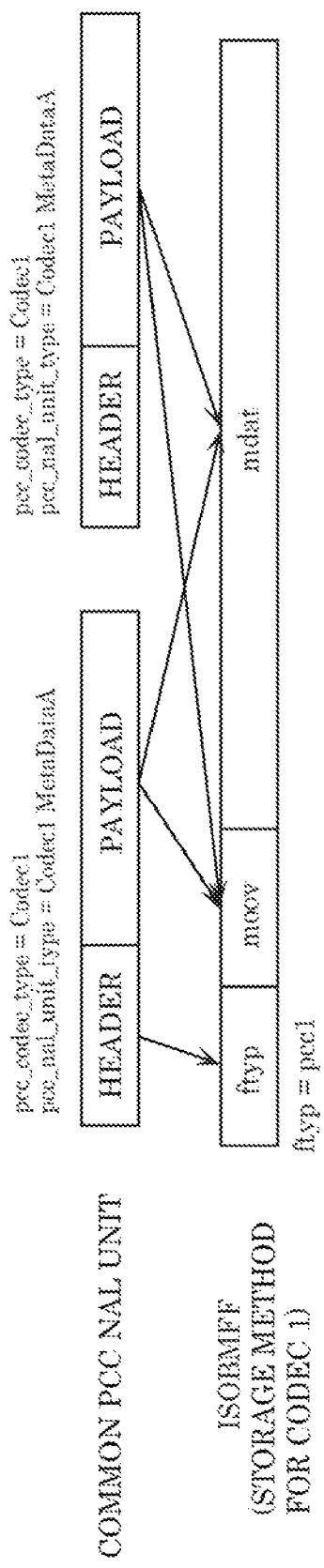
FIG. 16 is a diagram illustrating an example where a NAL unit is stored in a file for codec 1 according to Embodiment 2.
Figure 17:
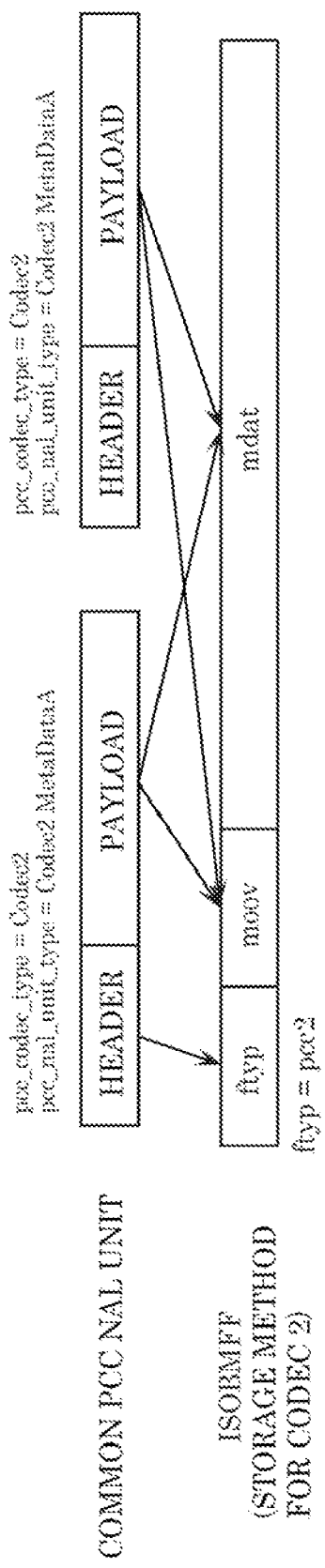
FIG. 17 is a diagram illustrating an example where a NAL unit is stored in a file for codec 2 according to Embodiment 2.

Next, a method of storing a common PCC NAL unit that supports a plurality of PCC codecs in an ISOBMFF file will be described. FIG. 16 is a diagram showing an example in which a common PCC NAL unit is stored in an ISOBMFF file for the storage method for codec 1 (Carriage of Codec1). FIG. 17 is a diagram showing an example in which a common PCC NAL unit is stored in an ISOBMFF file for the storage method for codec 2 (Carriage of Codec2).

Here, ftyp is information that is important for identification of the file format, and a different identifier of ftyp is defined for each codec. When PCC-encoded data encoded in the first encoding method (encoding scheme) is stored in the file, ftyp is set to pcc1. When PCC-encoded data encoded in the second encoding method is stored in the file, ftyp is set to pcc2.

Here, pcc1 indicates that PCC codec 1 (first encoding method) is used, pcc2 indicates that PCC codec2 (second encoding method) is used. That is, pcc1 and pcc2 indicate that the data is PCC (encoded three-dimensional data (point cloud data)), and indicate the PCC codec (first encoding method or second encoding method).

In the following, a method of storing a NAL unit in an ISOBMFF file will be described. The multiplexer analyzes the NAL unit header, and describes pcc1 in ftyp of ISOBMFF if pcc_codec_type=Codec1.

The multiplexer analyzes the NAL unit header, and describes pcc2 in ftyp of ISOBMFF if pcc_codec_type=Codec2.

If pcc_nal_unit_type is metadata, the multiplexer stores the NAL unit in moov or mdat in a predetermined manner, for example. If pcc_nal_unit_type is data, the multiplexer stores the NAL unit in moov or mdat in a predetermined manner, for example.

For example, the multiplexer may store the NAL unit size in the NAL unit, as with HEVC.

According to this storage method, the demultiplexer (a system layer) can determine whether the PCC-encoded data is encoded in the first encoding method or the second encoding method by analyzing ftyp included in the file. Furthermore, as described above, by determining whether the PCC-encoded data is encoded in the first encoding method or the second encoding method, the encoded data encoded in any one of the encoding methods can be extracted from the data including both the encoded data encoded in the encoding methods. Therefore, when transmitting the encoded data, the amount of data transmitted can be reduced. In addition, according to this storage method, different data (file) formats do not need to be set for the first encoding method and the second encoding method, and a common data format can be used for the first encoding method and the second encoding method.

Note that, when the identification information for the codec, such as ftyp of ISOBMFF, is indicated in the metadata of the system layer, the multiplexer can store a NAL unit without pcc_nal_unit_type in the ISOBMFF file.

Next, configurations and operations of the multiplexer of the three-dimensional data encoding system (three-dimensional data encoding device) according to this embodiment and the demultiplexer of the three-dimensional data decoding system (three-dimensional data decoding device) according to this embodiment will be described.

Figure 18:
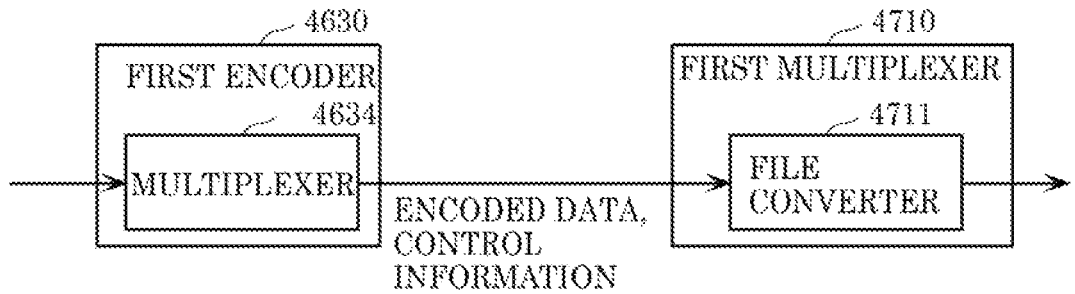
FIG. 18 is a diagram illustrating a structure of a first multiplexer according to Embodiment 2.

FIG. 18 is a diagram showing a configuration of first multiplexer 4710. First multiplexer 4710 includes file converter 4711 that generates multiplexed data (file) by storing encoded data generated by first encoder 4630 and control information (NAL unit) in an ISOBMFF file. First multiplexer 4710 is included in multiplexer 4614 shown in FIG. 1, for example.

Figure 19:
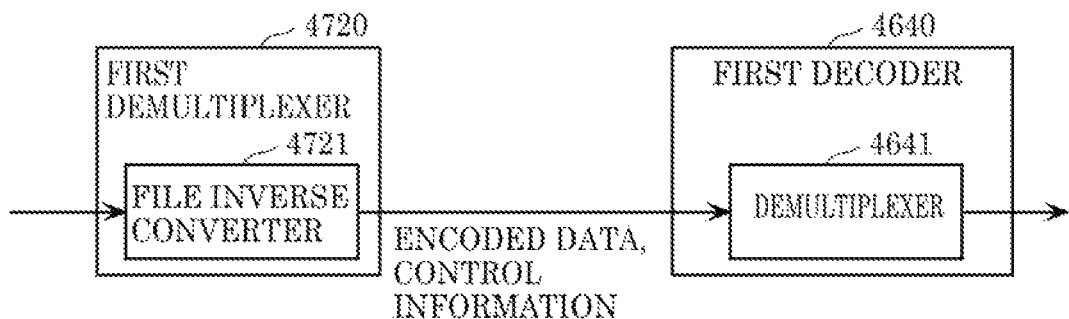
FIG. 19 is a diagram illustrating a structure of a first demultiplexer according to Embodiment 2.

FIG. 19 is a diagram showing a configuration of first demultiplexer 4720. First demultiplexer 4720 includes file inverse converter 4721 that obtains encoded data and control information (NAL unit) from multiplexed data (file) and outputs the obtained encoded data and control information to first decoder 4640. First demultiplexer 4720 is included in demultiplexer 4623 shown in FIG. 1, for example.

Figure 20:
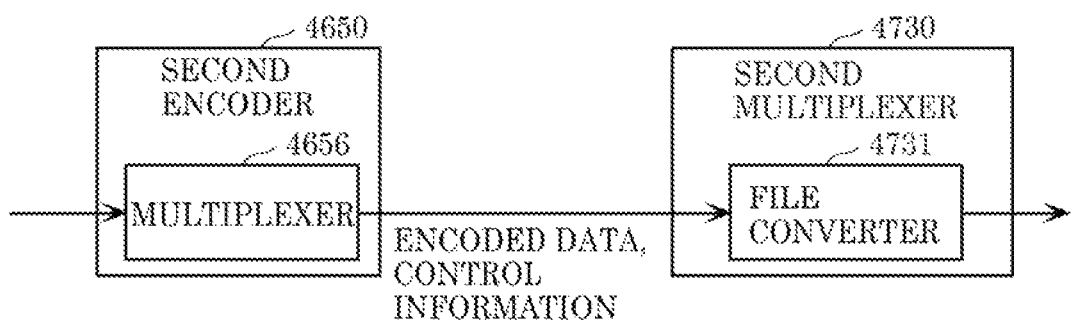
FIG. 20 is a diagram illustrating a structure of a second multiplexer according to Embodiment 2.

FIG. 20 is a diagram showing a configuration of second multiplexer 4730. Second multiplexer 4730 includes file converter 4731 that generates multiplexed data (file) by storing encoded data generated by second encoder 4650 and control information (NAL unit) in an ISOBMFF file. Second multiplexer 4730 is included in multiplexer 4614 shown in FIG. 1, for example.

Figure 21:
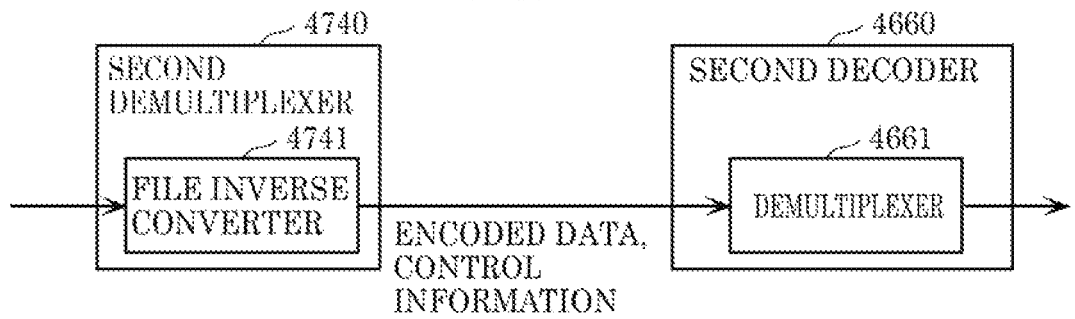
FIG. 21 is a diagram illustrating a structure of a second demultiplexer according to Embodiment 2.

FIG. 21 is a diagram showing a configuration of second demultiplexer 4740. Second demultiplexer 4740 includes file inverse converter 4741 that obtains encoded data and control information (NAL unit) from multiplexed data (file) and outputs the obtained encoded data and control information to second decoder 4660. Second demultiplexer 4740 is included in demultiplexer 4623 shown in FIG. 1, for example.

Figure 22:
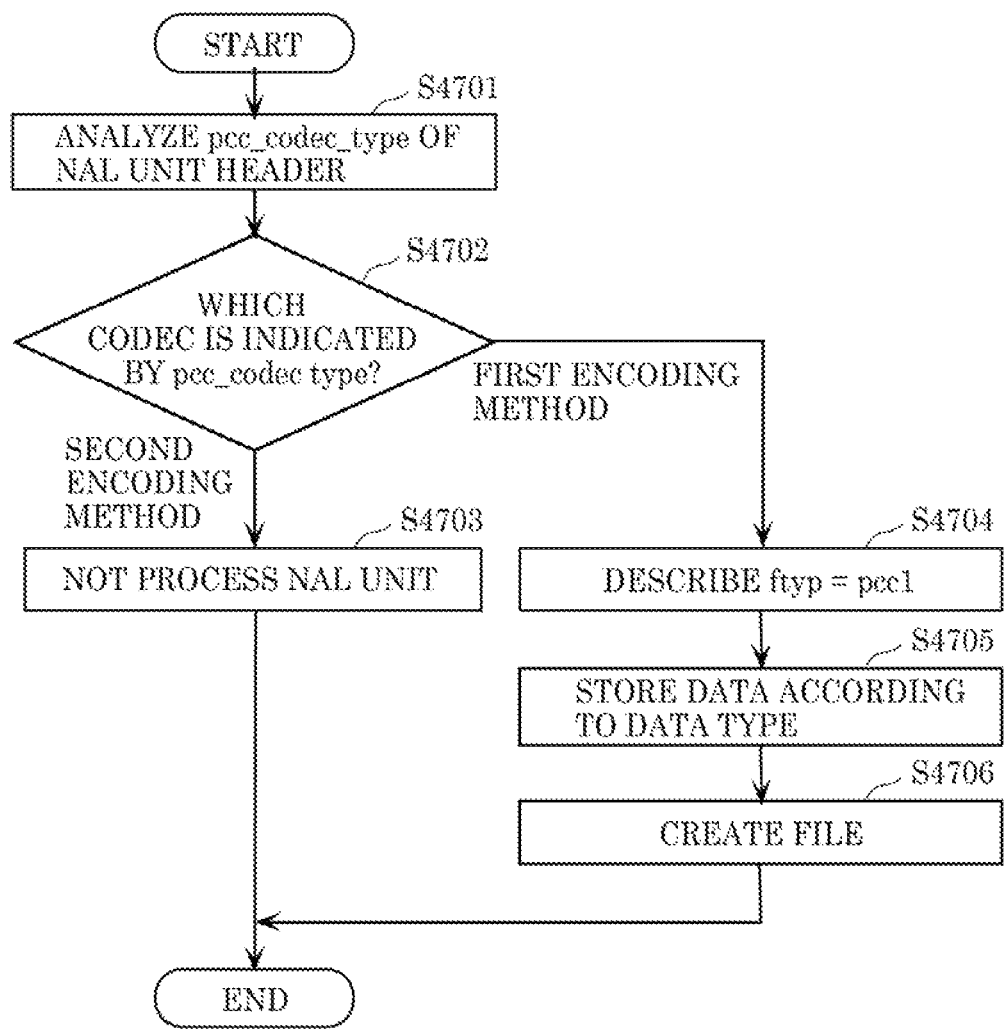
FIG. 22 is a flowchart of processing performed by the first multiplexer according to Embodiment 2.

FIG. 22 is a flowchart showing a multiplexing process by first multiplexer 4710. First, first multiplexer 4710 analyzes pcc_codec_type in the NAL unit header, thereby determining whether the codec used is the first encoding method or the second encoding method (S4701).

When pcc_codec_type represents the second encoding method (if "second encoding method" in S4702), first multiplexer 4710 does not process the NAL unit (S4703).

On the other hand, when pcc_codec_type represents the first encoding method (if "first encoding method" in S4702), first multiplexer 4710 describes pcc1 in ftyp (S4704). That is, first multiplexer 4710 describes information indicating that data encoded in the first encoding method is stored in the file in ftyp.

First multiplexer 4710 then analyzes pcc_nal_unit_type in the NAL unit header, and stores the data in a box (moov or mdat, for example) in a predetermined manner suitable for the data type represented by pcc_nal_unit_type (S4705). First multiplexer 4710 then creates an ISOBMFF file including the ftyp described above and the box described above (S4706).

Figure 23:
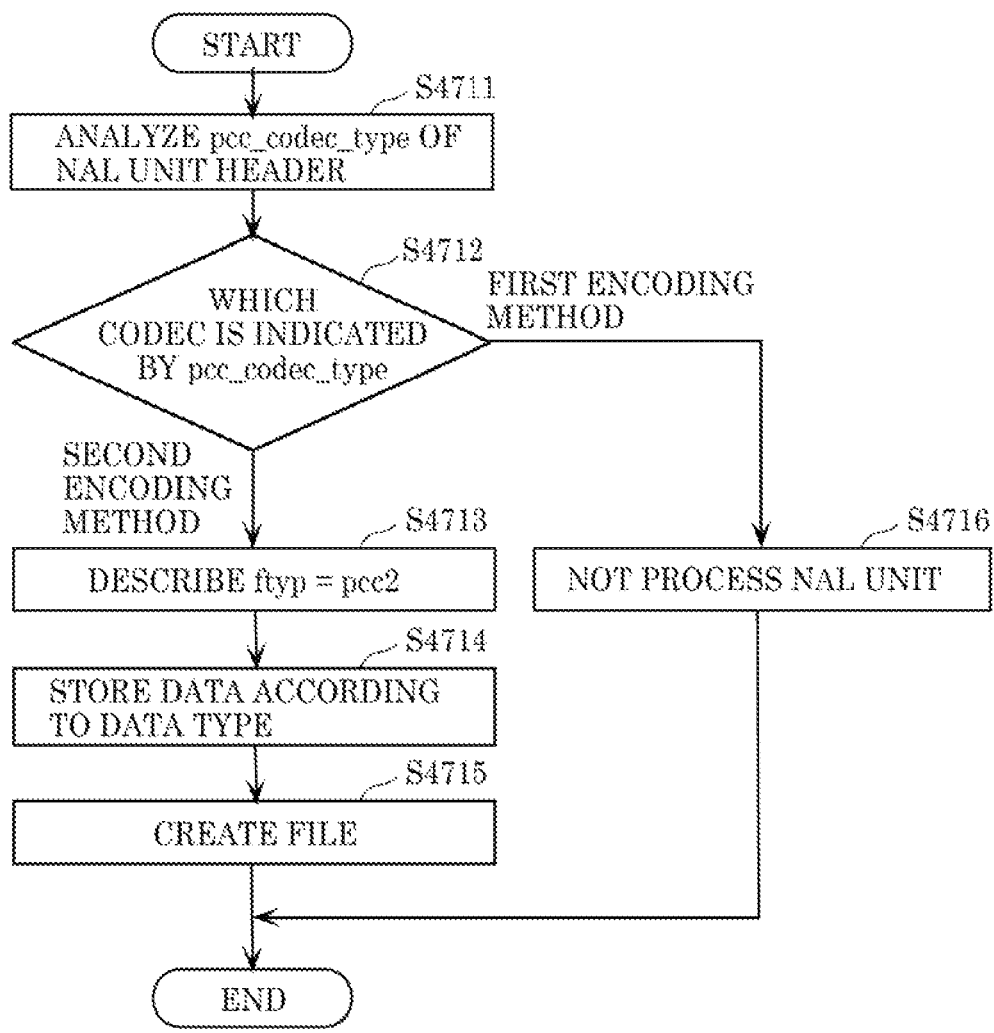
FIG. 23 is a flowchart of processing performed by the second multiplexer according to Embodiment 2.

FIG. 23 is a flowchart showing a multiplexing process by second multiplexer 4730. First, second multiplexer 4730 analyzes pcc_codec_type in the NAL unit header, thereby determining whether the codec used is the first encoding method or the second encoding method (S4711).

When pcc_codec_type represents the second encoding method (if "second encoding method" in S4712), second multiplexer 4730 describes pcc2 in ftyp (S4713). That is, second multiplexer 4730 describes information indicating that data encoded in the second encoding method is stored in the file in ftyp.

Second multiplexer 4730 then analyzes pcc_nal_unit_type in the NAL unit header, and stores the data in a box (moov or mdat, for example) in a predetermined manner suitable for the data type represented by pcc_nal_unit_type (S4714). Second multiplexer 4730 then creates an ISOBMFF file including the ftyp described above and the box described above (S4715).

On the other hand, when pcc_codec_type represents the first encoding method (if "first encoding method" in S4712), second multiplexer 4730 does not process the NAL unit (S4716).

Note that the process described above is an example in which PCC data is encoded in any one of the first encoding method and the second encoding method. First multiplexer 4710 and second multiplexer 4730 store a desired NAL unit in a file by identifying the codec type of the NAL unit. Note that, when the identification information for the PCC codec is included in a location other than the NAL unit header, first multiplexer 4710 and second multiplexer 4730 may identify the codec type (first encoding method or second encoding method) based on the identification information for the PCC codec included in the location other than the NAL unit header in step S4701 or S4711.

When storing data in a file in step S4706 or S4714, first multiplexer 4710 and second multiplexer 4730 may store the data in the file after deleting pcc_nal_unit_type from the NAL unit header.

Figure 24:
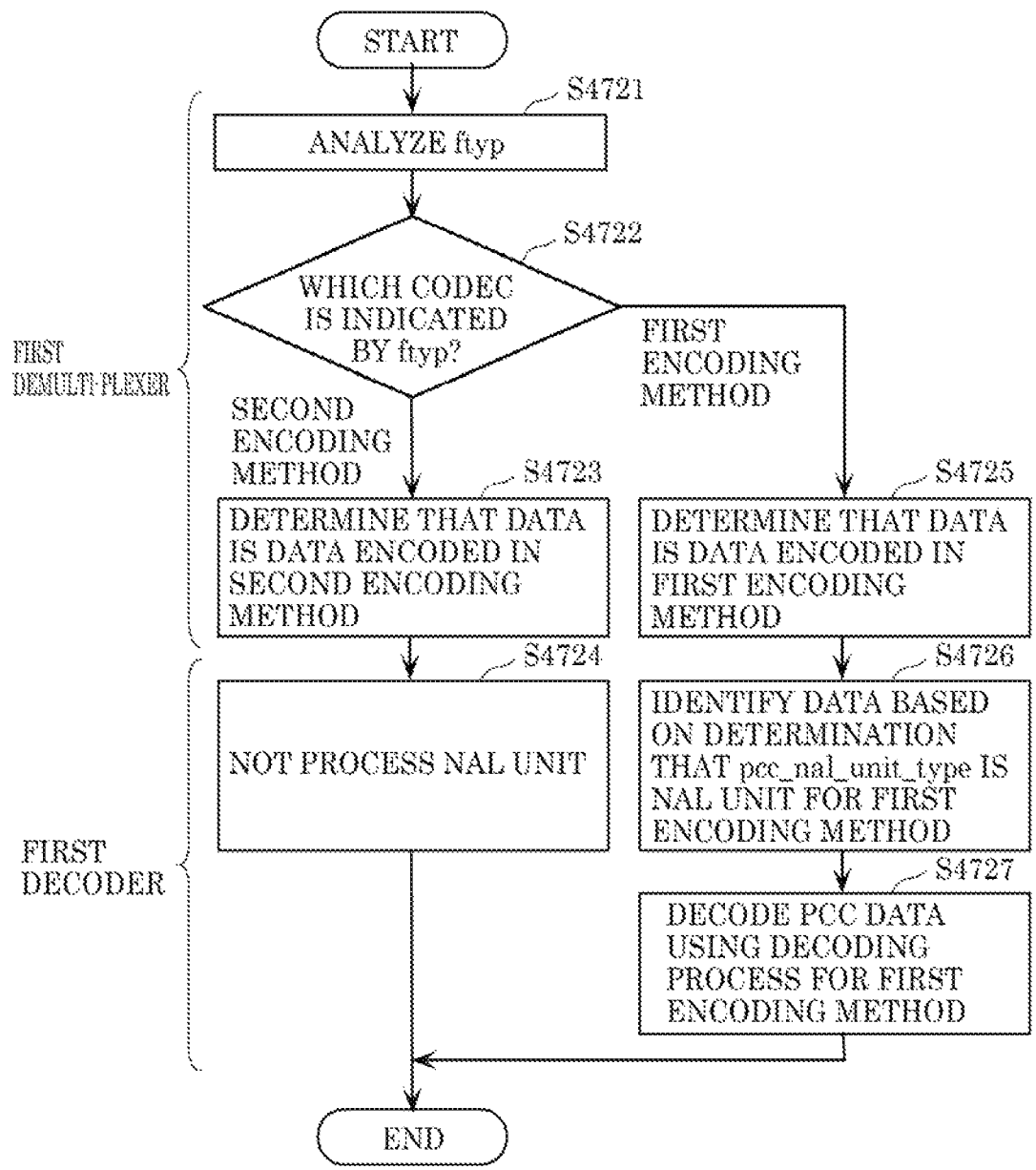
FIG. 24 is a flowchart of processing performed by the first demultiplexer and the first decoder according to Embodiment 2.

FIG. 24 is a flowchart showing a process performed by first demultiplexer 4720 and first decoder 4640. First, first demultiplexer 4720 analyzes ftyp in an ISOBMFF file (S4721). When the codec represented by ftyp is the second encoding method (pcc2) (if "second encoding method" in S4722), first demultiplexer 4720 determines that the data included in the payload of the NAL unit is data encoded in the second encoding method (S4723). First demultiplexer 4720 also transmits the result of the determination to first decoder 4640. First decoder 4640 does not process the NAL unit (S4724).

On the other hand, when the codec represented by ftyp is the first encoding method (pcc1) (if "first encoding method"

in S4722), first demultiplexer 4720 determines that the data included in the payload of the NAL unit is data encoded in the first encoding method (S4725). First demultiplexer 4720 also transmits the result of the determination to first decoder 4640.

First decoder 4640 identifies the data based on the determination that pcc_nal_unit_type in the NAL unit header is the identifier of the NAL unit for the first encoding method (S4726). First decoder 4640 then decodes the PCC data using a decoding process for the first encoding method (S4727).

Figure 25:
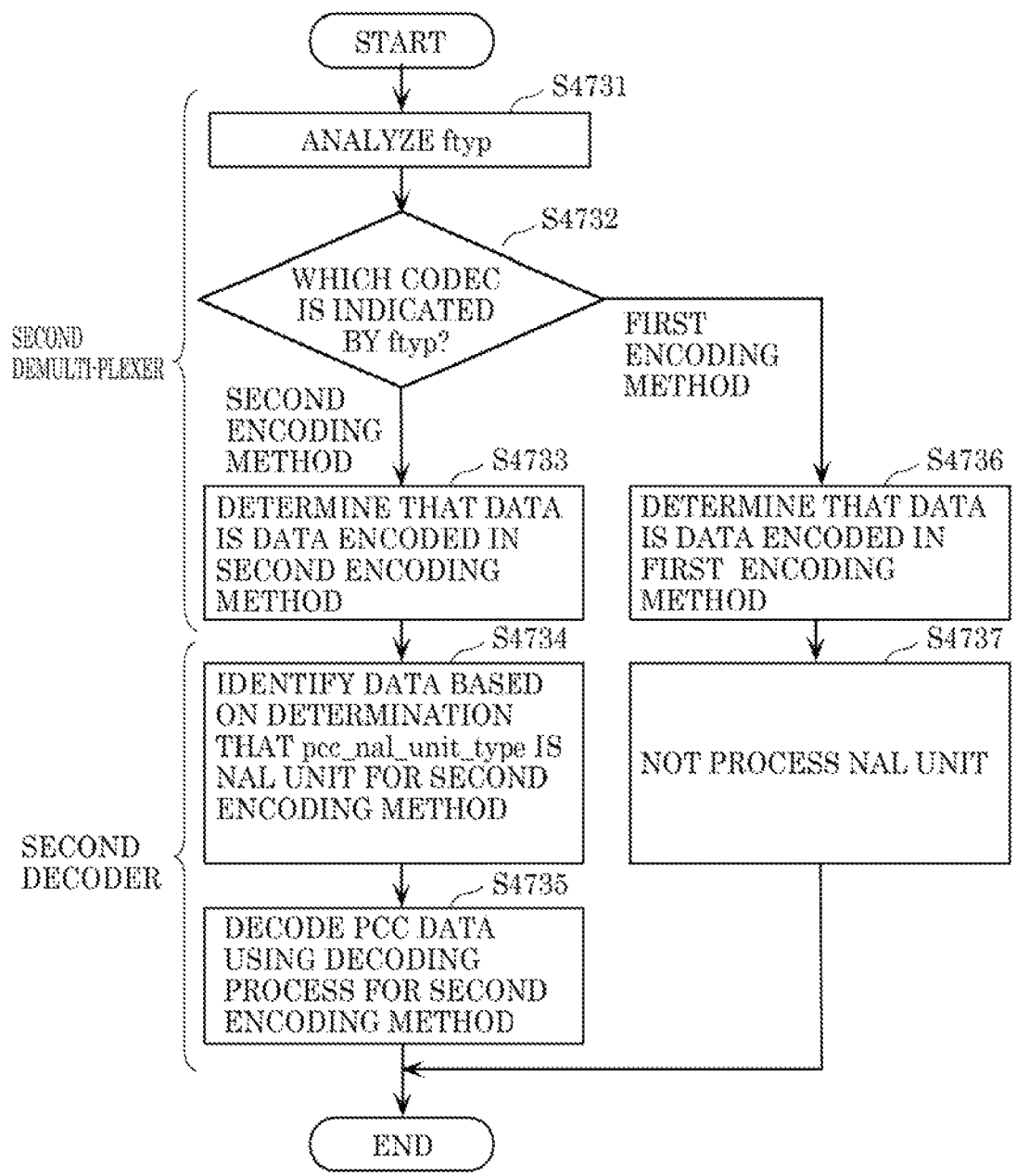
FIG. 25 is a flowchart of processing performed by the second demultiplexer and the second decoder according to Embodiment 2.

FIG. 25 is a flowchart showing a process performed by second demultiplexer 4740 and second decoder 4660. First, second demultiplexer 4740 analyzes ftyp in an ISOBMFF file (S4731). When the codec represented by ftyp is the second encoding method (pcc2) (if "second encoding method" in S4732), second demultiplexer 4740 determines that the data included in the payload of the NAL unit is data encoded in the second encoding method (S4733). Second demultiplexer 4740 also transmits the result of the determination to second decoder 4660.

Second decoder 4660 identifies the data based on the determination that pcc_nal_unit_type in the NAL unit header is the identifier of the NAL unit for the second encoding method (S4734). Second decoder 4660 then decodes the PCC data using a decoding process for the second encoding method (S4735).

On the other hand, when the codec represented by ftyp is the first encoding method (pcc1) (if "first encoding method" in S4732), second demultiplexer 4740 determines that the data included in the payload of the NAL unit is data encoded in the first encoding method (S4736). Second demultiplexer 4740 also transmits the result of the determination to second decoder 4660. Second decoder 4660 does not process the NAL unit (S4737).

As described above, for example, since the codec type of the NAL unit is identified in first demultiplexer 4720 or second demultiplexer 4740, the codec type can be identified in an early stage. Furthermore, a desired NAL unit can be input to first decoder 4640 or second decoder 4660, and an unwanted NAL unit can be removed. In this case, the process of first decoder 4640 or second decoder 4660 analyzing the identification information for the codec may be unnecessary. Note that a process of referring to the NAL unit type again and analyzing the identification information for the codec may be performed by first decoder 4640 or second decoder 4660.

Furthermore, if pcc_nal_unit_type is deleted from the NAL unit header by first multiplexer 4710 or second multiplexer 4730, first demultiplexer 4720 or second demultiplexer 4740 can output the NAL unit to first decoder 4640 or second decoder 4660 after adding pcc_nal_unit_type to the NAL unit.

Embodiment 3

Figure 26:
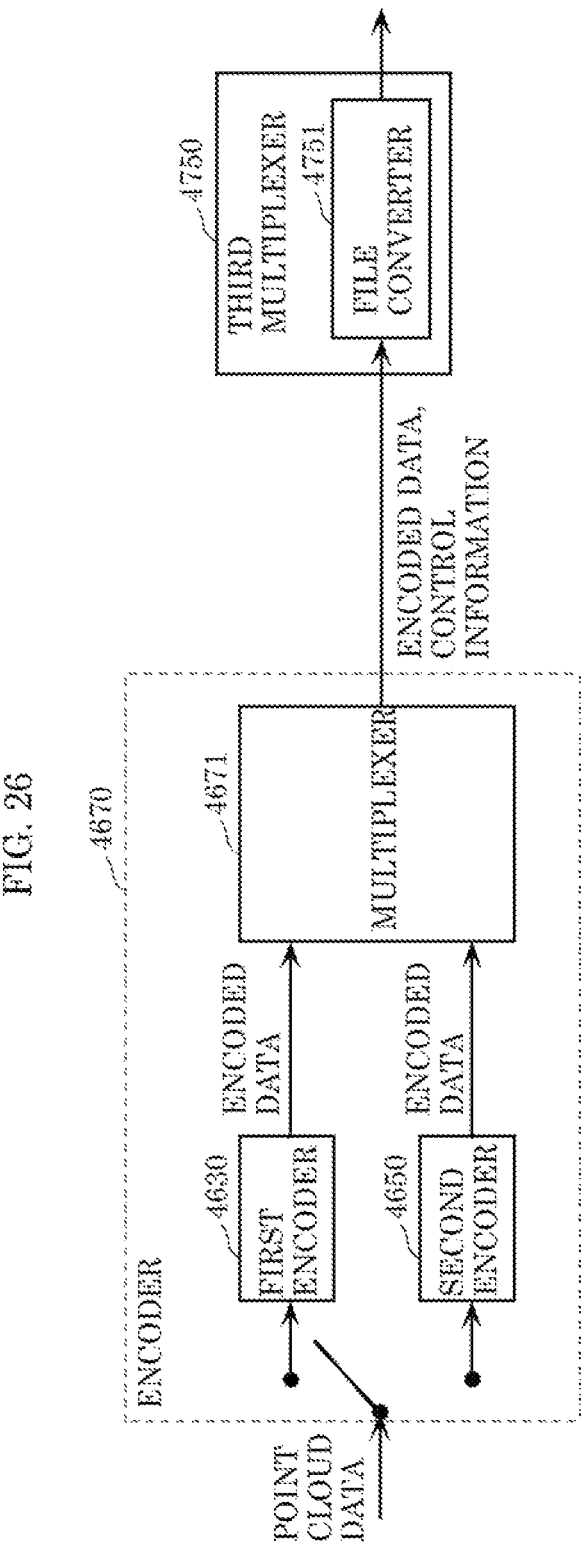
FIG. 26 is a diagram illustrating structures of an encoder and a third multiplexer according to Embodiment 3.

In Embodiment 3, a multiplexer and a demultiplexer that correspond to encoder 4670 and decoder 4680 ready for a plurality of codecs described above with regard to Embodiment 1 will be described. FIG. 26 is a diagram showing configurations of encoder 4670 and third multiplexer 4750 according to this embodiment.

Encoder 4670 encodes point cloud data in both or one of the first encoding method and the second encoding method. Encoder 4670 may change the encoding method (between the first encoding method and the second encoding method) on a point-cloud-data basis or on a frame basis. Alternatively, encoder 4670 may change the encoding method on the basis of an encodable unit.

Encoder 4670 generates encoded data (encoded stream) including the identification information for a PCC codec.

Third multiplexer 4750 includes file converter 4751. File converter 4751 converts a NAL unit output from encoder 4670 into a PCC data file. File converter 4751 analyzes the codec identification information included in the NAL unit header, and determines whether the PCC-encoded data is data encoded in the first encoding method, data encoded in the second encoding method, or data encoded in both the encoding methods. File converter 4751 describes a brand name that allows codec identification in ftyp. For example, when indicating the data is encoded in both the encoding methods, pcc3 is described in ftyp.

Note that, when encoder 4670 describes the PCC codec identification information in a location other than the NAL unit, file converter 4751 may determine the PCC codec (encoding method) based on the identification information.

Figure 27:
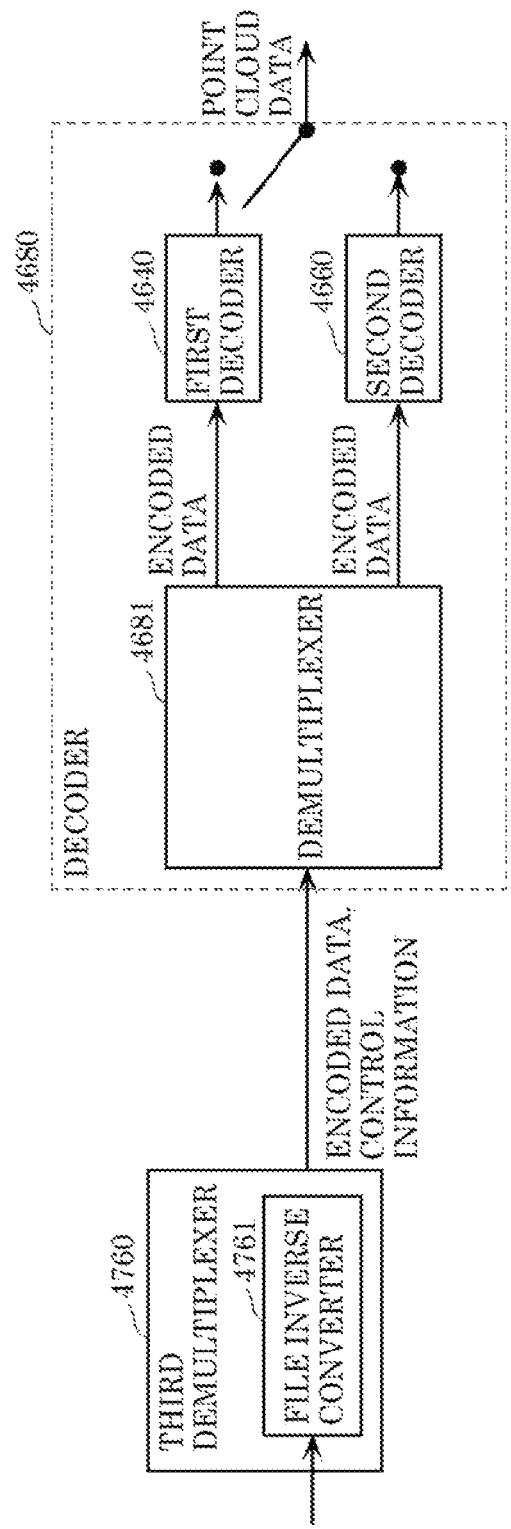
FIG. 27 is a diagram illustrating structures of a third demultiplexer and a decoder according to Embodiment 3.

FIG. 27 is a diagram showing configurations of third demultiplexer 4760 and decoder 4680 according to this embodiment.

Third demultiplexer 4760 includes file inverse converter 4761. File inverse converter 4761 analyzes ftyp included in a file, and determines whether the PCC-encoded data is data encoded in the first encoding method, data encoded in the second encoding method, or data encoded in both the encoding methods.

When the PCC-encoded data is data encoded in any one of the encoding methods, the data is input to an appropriate one of first decoder 4640 and second decoder 4660, and is not input to the other decoder. When the PCC-encoded data is data encoded in both the encoding methods, the data is input to decoder 4680 ready for both the encoding methods.

Decoder 4680 decodes the PCC-encoded data in both or one of the first encoding method and the second encoding method.

Figure 28:
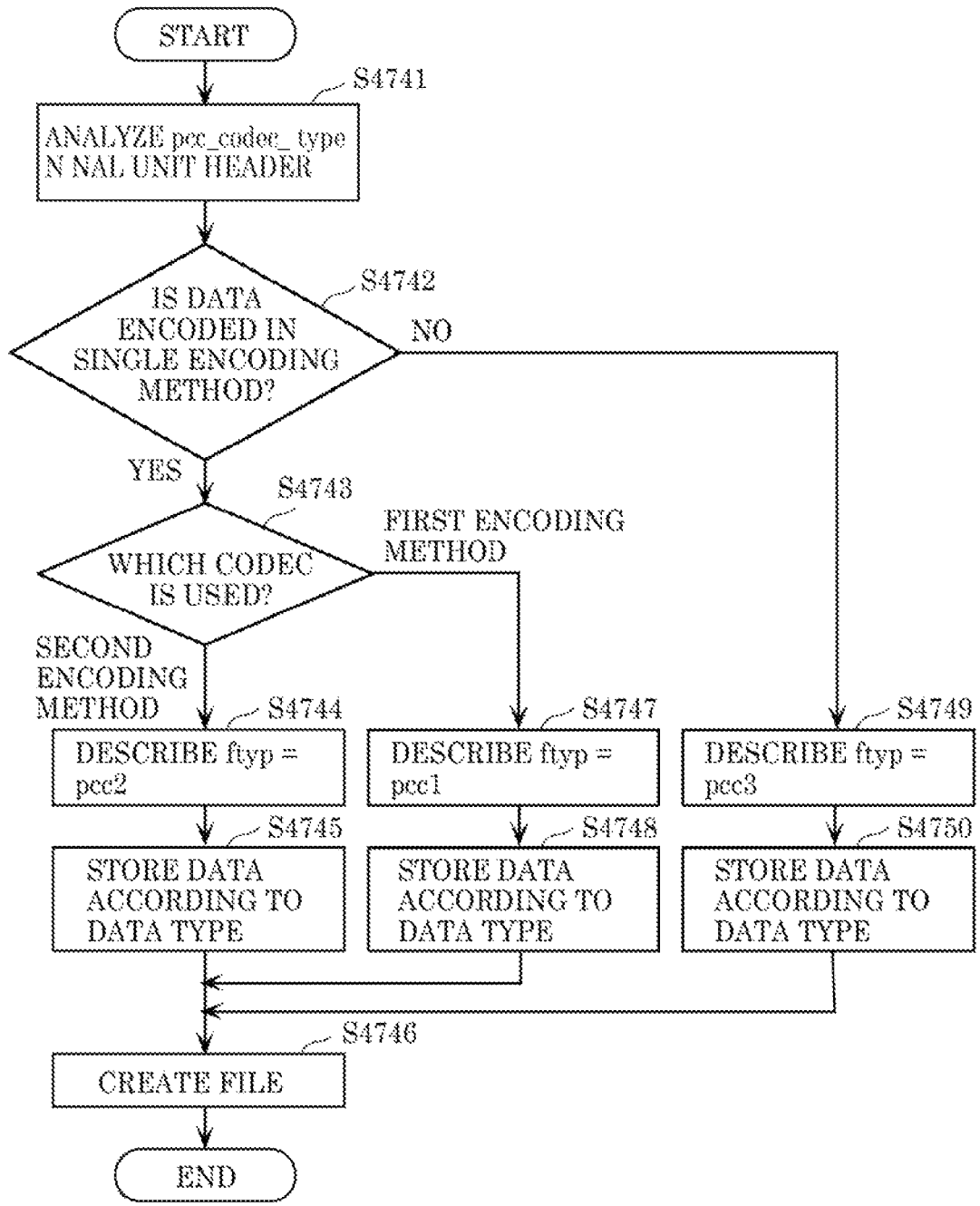
FIG. 28 is a flowchart of processing performed by the third multiplexer according to Embodiment 3.

FIG. 28 is a flowchart showing a process performed by third multiplexer 4750 according to this embodiment.

First, third multiplexer 4750 analyzes pcc_codec_type in the NAL unit header, thereby determining whether the codec(s) used is the first encoding method, the second encoding method, or both the first encoding method and the second encoding method (S4741).

When the second encoding method is used (if Yes in S4742 and "second encoding method" in S4743), third multiplexer 4750 describes pcc2 in ftyp (S4744). That is, third multiplexer 4750 describes information indicating that data encoded in the second encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4745). Third multiplexer 4750 then creates an ISOBMFF file including the ftyp described above and the box described above (S4746).

When the first encoding method is used (if Yes in S4742 and "first encoding method" in S4743), third multiplexer 4750 describes pcc1 in ftyp (S4747). That is, third multiplexer 4750 describes information indicating that data encoded in the first encoding method is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4748).

Third multiplexer 4750 then creates an ISOBMFF file including the ftyp described above and the box described above (S4746).

When both the first encoding method and the second encoding method are used (if No in S4742), third multiplexer 4750 describes pcc3 in ftyp (S4749). That is, third multiplexer 4750 describes information indicating that data encoded in both the encoding methods is stored in the file in ftyp.

Third multiplexer 4750 then analyzes pcc_nal_unit_type in the NAL unit header, and stores the data in a box (moov or mdat, for example) in a predetermined manner suitable for the data type represented by pcc_nal_unit_type (S4750). Third multiplexer 4750 then creates an ISOBMFF file including the ftyp described above and the box described above (S4746).

Figure 29:
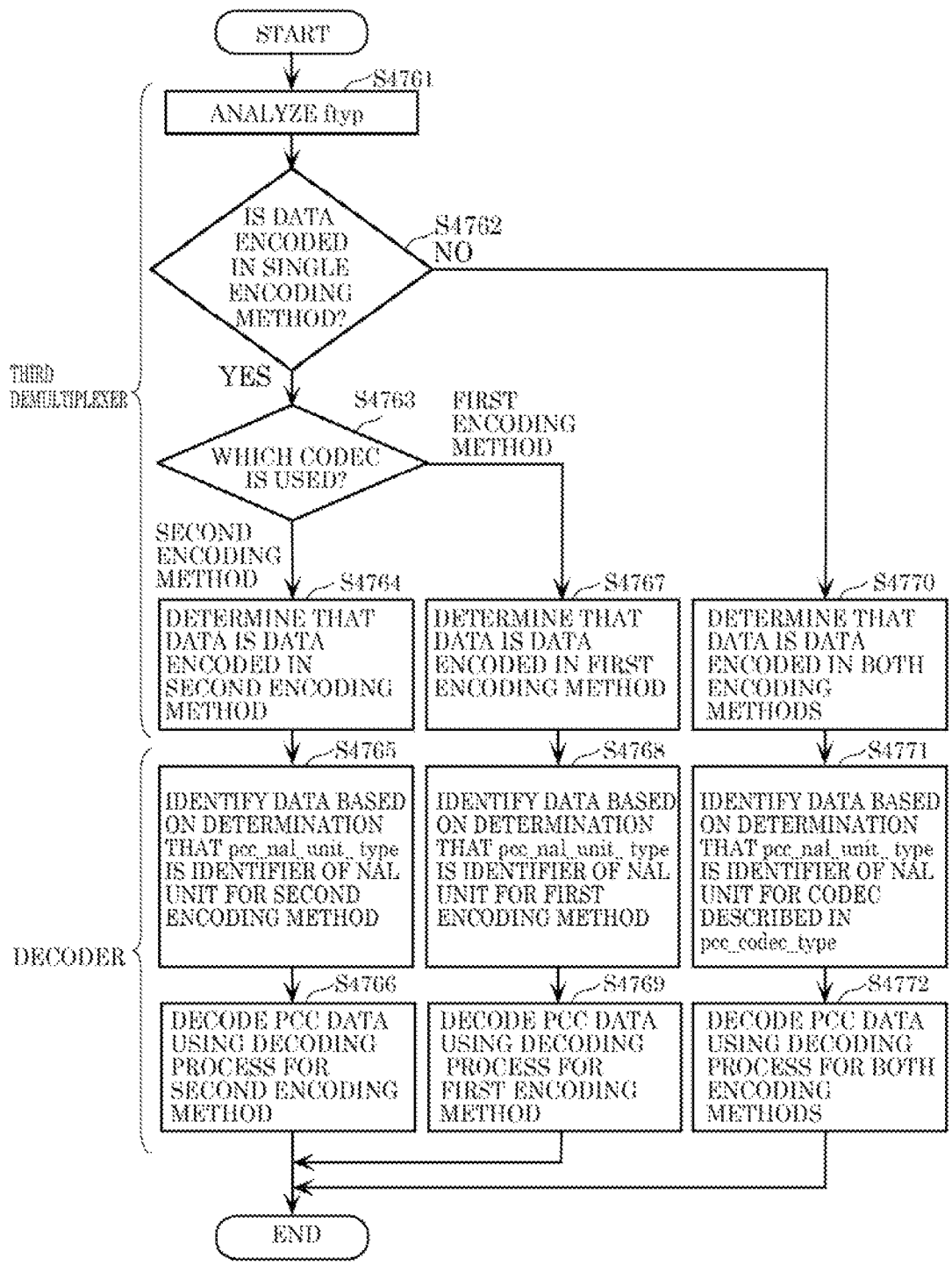
FIG. 29 is a flowchart of processing performed by the third demultiplexer and the decoder according to Embodiment 3.

FIG. 29 is a flowchart showing a process performed by third demultiplexer 4760 and decoder 4680. First, third demultiplexer 4760 analyzes ftyp included in an ISOBMFF file (S4761). When the codec represented by ftyp is the second encoding method (pcc2) (if Yes in S4762 and "second encoding method" in S4763), third demultiplexer 4760 determines that the data included in the payload of the NAL unit is data encoded in the second encoding method (S4764). Third demultiplexer 4760 also transmits the result of the determination to decoder 4680.

Decoder 4680 identifies the data based on the determination that pcc_nal_unit_type in the NAL unit header is the identifier of the NAL unit for the second encoding method (S4765). Decoder 4680 then decodes the PCC data using a decoding process for the second encoding method (S4766).

When the codec represented by ftyp is the first encoding method (pcc1) (if Yes in S4762 and "first encoding method" in S4763), third demultiplexer 4760 determines that the data included in the payload of the NAL unit is data encoded in the first encoding method (S4767). Third demultiplexer 4760 also transmits the result of the determination to decoder 4680.

Decoder 4680 identifies the data based on the determination that pcc_nal_unit_type in the NAL unit header is the identifier of the NAL unit for the first encoding method (S4768). Decoder 4680 then decodes the PCC data using a decoding process for the first encoding method (S4769).

When ftyp indicates that both the encoding methods are used (pcc3) (if No in S4762), third demultiplexer 4760 determines that the data included in the payload of the NAL unit is data encoded in both the first encoding method and the second encoding method (S4770). Third demultiplexer 4760 also transmits the result of the determination to decoder 4680.

Decoder 4680 identifies the data based on the determination that pcc_nal_unit_type in the NAL unit header is the identifier of the NAL unit for the codecs described in pcc_codec_type (S4771). Decoder 4680 then decodes the PCC data using decoding processes for both the encoding methods (S4772). That is, decoder 4680 decodes the data encoded in the first encoding method using a decoding process for the first encoding method, and decodes the data encoded in the second encoding method using a decoding process for the second encoding method.

In the following, variations of this embodiment will be described. As types of brands represented by ftyp, the types described below can be indicated by the identification information. Furthermore, a combination of a plurality of the types described below can also be indicated by the identification information.

The identification information may indicate whether the original data object yet to be PCC-encoded is a point cloud whose range is limited or a large point cloud whose range is not limited, such as map information.

The identification information may indicate whether the original data yet to be PCC-encoded is a static object or a dynamic object.

As described above, the identification information may indicate whether the PCC-encoded data is data encoded in the first encoding method or data encoded in the second encoding method.

The identification information may indicate an algorithm used in the PCC encoding. Here, the "algorithm" means an encoding method that can be used in the first encoding method or the second encoding method, for example.

The identification information may indicate a differentiation between methods of storing the PCC-encoded data into an ISOBMFF file. For example, the identification information may indicate whether the storage method used is a storage method for accumulation or a storage method for real-time transmission, such as dynamic streaming.

Although an example in which ISOBMFF is used as a file format has been described in Embodiments 2 and 3, other formats can also be used. For example, the method according to this embodiment can also be used when PCC-encoded data is stored in MPEG-2 TS Systems, MPEG-DASH, MMT, or RMP.

Although an example in which metadata, such as the identification information, is stored in ftyp has been shown above, metadata can also be stored in a location other than ftyp. For example, the metadata may be stored in moov.

Figure 30:
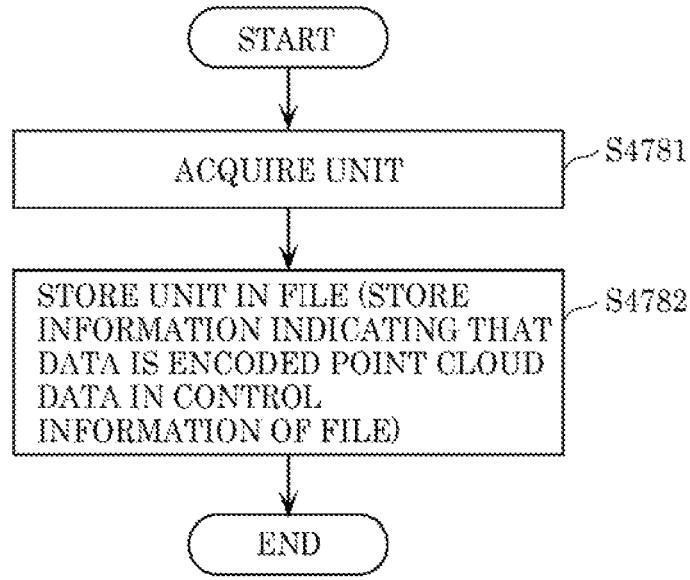
FIG. 30 is a flowchart of processing performed by a three-dimensional data storage device according to Embodiment 3.

As described above, a three-dimensional data storing device (or three-dimensional data multiplexing device or three-dimensional data encoding device) performs the process shown in FIG. 30.

First, the three-dimensional data storing device (which includes first multiplexer 4710, second multiplexer 4730 or third multiplexer 4750, for example) acquires one or more units (NAL units, for example) that store an encoded stream, which is encoded point cloud data (S4781). The three-dimensional data storing device then stores the one or more units in a file (an ISOBMFF file, for example) (S4782). In the storage (S4782), the three-dimensional data storing device also stores information indicating that the data stored in the file is encoded point cloud data (pcc1, pcc2, or pcc3, for example) in the control information (ftyp, for example) (referred to also as signaling information) for the file.

With such a configuration, a device that processes the file generated by the three-dimensional data storing device can quickly determine whether the data stored in the file is encoded point cloud data or not by referring to the control information for the file. Therefore, the processing amount of the device can be reduced, or the processing speed of the device can be increased.

For example, the information indicates the encoding method used for the encoding of the point cloud data among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, a device that processes the file generated by the three-dimensional data storing device can quickly determine the codec used for the data stored in the file by referring to the control information for the file.

Therefore, the processing amount of the device can be reduced, or the processing speed of the device can be increased.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data storing device includes a processor and a memory, and the processor performs the processes described above using the memory.

Figure 31:
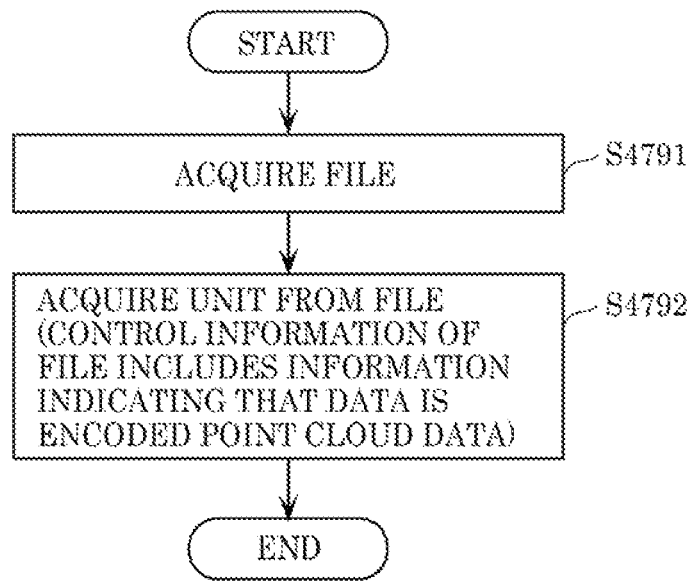
FIG. 31 is a flowchart of processing performed by a three-dimensional data acquisition device according to Embodiment 3.

As described above, a three-dimensional data acquisition device (or three-dimensional data demultiplexing device or three-dimensional data decoding device) performs the process shown in FIG. 31.

The three-dimensional data acquisition device (which includes first demultiplexer 4720, second demultiplexer 4740, or third demultiplexer 4760, for example) acquires a file (an ISOBMFF file, for example) that stores one or more units (NAL units, for example) that store an encoded stream, which is encoded point cloud data (S4791). The three-dimensional data acquisition device acquires the one or more units from the file (S4792). The control information (ftyp, for example) for the file includes information indicating that the data stored in the file is encoded point cloud data (pcc1, pcc2, or pcc3, for example).

For example, the three-dimensional data acquisition device determines whether the data stored in the file is encoded point cloud data or not by referring to the information. When the three-dimensional data acquisition device determines that the data stored in the file is encoded point cloud data, the three-dimensional data acquisition device generates point cloud data by decoding the encoded point cloud data included in the one or more units. Alternatively, when the three-dimensional data acquisition device determines that the data stored in the file is encoded point cloud data, the three-dimensional data acquisition device outputs information indicating that the data included in the one or more units is encoded point cloud data to a processor in a subsequent stage (first decoder 4640, second decoder 4660, or decoder 4680, for example) (or notifies a processor in a subsequent stage that the data included in the one or more units is encoded point cloud data).

With such a configuration, the three-dimensional data acquisition device can quickly determine whether the data stored in the file is encoded point cloud data or not by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, the information represents the encoding method used for the encoding among the first encoding method and the second encoding method. Note that the fact that the data stored in the file is encoded point cloud data and the encoding method used for the encoding of the point cloud data among the first encoding method and the second encoding method may be indicated by a single piece of information or different pieces of information.

With such a configuration, the three-dimensional data acquisition device can quickly determine the codec used for the data stored in the file by referring to the control information for the file. Therefore, the processing amount of the three-dimensional data acquisition device or a device in a subsequent stage can be reduced, or the processing speed of the three-dimensional data acquisition device or a device in a subsequent stage can be increased.

For example, based on the information, the three-dimensional data acquisition device acquires the data encoded in any one of the first encoding method and the second encoding method from the encoded point cloud data including the data encoded in the first encoding method and the data encoded in the second encoding method.

For example, the first encoding method is a method (GPCC) that encodes geometry information that represents the position of point cloud data as an N-ary tree (N represents an integer equal to or greater than 2) and encodes attribute information using the geometry information, and the second encoding method is a method (VPCC) that generates a two-dimensional image from point cloud data and encodes the two-dimensional image in a video encoding method.

For example, the file described above is in conformity with ISOBMFF (ISO-based media file format).

For example, the three-dimensional data acquisition device includes a processor and a memory, and the processor performs the processes described above using the memory.

Embodiment 4

In this embodiment, types of the encoded data (geometry information (geometry), attribute information (attribute), and additional information (metadata)) generated by first encoder 4630 or second encoder 4650 described above, a method of generating additional information (metadata), and a multiplexing process in the multiplexer will be described. The additional information (metadata) may be referred to as a parameter set or control information (signaling information).

In this embodiment, the dynamic object (three-dimensional point cloud data that varies with time) described above with reference to FIG. 4 will be described, for example. However, the same method can also be used for the static object (three-dimensional point cloud data associated with an arbitrary time point).

Figure 32:
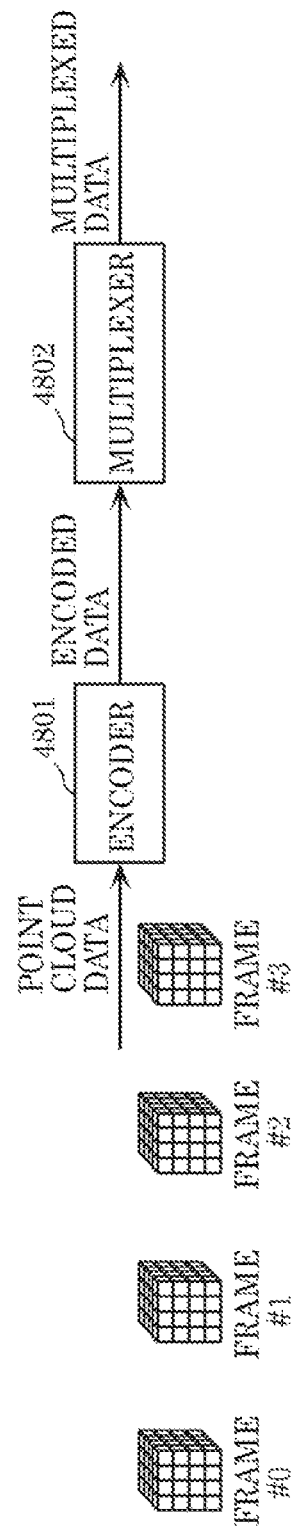
FIG. 32 is a diagram illustrating structures of an encoder and a multiplexer according to Embodiment 4.

FIG. 32 is a diagram showing configurations of encoder 4801 and multiplexer 4802 in a three-dimensional data encoding device according to this embodiment. Encoder 4801 corresponds to first encoder 4630 or second encoder 4650 described above, for example. Multiplexer 4802 corresponds to multiplexer 4634 or 4656 described above.

Encoder 4801 encodes a plurality of PCC (point cloud compression) frames of point cloud data to generate a plurality of pieces of encoded data (multiple compressed data) of geometry information, attribute information, and additional information.

Multiplexer 4802 integrates a plurality of types of data (geometry information, attribute information, and additional information) into a NAL unit, thereby converting the data into a data configuration that takes data access in the decoding device into consideration.

Figure 33:
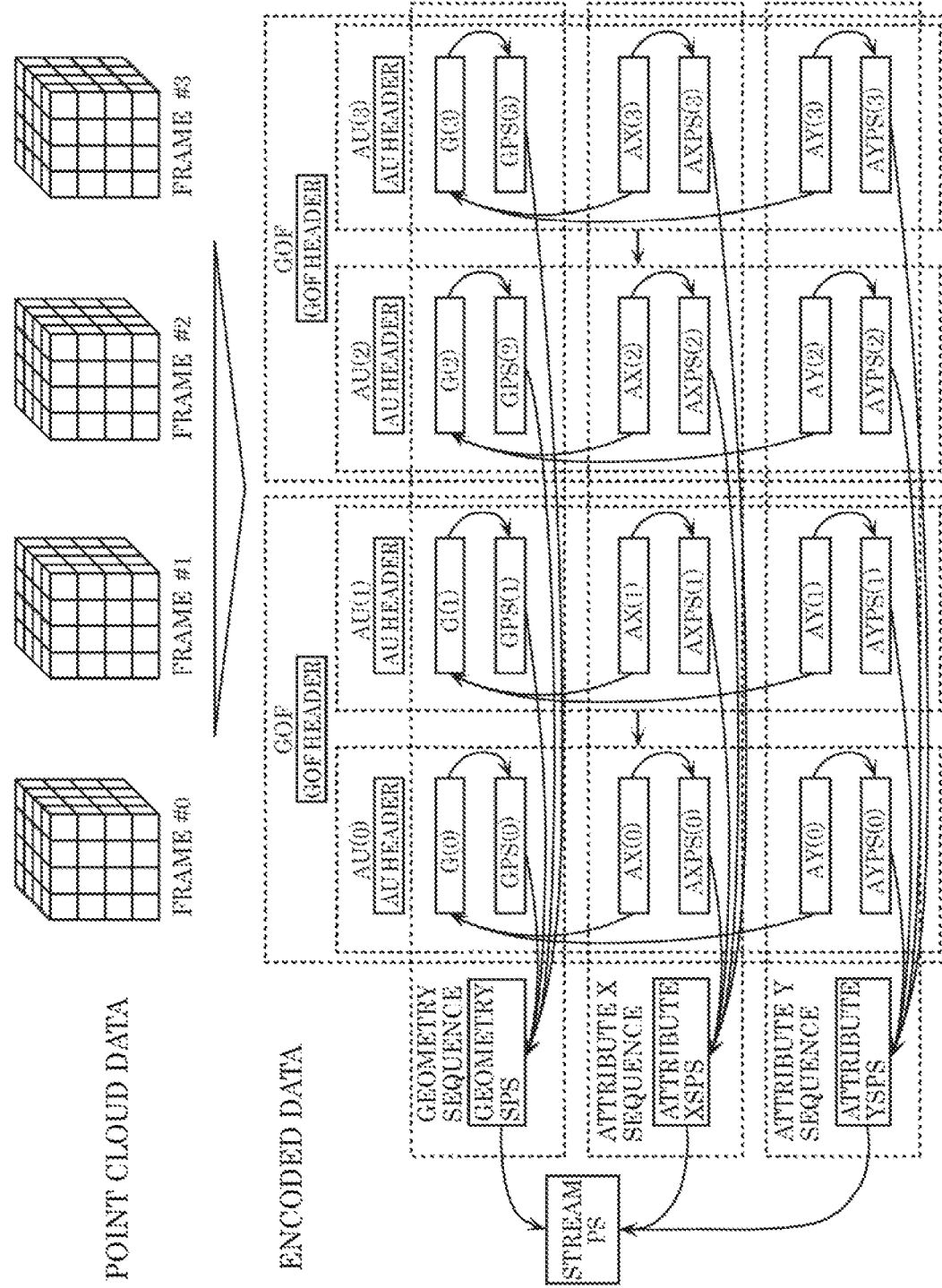
FIG. 33 is a diagram illustrating a structure example of encoded data according to Embodiment 4.

FIG. 33 is a diagram showing a configuration example of the encoded data generated by encoder 4801. Arrows in the drawing indicate a dependence involved in decoding of the encoded data. The source of an arrow depends on data of the destination of the arrow. That is, the decoding device decodes the data of the destination of an arrow, and decodes the data of the source of the arrow using the decoded data. In other words, "a first entity depends on a second entity" means that data of the second entity is referred to (used) in processing (encoding, decoding, or the like) of data of the first entity.

First, a process of generating encoded data of geometry information will be described. Encoder 4801 encodes geometry information of each frame to generate encoded geometry data (compressed geometry data) for each frame. The encoded geometry data is denoted by G(i). i denotes a frame number or a time point of a frame, for example.

Furthermore, encoder 4801 generates a geometry parameter set (GPS(i)) for each frame. The geometry parameter set includes a parameter that can be used for decoding of the encoded geometry data. The encoded geometry data for each frame depends on an associated geometry parameter set.

The encoded geometry data formed by a plurality of frames is defined as a geometry sequence. Encoder 4801 generates a geometry sequence parameter set (referred to also as geometry sequence PS or geometry SPS) that stores a parameter commonly used for a decoding process for the plurality of frames in the geometry sequence. The geometry sequence depends on the geometry SPS.

Next, a process of generating encoded data of attribute information will be described. Encoder 4801 encodes attribute information of each frame to generate encoded attribute data (compressed attribute data) for each frame. The encoded attribute data is denoted by A(i). FIG. 33 shows an example in which there are attribute X and attribute Y, and encoded attribute data for attribute X is denoted by AX(i), and encoded attribute data for attribute Y is denoted by AY(i).

Furthermore, encoder 4801 generates an attribute parameter set (APS(i)) for each frame. The attribute parameter set for attribute X is denoted by AXPS(i), and the attribute parameter set for attribute Y is denoted by AYPS(i). The attribute parameter set includes a parameter that can be used for decoding of the encoded attribute information. The encoded attribute data depends on an associated attribute parameter set.

The encoded attribute data formed by a plurality of frames is defined as an attribute sequence. Encoder 4801 generates an attribute sequence parameter set (referred to also as attribute sequence PS or attribute SPS) that stores a parameter commonly used for a decoding process for the plurality of frames in the attribute sequence. The attribute sequence depends on the attribute SPS.

In the first encoding method, the encoded attribute data depends on the encoded geometry data.

FIG. 33 shows an example in which there are two types of attribute information (attribute X and attribute Y). When there are two types of attribute information, for example, two encoders generate data and metadata for the two types of attribute information. For example, an attribute sequence is defined for each type of attribute information, and an attribute SPS is generated for each type of attribute information.

Note that, although FIG. 33 shows an example in which there is one type of geometry information, and there are two types of attribute information, the present invention is not limited thereto. There may be one type of attribute information or three or more types of attribute information. In such cases, encoded data can be generated in the same manner. If the point cloud data has no attribute information, there may be no attribute information. In such a case, encoder 4801 does not have to generate a parameter set associated with attribute information.

Next, a process of generating encoded data of additional information (metadata) will be described. Encoder 4801 generates a PCC stream PS (referred to also as PCC stream PS or stream PS), which is a parameter set for the entire PCC stream. Encoder 4801 stores a parameter that can be commonly used for a decoding process for one or more geometry sequences and one or more attribute sequences in the stream PS. For example, the stream PS includes identification information indicating the codec for the point cloud data and information indicating an algorithm used for the encoding, for example. The geometry sequence and the attribute sequence depend on the stream PS.

Next, an access unit and a GOF will be described. In this embodiment, concepts of access unit (AU) and group of frames (GOF) are newly introduced.

An access unit is a basic unit for accessing data in decoding, and is formed by one or more pieces of data and one or more pieces of metadata. For example, an access unit is formed by geometry information and one or more pieces of attribute information associated with a same time point. A GOF is a random access unit, and is formed by one or more access units.

Encoder 4801 generates an access unit header (AU header) as identification information indicating the top of an access unit. Encoder 4801 stores a parameter relating to the access unit in the access unit header. For example, the access unit header includes a configuration of or information on the encoded data included in the access unit. The access unit header further includes a parameter commonly used for the data included in the access unit, such as a parameter relating to decoding of the encoded data.

Note that encoder 4801 may generate an access unit delimiter that includes no parameter relating to the access unit, instead of the access unit header. The access unit delimiter is used as identification information indicating the top of the access unit. The decoding device identifies the top of the access unit by detecting the access unit header or the access unit delimiter.

Next, generation of identification information for the top of a GOF will be described. As identification information indicating the top of a GOF, encoder 4801 generates a GOF header. Encoder 4801 stores a parameter relating to the GOF in the GOF header. For example, the GOF header includes a configuration of or information on the encoded data included in the GOF. The GOF header further includes a parameter commonly used for the data included in the GOF, such as a parameter relating to decoding of the encoded data.

Note that encoder 4801 may generate a GOF delimiter that includes no parameter relating to the GOF, instead of the GOF header. The GOF delimiter is used as identification information indicating the top of the GOF. The decoding device identifies the top of the GOF by detecting the GOF header or the GOF delimiter.

In the PCC-encoded data, the access unit is defined as a PCC frame unit, for example. The decoding device accesses a PCC frame based on the identification information for the top of the access unit.

For example, the GOF is defined as one random access unit. The decoding device accesses a random access unit based on the identification information for the top of the GOF. For example, if PCC frames are independent from each other and can be separately decoded, a PCC frame can be defined as a random access unit.

Note that two or more PCC frames may be assigned to one access unit, and a plurality of random access units may be assigned to one GOF.

Encoder 4801 may define and generate a parameter set or metadata other than those described above. For example, encoder 4801 may generate supplemental enhancement information (SEI) that stores a parameter (an optional parameter) that is not always used for decoding.

Next, a configuration of encoded data and a method of storing encoded data in a NAL unit will be described.

Figure 34:
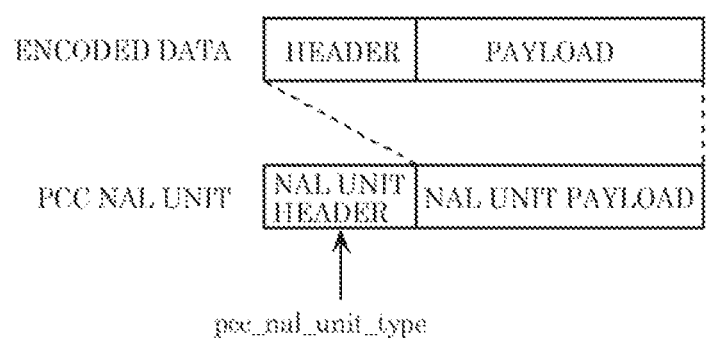
FIG. 34 is a diagram illustrating a structure example of encoded data and a NAL unit according to Embodiment 4.

For example, a data format is defined for each type of encoded data. FIG. 34 is a diagram showing an example of encoded data and a NAL unit.

For example, as shown in FIG. 34, encoded data includes a header and a payload. The encoded data may include length information indicating the length (data amount) of the encoded data, the header, or the payload. The encoded data may include no header.

The header includes identification information for identifying the data, for example. The identification information indicates a data type or a frame number, for example.

The header includes identification information indicating a reference relationship, for example. The identification information is stored in the header when there is a dependence relationship between data, for example, and allows an entity to refer to another entity. For example, the header of the entity to be referred to includes identification information for identifying the data. The header of the referring entity includes identification information indicating the entity to be referred to.

Note that, when the entity to be referred to or the referring entity can be identified or determined from other information, the identification information for identifying the data or identification information indicating the reference relationship can be omitted.

Multiplexer 4802 stores the encoded data in the payload of the NAL unit. The NAL unit header includes pcc_nal_unit_type, which is identification information for the encoded data. FIG. 35 is a diagram showing a semantics example of pcc_nal_unit_type.

As shown in FIG. 35, when pcc_codec_type is codec 1 (Codec1: first encoding method), values 0 to 10 of pcc_nal_unit_type are assigned to encoded geometry data (Geometry), encoded attribute X data (AttributeX), encoded attribute Y data (AttributeY), geometry PS (Geom. PS), attribute XPS (AttrX. S), attribute YPS (AttrY. PS), geometry SPS (Geometry Sequence PS), attribute X SPS (AttributeX Sequence PS), attribute Y SPS (AttributeY Sequence PS), AU header (AU Header), and GOF header (GOF Header) in codec 1. Values of 11 and greater are reserved in codec 1.

When pcc_codec_type is codec 2 (Codec2: second encoding method), values of 0 to 2 of pcc_nal_unit_type are assigned to data A (DataA), metadata A (MetaDataA), and metadata B (MetaDataB) in the codec. Values of 3 and greater are reserved in codec 2.

Next, an order of transmission of data will be described. In the following, restrictions on the order of transmission of NAL units will be described.

Multiplexer 4802 transmits NAL units on a GOF basis or on an AU basis. Multiplexer 4802 arranges the GOF header at the top of a GOF, and arranges the AU header at the top of an AU.

In order to allow the decoding device to decode the next AU and the following AUs even when data is lost because of a packet loss or the like, multiplexer 4802 may arrange a sequence parameter set (SPS) in each AU.

When there is a dependence relationship for decoding between encoded data, the decoding device decodes the data of the entity to be referred to and then decodes the data of the referring entity. In order to allow the decoding device to perform decoding in the order of reception without rearranging the data, multiplexer 4802 first transmits the data of the entity to be referred to.

Figure 36:
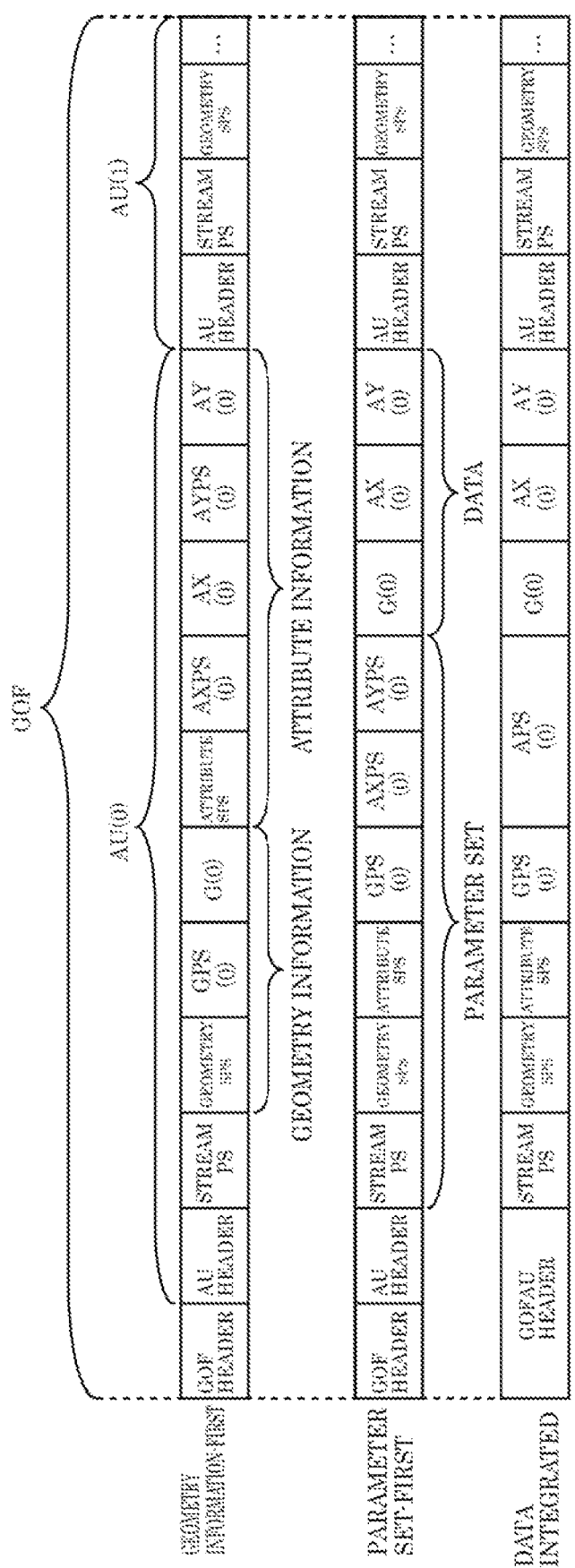
FIG. 36 is a diagram illustrating an example of a transmitting order of NAL units according to Embodiment 4.

FIG. 36 is a diagram showing examples of the order of transmission of NAL units. FIG. 36 shows three examples, that is, geometry information-first order, parameter-first order, and data-integrated order.

The geometry information-first order of transmission is an example in which information relating to geometry information is transmitted together, and information relating to attribute information is transmitted together. In the case of this order of transmission, the transmission of the information relating to the geometry information ends earlier than the transmission of the information relating to the attribute information.

For example, according to this order of transmission is used, when the decoding device does not decode attribute information, the decoding device may be able to have an idle time since the decoding device can omit decoding of attribute information. When the decoding device is required to decode geometry information early, the decoding device may be able to decode geometry information earlier since the decoding device obtains encoded data of the geometry information earlier.

Note that, although in FIG. 36 the attribute X SPS and the attribute Y SPS are integrated and shown as the attribute SPS, the attribute X SPS and the attribute Y SPS may be separately arranged.

In the parameter set-first order of transmission, a parameter set is first transmitted, and data is then transmitted.

As described above, as far as the restrictions on the order of transmission of NAL units are met, multiplexer 4802 can transmit NAL units in any order. For example, order identification information may be defined, and multiplexer 4802 may have a function of transmitting NAL units in a plurality of orders. For example, the order identification information for NAL units is stored in the stream PS.

The three-dimensional data decoding device may perform decoding based on the order identification information. The three-dimensional data decoding device may indicate a desired order of transmission to the three-dimensional data encoding device, and the three-dimensional data encoding device (multiplexer 4802) may control the order of transmission according to the indicated order of transmission.

Note that multiplexer 4802 can generate encoded data having a plurality of functions merged to each other as in the case of the data-integrated order of transmission, as far as the restrictions on the order of transmission are met. For example, as shown in FIG. 36, the GOF header and the AU header may be integrated, or AXPS and AYPS may be integrated. In such a case, an identifier that indicates data having a plurality of functions is defined in pcc_nal_unit_type.

In the following, variations of this embodiment will be described. There are levels of PSs, such as a frame-level PS, a sequence-level PS, and a PCC sequence-level PS. Provided that the PCC sequence level is a higher level, and the frame level is a lower level, parameters can be stored in the manner described below.

The value of a default PS is indicated in a PS at a higher level. If the value of a PS at a lower level differs from the value of the PS at a higher level, the value of the PS is indicated in the PS at the lower level. Alternatively, the value of the PS is not described in the PS at the higher level but is described in the PS at the lower level. Alternatively, information indicating whether the value of the PS is indicated in the PS at the lower level, at the higher level, or at both the levels is indicated in both or one of the PS at the lower level and the PS at the higher level. Alternatively, the PS at the lower level may be merged with the PS at the higher level. If the PS at the lower level and the PS at the higher level overlap with each other, multiplexer 4802 may omit transmission of one of the PSs.

Note that encoder 4801 or multiplexer 4802 may divide data into slices or tiles and transmit each of the divided slices or tiles as divided data. The divided data includes information for identifying the divided data, and a parameter used for decoding of the divided data is included in the parameter set. In this case, an identifier that indicates that the data is data relating to a tile or slice or data storing a parameter is defined in pcc_nal_unit_type.

Embodiment 5

Figure 37:
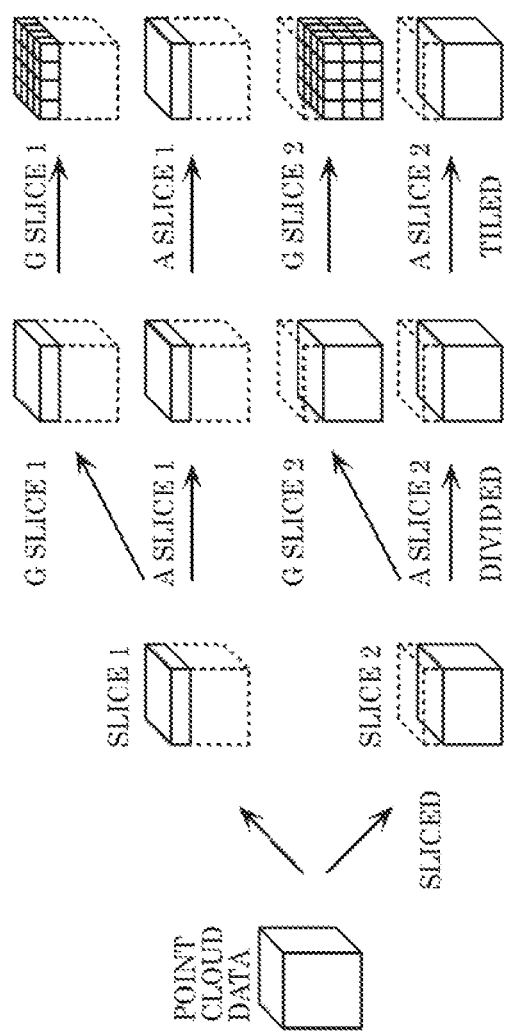
FIG. 37 is a diagram illustrating an example of dividing slices and tiles according to Embodiment 5.

Hereinafter, the dividing method for point cloud data will be described. FIG. 37 is a diagram illustrating an example of slice and tile dividing.

First, the method for slice dividing will be described. The three-dimensional data encoding device divides three-dimensional point cloud data into arbitrary point clouds on a slice-by-slice basis. In slice dividing, the three-dimensional data encoding device does not divide the geometry information and the attribute information constituting points, but collectively divides the geometry information and the attribute information. That is, the three-dimensional data encoding device performs slice dividing so that the geometry information and the attribute information of an arbitrary point belong to the same slice. Note that, as long as these are followed, the number of divisions and the dividing method may be any number and any method. Furthermore, the minimum unit of division is a point. For example, the numbers of divisions of geometry information and attribute information are the same. For example, a three-dimensional point corresponding to geometry information after slice dividing, and a three-dimensional point corresponding to attribute information are included in the same slice.

Also, the three-dimensional data encoding device generates slice additional information, which is additional information related to the number of divisions and the dividing method at the time of slice dividing. The slice additional information is the same for geometry information and attribute information. For example, the slice additional information includes the information indicating the reference coordinate position, size, or side length of a bounding box after division. Also, the slice additional information includes the information indicating the number of divisions, the division type, etc.

Next, the method for tile dividing will be described. The three-dimensional data encoding device divides the data divided into slices into slice geometry information (G slice) and slice attribute information (A slice), and divides each of the slice geometry information and the slice attribute information on a tile-by-tile basis.

Note that, although FIG. 37 illustrates the example in which division is performed with an octree structure, the number of divisions and the dividing method may be any number and any method.

Also, the three-dimensional data encoding device may divide geometry information and attribute information with different dividing methods, or may divide geometry information and attribute information with the same dividing method. Additionally, the three-dimensional data encoding device may divide a plurality of slices into tiles with different dividing methods, or may divide a plurality of slices into tiles with the same dividing method.

Furthermore, the three-dimensional data encoding device generates tile additional information related to the number of divisions and the dividing method at the time of tile dividing. The tile additional information (geometry tile additional information and attribute tile additional information) is separate for geometry information and attribute information. For example, the tile additional information includes the information indicating the reference coordinate position, size, or side length of a bounding box after division. Additionally, the tile additional information includes the information indicating the number of divisions, the division type, etc.

Next, an example of the method of dividing point cloud data into slices or tiles will be described. As the method for slice or tile dividing, the three-dimensional data encoding device may use a predetermined method, or may adaptively switch methods to be used according to point cloud data.

At the time of slice dividing, the three-dimensional data encoding device divides a three-dimensional space by collectively handling geometry information and attribute information. For example, the three-dimensional data encoding device determines the shape of an object, and divides a three-dimensional space into slices according to the shape of the object. For example, the three-dimensional data encoding device extracts objects such as trees or buildings, and performs division on an object-by-object basis. For example, the three-dimensional data encoding device performs slice dividing so that the entirety of one or a plurality of objects are included in one slice. Alternatively, the three-dimensional data encoding device divides one object into a plurality of slices.

In this case, the encoding device may change the encoding method for each slice, for example. For example, the encoding device may use a high-quality compression method for a specific object or a specific part of the object. In this case, the encoding device may store the information indicating the encoding method for each slice in additional information (metadata).

Also, the three-dimensional data encoding device may perform slice dividing so that each slice corresponds to a predetermined coordinate space based on map information or geometry information.

At the time of tile dividing, the three-dimensional data encoding device separately divides geometry information and attribute information. For example, the three-dimensional data encoding device divides slices into tiles according to the data amount or the processing amount. For example, the three-dimensional data encoding device determines whether the data amount of a slice (for example, the number of three-dimensional points included in a slice) is greater than a predetermined threshold value. When the data amount of the slice is greater than the threshold value, the three-dimensional data encoding device divides slices into tiles. When the data amount of the slice is less than the threshold value, the three-dimensional data encoding device does not divide slices into tiles.

For example, the three-dimensional data encoding device divides slices into tiles so that the processing amount or processing time in the decoding device is within a certain range (equal to or less than a predetermined value). Accordingly, the processing amount per tile in the decoding device becomes constant, and distributed processing in the decoding device becomes easy.

Additionally, when the processing amount is different between geometry information and attribute information, for example, when the processing amount of geometry information is greater than the processing amount of attribute information, the three-dimensional data encoding device makes the number of divisions of geometry information larger than the number of divisions of attribute information.

Furthermore, for example, when geometry information may be decoded and displayed earlier, and attribute information may be slowly decoded and displayed later in the decoding device according to contents, the three-dimensional data encoding device may make the number of divisions of geometry information larger than the number of divisions of attribute information. Accordingly, since the decoding device can increase the parallel number of geometry information, it is possible to make the processing of geometry information faster than the processing of attribute information.

Note that the decoding device does not necessarily have to process sliced or tiled data in parallel, and may determine whether or not to process them in parallel according to the number or capability of decoding processors.

By performing division with the method as described above, it is possible to achieve adaptive encoding according to contents or objects. Also, parallel processing in decoding processing can be achieved. Accordingly, the flexibility of a point cloud encoding system or a point cloud decoding system is improved.

Figure 38:
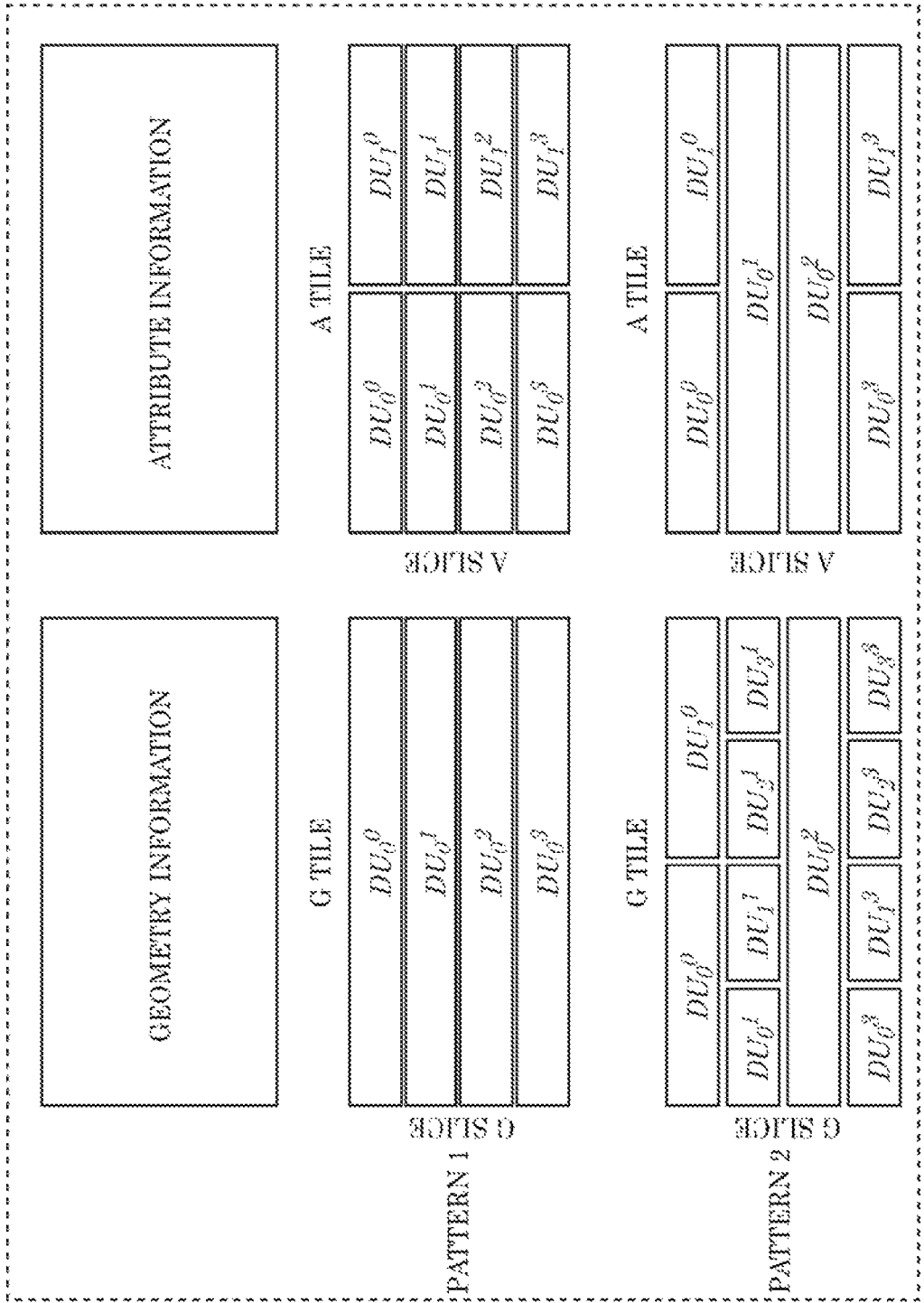
FIG. 38 is a diagram illustrating dividing pattern examples of slices and tiles according to Embodiment 5.

FIG. 38 is a diagram illustrating dividing pattern examples of slices and tiles. DU in the diagram is a data unit (DataUnit), and indicates the data of a tile or a slice. Additionally, each DU includes a slice index (SliceIndex) and a tile index (TileIndex). The top right numerical value of a DU in the diagram indicates the slice index, and the bottom left numerical value of the DU indicates the tile index.

In Pattern 1, in slice dividing, the number of divisions and the dividing method are the same for G slice and A slice. In tile dividing, the number of divisions and the dividing method for G slice are different from the number of divisions and the dividing method for A slice. Additionally, the same number of divisions and dividing method are used among a plurality of G slices. The same number of divisions and dividing method are used among a plurality of A slices.

In Pattern 2, in slice dividing, the number of divisions and the dividing method are the same for G slice and A slice. In tile dividing, the number of divisions and the dividing method for G slice are different from the number of divisions and the dividing method for A slice. Additionally, the number of divisions and the dividing method are different among a plurality of G slices. The number of divisions and the dividing method are different among a plurality of A slices.

Embodiment 6

Hereinafter, an example of performing slice division after tile division will be described. An autonomous application for automated driving of a vehicle etc. requires not point cloud data of all areas but point cloud data of an area surrounding a vehicle or an area in a traveling direction of a vehicle. Here, tiles and slices can be used to selectively decode original point cloud data. It is possible to achieve the improvement of coding efficiency or parallel processing by dividing three-dimensional point cloud data into tiles and further dividing the tiles into slices. When data is divided, additional information (metadata) is generated, and the generated additional information is transmitted to a multiplexer.

Figure 39:
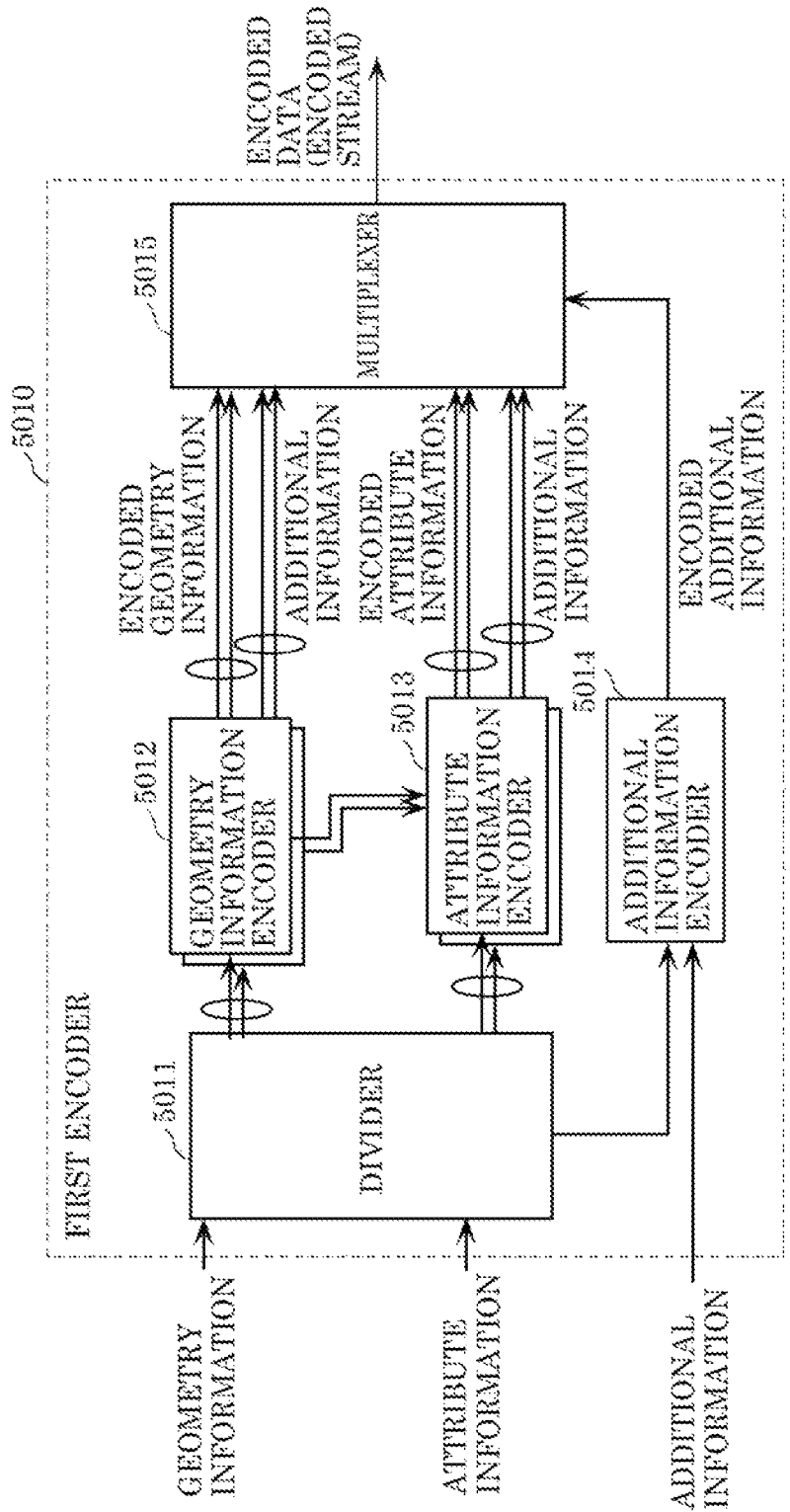
FIG. 39 is a block diagram of a first encoder according to Embodiment 6.

FIG. 39 is a block diagram illustrating a configuration of first encoder 5010 included in a three-dimensional data encoding device according to the present embodiment. First encoder 5010 generates encoded data (encoded stream) by encoding point cloud data using a first encoding method (geometry based PCC (GPCC)). First encoder 5010 includes divider 5011, geometry information encoders 5012, attribute information encoders 5013, additional information encoder 5014, and multiplexer 5015.

Divider 5011 generates pieces of divided data by dividing point cloud data. Specifically, divider 5011 generates pieces of divided data by dividing a space of point cloud data into subspaces. Here, a subspace is one of a tile and a slice, or a combination of a tile and a slice. More specifically, point cloud data includes geometry information, attribute information, and additional information. Divider 5011 divides geometry information into pieces of divided geometry information and attribute information into pieces of divided attribute information. In addition, divider 5011 generates additional information regarding division.

For example, first, divider 5011 divides a point cloud into tiles. Next, divider 5011 further divides the obtained tiles into slices.

Geometry information encoders 5012 generate pieces of encoded geometry information by encoding pieces of divided geometry information. For example, geometry information encoders 5012 process pieces of divided geometry information in parallel.

Attribute information encoders 5013 generate pieces of encoded attribute information by encoding pieces of divided attribute information. For example, attribute information encoders 5013 process pieces of divided geometry information in parallel.

Additional information encoder 5014 generates encoded additional information by encoding additional information included in point cloud data and additional information regarding data division generated at the time of dividing by divider 5011.

Multiplexer 5015 generates encoded data (encoded stream) by multiplexing pieces of encoded geometry information, pieces of encoded attribute information, and encoded additional information, and transmits the generated encoded data. The encoded additional information is also used at the time of decoding.

It should be noted that although FIG. 39 shows two geometry information encoders 5012 and two attribute information encoders 5013 as an example, the number of geometry information encoders 5012 and the number of attribute information encoders 5013 may be one or at least three. Moreover, pieces of divided data may be processed in parallel in identical chips, such as cores in a CPU, in a core of each of chips, or in cores of each of chips.

Figure 40:
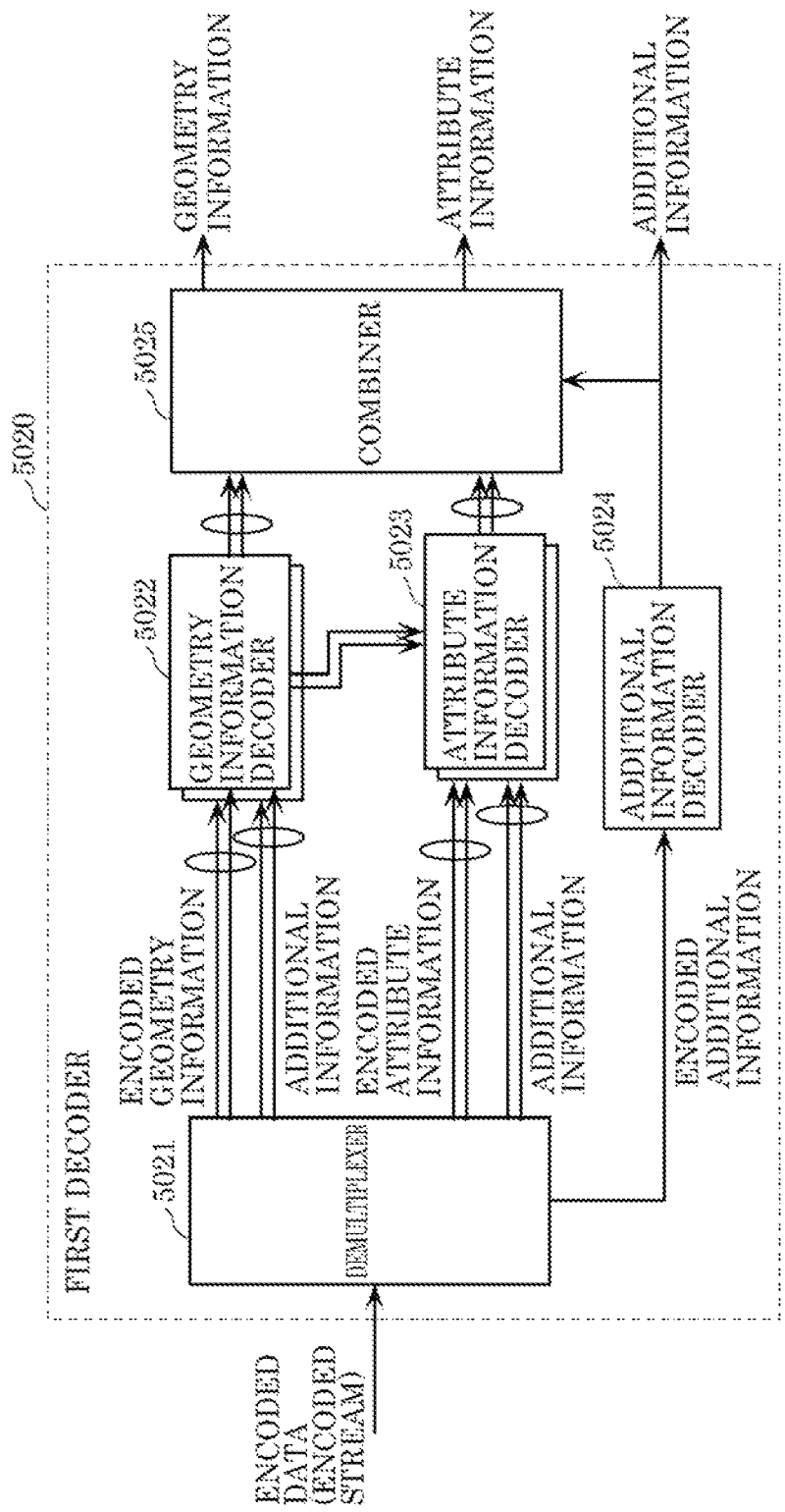
FIG. 40 is a block diagram of a first decoder according to Embodiment 6.

The following describes a decoding process. FIG. 40 is a block diagram illustrating a configuration of first decoder 5020. First decoder 5020 restores point cloud data by decoding encoded data (encoded stream) generated by encoding the point cloud data using the first encoding method (GPCC). First decoder 5020 includes demultiplexer 5021, geometry information decoders 5022, attribute information decoders 5023, additional information decoder 5024, and combiner 5025.

Demultiplexer 5021 generates pieces of encoded geometry information, pieces of encoded attribute information, and encoded additional information by demultiplexing encoded data (encoded stream).

Geometry information decoders 5022 generate pieces of divided geometry information by decoding pieces of encoded geometry information. For example, geometry information decoders 5022 process pieces of encoded geometry information in parallel.

Attribute information decoders 5023 generate pieces of divided attribute information by decoding pieces of encoded attribute information. For example, attribute information decoders 5023 process pieces of encoded attribute information in parallel.

Additional information decoder 5024 generates additional information by decoding encoded additional information.

Combiner 5025 generates geometry information by combining pieces of divided geometry information using additional information. Combiner 5025 also generates attribute information by combining pieces of divided attribute information using additional information. For example, first, combiner 5025 generates pieces of point cloud data corresponding to tiles by combing pieces of decoded point cloud data corresponding to slices using slice additional information. Next, combiner 5025 restores original point cloud data by combining pieces of point cloud data corresponding to the tiles using tile additional information.

It should be noted that although FIG. 39 shows two geometry information decoders 5022 and two attribute information decoders 5023 as an example, the number of geometry information decoders 5022 and the number of attribute information decoders 5023 may be one or at least three. Moreover, pieces of divided data may be processed in parallel in identical chips, such as cores in a CPU, in a core of each of chips, or in cores of each of chips.

The following describes a method of dividing point cloud data. An autonomous application for automated driving of a vehicle etc. requires not point cloud data of all areas but point cloud data of an area surrounding a vehicle or an area in a traveling direction of a vehicle.

Figure 41:
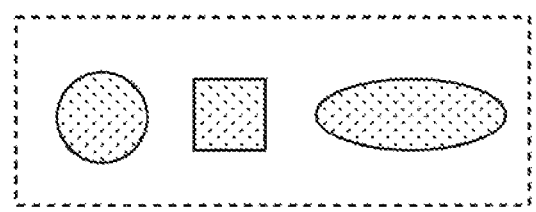
FIG. 41 is a diagram illustrating examples of a tile shape according to Embodiment 6.

FIG. 41 is a diagram illustrating examples of a tile shape. As shown in FIG. 41, examples of the tile shape may include various shapes such as a circle, a rectangle, or an ellipse.

Figure 42:
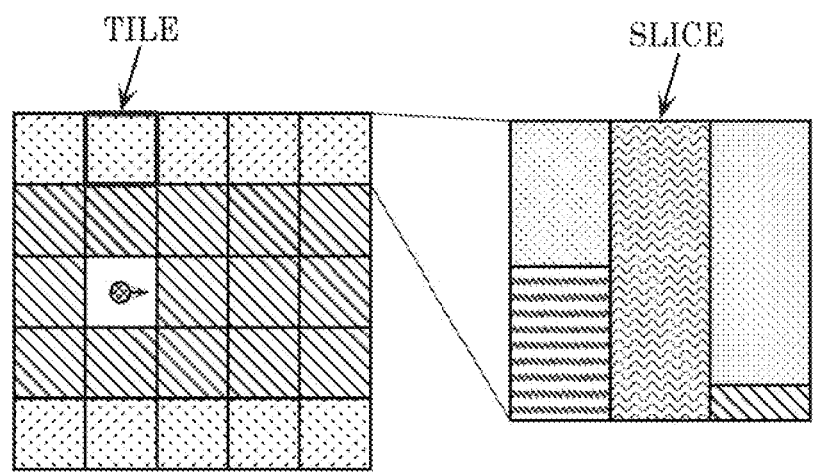
FIG. 42 is a diagram illustrating an example of tiles and slices according to Embodiment 6.

FIG. 42 is a diagram illustrating an example of tiles and slices. A composition of slices may differ between tiles. For example, a composition of tiles or slices may be optimized based on a data volume. Alternatively, a composition of tiles or slices may be optimized based on decoding speed.

Tile division may be performed based on geometry information. In this case, attribute information is divided in the same manner as corresponding geometry information.

Moreover, in slice division after tile division, geometry information and attribute information may be divided into slices using different methods. For example, a slice division method in each tile may be selected upon request from an application. A different slice division method or a different tile division method may be used based on a request from an application.

For example, divider 5011 divides three-dimensional point cloud data into one or more tiles in a two-dimensional shape obtained by seeing the three-dimensional point cloud data from top, based on position information such as map information. Divider 5011 divides each of the one or more tiles into one or more slices afterward.

It should be noted that divider 5011 may divide geometry information (geometry) and attribute information (attribute) into slices using the same method.

It should be noted that each of geometry information and attribute information may be of one type or two or more types. In addition, when point cloud data has no attribute information, attribute information may be unnecessary.

Figure 43:
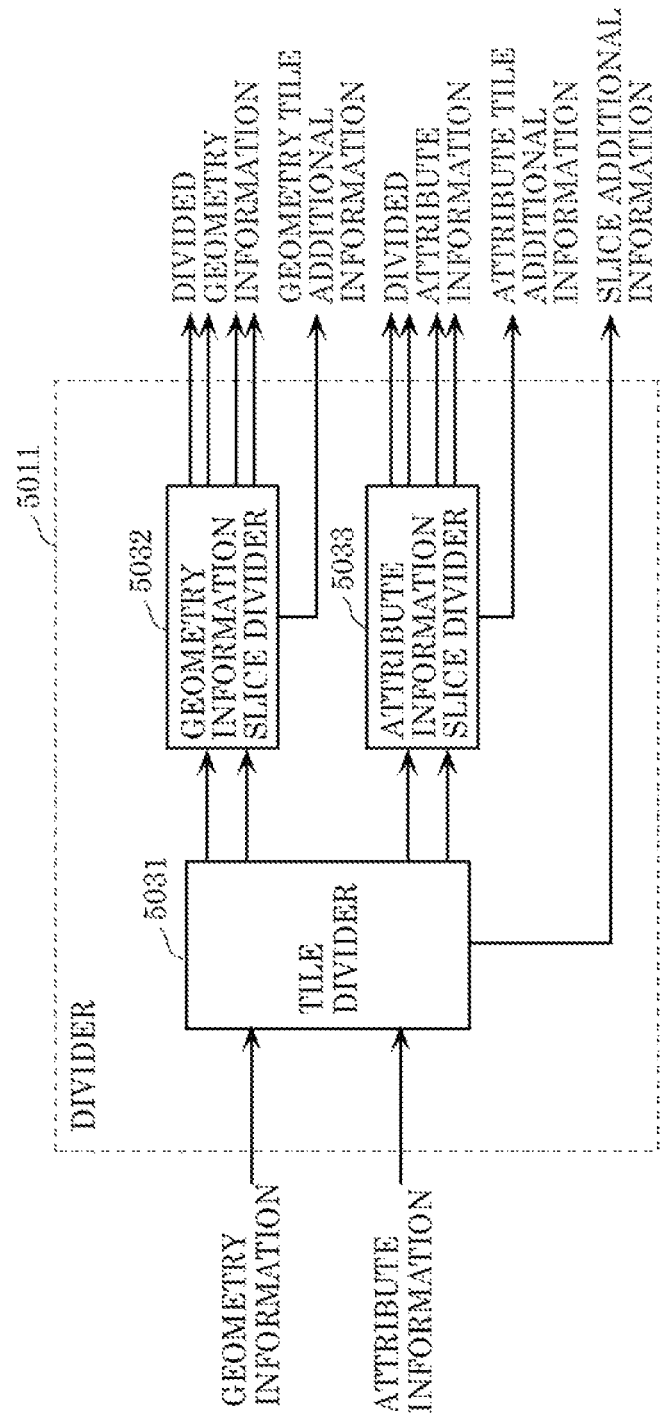
FIG. 43 is a block diagram of a divider according to Embodiment 6.

FIG. 43 is a block diagram of divider 5011. Divider 5011 includes tile divider 5031, geometry information slice divider (geometry slice divider) 5032, and attribute information slice divider (attribute slice divider) 5033.

Tile divider 5031 generates pieces of tile geometry information by dividing geometry information (position (geometry)) into tiles. In addition, tile divider 5031 generates pieces of tile attribute information by dividing attribute information (attribute) into tiles. Additionally, tile divider 5031 outputs tile additional information (tile metadata) including information regarding tile division and information generated in the tile division.

Geometry information slice divider 5032 generates pieces of divided geometry information (pieces of slice geometry information) by dividing pieces of tile geometry information into slices. In addition, geometry information slice divider 5032 outputs geometry slice additional information (geometry slice metadata) including information regarding slice division of geometry information and information generated in the slice division of the geometry information.

Attribute information slice divider 5033 generates pieces of divided attribute information (pieces of slice attribute information) by dividing pieces of tile attribute information into slices. In addition, attribute information slice divider 5033 outputs attribute slice additional information (attribute slice metadata) including information regarding slice division of attribute information and information generated in the slice division of the attribute information.

The following describes examples of a tile shape. An entire three-dimensional map (3D map) is divided into tiles. Data of the tiles are selectively transmitted to a three-dimensional data decoding device. Alternatively, the data of the tiles are transmitted to the three-dimensional data decoding device in decreasing order of importance. A tile shape may be selected from shapes according to a situation.

Figure 44:
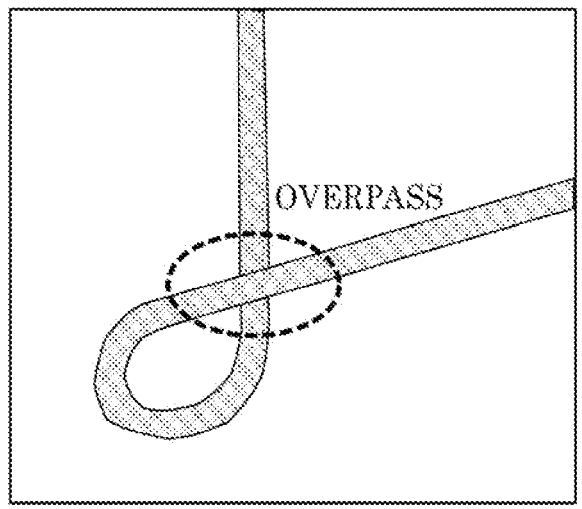
FIG. 44 is a diagram illustrating an example of a map in a top view of point cloud data according to Embodiment 6.

FIG. 44 is a diagram illustrating an example of a map in a top of view of point cloud data obtained by LiDAR. The example shown in FIG. 44 is point cloud data of a highway and includes an overpass (flyover).

Figure 45:
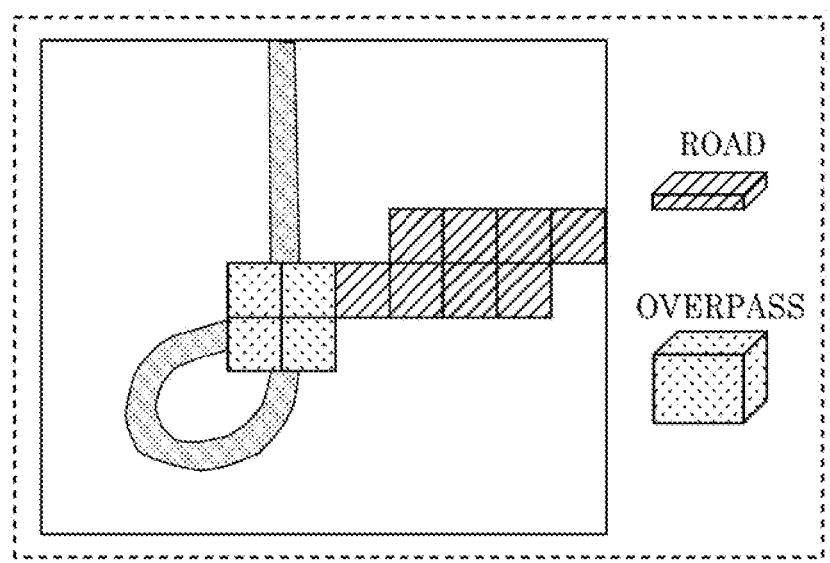
FIG. 45 is a diagram illustrating an example of tile division according to Embodiment 6.

FIG. 45 is a diagram illustrating an example of dividing the point cloud data shown in FIG. 44 into square tiles. It is easy to make such a division into squares in a map server. For a normal road, the height of a tile is set low. The height of tiles is set higher for an overpass than for the normal road so that the tiles contain the overpass.

Figure 46:
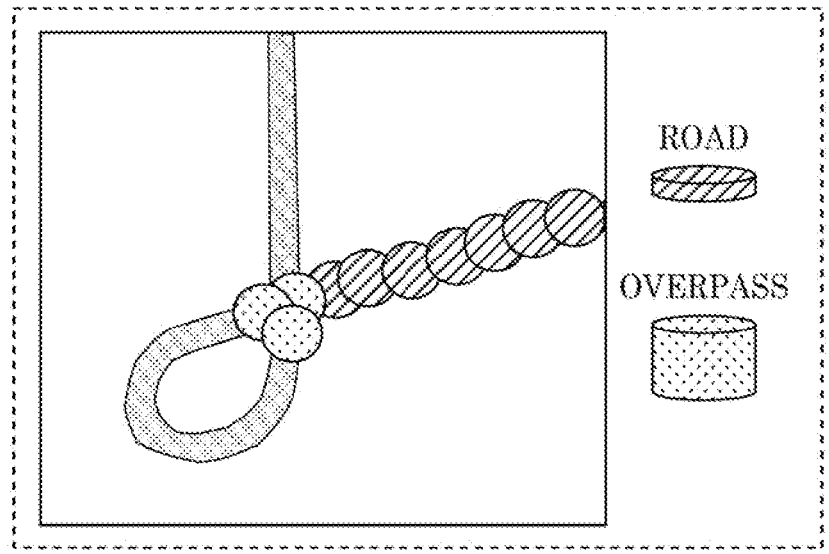
FIG. 46 is a diagram illustrating an example of tile division according to Embodiment 6.

FIG. 46 is a diagram illustrating an example of dividing the point cloud data shown in FIG. 44 into circular tiles. In this case, neighboring tiles may overlap each other in plan view. When a vehicle requires point cloud data of a surrounding area, the three-dimensional data encoding device transmits, to the vehicle, point cloud data of an area including columns (circles in top view) surrounding the vehicle.

As with the example shown in FIG. 45, for a normal road, the height of a tile is set low. The height of tiles is set higher for an overpass than for the normal road so that the tiles contain the overpass.

The three-dimensional data encoding device may change the height of a tile according to, for example, the shape or height of a road or building. In addition, the three-dimensional data encoding device may change the height of a tile according to position information or area information. Additionally, the three-dimensional data encoding device may change the height of each tile. Alternatively, the three-dimensional data encoding device may change the height of tiles for each zone including the tiles. To put it another way, the three-dimensional data encoding device may set tiles in a zone to the same height. Moreover, tiles having different heights may overlap each other in top view.

Figure 47:
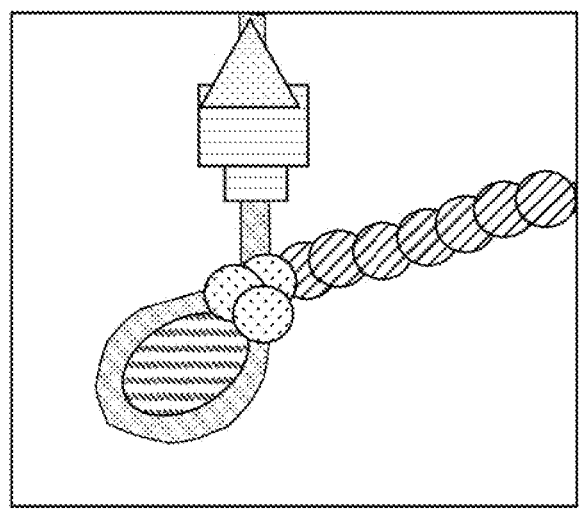
FIG. 47 is a diagram illustrating an example of tile division according to Embodiment 6.

FIG. 47 is a diagram illustrating an example of tile division when tiles having various shapes, sizes, and heights are used. Any tile may have any shape or size, or a combination of these.

For example, in addition to making a division into non-overlapping square tiles and making a division into overlapping circular tiles as described above, the three-dimensional data encoding device may make a division into overlapping square tiles. Moreover, the tile shape need not be a square or a circle, and may be a polygon having three or more vertices, or a shape having no vertices.

Furthermore, a tile shape may be of two or more types, and tiles having different shapes may overlap each other. In addition, a tile shape may be of one or more types; and when the same shape is used for divided tiles, the same shape may include shapes different in size or such shapes may overlap each other.

For example, a tile to be used is larger for an area including no object such as a road than for an area including an object. Moreover, the three-dimensional data encoding device may adaptively change a tile shape or size according to an object.

Furthermore, for example, the three-dimensional data encoding device may set tiles in a traveling direction of an automobile (a vehicle) to a large size because reading of tiles at a great distance ahead of the automobile in the traveling direction is likely to be needed; and set tiles in a side lateral to the automobile to a smaller size than the tiles in the traveling direction because the automobile is less likely to move to the side.

Figure 48:
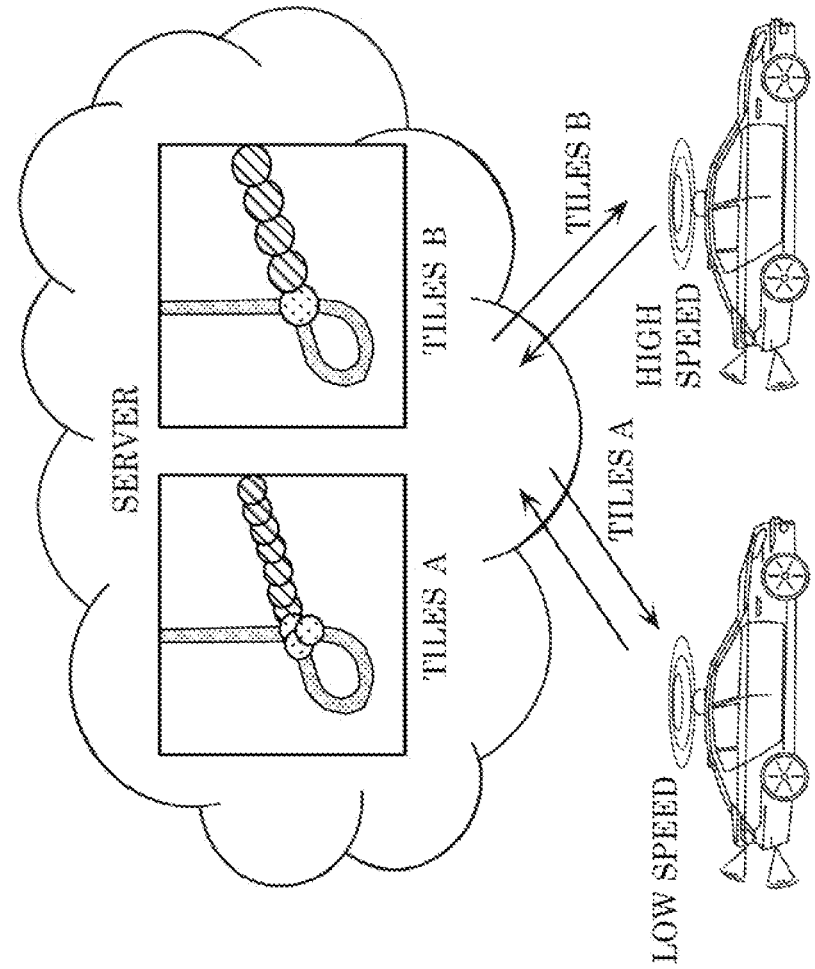
FIG. 48 is a diagram illustrating an example of data of tiles stored in a server according to Embodiment 6.

FIG. 48 is a diagram illustrating an example of data of tiles stored in a server. For example, point cloud data is divided into tiles and encoded in advance, and the obtained encoded data is stored in a server. A user obtains the data of desired tiles from the server when necessary. Alternatively, the server (the three-dimensional data encoding device) may perform tile division and encoding so that tiles include data desired by the user, in response to an instruction from the user.

For example, when a movable body (a vehicle) travels at a high speed, it is conceivable that more extensive point cloud data is needed. For this reason, the server may determine a tile shape and size based on a pre-estimated vehicular speed (e.g., a legal speed on a road, a vehicular speed estimated from the width or shape of a road, or a statistical vehicular speed), and perform tile division. Alternatively, as shown in FIG. 48, the server may encode tiles having a shape or size in advance, and store the obtained data. The movable body may obtain data of tiles having an appropriate shape or size according to the traveling direction and speed of the movable body.

Figure 49:
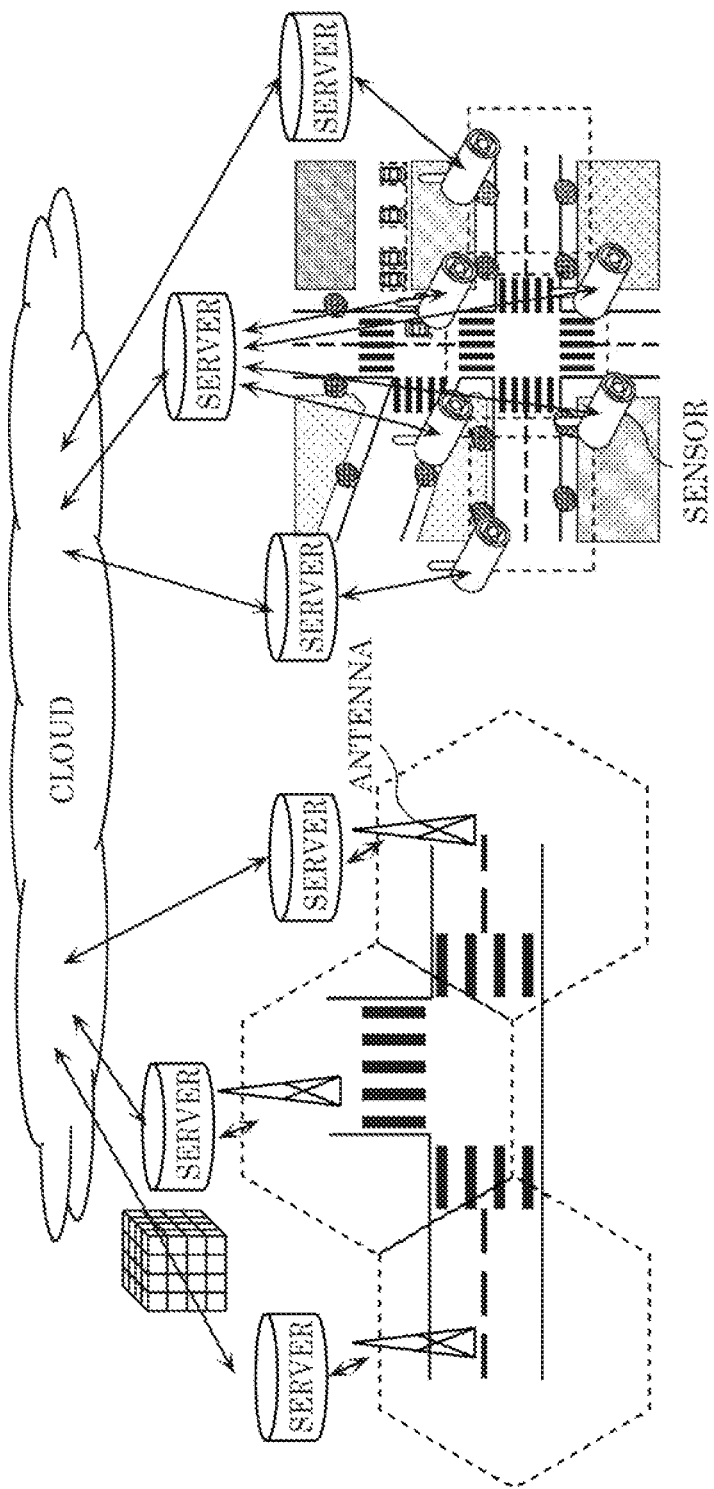
FIG. 49 is a diagram illustrating a system regarding tile division according to Embodiment 6.

FIG. 49 is a diagram illustrating an example of a system regarding tile division. As shown in FIG. 49, a tile shape and an area may be determined based on the location of an antenna (a base station) that is a means of communication transmitting point cloud data, or on a communication area supported by an antenna. Alternatively, when point cloud data is generated by a sensor such as a camera, a tile shape and an area may be determined based on the location or a target range (a detection range) of the sensor.

One tile may be assigned to one antenna or one sensor, or one tile may be assigned to antennas or sensors. In addition, tiles may be assigned to one antenna or one sensor. An antenna or a sensor may be fixed or movable.

For example, encoded data divided into tiles may be managed by a server connected to an antenna or a sensor for an area assigned to the tiles. The server may manage the encoded data of the area and tile information of a neighboring area. Pieces of encoded data of tiles may be managed in a centralized server (a cloud) that manages servers each corresponding to a different one of the tiles. Alternatively, instead of providing the servers each corresponding to the different one of the tiles, antennas or sensors may be directly connected to the centralized server.

It should be noted that the target range of an antenna or a sensor may change depending on the power of radio waves, differences between devices, and installation conditions, and a tile shape and size may change in conformity with these. Instead of a tile, a slice or a PCC frame may be assigned based on the target range of the antenna or the sensor.

The following describes a method of dividing a tile into slices. It is possible to improve the coding efficiency by assigning similar objects to the same slice.

For example, the three-dimensional data encoding device may recognize objects (e.g., a road, a building, a tree) using features of point cloud data, and perform slice division by clustering point clouds for each of the objects.

Alternatively, the three-dimensional data encoding device may classify objects having the same attribute into groups, and perform slice division by assigning a slice to each of the groups. Here, an attribute is, for example, information regarding motion. Objects are classified into groups according to dynamic information about pedestrians, cars, etc., quasi-dynamic information about accidents, congestion, etc., quasi-static information about traffic controls, roadwork, etc., and static information about road surfaces, structures, etc.

It should be noted that slices may have overlapping data. For example, when slice division is performed for each object group, any object may belong to one object group or two or more object groups.

Figure 50:
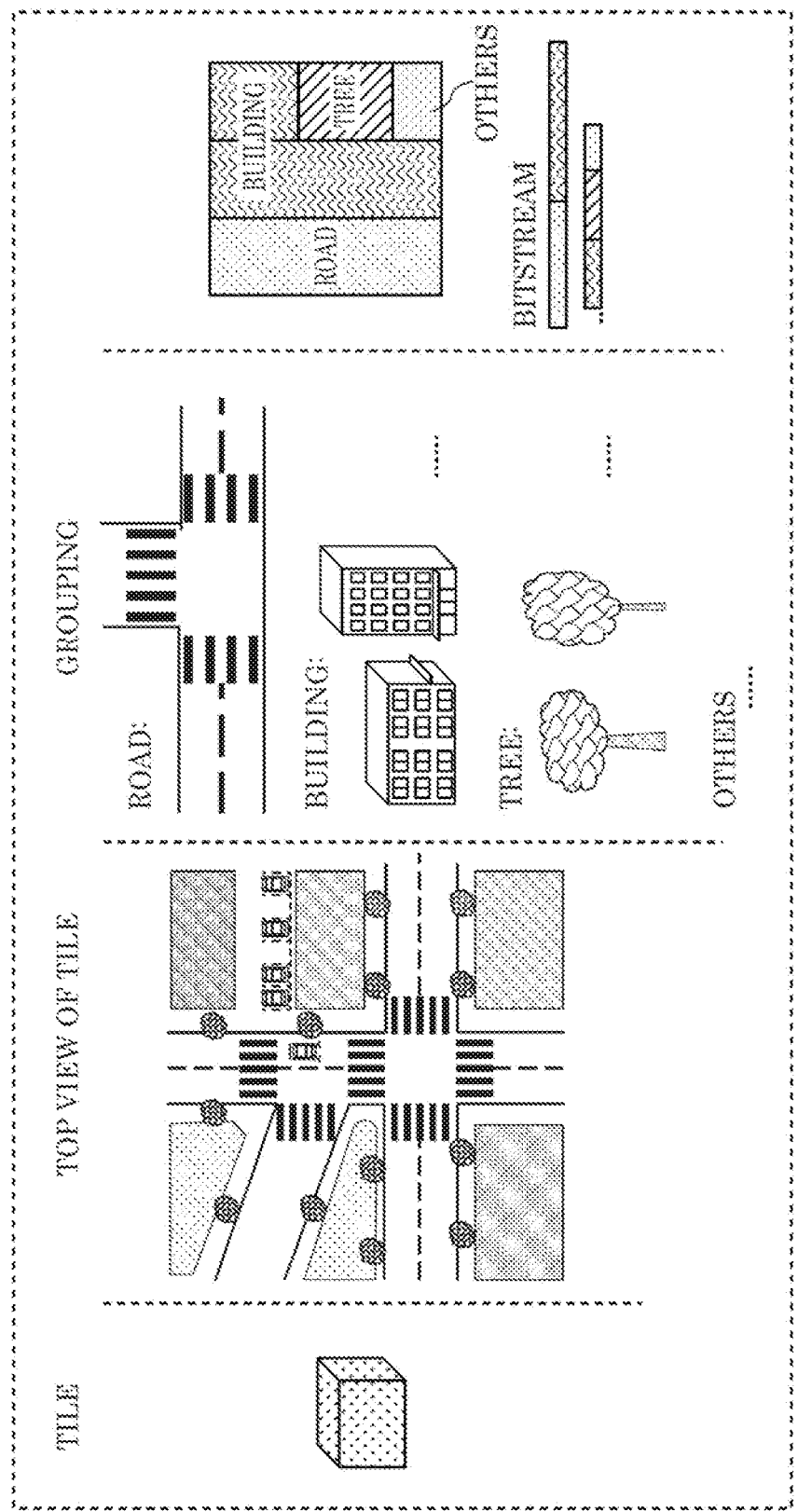
FIG. 50 is a diagram illustrating an example of slice division according to Embodiment 6.

FIG. 50 is a diagram illustrating an example of this slice division. For example, a tile is a cuboid in the example shown in FIG. 50. It should be noted that a tile may be columnar or have another shape.

Point clouds included in a tile are classified into object groups such as road, building, and tree. Then, slice division is performed so that each object group is included in a different one of slices. Subsequently, the slices are encoded separately.

The following describes a method of encoding divided data. The three-dimensional data encoding device (first encoder 5010) encodes each divided data. When the three-dimensional data encoding device encodes attribute information, the three-dimensional data encoding device generates, as additional information, dependency relationship information indicating based on which composition information (geometry information, additional information, or another attribute information) encoding has been performed. In other words, dependency relationship information indicates, for example, composition information of a reference destination (a dependee). In this case, the three-dimensional data encoding device generates dependency relationship information based on composition information corresponding to a divided shape for attribute information. It should be noted that the three-dimensional data encoding device may generate dependency relationship information based on composition information corresponding to divided shapes.

Dependency relationship information may be generated by the three-dimensional data encoding device, and the generated dependency relationship information may be transmitted to the three-dimensional data decoding device. Alternatively, the three-dimensional data decoding device may generate dependency relationship information, and the three-dimensional data encoding device need not transmit dependency relationship information. In addition, a dependency relationship to be used by the three-dimensional data encoding device may be determined in advance, and the three-dimensional data encoding device need not transmit dependency relationship information.

Figure 51:
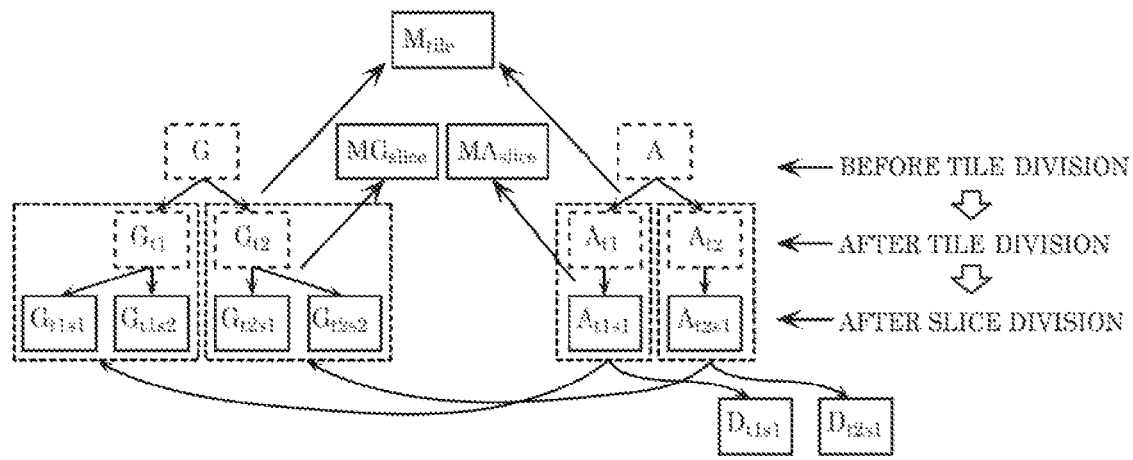
FIG. 51 is a diagram illustrating an example of dependency relationships according to Embodiment 6.

FIG. 51 is a diagram illustrating an example of a dependency relationship of each data. The pointed end of an arrow in the figure indicates a dependee, and the other end of the arrow indicates a depender. The three-dimensional data decoding device decodes data in order from dependee to depender. Data indicated by a solid line in the figure is data actually transmitted, and data indicated by a broken line is data not transmitted.

In the figure, G denotes geometry information, and A denotes attribute information. $G_{t1}$ denotes geometry information for tile number 1, and $G_{t2}$ denotes geometry information for tile number 2. $G_{t1s1}$ denotes geometry information for tile number 1 and slice number 1, $G_{t1s1}$ denotes geometry information for tile number 1 and slice number 2, $G_{t2s1}$ denotes geometry information for tile number 2 and slice number 1, and $G_{t2s2}$ denotes geometry information for tile number 2 and slice number 2. Likewise, $A_{t1}$ denotes attribute information for tile number 1, and $A_{t2}$ denotes attribute information for tile number 2. $A_{t1s1}$ denotes attribute information for tile number 1 and slice number 1, $A_{t1s2}$ denotes attribute information for tile number 1 and slice number 2, $A_{t2s1}$ denotes attribute information for tile number 2 and slice number 1, and $A_{t2s2}$ denotes attribute information for tile number 2 and slice number 2.

Mtile denotes tile additional information. MGslice denotes geometry slice additional information, and MAslice denotes attribute slice additional information. $D_{t1s1}$ denotes dependency relationship information of attribute information $A_{t1s1}$, and $D_{t2s1}$ denotes dependency relationship information of attribute information $A_{t2s1}$.

It should be noted that a different structure resulting from tile division or slice division may be used according to an application etc.

The three-dimensional data encoding device may rearrange data in decoding order so that the three-dimensional data decoding device need not rearrange data. It should be noted that the three-dimensional data decoding device may rearrange data, or both the three-dimensional data encoding device and the three-dimensional data decoding device may rearrange data.

Figure 52:
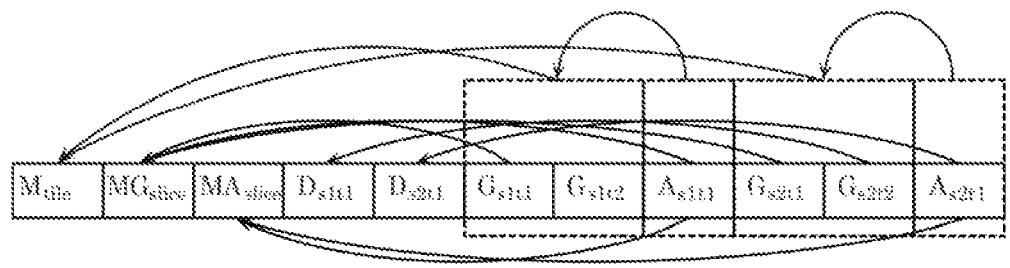
FIG. 52 is a diagram illustrating an example of decoding order of data according to Embodiment 6.

FIG. 52 is a diagram illustrating an example of decoding order of data. In the example shown in FIG. 52, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

Figure 53:
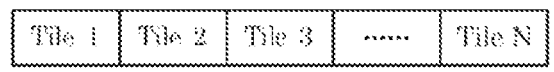
FIG. 53 is a diagram illustrating an example of encoded data of tiles according to Embodiment 6.

Furthermore, the three-dimensional data decoding device may selectively decode tiles based on a request from an application and information obtained from a NAL unit header. FIG. 53 is a diagram illustrating an example of encoded data of tiles. For example, decoding order of tiles is optional. In other words, tiles need not have a dependency relationship with each other.

Figure 54:
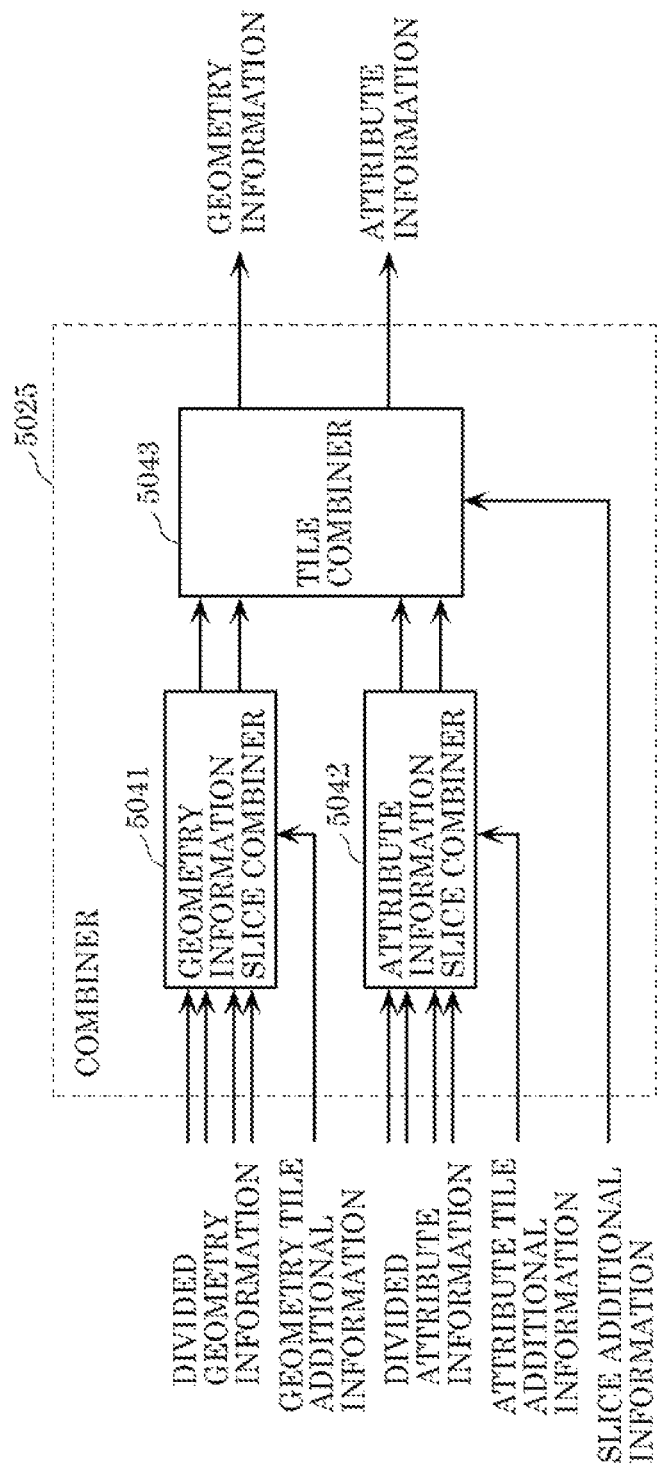
FIG. 54 is a block diagram of a combiner according to Embodiment 6.

The following describes a configuration of combiner 5025 included in first decoder 5020. FIG. 54 is a block diagram illustrating a configuration of combiner 5025. Combiner 5025 includes geometry information slice combiner (geometry slice combiner) 5041, attribute information slice combiner (attribute slice combiner) 5042, and tile combiner 5043.

Geometry information slice combiner 5041 generates pieces of tile geometry information by combining pieces of divided geometry information using geometry slice additional information. Attribute information slice combiner 5042 generates pieces of tile attribute information by combining pieces of divided attribute information using attribute slice additional information.

Tile combiner 5043 generates geometry information by combining pieces of tile geometry information using tile additional information. Besides, tile combiner 5043 generates attribute information by combining pieces of tile attribute information using tile additional information.

It should be noted that the number of divided slices or tiles is at least one. In other words, slice division or tile division need not be performed.

Figure 55:
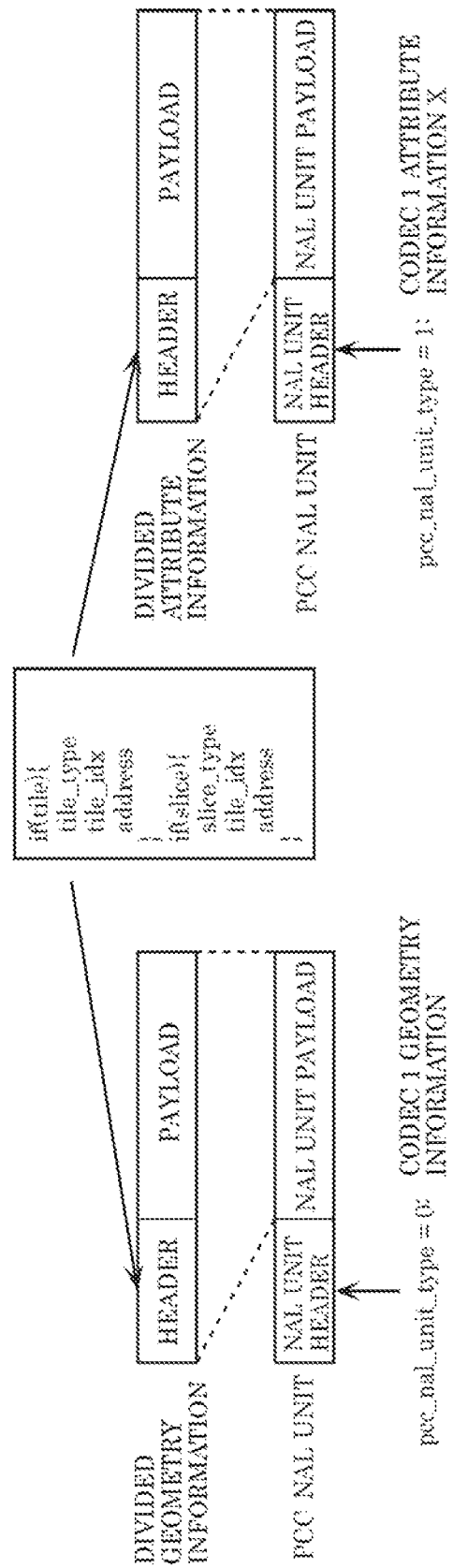
FIG. 55 is a diagram illustrating a structural example of encoded data and NAL units according to Embodiment 6.

The following describes a structure of encoded data subjected to slice division or tile division, and a method of storing encoded data in a NAL unit (a multiplexing method). FIG. 55 is a diagram illustrating a structure of encoded data and a method of storing encoded data in a NAL unit.

Encoded data (divided geometry information or divided attribute information) is stored in a NAL unit payload.

Encoded data includes a header and a payload. The header includes identification information for identifying data included in the payload. Examples of the identification information include a type of slice division or tile division (slice_type, tile_type), index information for identifying a slice or a tile (slice_idx, tile_idx), geometry information of data (a slice or tile), or an address of data (address). Index information for identifying a slice is also referred to as a slice index (SliceIndex). Index information for identifying a tile is also referred to as a tile index (TileIndex). A division type indicates, for example, a method based on an object shape as described above, a method based on map information or position information, or a method based on a data volume or an amount of processing.

Moreover, the header of the encoded data includes identification information indicating a dependency relationship. To put it another way, when data have a dependency relationship with each other, the header includes identification information for a depender to refer to a dependee. For example, the header of data of a dependee includes identification information for identifying the data. The header of data of a depender includes identification information indicating a dependee. It should be noted that when identification information for identifying data, additional information regarding slice division or tile division, and identification information indicating a dependency relationship are identifiable or derivable from other information, these pieces of information may be omitted.

Figure 56:
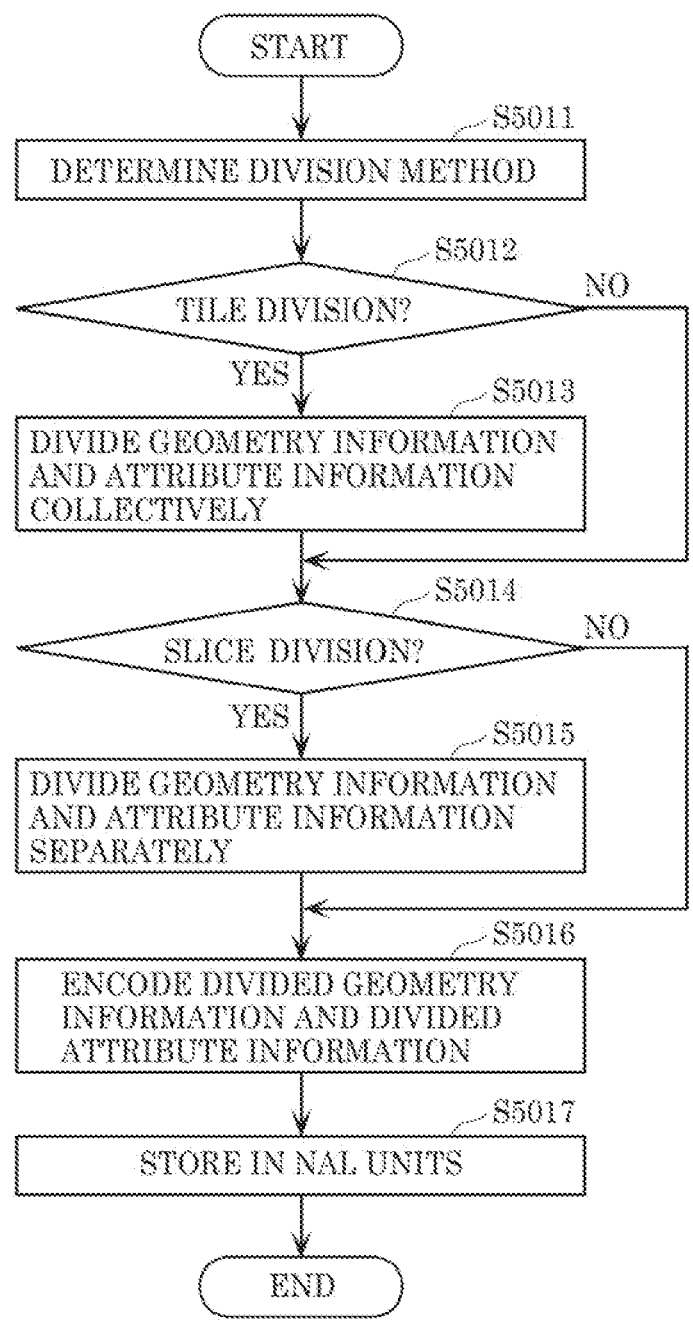
FIG. 56 is a flowchart of an encoding process according to Embodiment 6.

The following describes procedures of a point cloud data encoding process and a point cloud data decoding process according to the present embodiment. FIG. 56 is a flowchart of a point cloud data encoding process according to the present embodiment.

First, the three-dimensional data encoding device determines a division method to be used (S5011). Examples of the division method include tile division and slice division. A division method may include a division number, a division type, etc. when tile division or slice division is performed. A division type indicates, for example, a method based on an object shape as described above, a method based on map information or geometry information, or a method based on a data volume or an amount of processing. It should be noted that a division method may be determined in advance.

When tile division is performed (YES in S5012), the three-dimensional data encoding device generates pieces of tile geometry information and pieces of tile attribute information by dividing geometry information and attribute information collectively (S5013). Besides, the three-dimensional data encoding device generates tile additional information regarding the tile division. It should be noted that the three-dimensional data encoding device may divide geometry information and attribute information separately.

When slice division is performed (YES in S5014), the three-dimensional data encoding device generates pieces of divided geometry information and pieces of divided attribute information by dividing the pieces of tile geometry information and the pieces of tile attribute information (or the geometry information and the attribute information) separately (S5015). Also, the three-dimensional data encoding device generates geometry slice additional information and attribute slice additional information regarding the slice division. It should be noted that the three-dimensional data encoding device may divide tile geometry information and tile attribute information collectively.

Next, the three-dimensional data encoding device generates pieces of encoded geometry information and pieces of encoded attribute information by respectively encoding the pieces of divided geometry information and the pieces of divided attribute information (S5016). In addition, the three-dimensional data encoding device generates dependency relationship information.

Finally, the three-dimensional data encoding device generates encoded data (an encoded stream) by storing in NAL units (multiplexing) the pieces of encoded geometry information, the pieces of encoded attribute information, and additional information (S5017). Additionally, the three-dimensional data encoding device transmits the generated encoded data.

Figure 57:
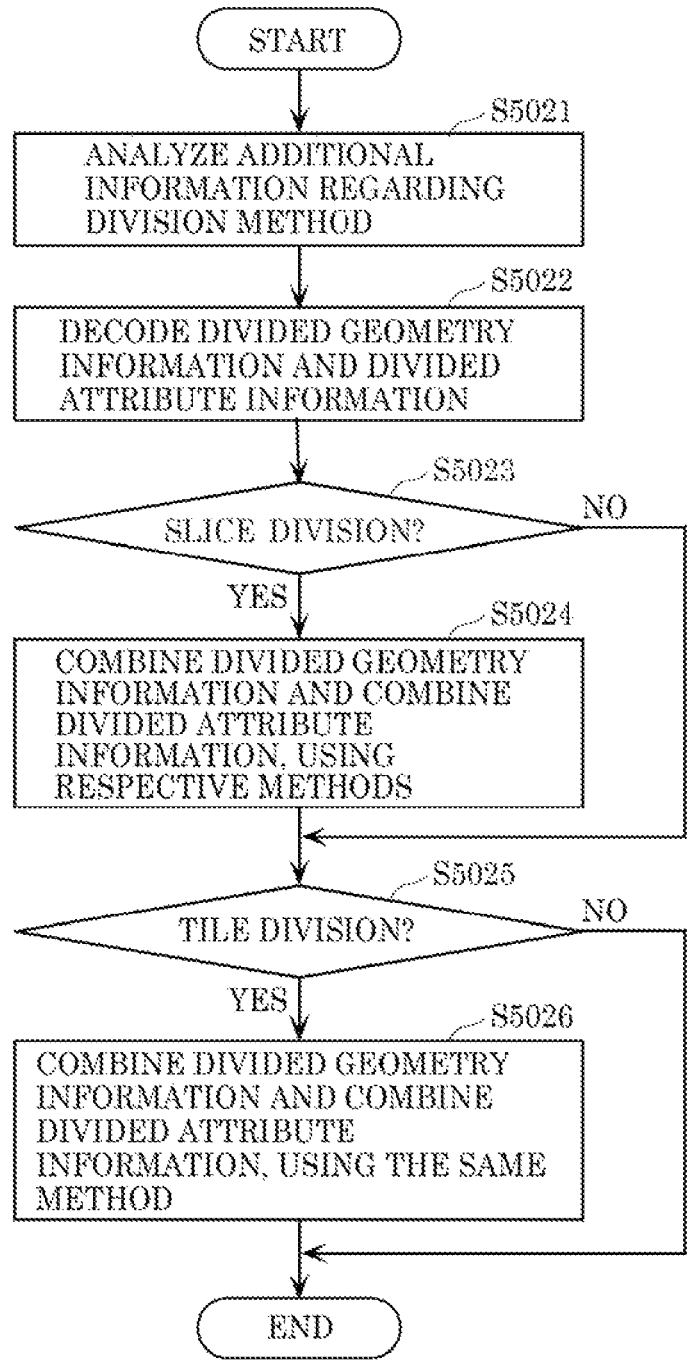
FIG. 57 is a flowchart of a decoding process according to Embodiment 6.

FIG. 57 is a flowchart of a point cloud data decoding process according to the present embodiment. First, the three-dimensional data decoding device determines a division method by analyzing additional information (tile additional information, geometry slice additional information, attribute slice additional information) regarding a division method included in encoded data (an encoded stream) (S5021). Examples of the division method include tile division and slice division. A division method may include a division number, a division type, etc. when tile division or slice division is performed.

Next, the three-dimensional data decoding device generates divided geometry information and divided attribute information by decoding pieces of encoded geometry information and pieces of encoded attribute information included in the encoded data, using dependency relationship information included in the encoded data (S5022).

When the additional information indicates that slice division has been performed (YES in S5023), the three-dimensional data decoding device generates pieces of tile geometry information and pieces of tile attribute information by combining pieces of divided geometry information and combining pieces of divided attribute information, using respective methods, based on the geometry slice additional information and the attribute slice additional information (S5024). It should be noted that the three-dimensional data decoding device may combine the pieces of divided geometry information and combine the pieces of divided attribute information, using the same method.

When the additional information indicates that tile division has been performed (YES in S5025), the three-dimensional data decoding device generates geometry information and attribute information by combining the pieces of tile geometry information (the pieces of divided geometry information) and combining the pieces of tile attribute information (the pieces of divided attribute information), using the same method, based on tile additional information (S5026). It should be noted that the three-dimensional data decoding device may combine the pieces of tile geometry information and combine the pieces of tile attribute information, using respective methods.

The following describes tile additional information. The three-dimensional data encoding device generates tile additional information that is metadata regarding a tile division method, and transmits the generated tile additional information to the three-dimensional data decoding device.

FIG. 58 is a diagram illustrating an example of syntax of tile additional information (TileMetaData). As shown in FIG. 58, for example, tile additional information includes division method information (type_of_divide), shape information (topview_shape), an overlap flag (tile_overlap_flag), overlap information (type_of_overlap), height information (tile_height), a tile number (tile_number), and tile position information (global_position, relative_position).

Division method information (type_of_divide) indicates a tile division method. For example, division method information indicates whether a tile division method is division based on map information, that is, division based on top view (top_view) or another division (other).

Shape information (topview_shape) is included in tile additional information when a tile division method is, for example, division based on top view. Shape information indicates a shape in top view of a tile. Examples of the shape include a square and a circle. Moreover, the examples of the shape may include an ellipse, a rectangle, or a polygon other than a quadrangle, or may include a shape other than these. It should be noted that shape information may indicate not only a shape in top view of a tile but also a three-dimensional shape (e.g., a cube, a round column) of a tile.

An overlap flag (tile_overlap_flag) indicates whether tiles overlap each other. For example, an overlap flag is included in tile additional information when a tile division method is division based on top view. In this case, the overlap flag indicates whether tiles overlap each other in top view. It should be noted that an overlap flag may indicate whether tiles overlap each other in a three-dimensional space.

Overlap information (type_of_overlap) is included in tile additional information when, for example, tiles overlap each other. Overlap information indicates, for example, how tiles overlap each other. For example, overlap information indicates the size of an overlapping region.

Height information (tile_height) indicates the height of a tile. It should be noted that height information may include information indicating a tile shape. For example, when the shape of a tile in top view is a rectangle, the information may indicate the length of a side (a vertical length, a horizontal length) of the rectangle. When the shape of a tile in top view is a circle, the information may indicate the diameter or radius of the circle.

Moreover, height information may indicate the height of each tile or a height common to tiles. In addition, height types such as roads and overpasses may be set in advance, and height information may indicate the height of each of the height types and a height type of each tile. Alternatively, a height of each height type may be specified in advance, and height information may indicate a height type of each tile. In other words, height information need not indicate a height of each height type.

A tile number (tile_number) indicates the number of tiles. It should be noted that tile additional information may include information indicating an interval between tiles.

Tile position information (global_position, relative_position) is information for identifying the position of each tile. For example, tile position information indicates the absolute coordinates or relative coordinates of each tile.

It should be noted that part or all of the above-mentioned information may be provided for each tile or each group of tiles (e.g., for each frame or group of frames).

The three-dimensional data encoding device may include tile additional information in supplemental enhancement information (SEI) and transmit the SEI. Alternatively, the three-dimensional data encoding device may store tile additional information in an existing parameter set (PPS, GPS, or APS, etc.) and transmit the parameter set.

For example, when tile additional information changes for each frame, the tile additional information may be stored in a parameter set for each frame (GPS or APS etc.). When tile additional information does not change in a sequence, the tile additional information may be stored in a parameter set for sequence (geometry SPS or attribute SPS). Further, when the same tile division information is used for geometry information and attribute information, tile additional information may be stored in a parameter set for a PCC stream (a stream PS).

Moreover, tile additional information may be stored in any one of the above-mentioned parameter sets or in parameter sets. In addition, tile additional information may be stored in the header of encoded data. Additionally, tile additional information may be stored in the header of a NAL unit.

Furthermore, part or all of tile additional information may be stored in one of the header of divided geometry information and the header of divided attribute information, and need not be stored in the other. For example, when the same tile additional information is used for geometry information and attribute information, the tile additional information may be included in the header of one of the geometry information and the attribute information. For example, when attribute information depends on geometry information, the geometry information is processed first. For this reason, the tile additional information may be included in the header of the geometry information, and need not be included in the header of the attribute information. In this case, for example, the three-dimensional data decoding device determines that the attribute information of the depender belongs to the same tile as a tile having the geometry information of the dependee.

The three-dimensional data decoding device reconstructs point cloud data subjected to tile division, based on tile additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using tile additional information. For example, when tiles overlap each other, the three-dimensional data decoding device may perform decoding for each tile, perform processing (e.g., smoothing or filtering) using the pieces of decoded data, and generate point cloud data. This makes it possible to perform highly accurate decoding.

Figure 59:
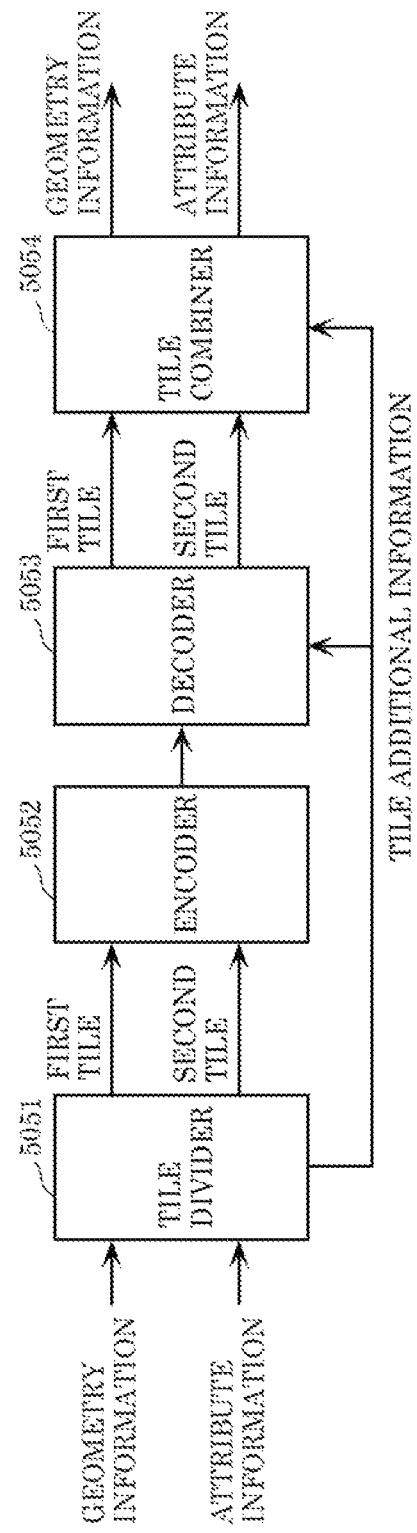
FIG. 59 is a block diagram of an encoding and decoding system according to Embodiment 6.

FIG. 59 is a diagram illustrating a configuration example of a system including the three-dimensional data encoding device and the three-dimensional data decoding device. Tile divider 5051 divides point cloud data including geometry information and attribute information into a first tile and a second tile. In addition, tile divider 5051 transmits tile additional information regarding tile division to decoder 5053 and tile combiner 5054.

Encoder 5052 generates encoded data by encoding the first tile and the second tile.

Decoder 5053 restores the first tile and the second tile by decoding the encoded data generated by encoder 5052. Tile combiner 5054 restores the point cloud data (the geometry information and the attribute information) by combining the first tile and the second tile using the tile additional information.

The following describes slice additional information. The three-dimensional data encoding device generates slice additional information that is metadata regarding a slice division method, and transmits the generated slice additional information to the three-dimensional data decoding device.

FIG. 60 is a diagram illustrating an example of syntax of slice additional information (SliceMetaData). As shown in FIG. 60, for example, slice additional information includes division method information (type_of_divide), an overlap flag (slice_overlap_flag), overlap information (type_of_overlap), a slice number (slice_number), slice position information (global_position, relative_position), and slice size information (slice_bounding_box_size).

Division method information (type_of_divide) indicates a slice division method. For example, division method information indicates whether a slice division method is division based on information about an object (object) as shown in FIG. 50. It should be noted that slice additional information may include information indicating an object division method. For example, this information indicates whether one object is to be divided into slices or assigned to one slice. In addition, the information may indicate, for example, a division number when one object is divided into slices.

An overlap flag (slice_overlap_flag) indicates whether slices overlap each other. Overlap information (type_of_overlap) is included in slice additional information when, for example, slices overlap each other. Overlap information indicates, for example, how slices overlap each other. For example, overlap information indicates the size of an overlapping region.

A slice number (slice_number) indicates the number of slices.

Slice position information (global_position, relative_position) and slice size information (slice_bounding_box_size) are information about a region of a slice. Slice position information is information for identifying the position of each slice. For example, slice position information indicates the absolute coordinates or relative coordinates of each slice. Slice size information (slice_bounding_box_size) indicates the size of each slice. For example, slice size information indicates the size of a bounding box of each slice.

The three-dimensional data encoding device may include slice additional information in SEI and transmit the SEI. Alternatively, the three-dimensional data encoding device may store slice additional information in an existing parameter set (PPS, GPS, or APS, etc.) and transmit the parameter set.

For example, when slice additional information changes for each frame, the slice additional information may be stored in a parameter set for each frame (GPS or APS etc.). When slice additional information does not change in a sequence, the slice additional information may be stored in a parameter set for sequence (geometry SPS or attribute SPS). Further, when the same slice division information is used for geometry information and attribute information, slice additional information may be stored in a parameter set for a PCC stream (a stream PS).

Moreover, slice additional information may be stored in any one of the above-mentioned parameter sets or in parameter sets. In addition, slice additional information may be stored in the header of encoded data. Additionally, slice additional information may be stored in the header of a NAL unit.

Furthermore, part or all of slice additional information may be stored in one of the header of divided geometry information and the header of divided attribute information, and need not be stored in the other. For example, when the same slice additional information is used for geometry information and attribute information, the slice additional information may be included in the header of one of the geometry information and the attribute information. For example, when attribute information depends on geometry information, the geometry information is processed first. For this reason, the slice additional information may be included in the header of the geometry information, and need not be included in the header of the attribute information. In this case, for example, the three-dimensional data decoding device determines that the attribute information of the depender belongs to the same slice as a slice having the geometry information of the dependee.

The three-dimensional data decoding device reconstructs point cloud data subjected to slice division, based on slice additional information. When there are pieces of overlapping point cloud data, the three-dimensional data decoding device specifies the pieces of overlapping point cloud data and selects one of the pieces of overlapping point cloud data or merges pieces of point cloud data.

Moreover, the three-dimensional data decoding device may perform decoding using slice additional information. For example, when slices overlap each other, the three-dimensional data decoding device may perform decoding for each slice, perform processing (e.g., smoothing or filtering) using the pieces of decoded data, and generate point cloud data. This makes it possible to perform highly accurate decoding.

Figure 61:
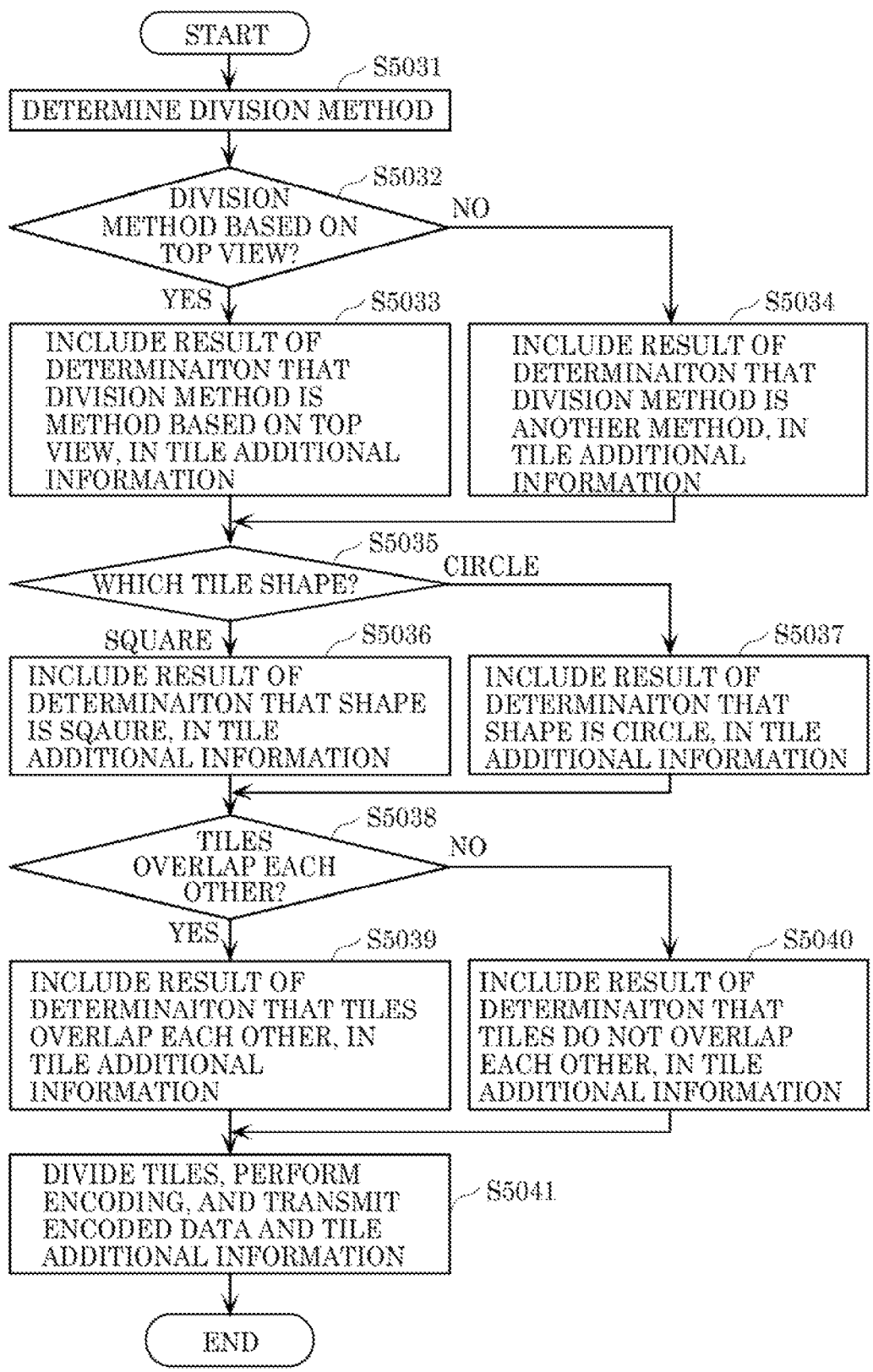
FIG. 61 is a flowchart of an encoding process according to Embodiment 6.

FIG. 61 is a flowchart of a three-dimensional data encoding process including a tile additional information generation process performed by the three-dimensional data encoding device according to the present embodiment.

First, the three-dimensional data encoding device determines a division method to be used (S5031). Specifically, the three-dimensional data encoding device determines whether a division method based on top view (top_view) or another method (other) is to be used as a tile division method. In addition, the three-dimensional data encoding device determines a tile shape when the division method based on top view is used. Additionally, the three-dimensional data encoding device determines whether tiles overlap with other tiles.

When the tile division method determined in step S5031 is the division method based on top view (YES in S5032), the three-dimensional data encoding device includes a result of the determination that the tile division method is the division method based on top view (top_view), in tile additional information (S5033).

On the other hand, when the tile division method determined in step S5031 is a method other than the division method based on top view (NO in S5032), the three-dimensional data encoding device includes a result of the determination that the tile division method is the method other than the division method based on top view (top_view), in tile additional information (S5034).

Moreover, when a shape in top view of a tile determined in step S5031 is a square (SQUARE in S5035), the three-dimensional data encoding device includes a result of the determination that the shape in top view of the tile is the square, in the tile additional information (S5036). In contrast, when a shape in top view of a tile determined in step S5031 is a circle (CIRCLE in S5035), the three-dimensional data encoding device includes a result of the determination that the shape in top view of the tile is the circle, in the tile additional information (S5037).

Next, the three-dimensional data encoding device determines whether tiles overlap with other tiles (S5038). When the tiles overlap with the other tiles (YES in S5038), the three-dimensional data encoding device includes a result of the determination that the tiles overlap with the other tiles, in the tile additional information (S5039). On the other hand, when the tiles do not overlap with other tiles (NO in S5038), the three-dimensional data encoding device includes a result of the determination that the tiles do not overlap with the other tiles, in the tile additional information (S5040).

Finally, the three-dimensional data encoding device divides the tiles based on the tile division method determined in step S5031, encodes each of the tiles, and transmits the generated encoded data and the tile additional information (S5041).

Figure 62:
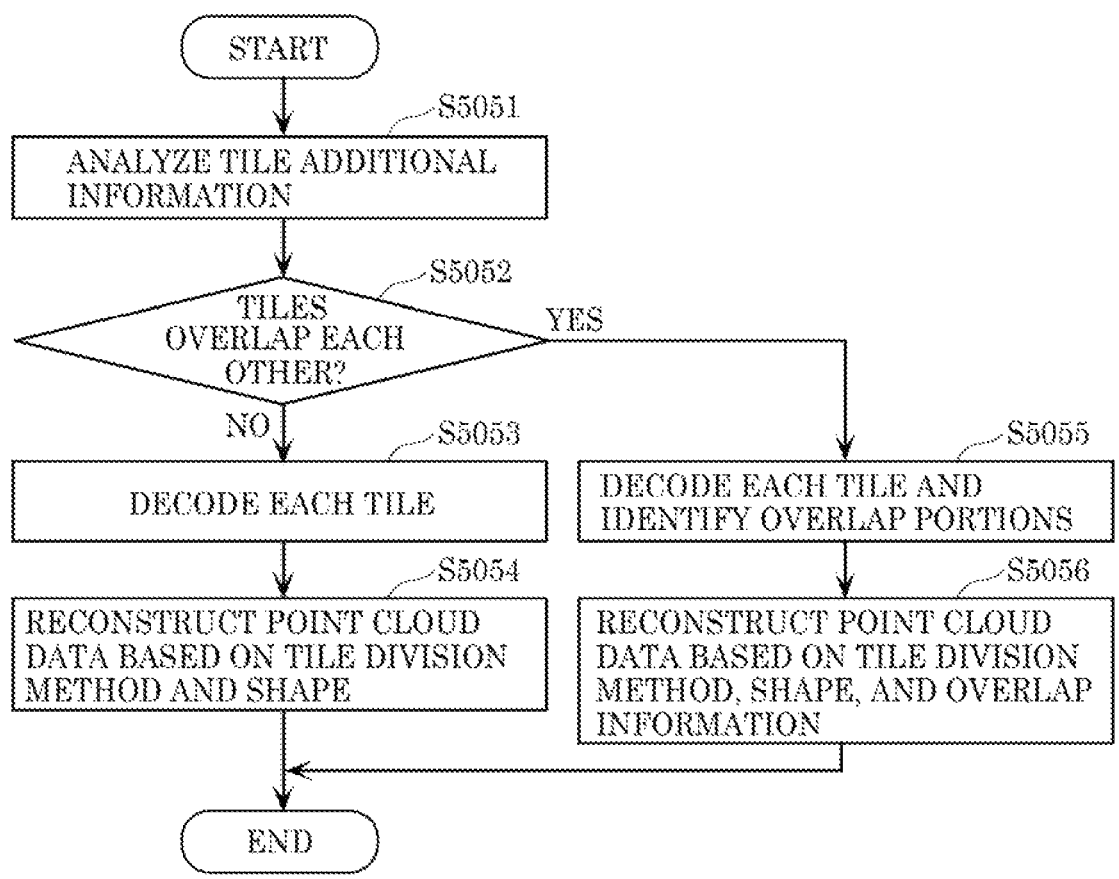
FIG. 62 is a flowchart of a decoding process according to Embodiment 6.

FIG. 62 is a flowchart of a three-dimensional data decoding process performed by the three-dimensional data decoding device according to the present embodiment using tile additional information.

First, the three-dimensional data decoding device analyzes tile additional information included in a bitstream (S5051).

When the tile additional information indicates that tiles do not overlap with other tiles (NO in S5052), the three-dimensional data decoding device generates point cloud data of each tile by decoding the tile (S5053). Finally, the three-dimensional data decoding device reconstructs point cloud data from the point cloud data of each tile, based on a tile division method and a tile shape indicated by the tile additional information (S5054).

In contrast, when the tile additional information indicates that tiles overlap with other tiles (YES in S5052), the three-dimensional data decoding device generates point cloud data of each tile by decoding the tile. In addition, the three-dimensional data decoding device identifies overlap portions of the tiles based on the tile additional information (S5055). It should be noted that, regarding the overlap portions, the three-dimensional data decoding device may perform decoding using pieces of overlapping information. Finally, the three-dimensional data decoding device reconstructs point cloud data from the point cloud data of each tile, based on a tile division method, a tile shape, and overlap information indicated by the tile additional information (S5056).

The following describes, for example, variations regarding slice. The three-dimensional data encoding device may transmit, as additional information, information indicating a type (a road, a building, a tree, etc.) or attribute (dynamic information, static information, etc.) of an object. Alternatively, a coding parameter may be predetermined according to an object, and the three-dimensional data encoding device may notify the coding parameter to the three-dimensional data decoding device by transmitting a type or attribute of the object.

The following methods may be used regarding slice data encoding order and transmitting order. For example, the three-dimensional data encoding device may encode slice data in decreasing order of ease of object recognition or clustering. Alternatively, the three-dimensional data encoding device may encode slice data in the order in which clustering is completed. Moreover, the three-dimensional data encoding device may transmit slice data in the order in which the slice data is encoded. Alternatively, the three-dimensional data encoding device may transmit slice data in decreasing order of priority for decoding in an application. For example, when dynamic information has high priority for decoding, the three-dimensional data encoding device may transmit slice data in the order in which slices are grouped using the dynamic information.

Furthermore, when encoded data order is different from the order of priority for decoding, the three-dimensional data encoding device may transmit encoded data after rearranging the encoded data. In addition, when storing encoded data, the three-dimensional data encoding device may store encoded data after rearranging the encoded data.

An application (the three-dimensional data decoding device) requests a server (the three-dimensional data encoding device) to transmit slices including desired data. The server may transmit slice data required by the application, and need not transmit slice data unnecessary for the application.

An application requests a server to transmit a tile including desired data. The server may transmit tile data required by the application, and need not transmit tile data unnecessary for the application.

Figure 63:
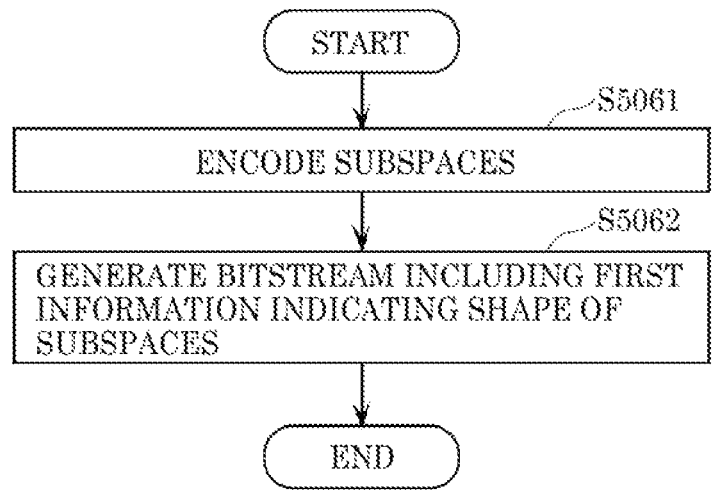
FIG. 63 is a flowchart of an encoding process according to Embodiment 6.

As stated above, the three-dimensional data encoding device according to the present embodiment performs the process shown in FIG. 63. First, the three-dimensional data encoding device encodes subspaces (e.g., tiles) obtained by dividing a current space which includes three-dimensional points, to generate pieces of encoded data (S5061). The three-dimensional data encoding device generates a bitstream including the pieces of encoded data and first information (e.g., topview_shape) indicating a shape of each of the subspaces (S5062).

Accordingly, since the three-dimensional data encoding device can select any shape from various types of shapes of subspaces, the three-dimensional data encoding device can improve the coding efficiency.

For example, the shape is a two-dimensional shape or a three-dimensional shape of each of the subspaces. For example, the shape is a shape in a top view of the subspace. To put it another way, the first information indicates a shape of the subspace viewed from a specific direction (e.g., an upper direction). In short, the first information indicates a shape in an overhead view of the subspace. For example, the shape is rectangular or circular.

For example, the bitstream includes second information (e.g., tile_overlap_flag) indicating whether the subspaces overlap.

Accordingly, since the three-dimensional data encoding device allows subspaces to overlap, the three-dimensional data encoding device can generate the subspaces without making a shape of each of the subspaces complex.

For example, the bitstream includes third information (e.g., type_of_divide) indicating whether a division method used to obtain the subspaces is a division method using a top view.

For example, the bitstream includes fourth information (e.g., tile_height) indicating at least one of a height, a width, a depth, or a radius of each of the subspaces.

For example, the bitstream includes fifth information (e.g., global_position or relative_position) indicating a position of each of the subspaces.

For example, the bitstream includes sixth information (e.g., tile_number) indicating a total number of the subspaces.

For example, the bitstream includes seventh information indicating an interval between the subspaces.

For example, the three-dimensional data encoding device includes a processor and memory, and the processor performs the above process using the memory.

Figure 64:
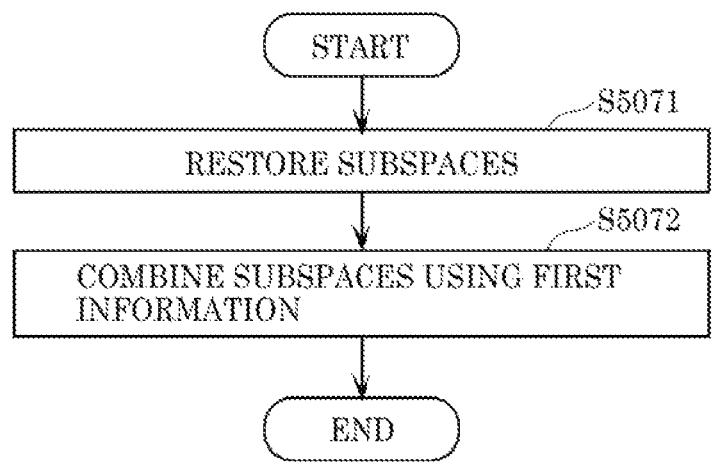
FIG. 64 is a flowchart of a decoding process according to Embodiment 6.

Moreover, the three-dimensional data decoding device according to the present embodiment performs the process shown in FIG. 64. First, the three-dimensional data decoding device decodes pieces of encoded data included in a bitstream and generated by encoding subspaces (e.g., tiles) obtained by dividing a current space which includes three-dimensional points, to restore the subspaces (S5071). The three-dimensional data decoding device restores the current space by combining the subspaces using first information (e.g., topview_shape) which is included in the bitstream and indicates a shape of each of the subspaces (S5072). For example, the three-dimensional data decoding device can determine a position and a range of each of subspaces in a current space by recognizing a shape of the subspace using the first information. The three-dimensional data decoding device can combine the subspaces based on the determined positions and ranges of the subspaces. Accordingly, the three-dimensional data decoding device can combine the subspaces correctly.

For example, the shape is a two-dimensional shape or a three-dimensional shape of each of the subspaces. For example, the shape is rectangular or circular.

For example, the bitstream includes second information (e.g., tile_overlap_flag) indicating whether the subspaces overlap. In the restoring of the current space, the three-dimensional data decoding device combines the subspaces by further using the second information. For example, the three-dimensional data decoding device determines whether subspaces overlap, using the second information. When the subspaces overlap, the three-dimensional data decoding device identifies overlap regions and performs a predetermined process on the identified regions.

For example, the bitstream includes third information (e.g., type_of_divide) indicating whether a division method used to obtain the subspaces is a division method using a top view. In the restoring of the current space, when the third information indicates that the division method used to obtain the subspaces is the division method using the top view, the three-dimensional data decoding device combines the subspaces using the first information.

For example, the bitstream includes fourth information (e.g., tile_height) indicating at least one of a height, a width, a depth, or a radius of each of the subspaces. In the restoring of the current space, the three-dimensional data decoding device combines the subspaces by further using the fourth information. For example, the three-dimensional data decoding device can determine a position and a range of each of subspaces in a current space by recognizing a height of the subspace using the fourth information. The three-dimensional data decoding device can combine the subspaces based on the determined positions and ranges of the subspaces.

For example, the bitstream includes fifth information (e.g., global_position or relative_position) indicating a position of each of the subspaces. In the restoring of the current space, the three-dimensional data decoding device combines the subspaces by further using the fifth information. For example, the three-dimensional data decoding device can determine a position of each of subspaces in a current space by recognizing a position of the subspace using the fifth information. The three-dimensional data decoding device can combine the subspaces based on the determined positions of the subspaces.

For example, the bitstream includes sixth information (e.g., tile_number) indicating a total number of the subspaces. In the restoring of the current space, the three-dimensional data decoding device combines the subspaces by further using the sixth information.

For example, the bitstream includes seventh information indicating an interval between the subspaces. In the restoring of the current space, the three-dimensional data decoding device combines the subspaces by further using the seventh information. For example, the three-dimensional data decoding device can determine a position and a range of each of subspaces in a current space by recognizing an interval between the subspaces using the seventh information. The three-dimensional data decoding device can combine the subspaces based on the determined positions and ranges of the subspaces.

For example, the three-dimensional data decoding device includes a processor and memory, and the processor performs the above process using the memory.

Embodiment 7

The present embodiment describes processing of a division unit (e.g., a tile or a slice) including no points. First, a method of dividing point cloud data will be described.

In a video coding standard such as HEVC, since there are data for all the pixels of a two-dimensional image, even when a two-dimensional space is divided into data areas, all the data areas include data. On the other hand, in encoding of three-dimensional point cloud data, points themselves that are elements of point cloud data are data, and there is a possibility that data are not included in some of areas.

There are various methods of spatially dividing point cloud data, and such methods can be classified according to whether a division unit (e.g., a tile or a slice) that is a divided data unit always includes one or more point data.

A division method in which all division units each include one or more point data is referred to as a first division method. Examples of the first division method include a method of dividing point cloud data in consideration of processing time for encoding or the size of encoded data. In this case, each division unit has a substantially even number of points.

Figure 65:
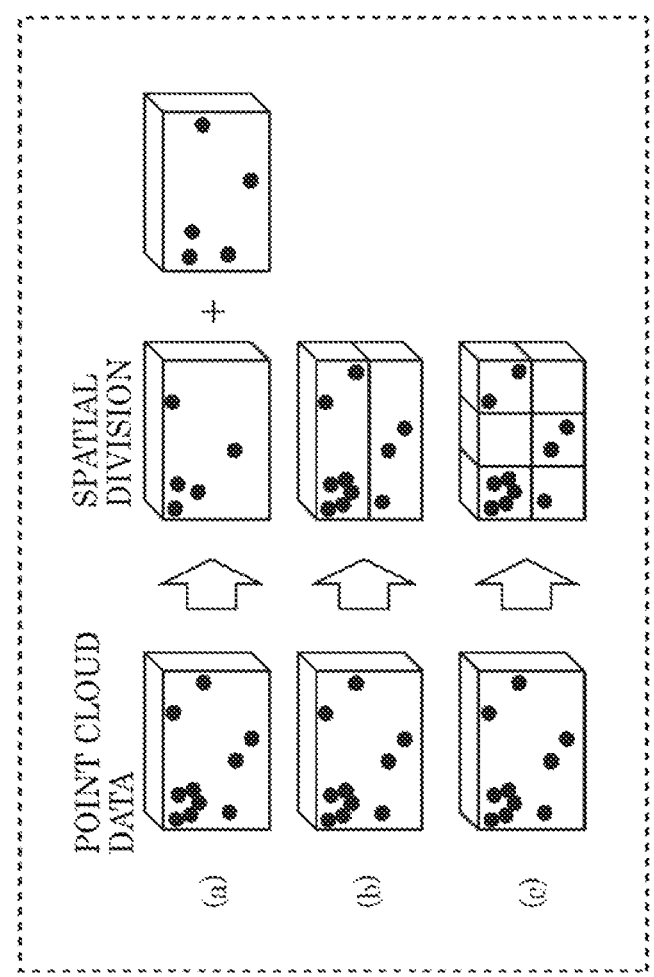
FIG. 65 is a diagram illustrating examples of a division method according to Embodiment 7.

FIG. 65 is a diagram illustrating examples of a division method. For example, as shown in (a) in FIG. 65, a method of separating points belonging to an identical space into two identical spaces may be used as the first division method. In addition, as shown in (b) in FIG. 65, a space may be divided into subspaces (division units) so that each of the division units includes points.

Since these methods are division in consideration of points, all division units always include one or more points.

A division method in which division units are likely to include one or more division units including no point data is referred to as a second division method. For example, as shown in (c) in FIG. 65, a method of dividing a space equally may be used as the second division method. In this case, a division unit does not always include points. In short, a division unit may include no points.

When the three-dimensional data encoding device divides point cloud data, the three-dimensional data encoding device may include, in divided additional information (e.g., tile additional information or slice additional information), (i) whether a division method in which all division units include one or more point data has been used, (ii) whether a division method in which division units include one or more division units including no point data has been used, or (iii) whether a division method in which division units are likely to include one or more division units including no point data. Subsequently, the three-dimensional data encoding device may transmit the divided additional information.

It should be noted that the three-dimensional data encoding device may indicate the above information as a type of a division method. Additionally, the three-dimensional data encoding device may perform division using a predetermined division method, and need not transmit divided additional information. In this case, the three-dimensional data encoding device clearly specifies whether the division method is the first division method or the second division method in advance.

The following describes the second division method and an example of generating and transmitting encoded data. It should be noted that although tile division will be exemplified as a method of dividing a three-dimensional space below, the present embodiment is not limited to tile division, and the following procedure is applicable to a division method using division units other than tiles. For example, slice division may be used instead of tile division.

Figure 66:
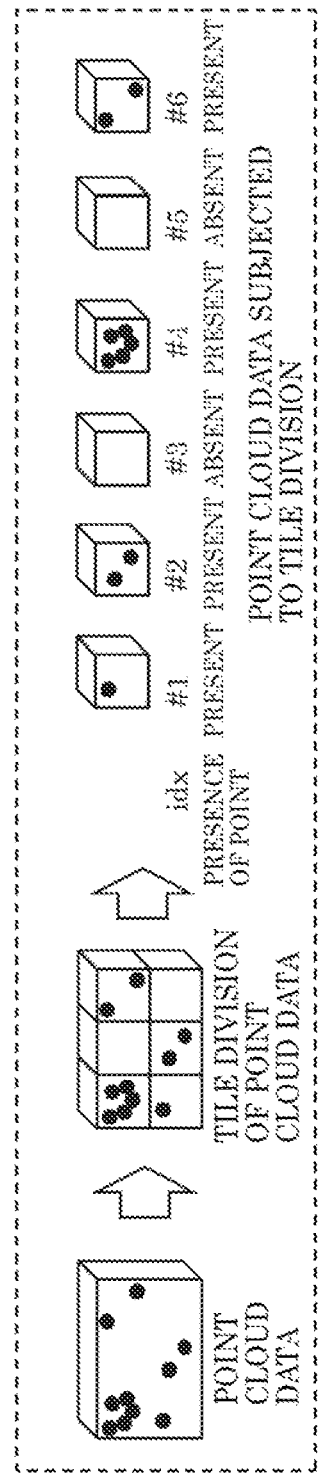
FIG. 66 is a diagram illustrating an example of dividing point cloud data according to Embodiment 7.

FIG. 66 is a diagram illustrating an example of dividing point cloud data into six tiles. FIG. 66 shows an example in which the smallest unit is a point and geometry information (geometry) and attribute information (attribute) are divided together. It should be noted that the same applies to a case in which geometry information and attribute information are divided using separate division methods or by separate division numbers, a case in which there is no attribute information, and a case in which there are pieces of attribute information.

In the example shown in FIG. 66, tile division results in tiles (#1, #2, #4, #6) including points and tiles (#3, #5) including no points. A tile including no points is referred to as a null tile.

It should be noted that the present disclosure is not limited to the division into six tiles, and any division method may be used. For example, a division unit may be a cube or have a non-cubic shape such as a cuboid or round column. Division units may be identical or different in shape. Moreover, a predetermined method may be used as a division method, or a different method may be used for each predetermined unit (e.g., PCC frame).

In the present division method, when point cloud data is divided into tiles and one or more of the tiles include no data, a bitstream including information indicating that the one or more tiles are null tiles is generated.

The following describes a method of transmitting a null tile and a method of signaling a null tile. The three-dimensional data encoding device may generate, as addition information (metadata) regarding data division, for example, the following information and transmit the generated information. FIG. 67 is a diagram illustrating an example of syntax of tile additional information (TileMetaData). Tile additional information includes division method information (type_of_divide), division method null information (type_of_divide_null), a tile division number (number_of_tiles), and a tile null flag (tile_null_flag).

Division method information (type_of_divide) is information regarding a division method or a division type. For example, division method information indicates one or more division methods or division types. Examples of a division method include top view (top_view) division and equal division. It should be noted that when the number of definitions of a division method is one, tile additional information need not include division method information.

Division method null information (type_of_divide_null) is information indicating whether a division method to be used is the following first division method or second division method. Here, the first division method is a division method in which each of all division units always includes one or more point data. The second division method is a division method in which division units include one or more division units including no point data or a division method in which division units are likely to include one or more division units including no point data.

Tile additional information may also include, as division information about tiles as a whole, at least one of (i) information (a tile division number (number_of_tiles)) indicating a tile division number or information for specifying a tile division number, (ii) information indicating the number of null tiles or information for specifying the number of null tiles, or (iii) information indicating the number of tiles other than null tiles or information for specifying the number of tiles other than null tiles. In addition, the tile additional information may include, as division information about tiles as a whole, information indicating shapes of tiles or whether tiles overlap each other.

Moreover, the tile additional information indicates division information of each tile in sequence. For example, the order of tiles is predetermined for each division method, and is already known to the three-dimensional data encoding device and the three-dimensional data decoding device. It should be noted that when the order of tiles is not predetermined, the three-dimensional data encoding device may transmit information indicating the order to the three-dimensional data decoding device.

Division information of each tile includes a tile null flag (tile_null_flag) indicating whether the tile includes data (a point). It should be noted that when a tile includes no data, a tile null flag may be included as tile division information.

Moreover, when a tile is not a null tile, tile additional information includes division information (position information (e.g., the coordinates of the origin (origin_x, origin_y, origin_z), tile height information, etc.) of each tile. Furthermore, when a tile is a null tile, tile additional information does not include division information of each tile.

For example, when slice division information of each tile is stored into division information of each tile, the three-dimensional data encoding device need not store slice division information of a null tile into additional information.

Figure 68:
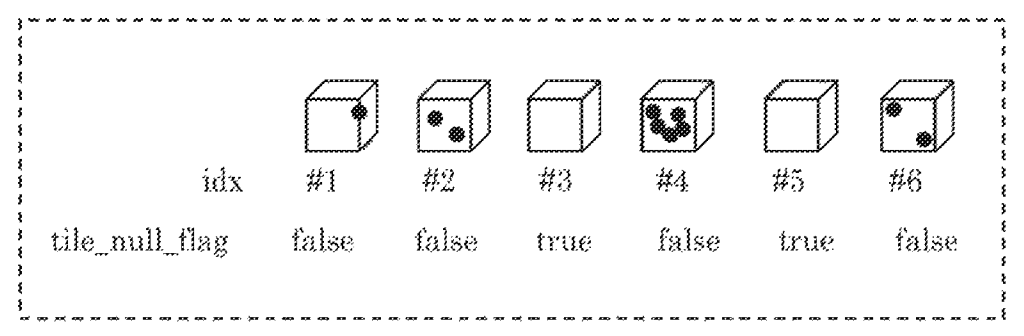

It should be noted that in this example, a tile division number (number_of_tiles) indicates the number of tiles including null tiles. FIG. 68 is a diagram illustrating an example of index information (idx) of a tile. In the example shown in FIG. 68, index information is also assigned to a null tile.

Figure 69:
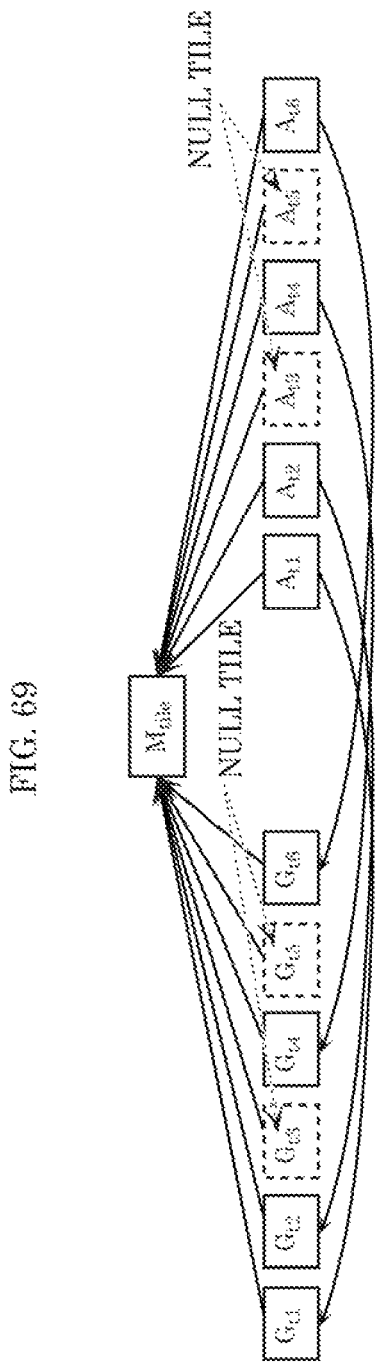
FIG. 69 is a diagram illustrating an example of dependency relationships according to Embodiment 7.
Figure 70:
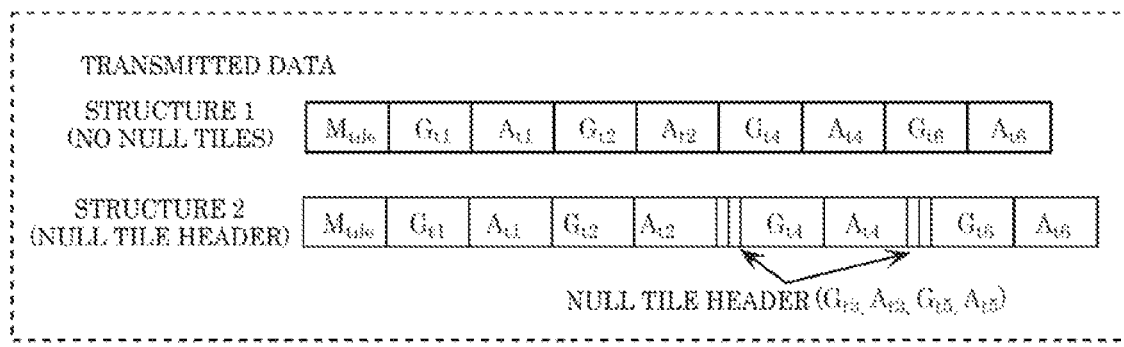
FIG. 70 is a diagram illustrating an example of transmitted data according to Embodiment 7.
Figure 71:
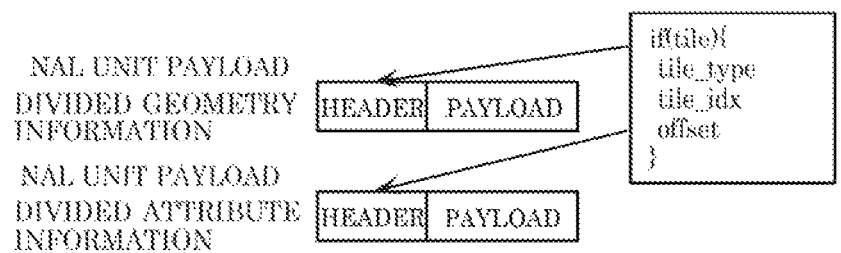
FIG. 71 is a diagram illustrating a structural example of NAL units according to Embodiment 7.

The following describes a data structure of encoded data including null tiles and a transmission method. FIG. 69 to FIG. 71 each are a diagram illustrating a data structure when the third and fifth tiles include no data after geometry information and attribute information are divided into six tiles.

FIG. 69 is a diagram illustrating an example of a dependency relationship of each data. The pointed end of an arrow in the figure indicates a dependee, and the other end of the arrow indicates a depender. Moreover, in the figure, $G_{tn}$ denotes geometry information for tile number n, and $A_{tn}$ denotes attribute information for tile number n, n being an integer from 1 to 6. $M_{tile}$ denotes tile additional information.

FIG. 70 is a diagram illustrating a structural example of transmitted data that is encoded data transmitted by the three-dimensional data encoding device. FIG. 71 is a diagram illustrating a structure of encoded data and a method of storing encoded data in a NAL unit.

As shown in FIG. 71, each of the headers of data of geometry information (divided geometry information) and attribute information (divided attribute information) includes index information (tile_idx) of a tile.

Moreover, as shown in structure 1 in FIG. 70, the three-dimensional data encoding device need not transmit geometry information or attribute information constituting a null tile. Alternatively, as shown in structure 2 in FIG. 70, the three-dimensional data encoding device may transmit, as data of a null tile, information indicating that a tile is a null tile. For example, the three-dimensional data encoding device may include, in tile_type stored in the header of a NAL unit or the header in a payload (nal_unit_payload) of a NAL unit, that a type of the data is a null tile, and transmit the header. It should be noted that the following description will be premised on structure 1.

In structure 1, when there are null tiles, some of values of index information (tile_idx) of tiles included in the header of geometry information data or attribute information data are missing and the values are not continuous in transmitted data.

Moreover, when data have a dependency relationship with each other, the three-dimensional data encoding device transmits the data so that data referred to can be decoded before data referring to the data. It should be noted that a tile of attribute information depends on a tile of geometry information. The same index number of a tile is assigned to attribute information and geometry information having a dependency relationship with each other.

It should be noted that tile additional information regarding tile division may be stored in both or one of a parameter set for geometry information (GPS) and a parameter set for attribute information (APS). When the tile additional information is stored in one of the GPS or the APS, reference information indicating a GPS or an APS to be referred to may be stored in the other of the GPS or the APS. Moreover, when a tile division method is different between geometry information and attribute information, different tile additional information is stored in each of a GPS and an APS. Furthermore, when an identical tile division method is used for sequences (PCC frames), tile additional information may be stored in a GPS, an APS, or a sequence parameter set (SPS).

For example, when tile additional information is stored in both a GPS and an APS, tile additional information for geometry information is stored in the GPS, and tile additional information for attribute information is stored in the APS. Moreover, when tile additional information is stored in common information such as an SPS, tile additional information to be commonly used for geometry information and attribute information may be stored, or tile additional information for the geometry information and tile additional information for the attribute information may be stored separately.

Hereinafter, a combination of tile division and slice division will be described. First, the following describe a data structure and data transmission when tile division is performed after slice division.

Figure 72:
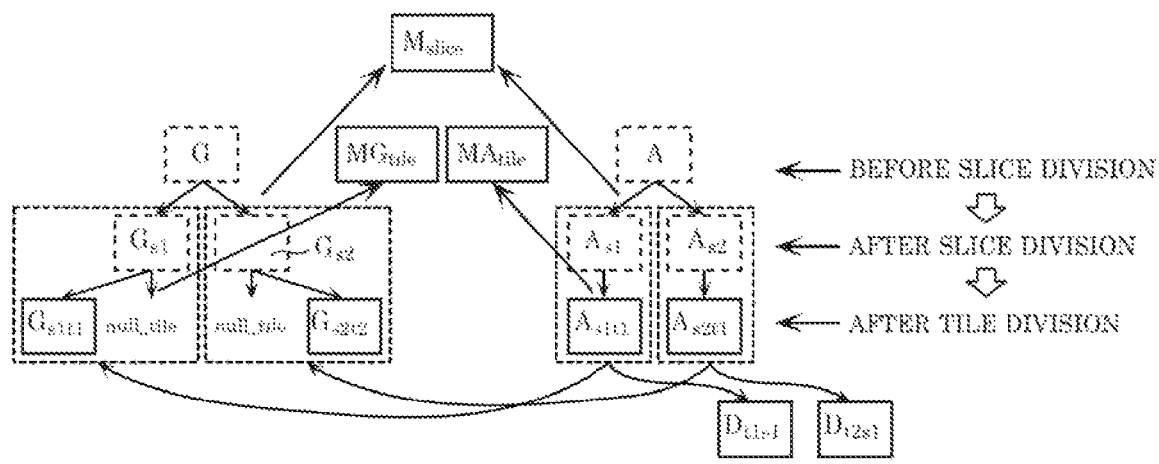
FIG. 72 is a diagram illustrating an example of dependency relationships according to Embodiment 7.

FIG. 72 is a diagram illustrating an example of a dependency relationship of each data when tile division is performed after slice division. The pointed end of an arrow in the figure indicates a dependee, and the other end of the arrow indicates a depender. Data indicated by a solid line in the figure is data actually transmitted, and data indicated by a broken line is data not transmitted.

In the figure, G denotes geometry information, and A denotes attribute information. $G_{s1}$ denotes geometry information for slice number 1, and $G_{s2}$ denotes geometry information for slice number 2. $G_{t1s1}$ denotes geometry information for slice number 1 and tile number 1, and $G_{s2t2}$ denotes geometry information for slice number 2 and tile number 2. Likewise, $A_{s1}$ denotes attribute information for slice number 1, and $A_{s2}$ denotes attribute information for slice number 2. $A_{s1t1}$ denotes attribute information for slice number 1 and tile number 1, and $A_{s2t1}$ denotes attribute information for slice number 2 and tile number 1.

$M_{slice}$ denotes slice additional information, $MG_{tile}$ denotes geometry tile additional information, and $MA_{tile}$ denotes attribute tile additional information. $D_{s1t1}$ denotes dependency relationship information of attribute information $A_{s1t1}$, and $D_{s2t1}$ denotes dependency relationship information of attribute information $A_{s2t1}$.

The three-dimensional data encoding device need not generate and transmit geometry information and attribute information regarding a null tile.

Even when a tile division number is identical to all slices, there is a possibility that the number of tiles generated and transmitted is different between slices. For example, when a tile division number is different between geometry information and attribute information, there is a case in which a null tile is included in one of the geometry information and the attribute information, and a null tile is not included in the other of the geometry information and the attribute information. In the example shown in FIG. 72, geometry information of slice 1 ($G_{s1}$) is divided into two tiles $G_{s1t1}$ and $G_{s1t2}$, and $G_{s1t2}$ is a null tile. In contrast, attribute information of slice 1 ($A_{s1}$) is not divided, with the result that there are one $A_{s1t1}$ and no null tiles.

When data is included in at least a tile of attribution information regardless of whether a null tile is included in a slice of geometry information, the three-dimensional data encoding device generates and transmits dependency relationship information of the attribute information. For example, when the three-dimensional data encoding device stores slice division information of each tile in division information of each slice included in slice additional information regarding slice division, the three-dimensional data encoding device stores information indicating whether the tile is a null tile in the slice division information.

Figure 73:
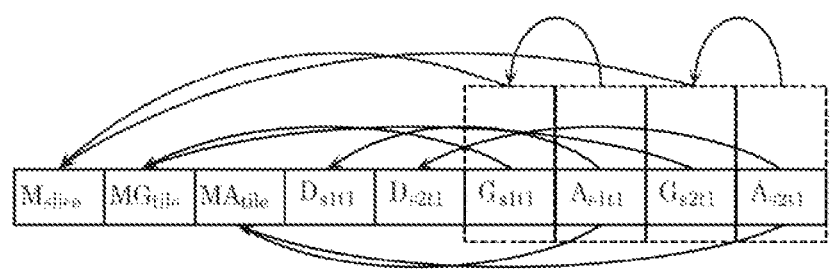
FIG. 73 is a diagram illustrating an example of decoding order of data according to Embodiment 7.

FIG. 73 is a diagram illustrating an example of decoding order of data. In the example shown in FIG. 73, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

Next, the following describe a data structure and data transmission when slice division is performed after tile division.

Figure 74:
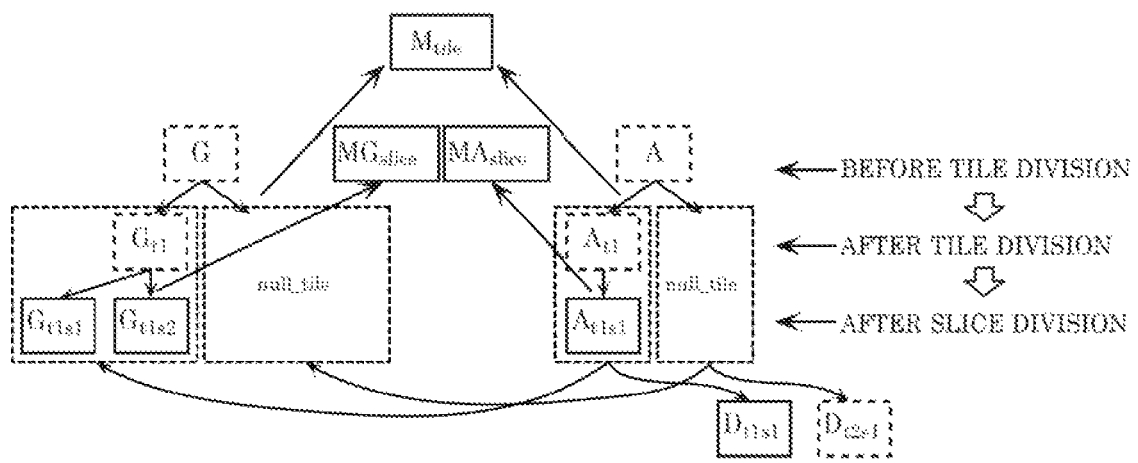
FIG. 74 is a diagram illustrating an example of dependency relationships according to Embodiment 7.

FIG. 74 is a diagram illustrating an example of a dependency relationship of each data when slice division is performed after tile division. The pointed end of an arrow in the figure indicates a dependee, and the other end of the arrow indicates a depender. Data indicated by a solid line in the figure is data actually transmitted, and data indicated by a broken line is data not transmitted.

In the figure, G denotes geometry information, and A denotes attribute information. $G_{t1}$ denotes geometry information for tile number 1. $G_{t1s1}$ denotes geometry information for tile number 1 and slice number 1, and $G_{t1s2}$ denotes geometry information for tile number 1 and slice number 2. Likewise, $A_{t1}$ denotes attribute information for tile number 1, and $A_{t1s1}$ denotes attribute information for tile number 1 and slice number 1.

$M_{tile}$ denotes tile additional information, $MG_{slice}$ denotes geometry slice additional information, and $MA_{slice}$ denotes attribute slice additional information. $D_{t1s1}$ denotes dependency relationship information of attribute information $A_{t1s1}$, and $D_{t2s1}$ denotes dependency relationship information of attribute information $A_{t2s1}$.

The three-dimensional data encoding device does not perform slice division on a null tile. In addition, the three-dimensional data encoding device need not generate and transmit geometry information and attribute information regarding a null tile, and dependency relationship information of the geometry information.

Figure 75:
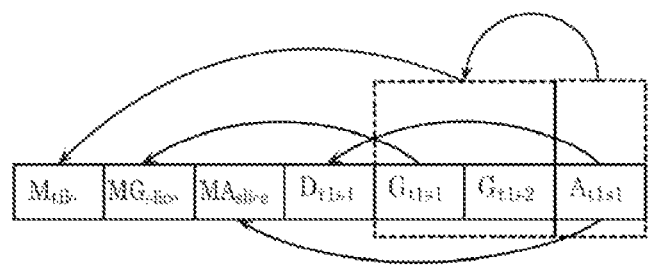
FIG. 75 is a diagram illustrating an example of decoding order of data according to Embodiment 7.

FIG. 75 is a diagram illustrating an example of decoding order of data. In the example shown in FIG. 75, data are decoded in order from the left. The three-dimensional data decoding device decodes, out of data having a dependency relationship with each other, data of a dependee first. For example, the three-dimensional data encoding device rearranges data in this order and transmits the data. It should be noted that any order may be used as long as data of a dependee takes precedence. Moreover, the three-dimensional data encoding device may transmit additional information and dependency relationship information before data.

The following describes procedures of a point cloud data division process and a point cloud data combination process. It should be noted that although examples of tile division and slice division will be described here, the same procedures can be applied to division of another space.

Figure 76:
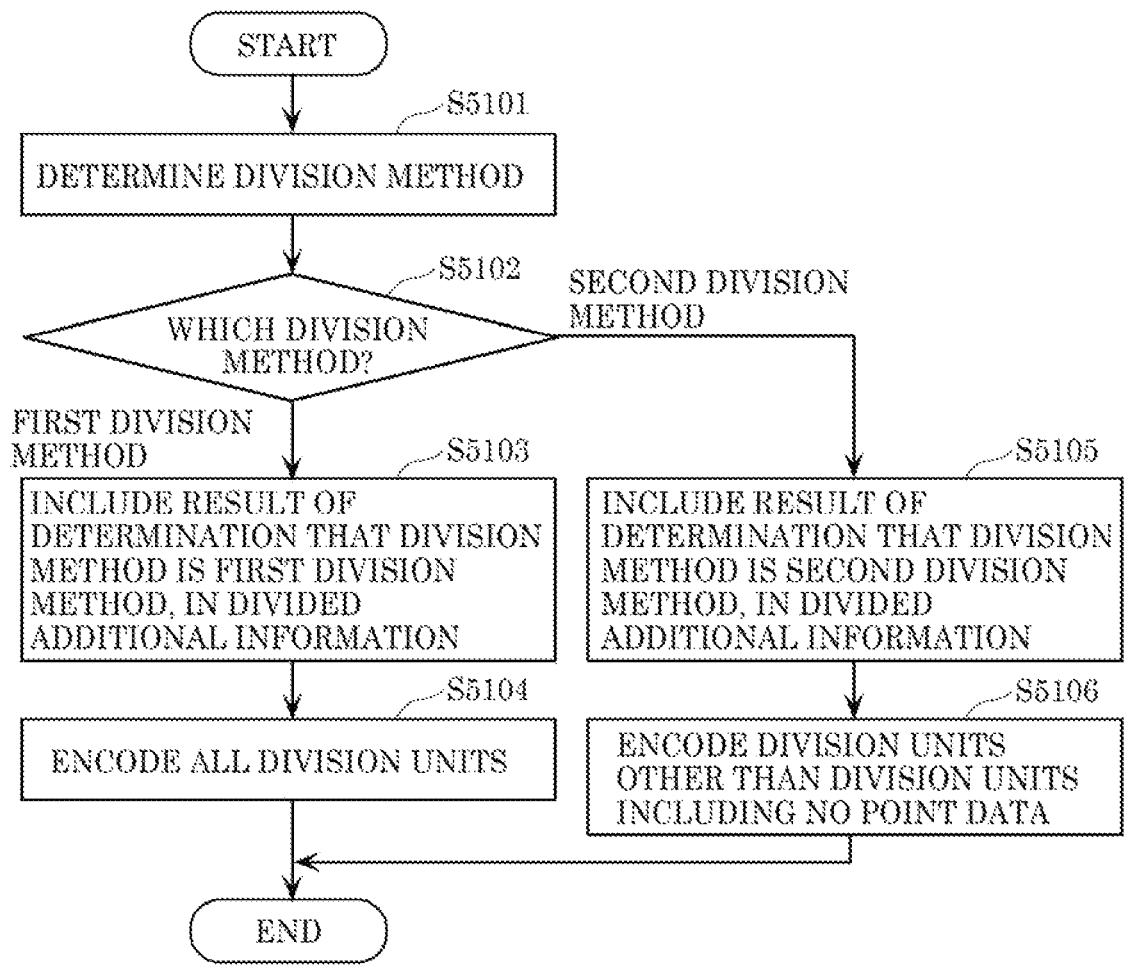
FIG. 76 is a flowchart of an encoding process according to Embodiment 7.

FIG. 76 is a flowchart of a three-dimensional data encoding process including a data division process performed by the three-dimensional data encoding device. First, the three-dimensional data encoding device determines a division method to be used (S5101). Specifically, the three-dimensional data encoding device determines whether to use a first division method or a second division method. For example, the three-dimensional data encoding device may determine a division method based on instructions from a user or an external device (e.g., the three-dimensional data decoding device), or determine a division method according to inputted point cloud data. In addition, a division method to be used may be predetermined.

Here, the first division method is a division method in which each of all division units (tiles or slices) always includes one or more point data. The second division method is a division method in which division units include one or more division units including no point data or a division method in which division units are likely to include one or more division units including no point data.

When the determined division method is the first division method (FIRST DIVISION METHOD in S5102), the three-dimensional data encoding device includes a result of the determination that the division method used is the first division method, in divided additional information (e.g., tile additional information or slice additional information) that is metadata regarding data division (S5103). Finally, the three-dimensional data encoding device encodes all division units (S5104).

On the other hand, when the determined division method is the second division method (SECOND DIVISION METHOD in S5102), the three-dimensional data encoding device includes a result of the determination that the division method used in the second division method, in divided additional information (S5105). Finally, the three-dimensional data encoding device encodes, among division units, division units other than division units (e.g., null tiles) including no point data (S5106).

Figure 77:
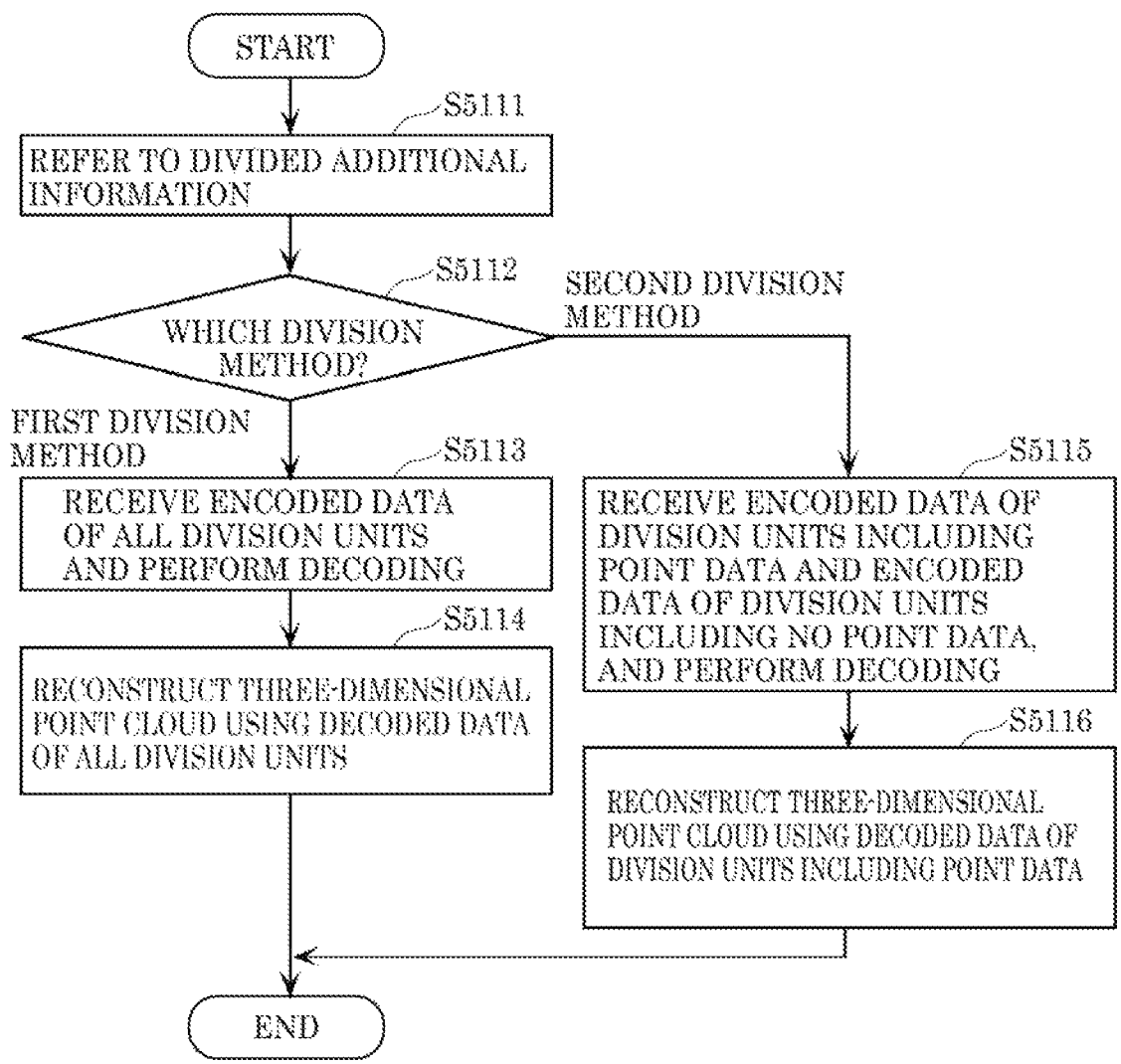
FIG. 77 is a flowchart of a decoding process according to Embodiment 7.

FIG. 77 is a flowchart of a three-dimensional data decoding process including a data combination process performed by the three-dimensional data decoding device. First, the three-dimensional data decoding device refers to divided additional information included in a bitstream and determines whether a division method used is the first division method or the second division method (S5111).

When the division method used is the first division method (FIRST DIVISION METHOD in S5112), the three-dimensional data decoding device receives encoded data of all division units and generates decoded data of all the division units by decoding the received encoded data (S5113). Finally, the three-dimensional data decoding device reconstructs a three-dimensional point cloud using the decoded data of all the division units (S5114). For example, the three-dimensional data decoding device reconstructs a three-dimensional point cloud by combining division units.

On the other hand, when the division method used is the second division method (SECOND DIVISION METHOD in S5112), the three-dimensional data decoding device receives encoded data of division units including point data and encoded data of division units including no point data, and generates decoded data by decoding the received encoded data of the division units (S5115). It should be noted that when division units including no point data are not transmitted, the three-dimensional data decoding device need not receive and decode the division units including no point data. Finally, the three-dimensional data decoding device reconstructs a three-dimensional point cloud using the decoded data of the division units including the point data (S5116). For example, the three-dimensional data decoding device reconstructs a three-dimensional point cloud by combining division units.

The following describes other point cloud data division methods. When a space is divided equally as shown in (c) in FIG. 65, a divided space may include no points. In this case, the three-dimensional data encoding device combines the space including no points with another space including points. As a result, the three-dimensional data encoding device can form division units so that each of the division units includes one or more points.

Figure 78:
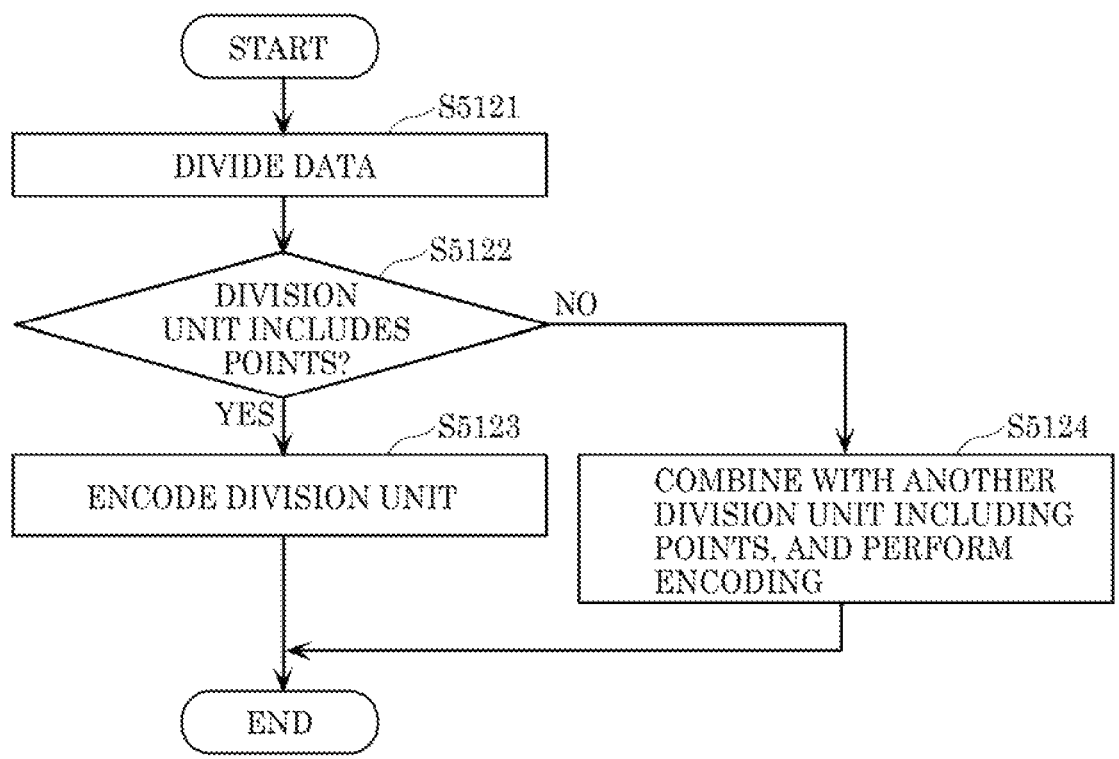
FIG. 78 is a flowchart of an encoding process according to Embodiment 7.

FIG. 78 is a flowchart for data division in the above case. First, the three-dimensional data encoding device divides data using a specific method (S5121). For example, the specific method is the above second division method.

Next, the three-dimensional data encoding device determines whether a current division unit that is a division unit to be processed includes points (S5122). When the current division unit includes points (YES in S5122), the three-dimensional data encoding device encodes the current division unit (S5123). On the other hand, when the current division unit includes no points (NO in S5122), the three-dimensional data encoding device combines the current division unit with another division unit including points, and encodes the combined division unit (S5124). To put it another way, the three-dimensional data encoding device encodes the current division unit together with the other division unit including the points.

It should be noted that although the example of performing determination and combination for each division unit has been described above, a processing method is not limited to this. For example, the three-dimensional data encoding device may determine whether each of division units includes points, perform combination so that any division unit including no points will disappear, and encode each of the combined division units.

Figure 79:
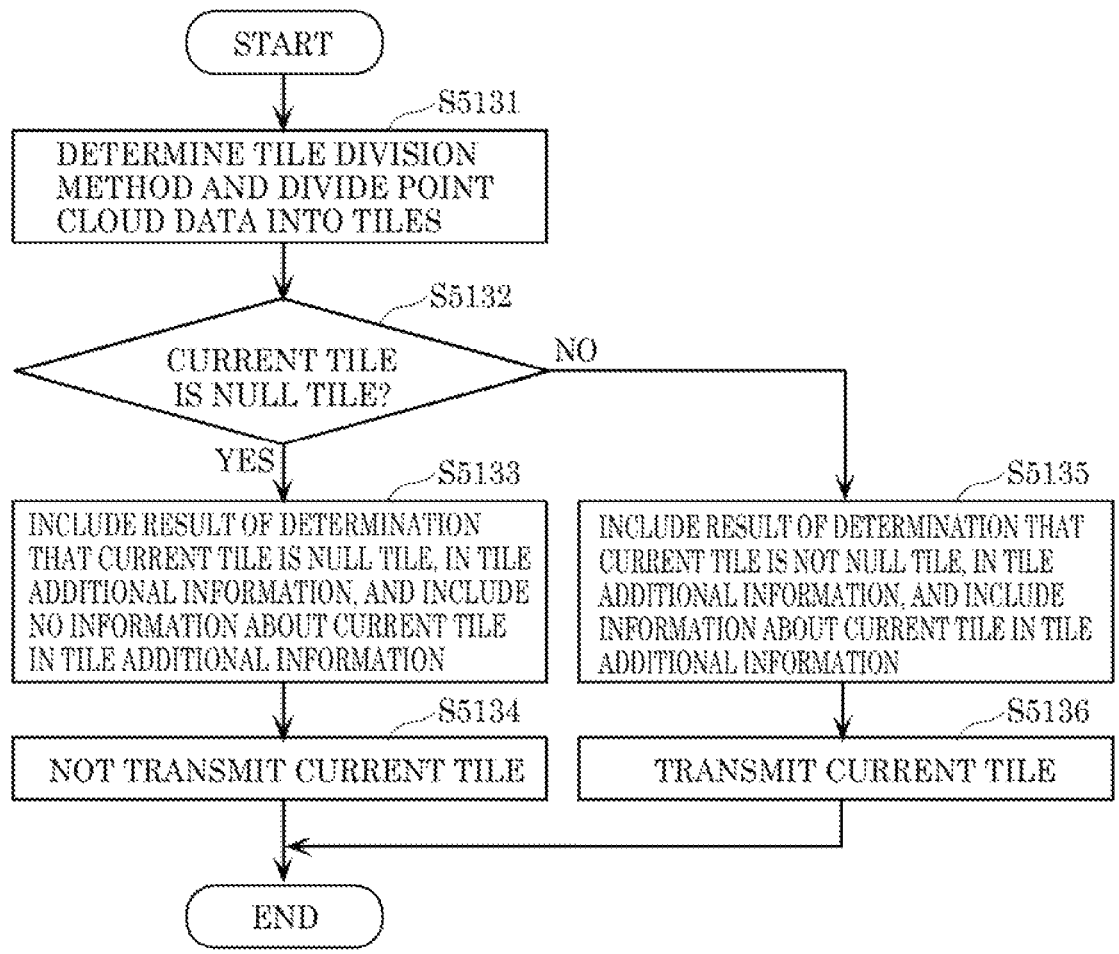
FIG. 79 is a flowchart of an encoding process according to Embodiment 7.

The following describes a method of transmitting data including a null tile. When a current tile that is a tile to be processed is a null tile, the three-dimensional data encoding device does not transmit data of the current tile. FIG. 79 is a flowchart of a data transmission process.

First, the three-dimensional data encoding device determines a tile division method and divides point cloud data into tiles using the determined division method (S5131).

Next, the three-dimensional data encoding device determines whether the current tile is a null tile (S5132). In other words, the three-dimensional data encoding device determines whether no data is included in the current tile.

When the current tile is the null tile (YES in S5132), the three-dimensional data encoding device includes a result of the determination that the current tile is the null tile, in tile additional information, and does not include information (tile position, size, etc.) about the current tile in the tile additional information (S5133). In addition, the three-dimensional data encoding device does not transmit the current tile (S5134).

On the other hand, when the current tile is not the null tile (NO in S5132), the three-dimensional data encoding device includes a result of the determination that the current tile is not the null tile, in tile additional information, and includes information about each tile in the tile additional information (S5135). In addition, the three-dimensional data encoding device transmits the current tile (S5136).

As stated above, it is possible to reduce the amount of tile additional information by omitting information about a null tile from the tile additional information.

The following describes a method of decoding encoded data including a null tile. First, a process when there is no packet loss will be described.

Figure 80:
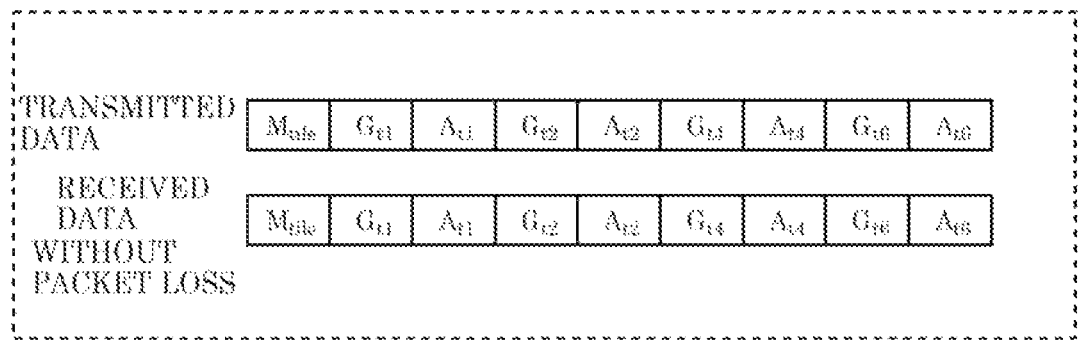
FIG. 80 is a diagram illustrating an example of transmitted data and an example of received data according to Embodiment 7.

FIG. 80 is a diagram illustrating an example of transmitted data that is encoded data transmitted by the three-dimensional data encoding device, and an example of received data inputted to the three-dimensional data decoding device. It should be noted that a system environment without packet loss is assumed here, and received data is identical to transmitted data.

Figure 81:
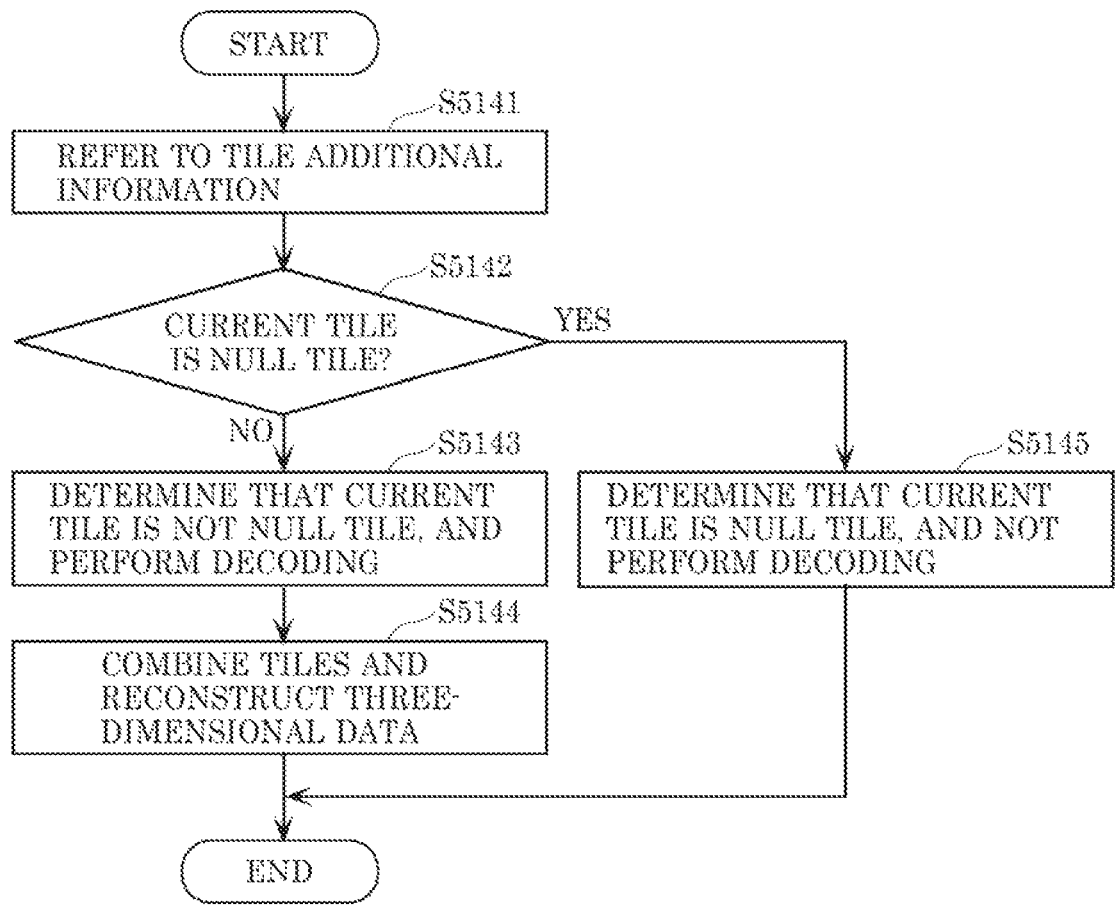
FIG. 81 is a flowchart of a decoding process according to Embodiment 7.

When a system environment is free from packet loss, the three-dimensional data decoding device receives all transmitted data. FIG. 81 is a flowchart of a process performed by the three-dimensional data decoding device.

First, the three-dimensional data decoding device refers to tile additional information (S5141) and determines whether each of tiles is a null tile (S5142).

When the tile additional information indicates that a current tile is not a null tile (NO in S5142), the three-dimensional data decoding device determines that the current tile is not the null tile and decodes the current tile (S5143). Finally, the three-dimensional data decoding device obtains information (position information (e.g., origin coordinates), size, etc. of the tiles) about the tiles from the tile additional information, and reconstructs three-dimensional data by combining the tiles using the obtained information (S5144).

On the other hand, when the tile additional information indicates that a current tile is a null tile (YES in S5142), the three-dimensional data decoding device determines that the current tile is the null tile and does not decode the current tile (S5145).

It should be noted that the three-dimensional data decoding device may determine that missing data is a null tile, by sequentially analyzing index information indicated by the header of encoded data. In addition, the three-dimensional data decoding device may combine a determination method using tile additional information and a determination method using index information.

Figure 82:
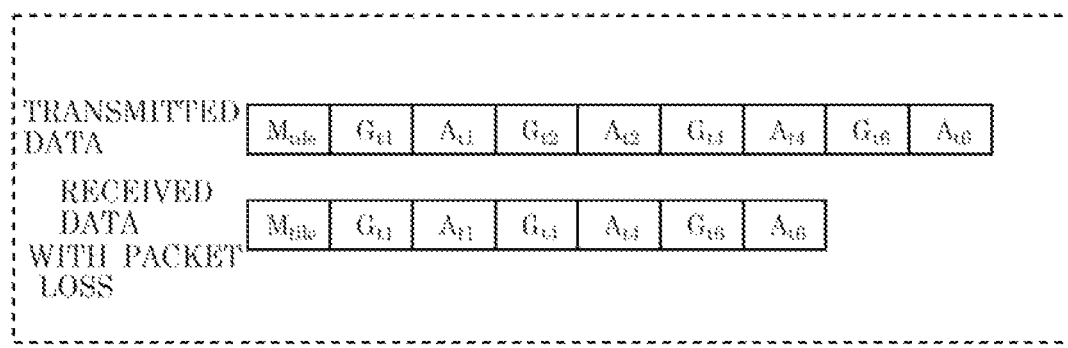
FIG. 82 is a diagram illustrating an example of transmitted data and an example of received data according to Embodiment 7.

The following describes a process when there is packet loss. FIG. 82 is a diagram illustrating an example of transmitted data from the three-dimensional data encoding device, and an example of received data inputted to the three-dimensional data decoding device. Here, a system environment with packet loss is assumed.

When packet loss occurs in a system environment, there is a possibility that the three-dimensional data decoding device cannot receive all transmitted data. In this example, packets of $G_{t2}$ and $A_{t2}$ are lost.

Figure 83:
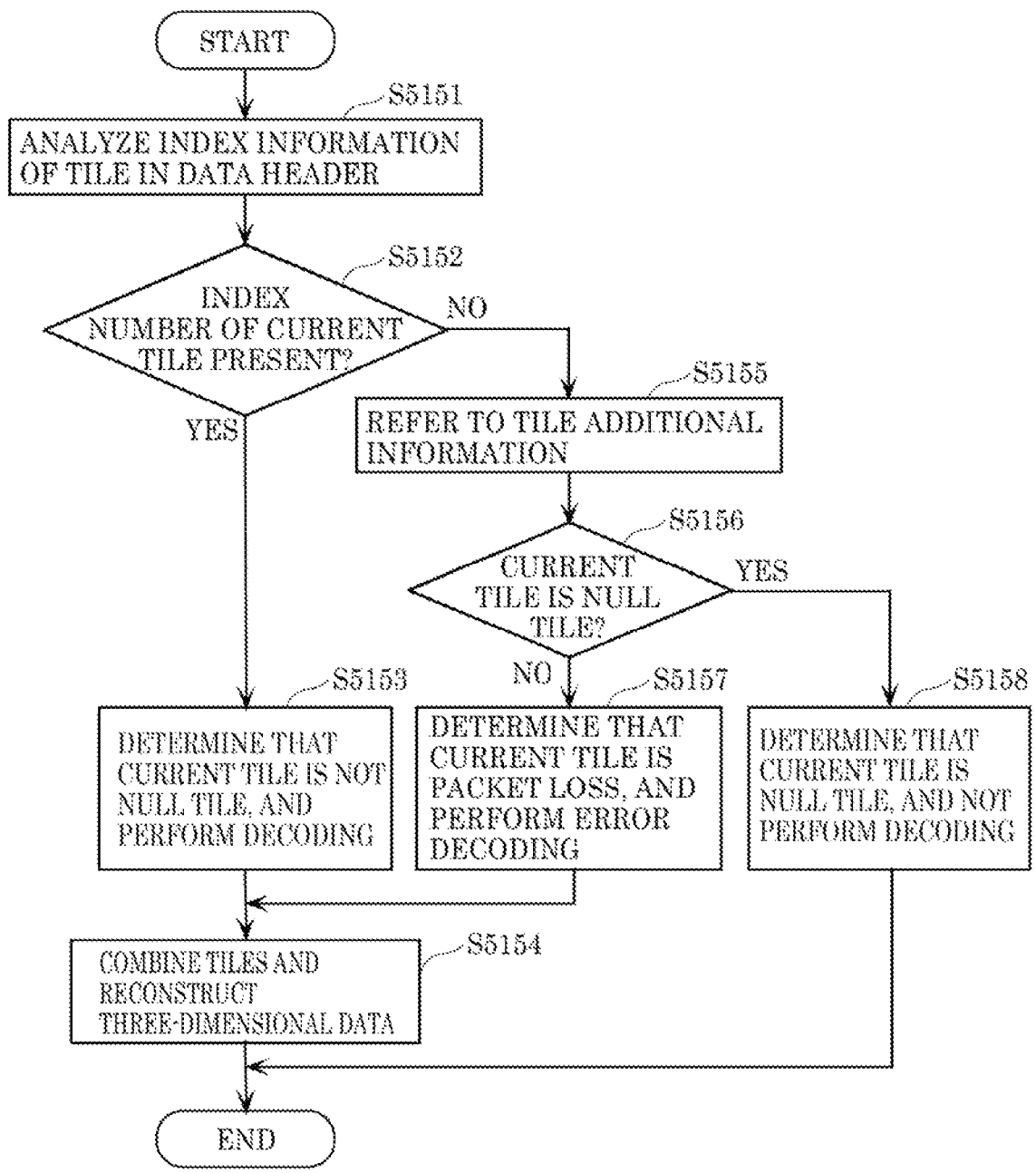
FIG. 83 is a flowchart of a decoding process according to Embodiment 7.

FIG. 83 is a flowchart of a process performed by the three-dimensional data decoding device in the above case. First, the three-dimensional data decoding device analyzes the continuity of index information indicated by the header of encoded data (S5151) and determines whether an index number of a current tile is present (S5152).

When the index number of the current tile is present (YES in S5152), the three-dimensional data decoding device determines that the current tile is not a null tile and decodes the current tile (S5153). Finally, the three-dimensional data decoding device obtains information (position information (e.g., origin coordinates), size, etc. of tiles) about tiles from tile additional information, and reconstructs three-dimensional data by combining the tiles using the obtained information (S5154).

On the other hand, when the index number of the current tile is not present (NO in S5152), the three-dimensional data decoding device refers to tile additional information (S5155) and determines whether the current tile is a null tile (S5156).

When the current tile is not the null tile (NO in S5156), the three-dimensional data decoding device determines that the current tile is lost (packet loss) and performs error decoding (S5157). Error decoding is, for example, a process of trying to decode original data assuming that the data existed. In this case, the three-dimensional data decoding device may regenerate three-dimensional data and reconstruct three-dimensional data (S5154).

In contrast, when the current tile is the null tile (YES in S5156), the three-dimensional data decoding device determines that the current tile is the null tile, and performs neither decoding nor the reconstruction of three-dimensional data (S5158).

The following describes an encoding method when no null tiles are clearly shown. The three-dimensional data encoding device may generate encoded data and additional information using the following method.

The three-dimensional data encoding device does not include information about a null tile in tile additional information. The three-dimensional data encoding device appends index numbers of tiles other than the null tile to a data header. The three-dimensional data encoding device does not transmit the null tile.

In this case, a tile division number (number_of_tiles) indicates a division number excluding a null tile. It should be noted that the three-dimensional data encoding device may separately store information indicating the number of null tiles in a bitstream. In addition, the three-dimensional data encoding device may include information about a null tile in additional information or include part of information about a null tile in the additional information.

Figure 84:
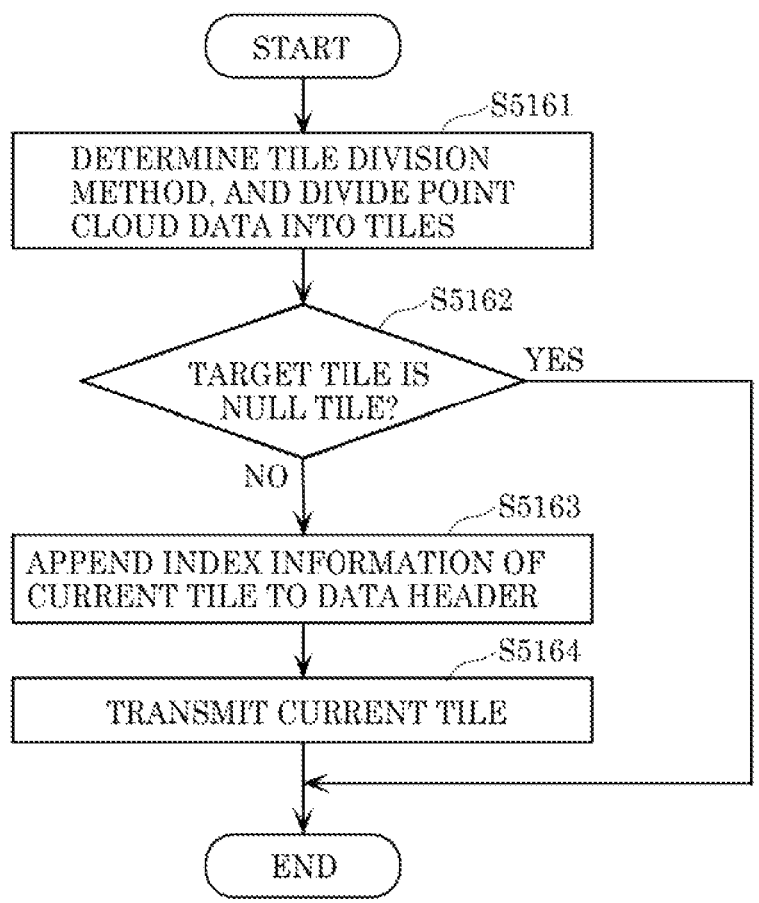
FIG. 84 is a flowchart of an encoding process according to Embodiment 7.

FIG. 84 is a flowchart of a three-dimensional data encoding process performed by the three-dimensional data decoding device in the above case. First, the three-dimensional data encoding device determines a tile division method and divides point cloud data into tiles using the determined division method (S5161).

Next, the three-dimensional data encoding device determines whether a current tile is a null tile (S5162). In other words, the three-dimensional data encoding device determines whether no data is included in the current tile.

When the current tile is not the null tile (NO in S5162), the three-dimensional data encoding device appends index information of the current tile other than a null tile to a data header (S5163). Finally, the three-dimensional data encoding device transmits the current tile (S5164).

On the other hand, when the current tile is the null tile (YES in S5162), the three-dimensional data encoding device neither appends index information of the current tile to a data header nor transmits the current tile.

Figure 85:
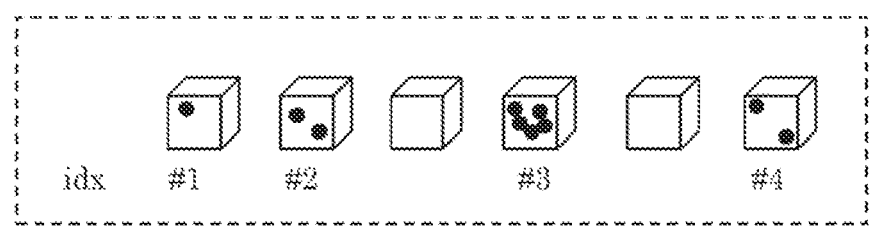
FIG. 85 is a diagram illustrating an example of index information according to Embodiment 7.

FIG. 85 is a diagram illustrating an example of index information (idx) to be appended to a data header. As shown in FIG. 85, index information of any null tile is not appended, and serial numbers are put on tiles other than null tiles.

Figure 86:
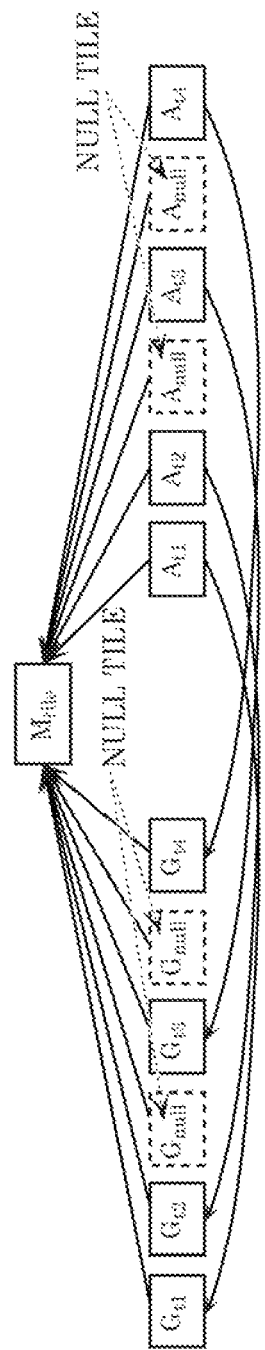
FIG. 86 is a diagram illustrating an example of dependency relationships according to Embodiment 7.

FIG. 86 is a diagram illustrating an example of a dependency relationship of each data. The pointed end of an arrow in the figure indicates a dependee, and the other end of the arrow indicates a depender. Moreover, in the figure, $G_{tn}$ denotes geometry information for tile number n, and $A_{tn}$ denotes attribute information for tile number n, n being an integer from 1 to 4. $M_{tile}$ denotes tile additional information.

Figure 87:
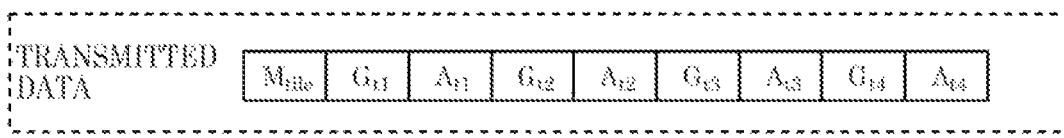
FIG. 87 is a diagram illustrating an example of transmitted data according to Embodiment 7.

FIG. 87 is a diagram illustrating a structural example of transmitted data that is encoded data transmitted by the three-dimensional data encoding device.

Figure 88:
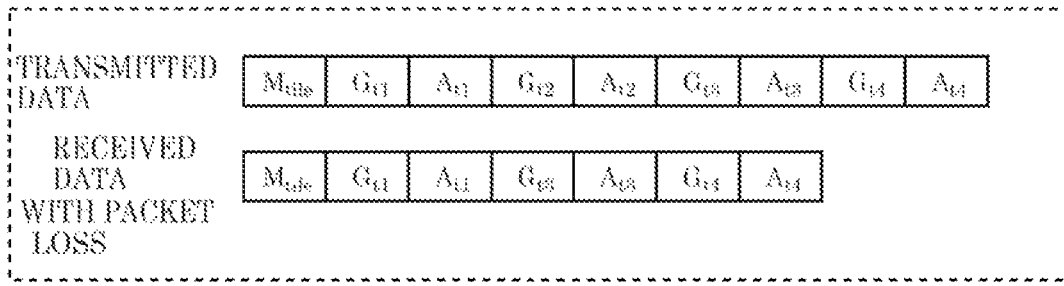
FIG. 88 is a diagram illustrating an example of transmitted data and an example of received data according to Embodiment 7.

The following describes a decoding method when no null tiles are clearly shown. FIG. 88 is a diagram illustrating an example of transmitted data from the three-dimensional data encoding device, and an example of received data inputted to the three-dimensional data decoding device. Here, a system environment with packet loss is assumed.

Figure 89:
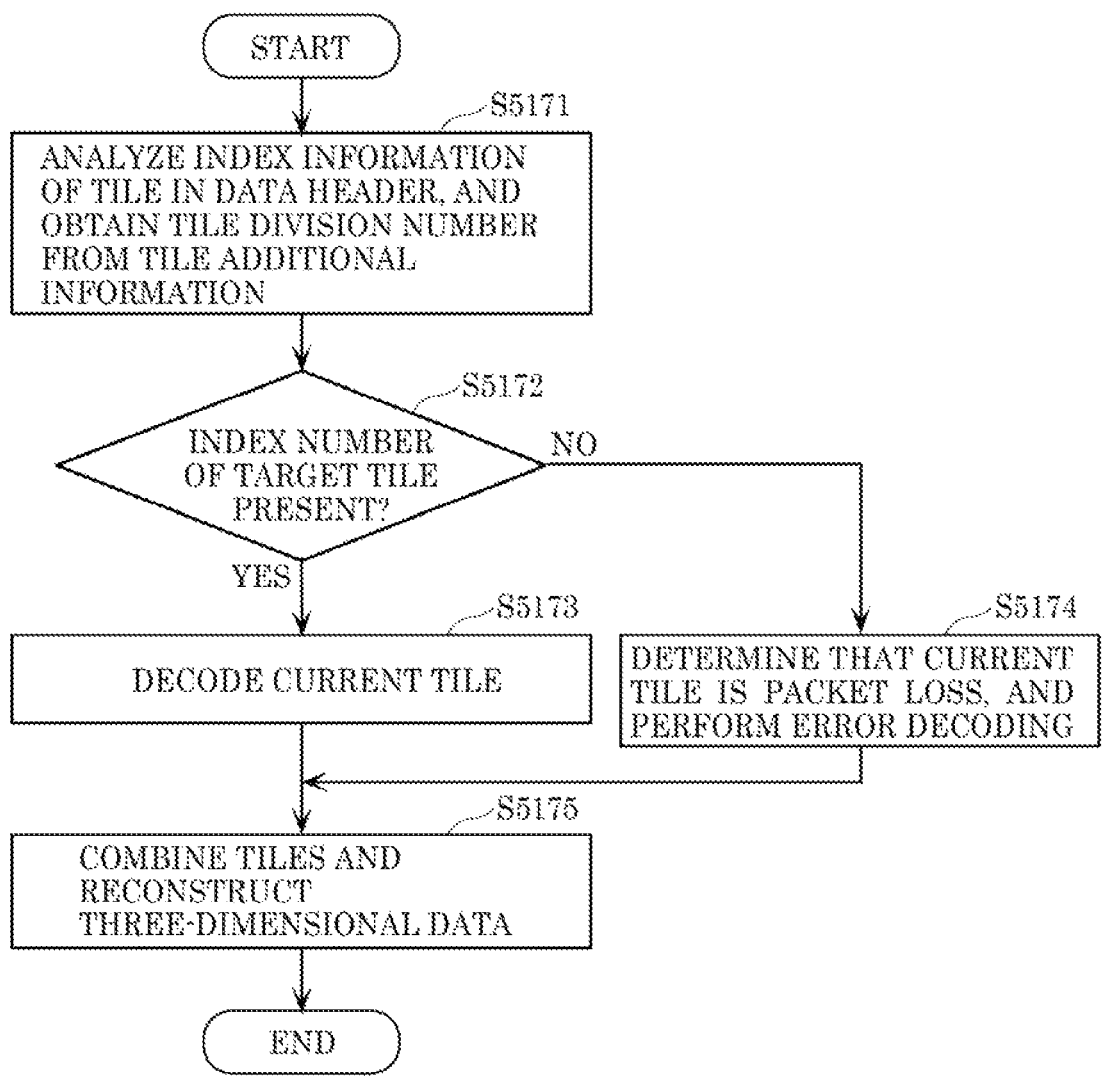
FIG. 89 is a flowchart of a decoding process according to Embodiment 7.

FIG. 89 is a flowchart of a process performed by the three-dimensional data decoding device in the above case. First, the three-dimensional data decoding device analyzes index information of tiles indicated by the header of encoded data, and determines whether an index number of a current tile is present. In addition, the three-dimensional data decoding device obtains a tile division number from tile additional information (S5171).

When the index number of the current tile is present (YES in S5172), the three-dimensional data decoding device decodes the current tile (S5173). Finally, the three-dimensional data decoding device obtains information (position information (e.g., origin coordinates), size, etc. of the tiles) about the tiles from the tile additional information, and reconstructs three-dimensional data by combining the tiles using the obtained information (S5175).

In contrast, when the index number of the current tile is not present (NO in S5172), the three-dimensional data decoding device determines that the current tile is lost and performs error decoding (S5174). In addition, the three-dimensional data decoding device determines that any space including no data is a null tile, and reconstructs three-dimensional data.

By clearly showing null tiles, the three-dimensional data encoding device can appropriately determine the absence of points in tiles, not data unavailability due to, for example, mismeasurement or data processing, or packet loss.

It should be noted that the three-dimensional data encoding device may use both a method of clearly showing null packets and a method of clearly showing no null packets. In this case, the three-dimensional data encoding device may include information indicating whether null packets are clearly shown, in tile additional information. Moreover, whether null packets are to be clearly shown may be determined in advance according to a type of a division method, and the three-dimensional data encoding device may indicate whether the null packets are to be clearly shown, by showing the type of the division method.

Although an example in which information regarding all tiles is included in tile additional information has been described in FIG. 67 etc., information regarding some of tiles or information regarding null tiles of some of tiles may be included in tile additional information.

Moreover, although an example in which information regarding divided data such as information indicating whether divided data (tiles) are present is stored in tile additional information has been described, part or all of these pieces of information may be stored in a parameter set or may be stored as data. When these pieces of information are stored as data, for example, nal_unit_type denoting information indicating whether divided data are present may be defined, and the pieces of information may be stored in a NAL unit. Additionally, the pieces of information may be stored in both additional information and data.

Figure 90:
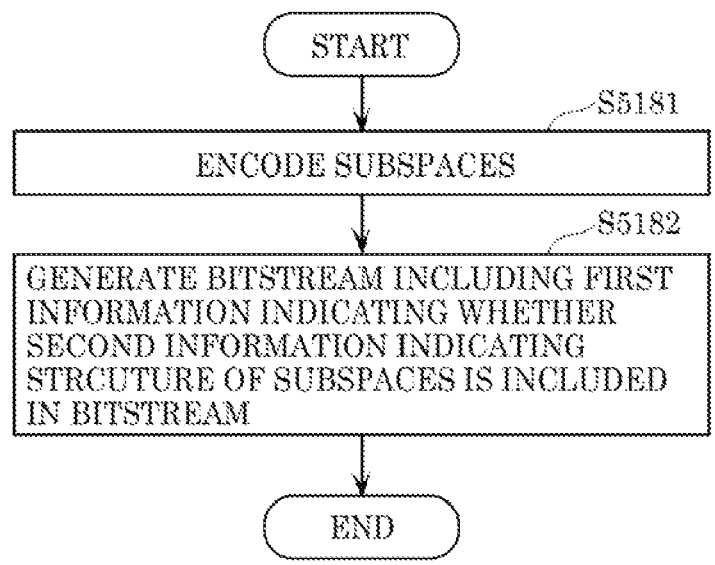
FIG. 90 is a flowchart of an encoding process according to Embodiment 7.

As stated above, the three-dimensional data encoding device according to the present embodiment performs the process shown in FIG. 90. First, the three-dimensional data encoding device generates pieces of encoded data by encoding subspaces (e.g., tiles or slices) obtained by dividing a current space including three-dimensional points (S5181). The three-dimensional data encoding device generates a bitstream including the pieces of encoded data and pieces of first information (e.g., tile_null_flag) each of which corresponds to a corresponding one of the subspaces (S5182). Each of the pieces of first information indicates whether the bitstream includes second information indicating a structure of the corresponding one of the subspaces.

Accordingly, for example, since the second information can be omitted for a subspace including no points, it is possible to reduce the data volume of a bitstream.

For example, the second information includes information indicating origin coordinates of the corresponding one of the subspaces. For example, the second information includes information indicating at least one of a height, a width, or a depth of the corresponding one of the subspaces.

Accordingly, the three-dimensional data encoding device can reduce the data volume of a bitstream.

Moreover, as shown in FIG. 78, the three-dimensional data encoding device may divide a current space including three-dimensional points into subspaces (e.g., tiles or slices), combine the subspaces according to the number of three-dimensional points included in each of the subspaces, and encode the combined subspaces. For example, the three-dimensional data encoding device may combine subspaces so that the number of three-dimensional points included in each of the combined subspaces is greater than or equal to a predetermined number. For example, the three-dimensional data encoding device may combine subspaces including no three-dimensional points with subspaces including three-dimensional points.

Accordingly, since the three-dimensional data encoding device can suppress the generation of subspaces including fewer points or no points, the three-dimensional data encoding device can improve the coding efficiency.

For example, the three-dimensional data encoding device includes a processor and memory, and the memory performs the above process using the memory.

Figure 91:
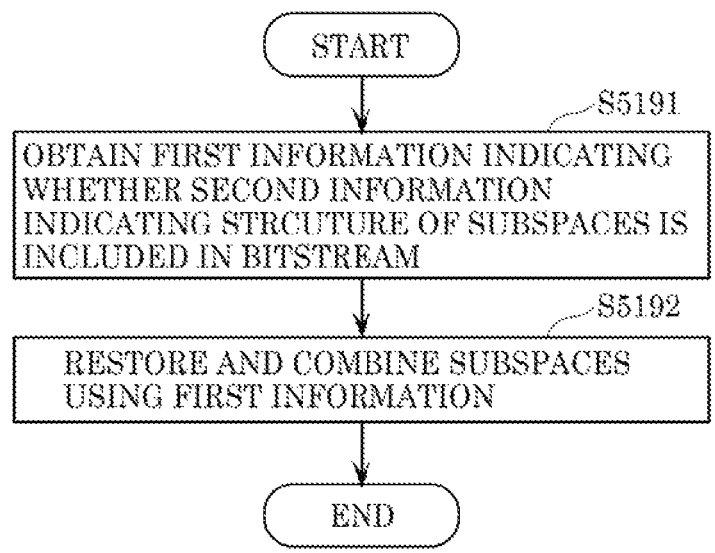
FIG. 91 is a flowchart of a decoding process according to Embodiment 7.

The three-dimensional data decoding device according to the present embodiment performs the process shown in FIG. 91. First, the three-dimensional data decoding device obtains from a bitstream pieces of first information (e.g., tile_null_flag) each of which (i) corresponds to a corresponding one of subspaces (e.g., tiles or slices) obtained by dividing a current space including three-dimensional points and (ii) indicates whether the bitstream includes second information indicating a structure of the corresponding one of the subspaces (S5191). The three-dimensional data decoding device restores the subspaces by decoding pieces of encoded data included in the bitstream and generated by encoding the subspaces, and restores the current space by combining the subspaces, using the pieces of first information (S5192). For example, the three-dimensional data decoding device determines whether a bitstream includes second information, using first information; and combines decoded subspaces using the second information when the bitstream includes the second information.

Accordingly, for example, since the second information can be omitted for a subspace including no points, it is possible to reduce the data volume of a bitstream.

For example, the second information includes information indicating origin coordinates of the corresponding one of the subspaces. For example, the second information includes information indicating at least one of a height, a width, or a depth of the corresponding one of the subspaces.

Accordingly, the three-dimensional data decoding device can reduce the data volume of a bitstream.

Moreover, the three-dimensional data decoding device may divide a current space including three-dimensional points into subspaces (e.g., tiles or slices), combine the subspaces according to the number of three-dimensional points included in each of the subspaces, receive encoded data generated by encoding the combined subspaces, and decode the received encoded data. For example, encoded data may be generated by combining subspaces so that the number of three-dimensional points included in each of the combined subspaces is greater than or equal to a predetermined number. For example, three-dimensional data may be generated by combining subspaces including no three-dimensional points with subspaces including three-dimensional points.

Accordingly, the three-dimensional data decoding device can decode encoded data for which the coding efficiency is improved, by suppressing the generation of subspaces including fewer points or no points.

For example, the three-dimensional data decoding device includes a processor and memory, and the memory performs the above process using the memory.

Embodiment 8

Figure 92:
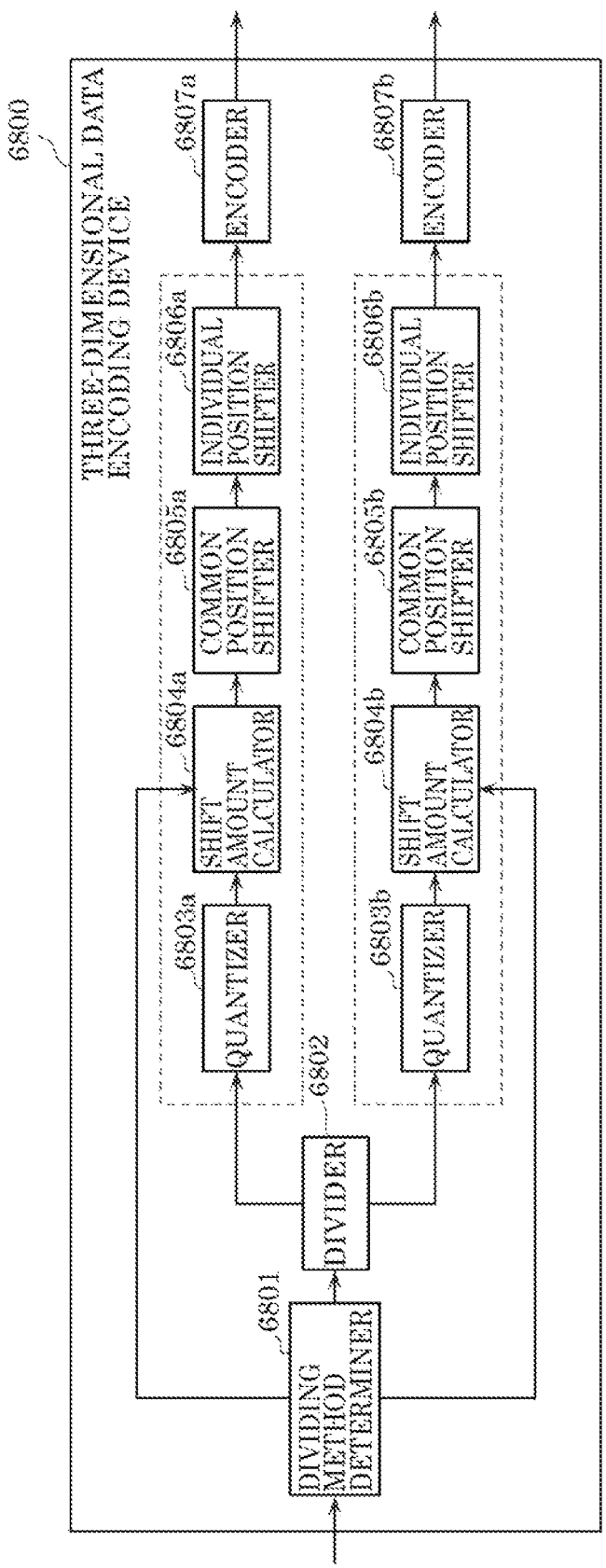
FIG. 92 is a block diagram illustrating an exemplary configuration of a three-dimensional data encoding device according to Embodiment 8.
Figure 93:
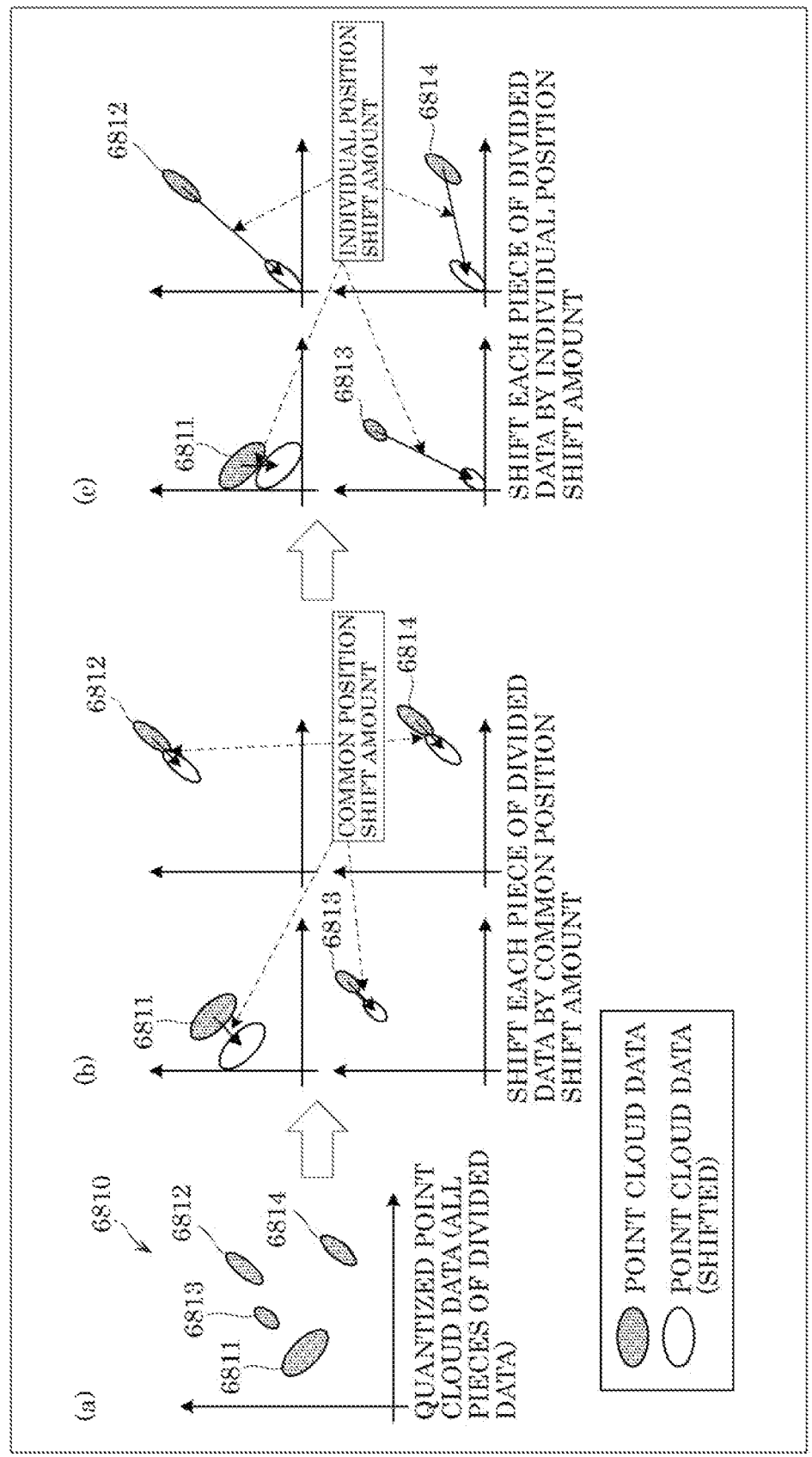
FIG. 93 is a diagram for describing an overview of an encoding method performed by the three-dimensional data encoding device according to Embodiment 8.

FIG. 92 is a block diagram illustrating an exemplary configuration of a three-dimensional data encoding device according to this embodiment. FIG. 93 is a diagram for describing an overview of an encoding method performed by the three-dimensional data encoding device according to this embodiment.

Three-dimensional data encoding device 6800 divides point cloud data into pieces of divided data such as tiles or slices, and encodes each piece of divided data. The divided data is also referred to as sub point cloud data. The point cloud data indicates three-dimensional positions in a three-dimensional space. The pieces of divided data are pieces of sub point cloud data created from the point cloud data by dividing the three-dimensional space containing the point cloud data into subspaces. The number of subspaces, i.e., the number of pieces of divided data may be one, which means no division, or two or more.

FIG. 92 will be described for an example in which three-dimensional data encoding device 6800 divides the point cloud data into two pieces. FIG. 93 shows an example in which the point cloud data is divided into four pieces. Although the description of FIG. 93 assumes that a two-dimensional space is divided for example, a one-dimensional or three-dimensional space may be divided.

Three-dimensional data encoding device 6800 includes dividing method determiner 6801, divider 6802, quantizers 6803a and 6803b, shift amount calculators 6804a and 6804b, common position shifters 6805a and 6805b, individual position shifters 6806a and 6806b, and encoders 6807a and 6807b.

Dividing method determiner 6801 determines a dividing method for dividing the point cloud data. Dividing method determiner 6801 outputs dividing method information indicating the dividing method to divider 6802 and shift amount calculators 6804a and 6804b. Detailed examples of the dividing method will be described below. Three-dimensional data encoding device 6800 need not include dividing method determiner 6801. If dividing method determiner 6801 is not included, three-dimensional data encoding device 6800 may use a predetermined dividing method to divide the point cloud data into pieces of divided data.

Divider 6802 divides the point cloud data into pieces of divided data according to the dividing method determined by dividing method determiner 6801. The pieces of divided data created by divider 6802 are individually processed. For this purpose, three-dimensional data encoding device 6800 includes processors that process the respective pieces of divided data. Specifically, for processing a first piece of divided data, three-dimensional data encoding device 6800 includes quantizer 6803a, shift amount calculator 6804a, common position shifter 6805a, individual position shifter 6806a, and encoder 6807a. For processing a second piece of divided data, three-dimensional data encoding device 6800 includes quantizer 6803b, shift amount calculator 6804b, common position shifter 6805b, individual position shifter 6806b, and encoder 6807b. This enables three-dimensional data encoding device 6800 to process the pieces of divided data in parallel. Although FIG. 92 shows the exemplary processors for processing two pieces of divided data in parallel, three-dimensional data encoding device 6800 may include processors for processing three or more pieces of divided data in parallel. Further, the three-dimensional data encoding device may be configured to process each piece of divided data in a single processor.

Each of quantizers 6803a and 6803b scales (divides geometry information by a certain value) and quantizes the corresponding piece of divided data. If multiple points are duplicated, each of quantizers 6803a and 6803b may delete at least one of the duplicated points or may leave at least one point unprocessed.

Each of shift amount calculators 6804a and 6804b calculates at least one of a common position shift amount and an individual position shift amount for shifting, i.e., moving, the position of the corresponding piece of divided data according to the dividing method determined by dividing method determiner 6801. Shift amount calculators 6804a and 6804b may calculate only the common position shift amount, only the individual position shift amount, or both of the common position shift amount and the individual position shift amount, according to the dividing method.

The common position shift amount is the shift amount (the amount of movement) by which the positions of the pieces of divided data are uniformly shifted. That is, the common position shift amount is the same for the pieces of divided data. The common position shift amount includes the direction and distance of the shift of the positions of the pieces of divided data. The common position shift amount is an example of the first shift amount.

The individual position shift amount is the shift amount (the amount of movement) by which the position of each piece of divided data is individually shifted. The individual position shift amount is determined in a one-to-one correspondence with each piece of divided data and is often different for each piece of divided data. The individual position shift amount includes the direction and distance of the shift of the position of the corresponding piece of divided data. The individual position shift amount is an example of the second shift amount.

Each of common position shifters 6805a and 6805b shifts the position of the corresponding piece of divided data by the common position shift amount calculated by the corresponding one of shift amount calculators 6804a and 6804b. Thus, pieces of divided data 6811 to 6814 shown in (a) in FIG. 93 created by dividing point cloud data 6810 are shifted in a direction and over a distance as indicated by the common position shift amount, as shown in (b) in FIG. 93.

Each of individual position shifters 6806a and 6806b shifts the position of the corresponding piece of divided data by the individual position shift amount calculated by the corresponding one of shift amount calculators 6804a and 6804b. Thus, pieces of divided data 6811 to 6814 shown in (c) in FIG. 93 are shifted in a direction and over a distance as indicated by their respective individual shift amounts.

Each of encoders 6807a and 6807b encodes the corresponding one of the pieces of divided data shifted by individual position shifters 6806a and 6806b.

The order of processing by divider 6802, quantizers 6803a and 6803b, shift amount calculators 6804a and 6804b, common position shifters 6805a and 6805b, and individual position shifters 6806a and 6806b may be changed. For example, shift amount calculators 6804a and 6804b and common position shifters 6805a and 6805b may perform processing before processing by divider 6802. In this case, shift amount calculators 6804a and 6804b may be merged into one processor, and common position shifters 6805a and 6805b may be merged into one processor. Also in this case, shift amount calculators 6804a and 6804b may calculate at least the common position shift amount out of the common position shift amount and the individual position shift amount before processing by common position shifters 6805a and 6805b. The individual position shift amount may be calculated before processing by individual position shifters 6806a and 6806b. That is, processors responsible for calculating the common position shift amount may calculate the common position shift amount before processing by the common position shifters separately from processors responsible for calculating the individual position shift amounts. Further, any two or more of the above processors may be merged together.

Figure 94:
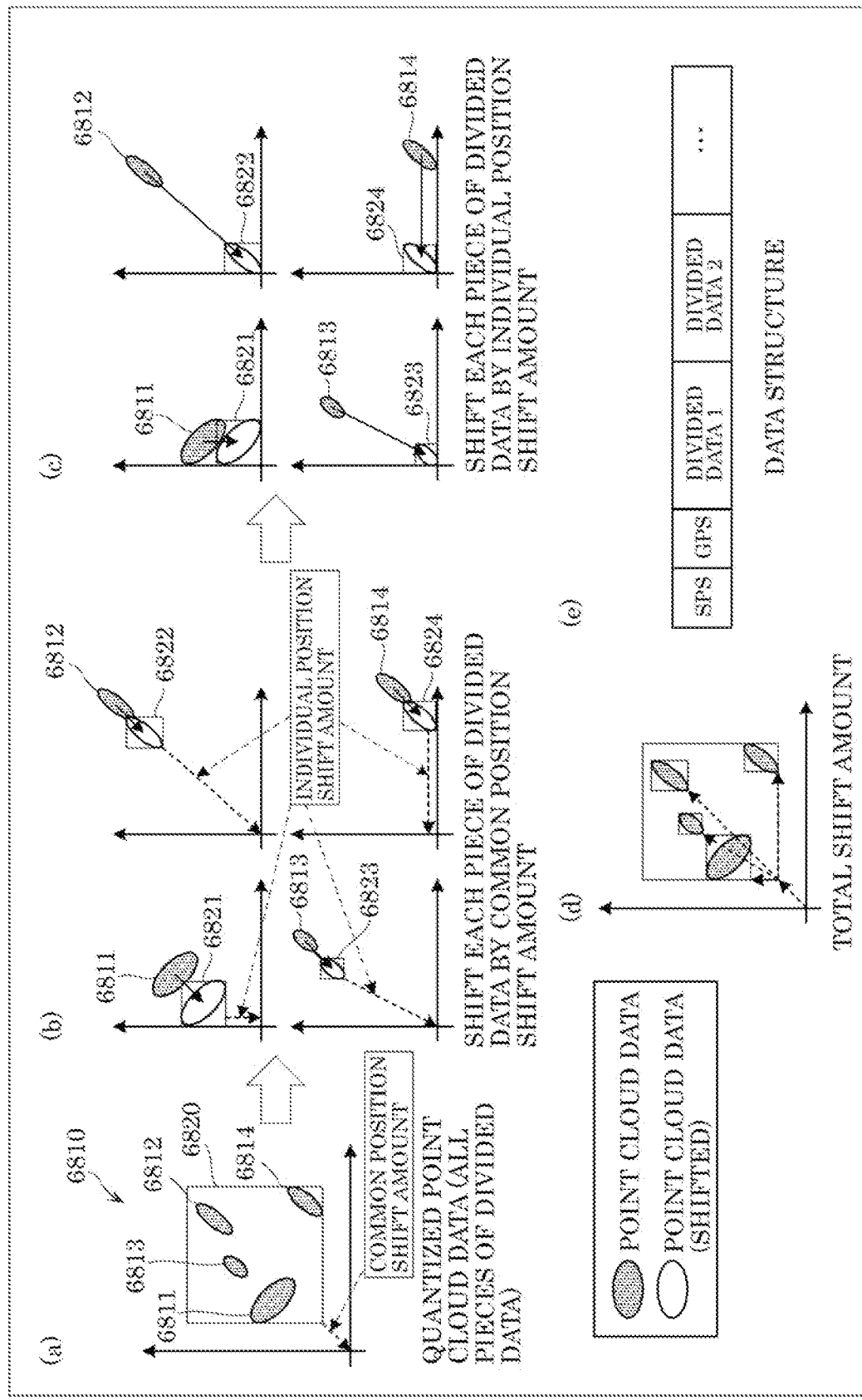
FIG. 94 is a diagram for describing a first example of position shift according to Embodiment 8.

Now, an example of calculating the common position shift amount and the individual position shift amounts will be described with reference to FIG. 94. FIG. 94 is a diagram for describing a first example of the position shift. In the first example, point cloud data 6810 is shifted by the common position shift amount, and then pieces of divided data 6811 to 6814 are shifted by their respective individual position shift amounts.

As shown in (a) in FIG. 94, the three-dimensional data encoding device generates bounding box 6820 of a size accommodating all pieces of divided data 6811 to 6814 of point cloud data 6810, and calculates the minimum value point of bounding box 6820 generated. The three-dimensional data encoding device then calculates, as the common position shift amount, the direction and distance of a vector represented as the difference between the minimum value point calculated and the origin. Because the origin is 0, the difference is indicated by the coordinates of the minimum value point. The origin may also be a predetermined nonzero reference point. Bounding box 6820 may be a rectangular region of the minimum size surrounding all pieces of divided data 6811 to 6814. The minimum value point of bounding box 6820 is the point closest to the origin in the region of bounding box 6820. Bounding box 6820 is also referred to as a common bounding box. A bounding box is also referred to as a coding bounding box.

As shown in (b) in FIG. 94, the three-dimensional data encoding device shifts pieces of divided data 6811 to 6814 by the common position shift amount calculated. Alternatively, the three-dimensional data encoding device may shift undivided point cloud data 6810 by the common position shift amount.

Then, as shown in (b) in FIG. 94, the three-dimensional data encoding device generates, for pieces of divided data 6811 to 6814 uniformly shifted, respective bounding boxes 6821 to 6824 each having a size accommodating the corresponding one of pieces of divided data 6811 to 6814, and calculates the minimum value point of each of bounding boxes 6821 to 6824 generated. For each of pieces of divided data 6811 to 6814, the three-dimensional data encoding device calculates, as the individual position shift amount of the piece of divided data, the distance between the minimum value point of the corresponding bounding box and the origin. Bounding boxes 6821 to 6824 may each be a rectangular region of the minimum size surrounding the corresponding one of pieces of divided data 6811 to 6814. The minimum value point of each of bounding boxes 6821 to 6824 is the point closest to the origin in the region of each of bounding boxes 6821 to 6824. Bounding boxes 6821 to 6824 are also referred to as individual bounding boxes.

As shown in (c) in FIG. 94, the three-dimensional data encoding device shifts pieces of divided data 6811 to 6814 by their respective individual position shift amounts calculated.

The three-dimensional data encoding device uses bounding boxes 6821 to 6824 to encode respective pieces of divided data 6811 to 6814 shifted by the individual position shift amounts, thereby generating a bitstream. At this point, the three-dimensional data encoding device stores, in metadata in the bitstream, second bounding box information indicating the position of the minimum value point of and the size of each of bounding boxes 6821 to 6824. Hereafter, bounding boxes will also be referred to as coding bounding boxes (coding BBs).

The common position shift amount, and first bounding box information indicating the position of the minimum value point of and the size of bounding box 6820, are stored in the SPS in the data structure of the bitstream shown in (e) in FIG. 94. Each individual position shift amount is stored in the header of geometry information on the corresponding piece of divided data. The second bounding box information on each one of bounding boxes 6821 to 6824 used to encode the corresponding one of pieces of divided data 6811 to 6814 is stored in the header of the geometry information on the piece of divided data.

The shift amount Shift(i) of a piece of divided data (i) can be calculated using the following equation, where Shift_A is the common position shift amount and Shift_B(i) is the individual position shift amount (i is the index of the piece of divided data).

$$\text{Shift}(i)=\text{Shift\_}A+\text{Shift\_}B(i)$$

That is, as shown in (d) in FIG. 94, the total shift amount of each piece of divided data can be calculated by summing the common position shift amount and the corresponding individual position shift amount.

Before encoding the point cloud data, the three-dimensional data encoding device shifts the position of the point cloud data of the i-th piece of divided data by subtracting Shift(i).

A three-dimensional data decoding device can return the piece of divided data to its original position in the following manner. The three-dimensional data decoding device obtains Shift_A and Shift_B(i) from the SPS and from the header of the piece of divided data and calculates Shift(i), and then adds Shift(i) to the piece of divided data (i) decoded. The pieces of divided data can thus be correctly reproduced.

Now, a second example of the position shift, involving the common position shift but not the individual position shift, will be described with reference to FIG. 95. The second example can reduce the information amount in the bitstream by not sending the individual position shift amounts.

Figure 95:
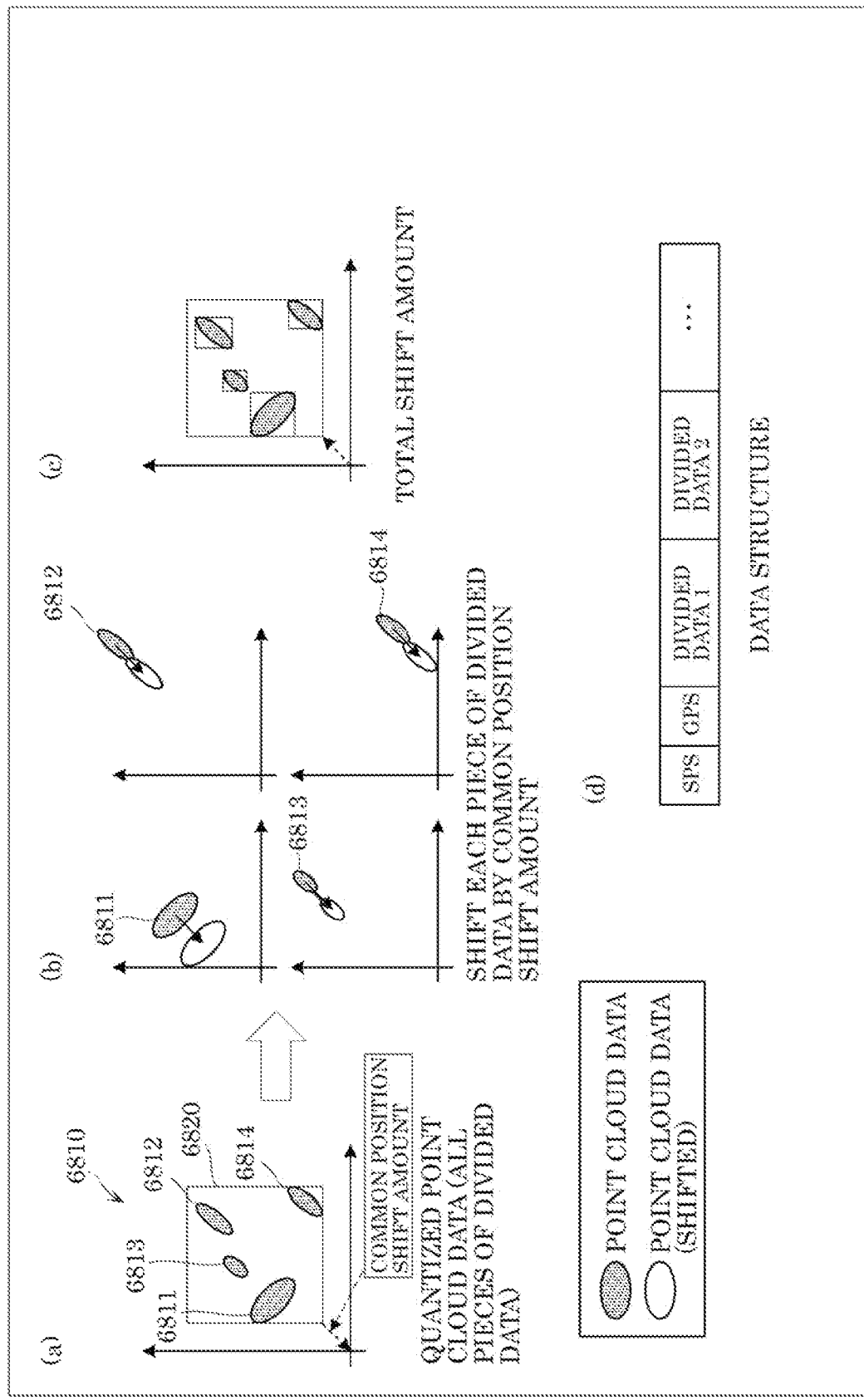
FIG. 95 is a diagram for describing a second example of the position shift according to Embodiment 8.

FIG. 95 is a diagram for describing the second example of the position shift. In the second example, the position of point cloud data 6810 is shifted by the common position shift amount, but the positions of pieces of divided data 6811 to 6814 are not shifted by the individual position shift amounts.

As shown in (a) in FIG. 95, the three-dimensional data encoding device generates bounding box 6820 of a size accommodating all pieces of divided data 6811 to 6814 of point cloud data 6810, and calculates the common position shift amount using bounding box 6820 generated. The common position shift amount is calculated in the manner described with reference to FIG. 94.

As shown in (b) in FIG. 95, the three-dimensional data encoding device shifts pieces of divided data 6811 to 6814 by the common position shift amount calculated, and encodes the divided data using bounding box 6820 containing all pieces of divided data 6811 to 6814 uniformly shifted.

As above, in the second example, the dividing of point cloud data 6810 is not followed by the calculation of the individual position shift amount or the bounding box information for each of pieces of divided data 6811 to 6814. Although the three-dimensional data encoding device in the second example shifts the positions of pieces of divided data 6811 to 6814 by the common position shift amount and encodes pieces of divided data 6811 to 6814 using the common bounding box, this is not limiting. For example, the three-dimensional data encoding device may shift the positions of pieces of divided data 6811 to 6814 by the common position shift amount and encode pieces of divided data 6811 to 6814 using bounding boxes for respective pieces of divided data 6811 to 6814. The three-dimensional data encoding device may also shift pieces of divided data 6811 to 6814 by their respective individual position shift amounts and encode pieces of divided data 6811 to 6814 using the common bounding box.

As shown in (c) in FIG. 95, the total shift amount of each piece of divided data is the common position shift amount.

The common position shift amount, and the first bounding box information indicating the position of the minimum value point of and the size of bounding box 6820 containing all the pieces of divided data, are stored in the SPS in the data structure of the bitstream shown in (d) in FIG. 95

No individual position shift amount, or second bounding box information for encoding each piece of divided data, is stored in the header of the geometry information on the piece of divided data.

The SPS or GPS includes a flag (identification information) indicating that the divided data has been encoded using the common position shift amount and using the bounding box containing all pieces of divided data 6811 to 6814. The SPS or GPS also includes a flag (identification information) indicating that no individual position shift amount or size information on a bounding box for encoding each piece of divided data is stored in the header of the geometry information on the piece of divided data.

The three-dimensional data decoding device determines, based on the above flags in the SPS or GPS, whether the divided data has been encoded using common information or individual information, and calculates, for use in decoding, geometry information and the bounding box size or sizes.

Hereafter, a BB refers to a bounding box. The common information refers to the common position shift amount and the first BB information, which are shared by all the pieces of divided data. The common position shift amount may be represented as the minimum value point of the common bounding box. The individual information refers to the individual position shift amount of each piece of divided data, and the second BB information on the bounding box for the piece of divided data used for encoding. The individual position shift amount may be represented as the minimum value point of the bounding box for each piece of divided data. Section information refers to information indicating partitions that divide the space into pieces of data, and may include BB information indicating the minimum value point of each BB and the size of each BB.

Figure 96:
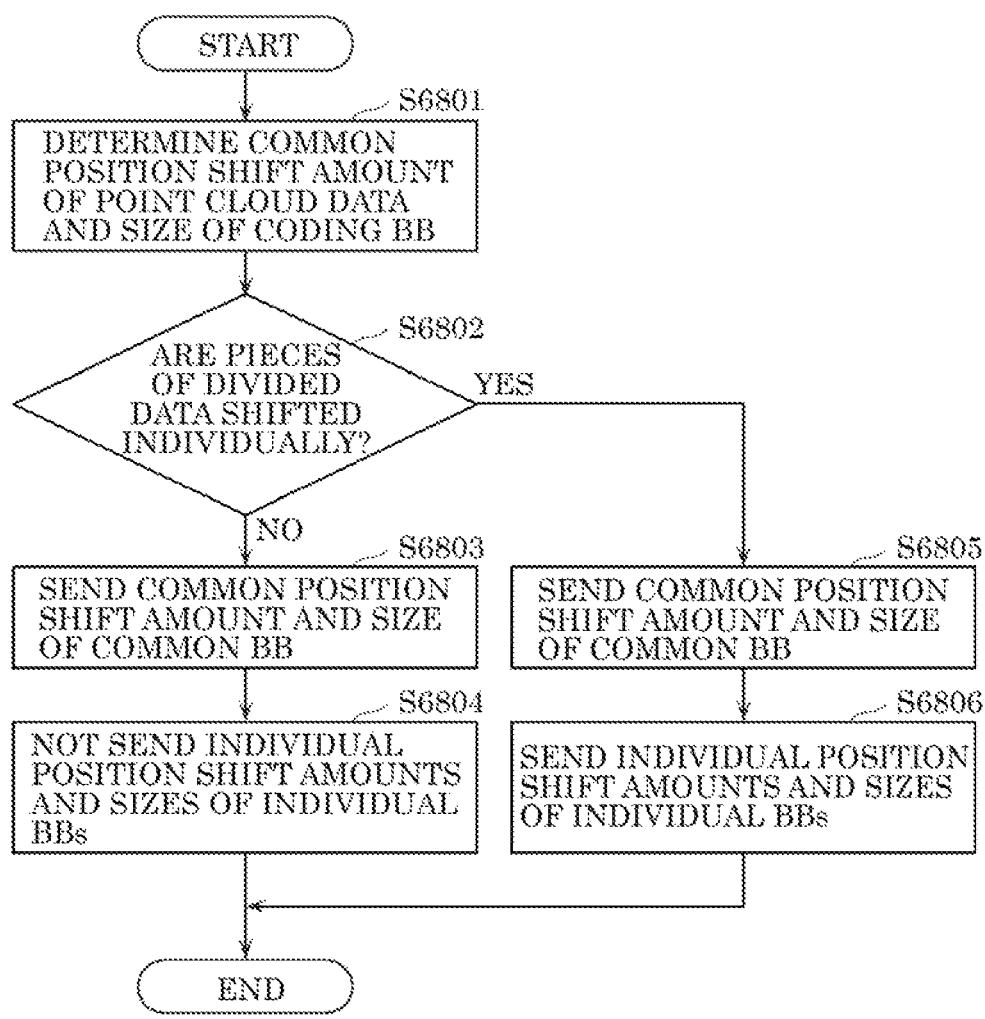
FIG. 96 is a flowchart illustrating an exemplary encoding method according to Embodiment 8.
Figure 97:
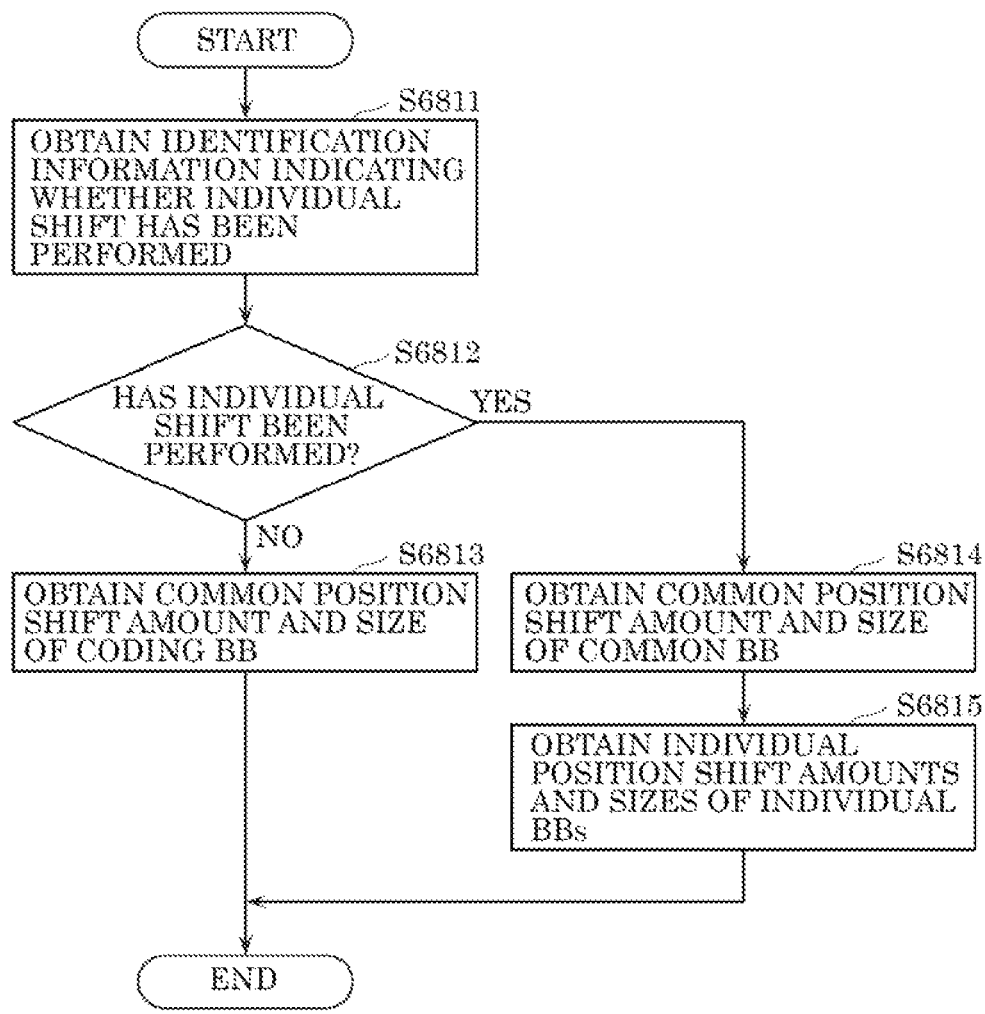
FIG. 97 is a flowchart illustrating an exemplary decoding method according to Embodiment 8.

FIG. 96 is a flowchart illustrating an exemplary encoding method in which processing is switched between the first example and the second example. FIG. 97 is a flowchart illustrating an exemplary decoding method in which processing is switched between the first example and the second example.

As shown in FIG. 96, the three-dimensional data encoding device determines the common position shift amount of point cloud data 6810 and the size of the common BB surrounding point cloud data 6810 (S6801).

The three-dimensional data encoding device determines whether to shift pieces of divided data 6811 to 6814 individually by their respective individual position shift amounts (S6802). The three-dimensional data encoding device may make this determination based on the amount of reduction in header information or based on the result of calculating the coding efficiency.

If pieces of divided data 6811 to 6814 are not shifted individually (No at S6802), the three-dimensional data encoding device determines to send the common position shift amount and the size of the common BB (S6803) but not to send individual position shift amounts and the size of the common BB (S6804). Consequently, the three-dimensional data encoding device generates a bitstream that includes the common position shift amount and the size of the common BB but does not include individual position shift amounts and the sizes of individual BBs. The bitstream may include identification information indicating that no individual shift has been performed.

If pieces of divided data 6811 to 6814 are shifted individually (Yes at S6802), the three-dimensional data encoding device determines to send the common position shift amount and the size of the common BB (S6805) and to send the individual position shift amounts and the sizes of the individual BBs (S6806). Consequently, the three-dimensional data encoding device generates a bitstream that includes the common position shift amount and the size of the common BB, as well as the individual position shift amounts and the sizes of the individual BBs. The bitstream may include identification information indicating that individual shift has been performed. At step S6806, the three-dimensional data encoding device may calculate the individual position shift amounts and the sizes of the individual BBs for pieces of divided data 6811 to 6814.

As shown in FIG. 97, the three-dimensional data decoding device receives the bitstream to obtain the identification information indicating whether individual shift has been performed (S6811).

Based on the identification information, the three-dimensional data decoding device determines whether individual shift has been performed during the encoding (S6812).

If the three-dimensional data decoding device determines that no individual shift has been performed for pieces of divided data 6811 to 6814 (No at S6812), the three-dimensional data decoding device obtains the common position shift amount and the size of the common BB from the bitstream (S6813).

If the three-dimensional data decoding device determines that individual shift has been performed for pieces of divided data 6811 to 6814 (Yes at S6812), the three-dimensional data decoding device obtains the common position shift amount and the size of the common BB (S6814) as well as the individual position shift amounts and the sizes of the individual BBs (S6815) from the bitstream.

Now, a third example of the position shift will be described with reference to FIG. 98. In the third example, the positions are shifted by position shift amounts determined using sections that divides the space containing the point cloud data. The third example can further reduce the information amount of the position shift amounts.

Figure 98:
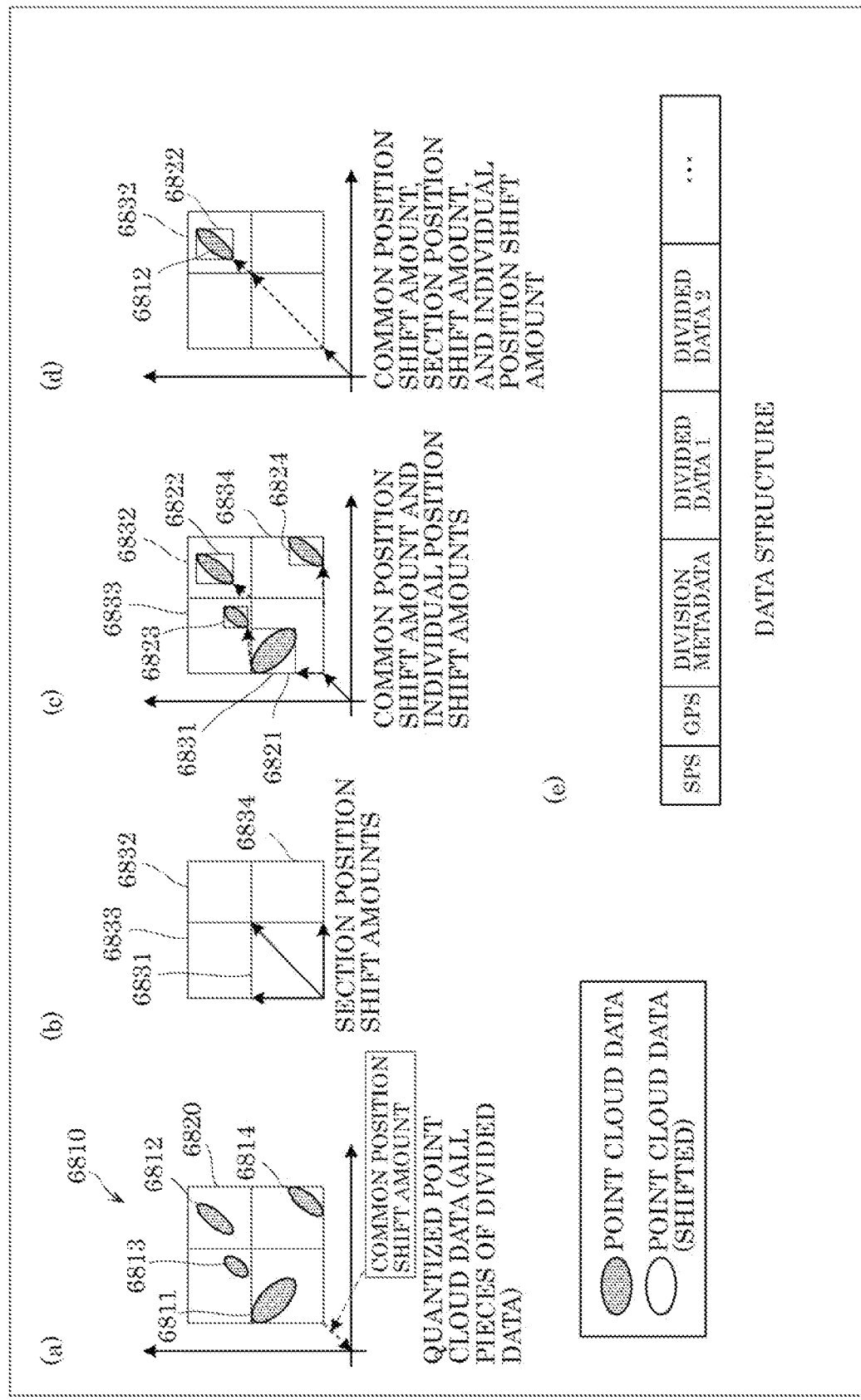
FIG. 98 is a diagram for describing a third example of the position shift according to Embodiment 8.

FIG. 98 is a diagram for describing the third example of the position shift. In the third example, the total shift amount of each of pieces of divided data 6811 to 6814 is represented as a three-step shift amount.

As shown in (a) in FIG. 98, the three-dimensional data encoding device calculates the common position shift amount using bounding box 6820. The common position shift amount is calculated in the manner described with reference to FIG. 94. At this point, the three-dimensional data encoding device determines sections 6831 to 6834 ((b) in FIG. 98) for dividing point cloud data 6810, and divides point cloud data 6810 into pieces of divided data 6811 to 6814 according to sections 6831 to 6834 determined. Sections 6831 to 6834 correspond to pieces of divided data 6811 to 6814, respectively. Sections 6831 to 6834 are also referred to as section bounding boxes.

As shown in (b) in FIG. 98, the three-dimensional data encoding device calculates, as the position shift amount of each of sections 6831 to 6834, the direction and distance of a vector represented as the difference between the minimum value point of bounding box 6820 containing all the pieces of divided data and the minimum value point of the section.

As shown in (c) in FIG. 98, for pieces of divided data 6811 to 6814, the three-dimensional data encoding device generates bounding boxes 6821 to 6824 each having a size accommodating the corresponding one of pieces of divided data 6811 to 6814, and calculates the minimum value point of each of bounding boxes 6821 to 6824 generated. Then, for each of pieces of divided data 6811 to 6814, the three-dimensional data encoding device calculates, as the individual position shift amount of the piece of divided data, the direction and distance of a vector represented as the difference between the minimum value point of the bounding box for the piece of divided data and the minimum value point of the corresponding section.

The three-dimensional data encoding device stores, in a bitstream, the common position shift amount, the individual position shift amount of each piece of divided data, and the bounding box information indicating the size of bounding box 6820.

The common position shift amount, and the first bounding box information indicating the position of the minimum value point of and the size of bounding box 6820, are stored in the SPS in the data structure of the bitstream shown in (e) in FIG. 98. The individual position shift amount is stored in the header of the geometry information on each piece of divided data. Section information including the position shift amount of each section is stored in, for example, a parameter set in which division metadata is stored. The second bounding box information on each of bounding boxes 6821 to 6824 used to encode the corresponding one of pieces of divided data 6811 to 6814 is stored in the header of the geometry information on the piece of divided data. Here, bounding boxes 6821 to 6824 used to encode respective pieces of divided data 6811 to 6814 are within respective sections 6831 to 6834.

The shift amount Shift(i) of a piece of divided data (i) can be calculated using the following equation, where Shift_A is the common position shift amount, Shift_B(i) is the individual position shift amount, and Shift_C(i) is the section position shift amount (i is the index of the piece of divided data).

$$\text{Shift}(i) = \text{Shift\_}A + \text{Shift\_}B(i) + \text{Shift\_}C(i)$$

That is, as shown in (d) in FIG. 98, the total shift amount of each piece of divided data can be calculated by summing the three shift amounts: the common position shift amount, the section position shift amount, and the individual position shift amount.

Before encoding the point cloud data, the three-dimensional data encoding device shifts the position of the point cloud data of the i-th piece of divided data by subtracting Shift(i).

The three-dimensional data decoding device can return the piece of divided data to its original position in the following manner. The three-dimensional data decoding device obtains Shift_A, Shift_B(i), and Shift_C(i) from the SPS and from the header of the piece of divided data and calculates Shift(i), and then adds Shift(i) to the piece of divided data (i) decoded. The pieces of divided data can thus be correctly decoded.

This method sends the section information and indicates each individual position shift amount as the difference between each piece of divided data and the corresponding section. This advantageously reduces the information amount of the shift amount of each piece of divided data.

The individual position shift amount may be switched as follows. If the section information is not sent, the individual position shift amount may be the difference between the minimum value point of the common bounding box and the minimum value point of each individual bounding box. If the section information is sent, the individual position shift amount may be the difference between the minimum value point of each section and the minimum value point of the corresponding individual bounding box. In the latter case, the individual position shift amount is represented as the sum of the section position shift amount and the difference calculated.

Figure 99:
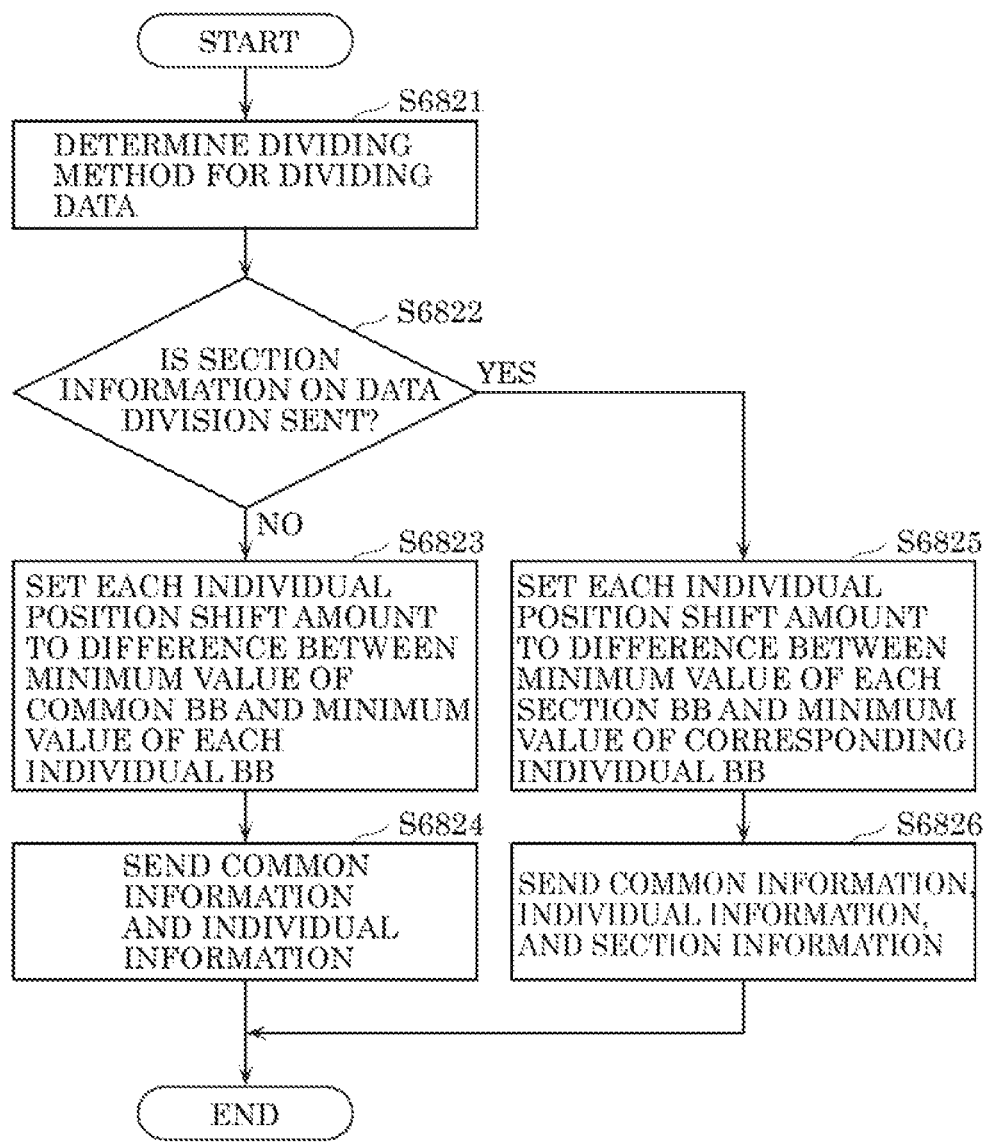
FIG. 99 is a flowchart illustrating an exemplary encoding method according to Embodiment 8.
Figure 100:
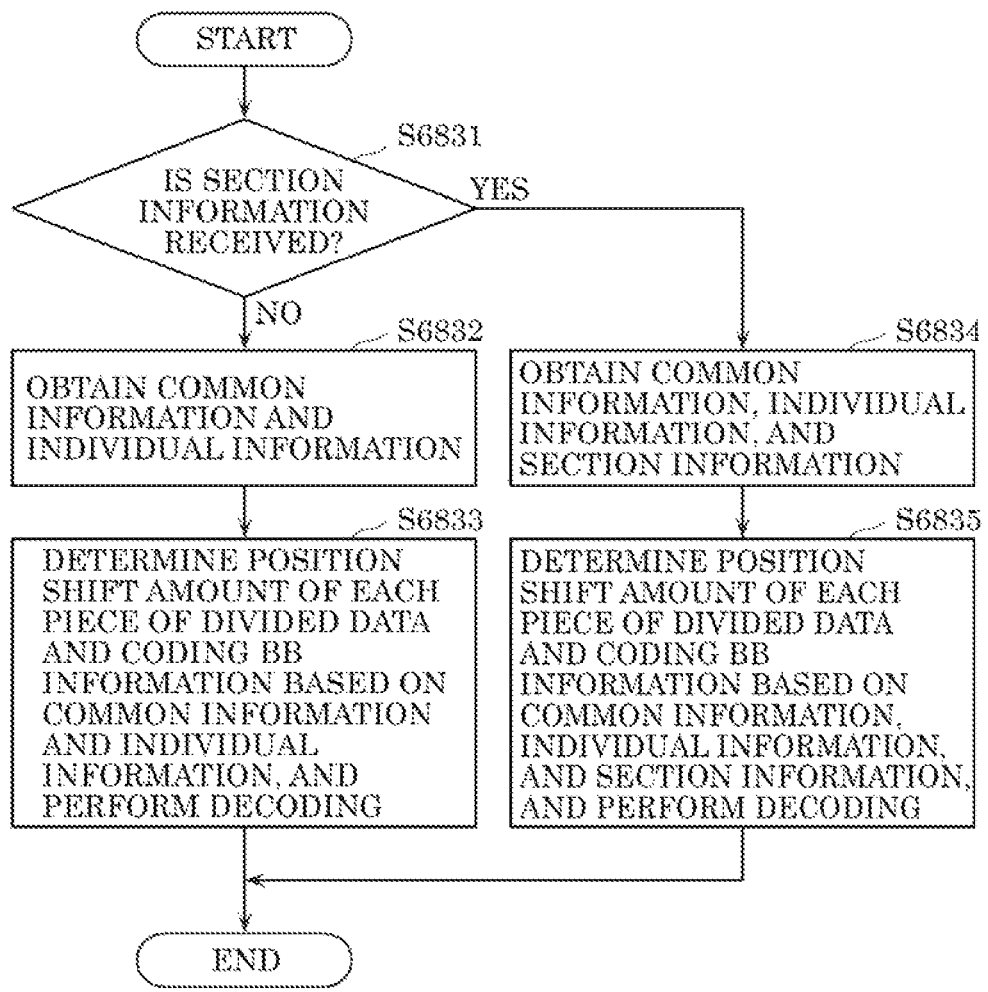
FIG. 100 is a flowchart illustrating an exemplary decoding method according to Embodiment 8.

FIG. 99 is a flowchart illustrating an exemplary encoding method in which individual position shift is switched between the first example and the third example. FIG. 100 is a flowchart illustrating an exemplary decoding method in which individual position shift is switched between the first example and the third example.

As shown in FIG. 99, the three-dimensional data encoding device determines the dividing method for dividing point cloud data 6810 (S6821). Specifically, the three-dimensional data encoding device determines whether to shift the positions of the point cloud data according to the first example or the third example.

Based on the dividing method determined, the three-dimensional data encoding device determines whether the method in the third example involving sections is used (S6822).

If the method in the first example is determined to be used (No at S6822), the three-dimensional data encoding device sets each individual position shift amount to the difference between the minimum value point of the common BB and the minimum value point of each individual BB (S6823).

The three-dimensional data encoding device generates a bitstream that includes the common information and the individual information (S6824). The bitstream may include identification information indicating the method in the first example.

If the method in the third example is determined to be used (Yes at S6822), the three-dimensional data encoding device sets each individual position shift amount to the difference between the minimum value point of each section BB and the minimum value point of the corresponding individual BB (S6825).

The three-dimensional data encoding device sends a bitstream that includes the common information, the individual information, and the section information (S6826). The bitstream may include identification information indicating the method in the third example.

As shown in FIG. 100, the three-dimensional data decoding device obtains the bitstream and determines whether the bitstream includes the section information (S6831). The three-dimensional data decoding device thus determines whether the bitstream obtained includes point cloud data encoded according to the first example or point cloud data encoded according to the third example. Specifically, if the bitstream includes the section information, the device determines that the bitstream includes point cloud data encoded according to the third example. If the bitstream does not include the section information, the device determines that the bitstream includes point cloud data encoded according to the first example. Alternatively, the three-dimensional data decoding device may obtain the identification information in the bitstream to determine whether the bitstream has been encoded according to the first example or the third example.

If the bitstream does not include the section information (No at S6831), that is, if the data has been encoded according to the first example, the three-dimensional data decoding device obtains the common information and the individual information from the bitstream (S6832).

Based on the common information and the individual information obtained, the three-dimensional data decoding device calculates the position shift amount of each piece of divided data, which is the position shift amount Shift(i) in the first example, and also calculates the common BB and the individual BBs. The three-dimensional data decoding device uses these information items to decode the point cloud data (S6833).

If the bitstream includes the section information (Yes at S6831), that is, if the data has been encoded according to the third example, the three-dimensional data decoding device obtains the common information, the individual information, and the section information from the bitstream (S6834).

Based on the common information, the individual information, and the section information obtained, the three-dimensional data decoding device calculates the position shift amount of each piece of divided data, which is the position shift amount Shift(i) in the third example, and also calculates the common BB, the individual BBs, and the sections. The three-dimensional data decoding device uses these information items to decode the point cloud data (S6835).

Now, a fourth example of the position shift will be described with reference to FIG. 101. In the fourth example, the positions are shifted by position shift amounts determined using coding bounding boxes that are sections dividing the space containing the point cloud data. Compared with the third example, the fourth example can reduce the information amount of the bounding boxes because the sections match the individual bounding boxes.

Figure 101:
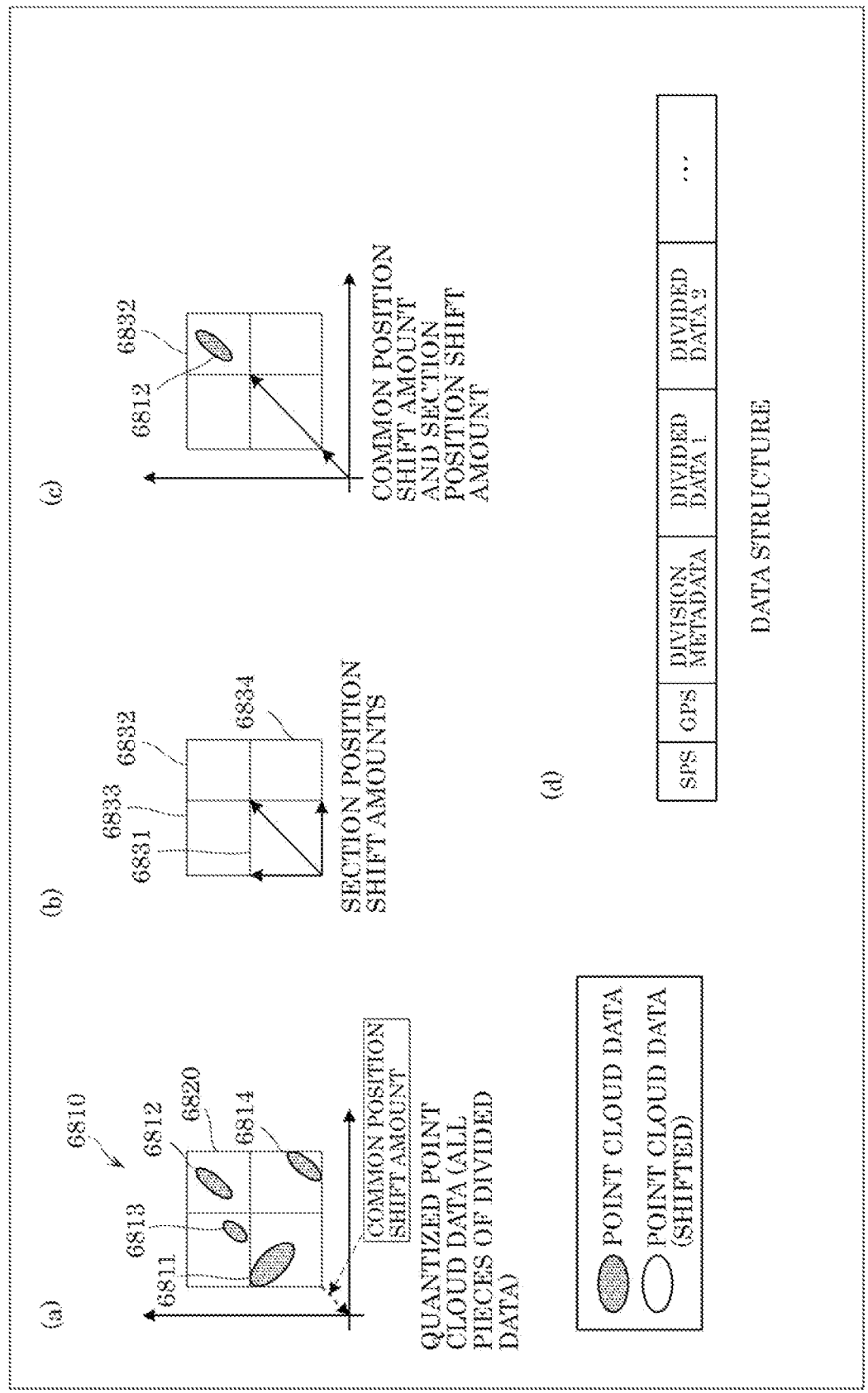
FIG. 101 is a diagram for describing a fourth example of the position shift according to Embodiment 8.

FIG. 101 is a diagram for describing the fourth example of the position shift. In the fourth example, the total shift amount of each of pieces of divided data 6811 to 6814 is represented as a two-step shift amount that includes the common position shift amount and the section position shift amount.

As shown in (a) in FIG. 101, the three-dimensional data encoding device calculates the common position shift amount using bounding box 6820. The common position shift amount is calculated in the manner described with reference to FIG. 94. At this point, the three-dimensional data encoding device divides point cloud data 6810 into pieces of divided data 6811 to 6814. Point cloud data 6810 is divided in the manner described with reference to (a) in FIG. 98.

As shown in (b) in FIG. 101, the three-dimensional data encoding device calculates the section position shift amounts. The section position shift amounts are calculated in the manner described with reference to (b) in FIG. 98.

The three-dimensional data encoding device calculates the section position shift amounts as the individual position shift amounts of pieces of divided data 6811 to 6814. Consequently, the three-dimensional data encoding device stores, in a bitstream, the common position shift amount, the individual position shift amounts (the section position shift amounts), and the bounding box information indicating the sizes of the bounding boxes (the sections).

The common position shift amount, and the first bounding box information indicating the position of the minimum point of and the size of bounding box 6820, are stored in the SPS in the data structure of the bitstream shown in (d) in FIG. 101.

Each individual position shift amount is stored in at least one of: the header of the geometry information on the corresponding piece of divided data; and the division metadata. If the individual position shift amount is stored in only one of the header of the geometry information and the division metadata, the GPS or SPS may include identification information indicating that the individual position shift amount is stored in the header of the geometry information on the corresponding piece of divided data, or identification information indicating that the individual position shift amount is stored in the division metadata. Alternatively, each individual position shift amount may be stored in, for example, the header of the corresponding piece of divided data, and the GPS or SPS may include identification information (a flag) indicating whether the position shift amount and the bounding box information in the header of the piece of divided data match the corresponding section. This allows the three-dimensional data decoding device to refer to the flag to determine that the section information is stored in the header of the piece of divided data, and use, as the section information, the position shift amount and the bounding box information in the header of the piece of divided data. Alternatively, the flag may be stored in the division metadata, and, if the flag is set to 1 indicating that the section information is stored in the header of the corresponding piece of divided data, the three-dimensional data decoding device may refer to the header of the piece of the divided data to obtain the section information.

The shift amount Shift(i) of a piece of divided data (i) can be calculated using the following equations, where Shift_A is the common position shift amount, Shift_B(i) is the individual position shift amount, and Shift_C(i) is the section position shift amount (i is the index of the piece of divided data).

$$\text{Shift\_}B(i)=\text{Shift\_}C(i)$$

$$\text{Shift}(i)=\text{Shift\_}A+\text{Shift\_}B(i)$$

That is, as shown in (c) in FIG. 101, the total shift amount of each piece of divided data can be calculated by summing the common position shift amount and the section position shift amount (i.e., the individual position shift amount).

Before encoding the point cloud data, the three-dimensional data encoding device shifts the position of the point cloud data of the i-th piece of divided data by subtracting Shift(i).

The three-dimensional data decoding device can return the piece of divided data to its original position in the following manner. The three-dimensional data decoding device obtains Shift_A, and Shift_B(i) or Shift_C(i), from the SPS and from the header of the piece of divided data and calculates Shift(i), and then adds Shift(i) to the piece of divided data (i) decoded. The pieces of divided data can thus be correctly decoded.

This method sets the individual position shift amounts to match the section position shift amounts. This eliminates the need to send, in response to a request, section information that would otherwise be needed, thereby advantageously reducing the information amount.

Note that the method may switch between transmitting, as the individual position shift amount, the bounding box information on the individual bounding box for each piece of divided data and transmitting the section information as the individual position shift amount, depending on whether it is required to send the section information.

Figure 102:
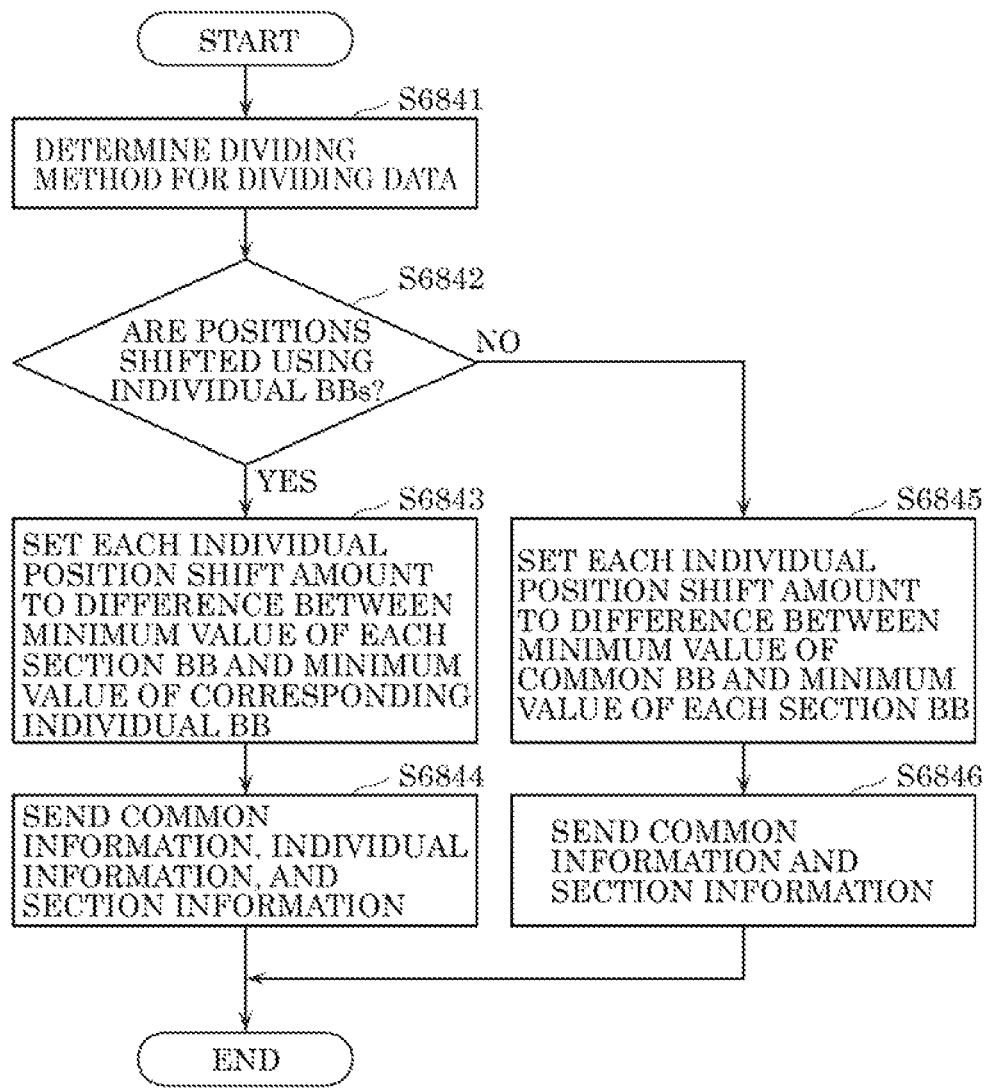
FIG. 102 is a flowchart illustrating an exemplary encoding method according to Embodiment 8.

FIG. 102 is a flowchart illustrating an exemplary encoding method in which the section information is stored and processing is switched between the third example and the fourth example.

As shown in FIG. 102, the three-dimensional data encoding device determines the dividing method for dividing point cloud data 6810 (S6841). Specifically, the three-dimensional data encoding device determines whether to shift the positions of the point cloud data according to the third example or the fourth example. The three-dimensional data encoding device may make this determination based on the amount of reduction in header information or based on the result of calculating the coding efficiency.

Based on the dividing method determined, the three-dimensional data encoding device determines whether the positions are shifted using individual bounding boxes (S6842). That is, the three-dimensional data encoding device determines whether the method in the third example or the method in the fourth example is used.

If the method in the third example is determined to be used (Yes at S6842), the three-dimensional data encoding device sets each individual position shift amount to the difference between the minimum value point of each section BB and the minimum value point of the corresponding individual BB (S6843).

The three-dimensional data encoding device generates a bitstream that includes the common information, the individual information, and the section information (S6844). The bitstream may include identification information indicating the method in the third example.

If the method in the fourth example is determined to be used (No at S6842), the three-dimensional data encoding device sets each individual position shift amount to the difference between the minimum value point of the common BB and the minimum value point of each section BB (S6845).

The three-dimensional data encoding device sends a bitstream that includes the common information and the section information (S6846). The bitstream may include identification information indicating the method in the fourth example.

Now, a fifth example of the position shift will be described with reference to FIG. 103. In the fifth example, the positions are shifted by position shift amounts determined using sections that divides the space containing the point cloud data. The fifth example can reduce the information amount of the shift amounts.

Figure 103:
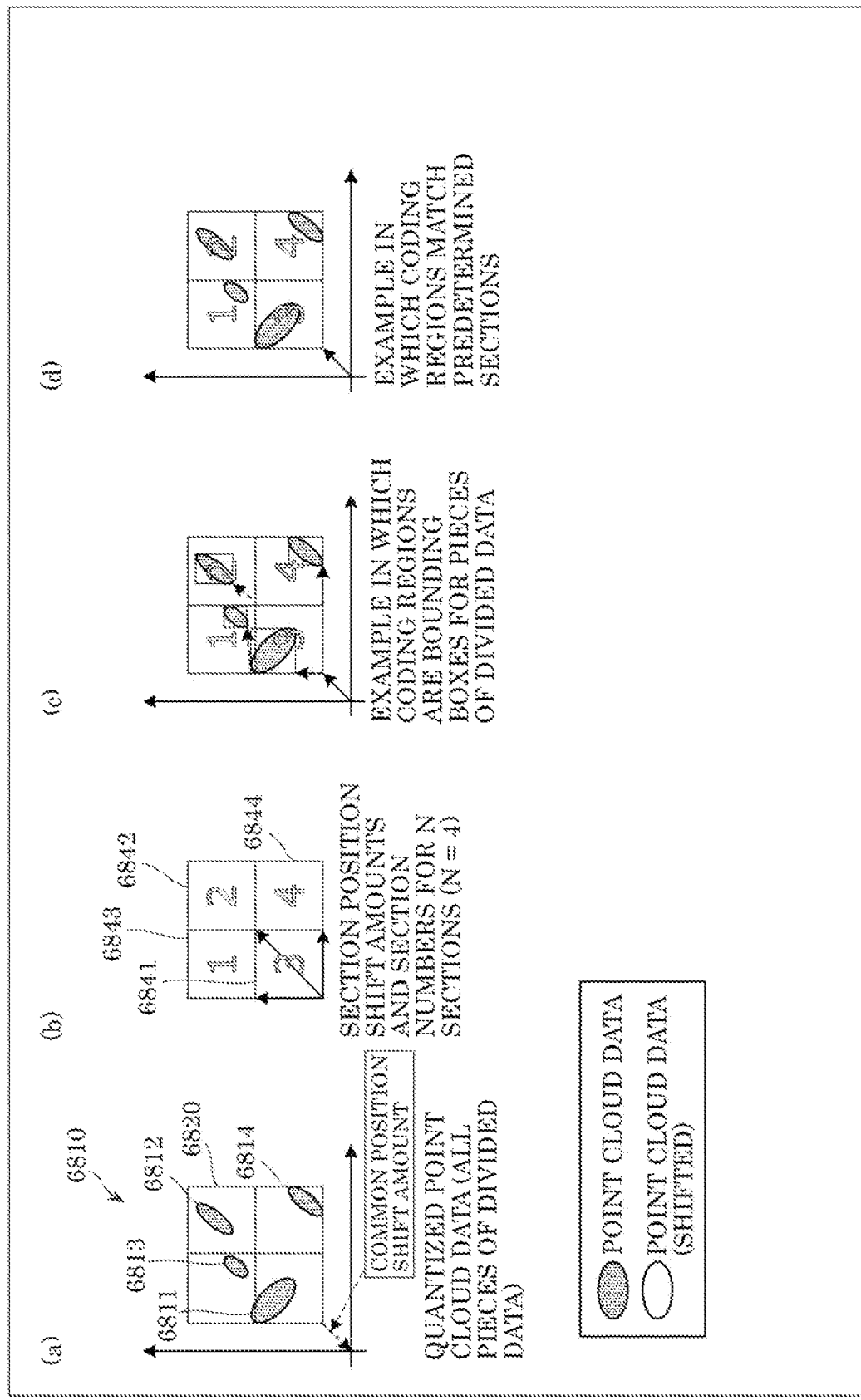
FIG. 103 is a diagram for describing a fifth example of the position shift according to Embodiment 8.

FIG. 103 is a diagram for describing the fifth example of the position shift. The fifth example is different from the third example in that the sections are equal in size.

As shown in (a) in FIG. 103, the three-dimensional data encoding device calculates the common position shift amount using bounding box 6820. The common position shift amount is calculated in the manner described with reference to FIG. 94. At this point, with reference to bounding box 6820 and according to a predetermined rule for example, the three-dimensional data encoding device determines sections 6841 to 6844 ((b) in FIG. 103) for dividing point cloud data 6810. For example, if bounding box 6820 is to be divided into N sections and if N=4, the three-dimensional data encoding device can create four sections 6841 to 6844 of the same size. Here, section numbers in Morton order, for example, may be defined as identifiers for identifying sections 6841 to 6844. Because the sections are of the same size, the position shift amount of each section can be calculated from the number of sections and the section number. Therefore, instead of sending the position shift amounts of the sections, the three-dimensional data encoding device may send the number of sections and identification information for identifying the sections. The identification information is, as described above, the section numbers of sections 6841 to 6844 in Morton order.

In the example in (c) in FIG. 103, the coding regions are bounding boxes for the respective pieces of divided data. The position shift amount of each piece of divided data is represented as the sum of the common position shift amount, the position shift amount of the corresponding section, and the individual position shift amount from the reference position (the position of the minimum point) of the corresponding section. The corresponding section need not include the entire coding region (i.e., the entire individual BB).

In the example in (d) in FIG. 103, the coding regions for the pieces of divided data match the respective sections. The position shift amount of each piece of divided data is represented as the sum of the common position shift amount and the position shift amount of the corresponding section. The corresponding section matches the coding region (i.e., the individual BB) and therefore includes the entire coding region.

As above, the three-dimensional data encoding device may or need not set the coding regions for the pieces of divided data to match the sections dividing the point cloud data. If the coding regions for the pieces of divided data are set to match the sections, either the method in (c) in FIG. 103 or the method in (d) in FIG. 103 may be used. If the coding regions for the pieces of divided data are not set to match the sections, the method in (c) in FIG. 103 may be used.

When the method in (c) or (d) in FIG. 103 is used, the common position shift amount and the bounding box information indicating the position of the minimum point of and the size of bounding box 6820 are stored in the SPS in the data structure of the bitstream. Section information, including the dividing method information and the number of sections, is stored in the SPS or GPS as information shared by all the pieces of divided data. The number in a predetermined order (Morton order) (the identification information) of each section is stored, as information on the section, in the header of the geometry information on the corresponding piece of divided data.

Each individual position shift amount is stored in the header of the geometry information on the corresponding piece of divided data. Further, for (c) in FIG. 103, each individual position shift amount is stored in the header of the geometry information on the corresponding piece of divided data.

If the sections are set to match the pieces of divided data (i.e., if the sections are set to match the individual bounding boxes for the pieces of divided data), the number (the tile ID)

of each piece of divided data in the header of the geometry information on the piece of divided data may be regarded as the number of the corresponding section in the predetermined order. In this manner, each individual position shift amount may be indicated by the identification information (the number in the predetermined order) on each piece of data. This advantageously reduces the information amount in the header.

The three-dimensional data encoding device may switch the manner of indicating the position shift amounts as follows. If the dividing method in the fifth example is used, the three-dimensional data encoding device may divide the common bounding box into sections numbered in a predetermined order. The three-dimensional data encoding device may then indicate the position shift amount of each section as the section information that includes the number of sections and the section identification information. If any other dividing method is used, the three-dimensional data encoding device may indicate the position shift amounts without using the above section information.

The shift amount Shift(i) of a piece of divided data (i) can be calculated using the following equation, where Shift_A is the common position shift amount. Shift_B(i) is the individual position shift amount, and Shift_D(i) is the section position shift amount (i is the index of the piece of divided data).

$$\text{Shift}(i) = \text{Shift\_A} + \text{Shift\_B}(i) + \text{Shift\_D}(i)$$

That is, the total shift amount of each piece of divided data can be calculated by summing the three shift amounts: the common position shift amount, the section position shift amount, and the individual position shift amount.

Before encoding the point cloud data, the three-dimensional data encoding device shifts the position of the point cloud data of the i-th piece of divided data by subtracting Shift(i).

The three-dimensional data decoding device can return the piece of divided data to its original position in the following manner. The three-dimensional data decoding device obtains Shift_A and Shift_B(i) from the SPS and from the header of the piece of divided data, and further obtains the section information that includes the dividing method information, the number of sections, and the section number in the predetermined order. The three-dimensional data decoding device then derives the position shift amount Shift_D(i) by a predetermined method, calculates Shift(i), and adds Shift(i) to the piece of divided data (i) decoded. The pieces of divided data can thus be correctly decoded.

Figure 104:
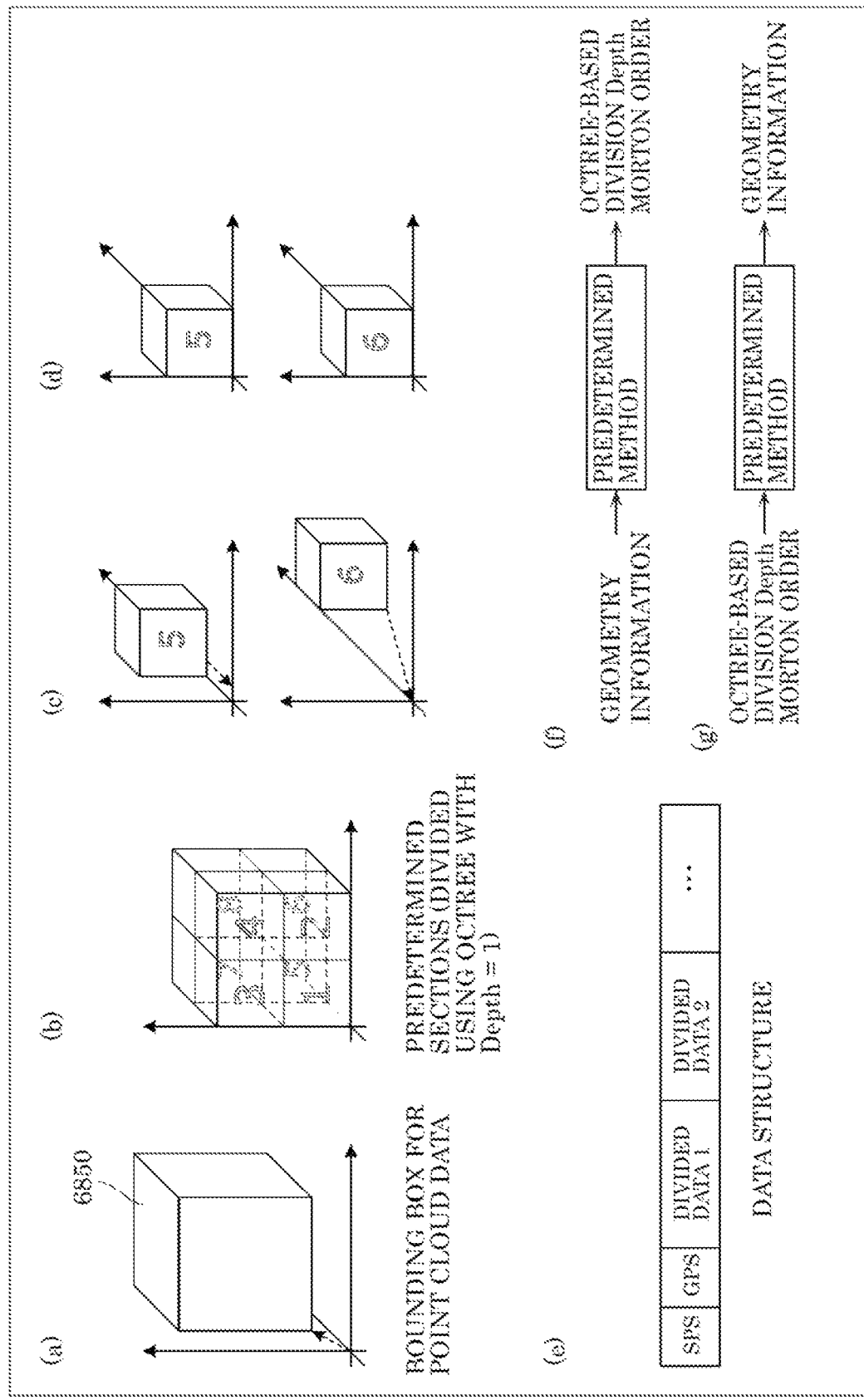
FIG. 104 is a diagram for describing an encoding method according to Embodiment 8.

A detailed example of a rule and a reduction in header amount will be described with respect to the point cloud data divided using an octree. FIG. 104 is a diagram for describing an encoding method for the three-dimensional space divided using an octree.

First, the three-dimensional data encoding device may offset (shift or move the position of) the point cloud data in the three-dimensional space by the common position shift amount and divide the point cloud data using an octree. The three-dimensional data encoding device uses the octree to divide bounding box 6850 for the point cloud data into eight sections. The number of sections is set according to the Depth of the octree. For example, the number of sections according to the Depth is given by N=2^(Depth*3), so that the number of sections is 8 for Depth=1, and 64 for Depth=2. The sections are numbered in Morton order. The geometry information on the sections can be calculated from Morton order by applying the fifth example to the three-dimensional space. Notably, Morton order can be calculated from the geometry information on the sections by a predetermined method.

Information on the bounding box for the point cloud data is stored in the SPS or GPS that includes metadata shared by all the pieces of divided data. The bounding box information includes the minimum value point (the initial position) of and the size of the bounding box.

The three-dimensional data encoding device stores, in the SPS or GPS in the data structure of the bitstream shown in (e) in FIG. 104, identification information indicating that the dividing method is octree division, and, if the dividing method is octree-based, Depth information indicating the Depth of the octree. The number in Morton order is stored, as the divided-data number, in the header of each piece of divided data. In the octree-based dividing method, the position shift amount of each piece of divided data and the coding bounding box information are to be derived from Morton order and therefore not stored in the bitstream.

Thus, as shown in (f) in FIG. 104, the three-dimensional data encoding device uses the geometry information on each octree section and a predetermined method to calculate the identification information indicating the octree-based dividing method, the Depth of the octree, and the number in Morton order. As shown in (g) in FIG. 104, the three-dimensional data decoding device obtains the identification information indicating the octree-based dividing method, the Depth of the octree, and the number in Morton order. The three-dimensional data decoding device then uses a predetermined method to reproduce the geometry information on each octree section.

If a section contains no point cloud data, the corresponding section information is not required. For example, if the section with the divided-data number=2 contains no point cloud data, the divided-data number is not sent. The sequence of divided-data numbers therefore skips 2 and includes 1, 3, 4, and so on.

The division metadata may include the divided-data numbers or may include the section information on all the sections, including sections containing no point cloud data. In the latter case, the section information may indicate whether each section contains point cloud data.

FIG. 105 is a diagram illustrating an exemplary syntax of the GPS.

octree_partition_flag is a flag indicating whether the point cloud data was divided using an octree.

depth indicates, if the point cloud data was divided using an octree, the depth of division by the octree.

gheader_BBmin_present_flag is a flag indicating whether the header of each piece of geometry information includes a geometry information field for the coding bounding box for the point cloud data.

gheader_BBsize_present_flag is a flag indicating whether the header of each piece of geometry information includes a size information field for the coding bounding box for the point cloud data.

If octree_partition_flag=1, gheader_BBminpresent_flag and gheader_BBsize_present_flag are set to 0.

FIG. 106 is a diagram illustrating an exemplary syntax of the header of each piece of geometry information.

partition_id indicates the identification information on the divided data. For octree-based division, partition_id indicates a unique position in Morton order.

BBmin indicates the shift amount for encoding the data or the divided data.

BBsize indicates the size of the bounding box for encoding the data or the divided data.

Although the above description has taken octree-based division as an example, the above approach can similarly be applied to other dividing methods by defining a predetermined dividing method, the order of the pieces of divided data, and the manner of calculating the geometry information. For example, if the point cloud data is divided at regular intervals in an x-y plane viewed from above, information indicating this dividing method, the number or size of the sections, and the order of the sections may be determined and sent. Based on these information items, both the three-dimensional data encoding device and the three-dimensional data decoding device can calculate the geometry information and the position shift amounts. Because no geometry information is sent, the amount of data can be reduced. The information sent may also include information indicating whether the dividing method is octree-based, information on the plane divided, and information on quadtree-based division.

Figure 107:
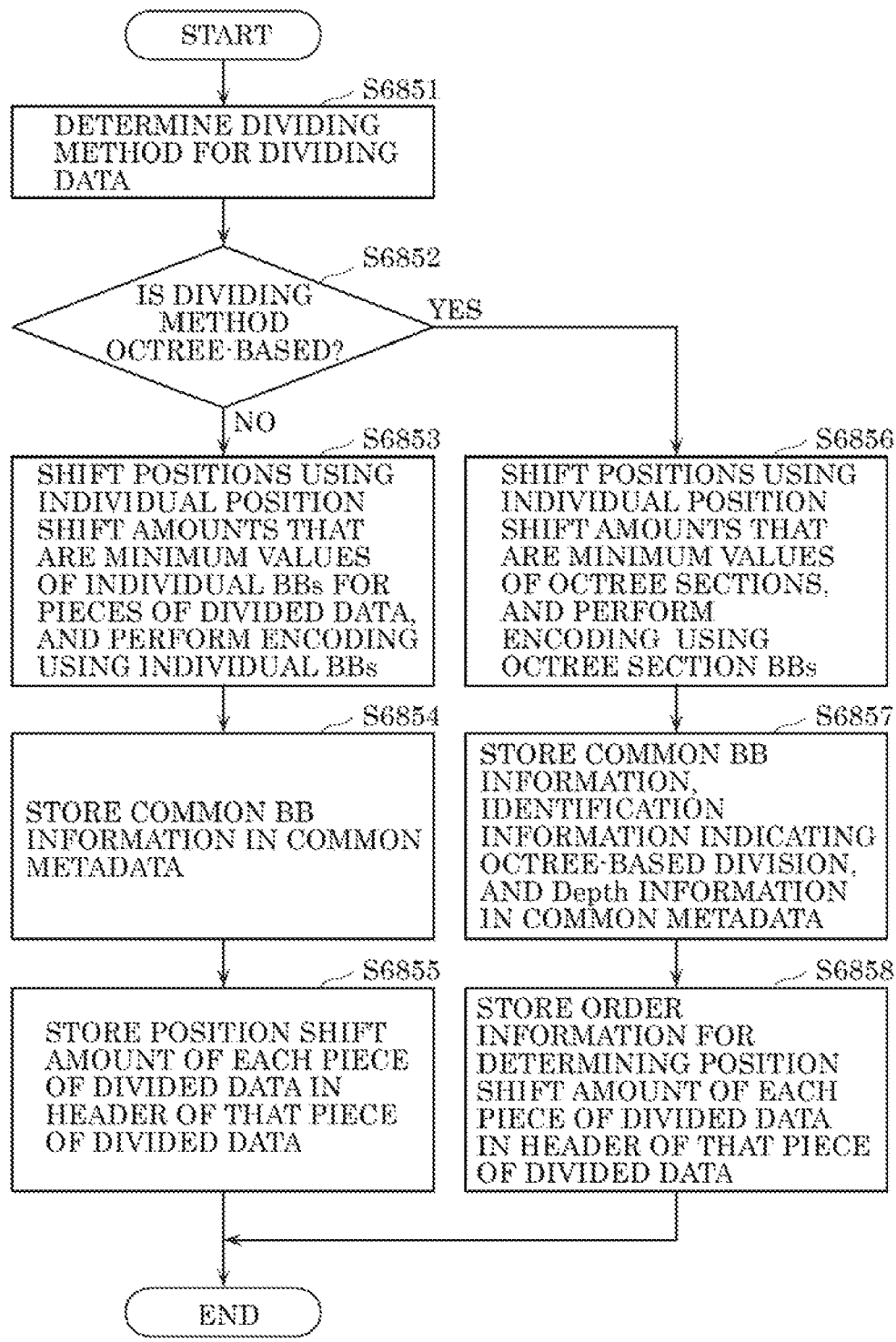
FIG. 107 is a flowchart illustrating an exemplary encoding method in which processing is switched, according to Embodiment 8.
Figure 108:
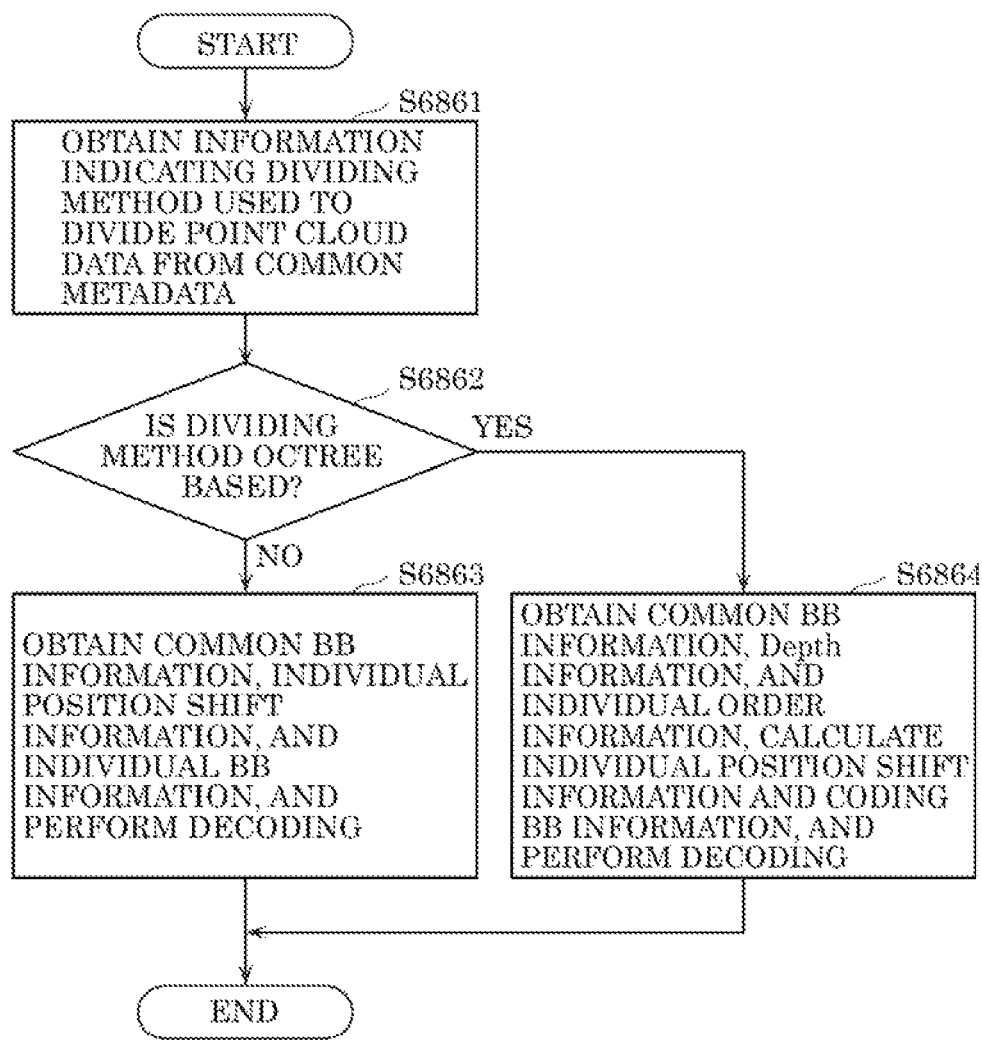
FIG. 108 is a flowchart illustrating an exemplary decoding method in which processing is switched, according to Embodiment 8.

FIG. 107 is a flowchart illustrating an exemplary encoding method in which processing is switched according to whether octree-based division is performed. FIG. 108 is a flowchart illustrating an exemplary decoding method in which processing is switched according to whether octree-based division was performed.

As shown in FIG. 107, the three-dimensional data encoding device determines the dividing method for dividing the point cloud data (S6851).

Based on the dividing method determined, the three-dimensional data encoding device determines whether octree-based division is performed (S6852).

If octree-based division is not determined to be performed (No at S6852), the three-dimensional data encoding device sets the individual position shift amounts to the minimum value points of the individual BBs for the pieces of divided data, shifts the positions of the pieces of divided data, and encodes the pieces of divided data using the individual BBs (S6853).

The three-dimensional data encoding device stores the common BB information in the common metadata (S6854).

The three-dimensional data encoding device stores the individual position shift amount of each piece of divided data in the header of the piece of divided data (S6855).

If octree-based division is determined to be performed (Yes at S6852), the three-dimensional data encoding device sets the individual position shift amounts to the minimum value points of the sections created by an octree, shifts the positions of the pieces of divided data, and encodes the pieces of divided data using the octree sections (S6856).

The three-dimensional data encoding device stores the common BB information, the identification information indicating the octree-based division, and the Depth information, in the common metadata (S6857).

The three-dimensional data encoding device stores, in the header of each piece of divided data, the order information indicating the number in Morton order for determining the individual position shift amount of the piece of divided data (S6858).

The three-dimensional data decoding device obtains, from the common metadata, the information indicating the dividing method used to divide the point cloud data (S6861).

Based on the information indicating the dividing method obtained, the three-dimensional data decoding device determines whether the dividing method is octree-based (S6862). Specifically, based on the identification information indicating whether octree-based dividing was performed, the three-dimensional data decoding device determines whether the dividing method is octree-based.

If the dividing method is not octree-based (No at S6862), the three-dimensional data decoding device obtains the common BB information, the individual position shift amounts, and the individual BB information, and decodes the point cloud data (S6863).

If the dividing method is octree-based (Yes at S6862), the three-dimensional data decoding device obtains the common BB information, the Depth information, and the individual order information, calculates the individual position shift amounts and the coding BB information, and decodes the point cloud data (S6864).

Any of the methods in the examples described in this embodiment will successfully reduce the code amount. Any one of these methods may be selected in a predetermined manner.

For example, the three-dimensional data encoding device may calculate the code amount, and, on a predetermined condition that depends on the code amount calculated, determine to perform the first method of the above-described methods. As another example, in the case of irreversible compression, it may be determined whether the quantization factor is greater than a predetermined value, whether the number of pieces of divided data is greater than a predetermined number, or whether the number of point clouds is fewer than a predetermined number. If these conditions suggest a possible change in overhead, the first method may be switched to the second method of the above-described methods.

In the above description, the header of each piece of divided data includes, as the individual information, the difference between the piece of divided data and the common information. However, this is not limitation. Rather, the individual information in the header of each piece of divided data may be the difference between the piece of divided data and the individual information on the preceding piece of divided data.

Figure 109:
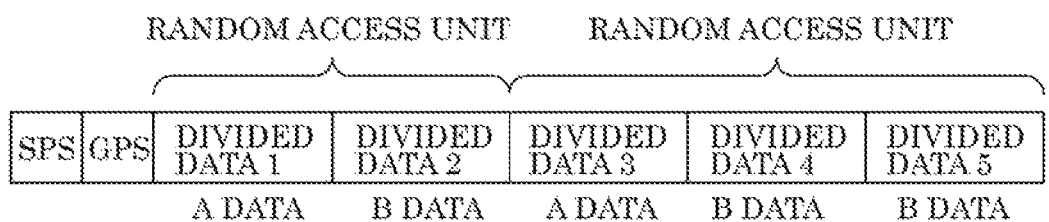
FIG. 109 is a diagram illustrating an exemplary data structure of a bitstream according to Embodiment 8.
Figure 110:
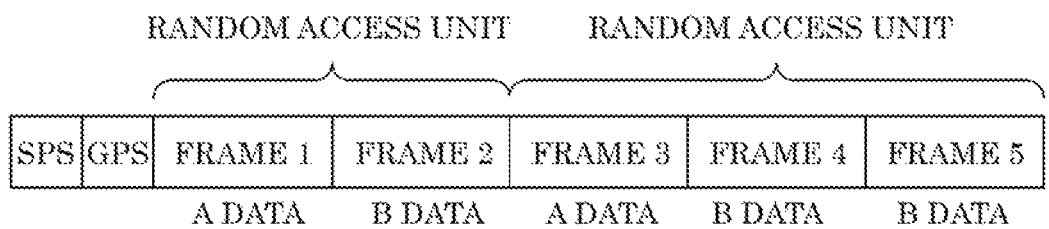
FIG. 110 illustrates an example in which pieces of divided data in FIG. 109 are replaced by frames, according to Embodiment 8.

FIG. 109 is a diagram illustrating an exemplary data structure of a bitstream in which the pieces of divided data are classified into A data capable of random access and B data incapable of random access. FIG. 110 illustrates an example in which the pieces of divided data in FIG. 109 are replaced by frames.

In this case, in which one or more random access units exist, the data headers of A data and the data headers of B data may include different types of information. For example, each piece of divided data belonging to A data may include difference information on the individual difference between the piece of divided data and the common information in the GPS, whereas each piece of divided data belonging to B data may include difference information indicating the difference between the piece of divided data and A data in the same random-access unit. For a random-access unit that includes multiple pieces of divided data belonging to B data, each piece of divided data belonging to B data in the random-access unit may include difference information indicating the difference between the piece of divided data and A data, or may include difference information indicating the difference between the piece of divided data and the preceding piece of divided data belonging to A or B data.

Although the pieces of divided data have been described above, the above description also applies to frames.

This embodiment has been described mainly with reference to the examples in which the sections or partitions divide the BB containing all the pieces of divided data (FIG.

111). Advantageously, for other types of sections, the methods in this embodiment will similarly reduce the code amount.

Figure 111:
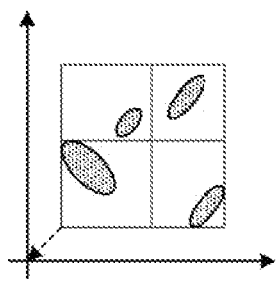
FIG. 111 is a diagram illustrating another example of sections according to Embodiment 8.

To divide the BB containing all the pieces of divided data as shown in FIG. 111, the three-dimensional data encoding device may shift the positions of the pieces of divided data with reference to the minimum value of the BB and then divide the point cloud data shifted. If the point cloud data is scaled or quantized, the three-dimensional data encoding device may divide the point cloud data scaled or quantized, or may divide the point cloud data yet to be scaled or quantized.

Figure 112:
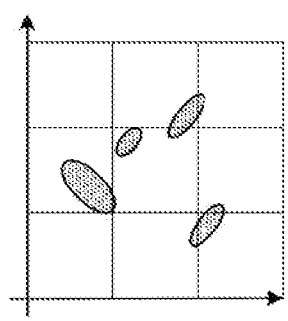
FIG. 112 is a diagram illustrating another example of sections according to Embodiment 8.

As shown in FIG. 112, the three-dimensional data encoding device may set the sections according to the coordinate system of the input point cloud data. In this case, the three-dimensional data encoding device does not shift the positions with reference to the minimum value point of the BB for the point cloud data.

Figure 113:
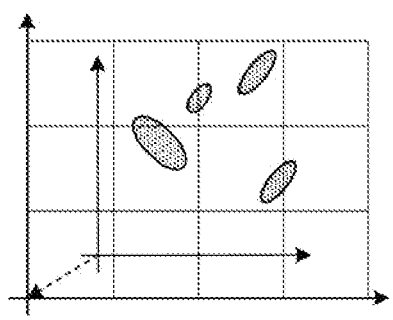
FIG. 113 is a diagram illustrating another example of sections according to Embodiment 8.

As shown in FIG. 113, the three-dimensional data encoding device may set the sections according to a higher-order coordinate system higher than the coordinate system of the point cloud data. For example, the three-dimensional data encoding device may set the sections based on the GPS coordinates of map data.

In this case, the three-dimensional data encoding device may store, in the bitstream, relative position information on the point cloud coordinate system relative to the higher-order coordinate system, and send the bitstream. For example, a sensor such as an in-vehicle Lidar may sense the point cloud data while travelling, and the three-dimensional data encoding device may send sensor position information (the GPS coordinates, acceleration, speed, and travelling distance) as the relative position information. If the point cloud data has a time-series frame structure, the three-dimensional data encoding device may store, in the bitstream, time-series sensor position information on a frame basis, and send the bitstream. The higher-order coordinate system may indicate absolute coordinates, or relative coordinates based on the absolute coordinates. A coordinate system further higher than the higher-order coordinate system may serve as the higher-order coordinate system.

Figure 114:
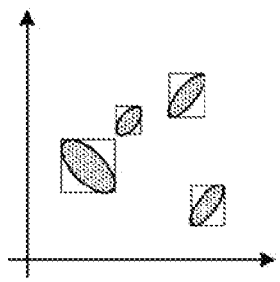
FIG. 114 is a diagram illustrating another example of sections according to Embodiment 8.

As shown in FIG. 114, the three-dimensional data encoding device may determine the sections based on objects or data attributes of the point cloud data. For example, the three-dimensional data encoding device may determine the sections based on the result of image recognition. The sections in this case may include overlapping areas. The three-dimensional data encoding device may cluster the points in the point clouds based on predetermined attributes, divide the data based on the number of points, or determine the sections so that the sections have substantially the same number of point clouds.

The three-dimensional data encoding device may signal the number of points encoded, and the three-dimensional data decoding device may use the number of points to decode the point cloud data.

Data to be encoded are set for each frame or for each piece of divided data created by dividing each frame. The number of points encoded is typically stored in the corresponding data header. The number of points encoded may be signaled in the following manner; a reference value may be stored in the common metadata, and difference information indicating the difference between the number of points and the reference value may be stored in each data header.

Figure 115:
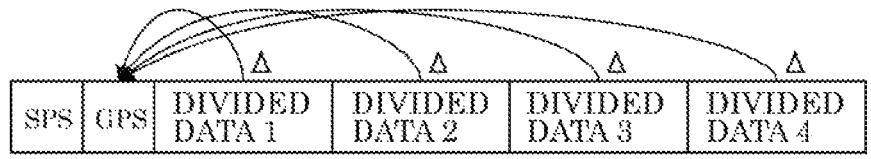
FIG. 115 is a diagram illustrating another exemplary data structure according to Embodiment 8.

For example, as shown in FIG. 115, the three-dimensional data encoding device may store the reference number A of points (i.e., the reference value) in the GPS or SPS, and store, in each data header, the number B(i) of points (i is the index of the piece of divided data), which is the difference between the number of points and the reference number A of points. The number of points in the piece of divided data (i) is obtained by adding the number B(i) to the number A. The three-dimensional data decoding device therefore calculates A+B(i) and decodes the data using the calculated value as the number of points in the piece of divided data (i).

Figure 116:
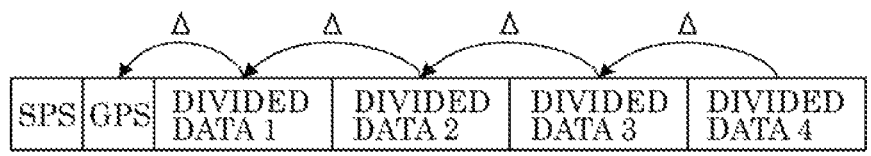
FIG. 116 is a diagram illustrating another exemplary data structure according to Embodiment 8.

Alternatively, as shown in FIG. 116, the three-dimensional data encoding device may store, in each data header, difference information indicating the difference between the number of points and the number of points in the preceding piece of divided data. In this case, the number of points in the piece of divided data (i) is obtained by adding the numbers B(1)-B(i) in the preceding pieces of divided data to the number A.

Figure 117:
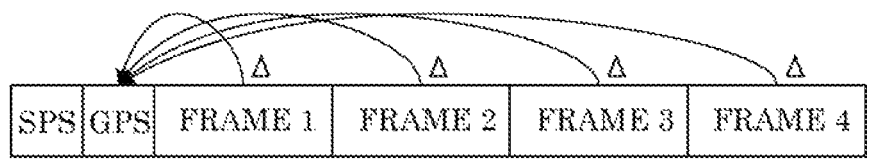
FIG. 117 is a diagram illustrating another exemplary data structure according to Embodiment 8.

If, for example, the point cloud data is time-series data having a multi-frame structure as shown in FIG. 117, the three-dimensional data encoding device may store, in the common SPS, a reference value of the number of points encoded, and store, in the GPS or each data header, a relative value of each frame relative to the reference value. The three-dimensional data encoding device may also store, in the GPS, the difference (a relative value) between each number of points and the reference value stored in the SPS and further store, in each data header, the difference (a relative value) between the number of points and the sum of the reference value in the SPS and the difference value in the GPS. This will advantageously reduce the code amount in the overhead.

One possible manner of dividing the point cloud data is dividing the point cloud data into pieces having substantially the same number of points. In this case, a method as in FIG. 115 may be used.

Figure 118:
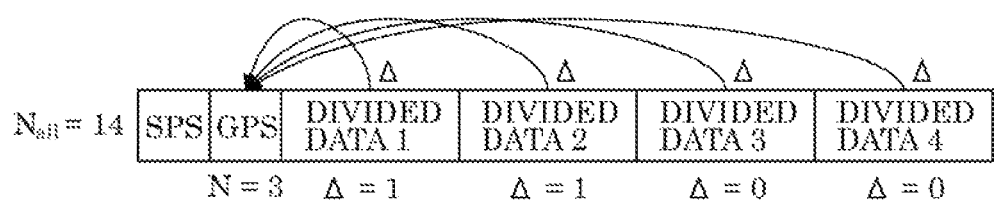
FIG. 118 is a diagram illustrating another exemplary data structure according to Embodiment 8.

As an example, as shown in FIG. 118, the point cloud data may be divided such that the differences among the numbers of points in the pieces of divided data are not greater than one. Δ may be indicated by 1-bit data. For Δ=0, the difference information need not be indicated.

Figure 119:
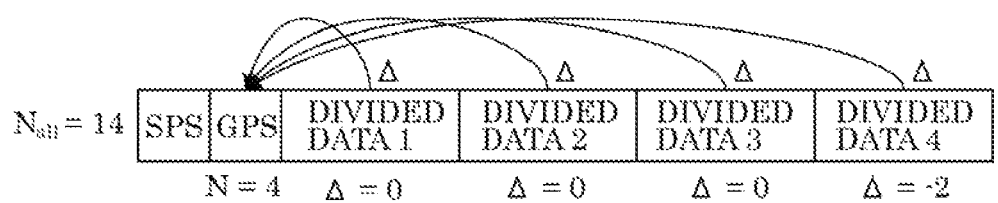

As another example, as shown in FIG. 119, most pieces of divided data may include the same number of points as the reference number indicated in the GPS, and the remaining pieces of divided data may indicate the difference between the number of points and the reference number. For Δ=0, the difference information need not be indicated.

Any of the above methods in FIGS. 115 to 119 will advantageously reduce the information amount in the overhead.

Figure 120:
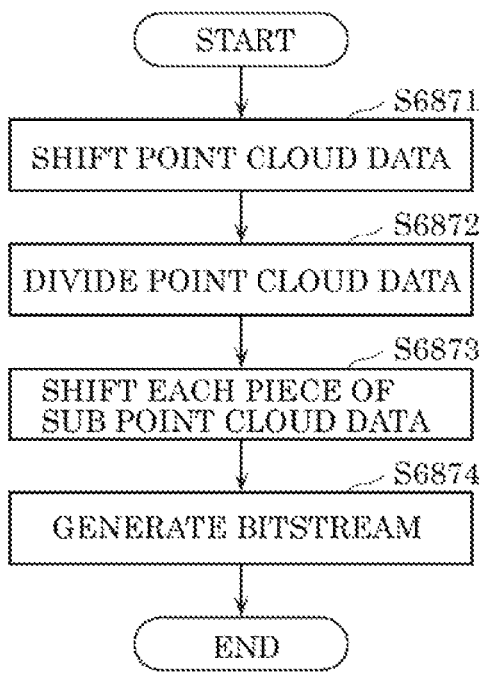

As stated above, the three-dimensional data encoding device according to the present embodiment performs the process shown by FIG. 120. The three-dimensional data encoding device encodes point cloud data indicating three-dimensional positions in a three-dimensional space. The three-dimensional data encoding device shifts the point cloud data by a first shift amount (S6871). Next, the three-dimensional data encoding device divides the point cloud data into pieces of sub point cloud data by dividing the three-dimensional space into subspaces (S6872). The three-dimensional data encoding device shifts each of the pieces of sub point cloud data by a second shift amount based on a position of one of the subspaces that includes the sub point cloud data, the pieces of sub point cloud data being included in the point cloud data shifted by the first shift amount (S6873). The three-dimensional data encoding device encodes the pieces of sub point cloud data shifted, to generate a bitstream (S6874). The bitstream includes first shift information for calculating the first shift amount, and pieces of second shift information each for calculating a corresponding one of second shift amounts by which the pieces of sub point cloud data are shifted and each of which is the second shift amount. According to this method, the pieces of sub point cloud data created by dividing are encoded after being shifted. This can reduce the amount of geometry information on each piece of sub point cloud data, thereby improving the coding efficiency.

For example, the subspaces are equal in size. Each of the pieces of second shift information includes first identification information for identifying a total number of the subspaces and a corresponding one of the subspaces. This can reduce the amount of the second shift information, thereby improving the coding efficiency.

For example, the first identification information is a Morton order corresponding to each of the subspaces.

For example, each of the subspaces is a space obtained by dividing one three-dimensional space using an octree. The bitstream includes second identification information indicating that the subspace is a space obtained by dividing one three-dimensional space using an octree, and depth information indicating a depth of the octree. As above, the point cloud data in the three-dimensional space is divided using the octree. This can reduce the amount of geometry information on each piece of subspace point cloud data, thereby improving the coding efficiency.

For example, the dividing of the point cloud data is performed after the point cloud data is shifted by the first shift amount.

For example, the three-dimensional data encoding device includes a processor and memory, and the processor performs the above process using the memory.

Figure 121:
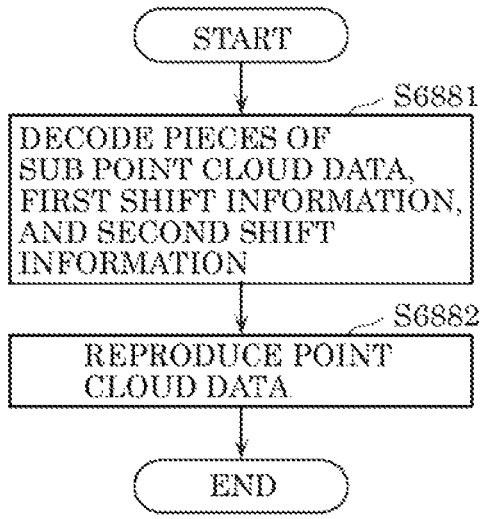

The three-dimensional data decoding device according to the present embodiment performs the process shown by FIG. 121. The three-dimensional data decoding device decodes pieces of sub point cloud data, first shift information, and second shift information from a bitstream, the pieces of sub point cloud data (i) being obtained by dividing point cloud data indicating three-dimensional positions by dividing a three-dimensional space into subspaces and (ii) being each shifted by a first shift amount and a corresponding second shift amount, the first shift information being for calculating the first shift amount, the pieces of second shift information being each for calculating a corresponding one of second shift amounts by which the pieces of sub point cloud data are shifted and each of which is the corresponding second shift amount (S6881). The three-dimensional data decoding device reproduces the point cloud data by shifting each of the pieces of sub point cloud data by a shift amount obtained by adding the first shift amount and the corresponding second shift amount (S6882). According to this method, the point cloud data can be correctly decoded using the bitstream with improved coding efficiency.

For example, the subspaces are equal in size. Each of the pieces of second shift information includes first identification information for identifying a total number of the subspaces and a corresponding one of the subspaces. This can reduce the amount of the second shift information, thereby improving the coding efficiency.

For example, the first identification information is a Morton order corresponding to each of the subspaces.

For example, each of the subspaces is a space obtained by dividing one three-dimensional space using an octree. The bitstream includes second identification information indicating that the subspace is a space obtained by dividing one three-dimensional space using an octree, and depth information indicating a depth of the octree. As above, the point cloud data in the three-dimensional space is divided using the octree. This can reduce the amount of geometry information on each piece of subspace point cloud data, thereby improving the coding efficiency.

For example, the three-dimensional data decoding device includes a processor and memory, and the processor performs the above process using the memory.

Embodiment 9

In this embodiment, an example of a method of calculating an individual position shift amount and a divisional area position shift amount in the calculation of the position shift amount using the divisional area information described above will be described.

Figure 122:
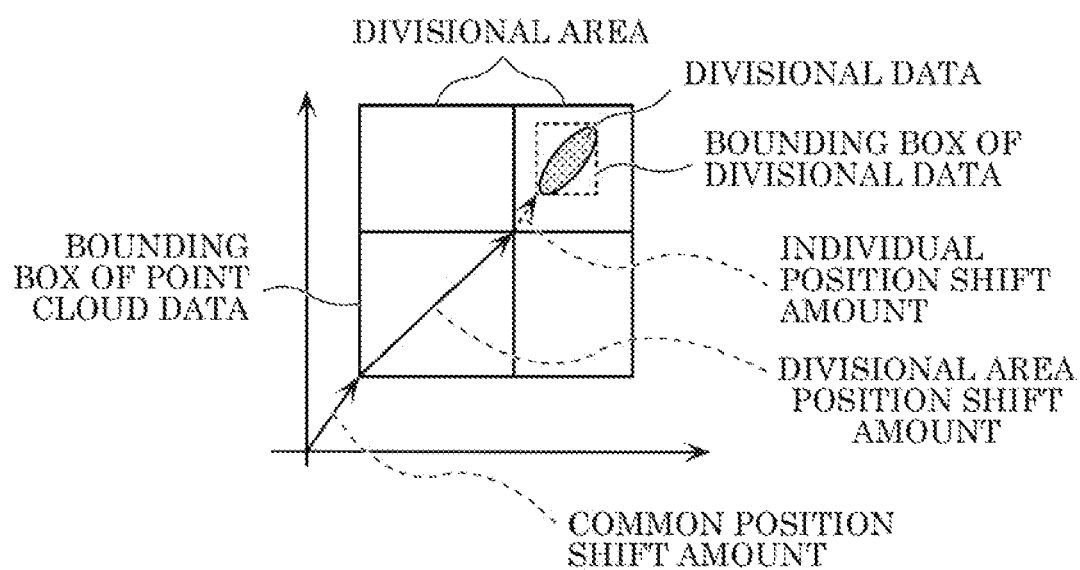

FIG. 122 is a diagram showing an example of an individual position shift amount and a divisional area position shift amount. As shown in FIG. 122, a common position shift amount is the difference between the origin and the minimum coordinates of the bounding box of point cloud data (three-dimensional data). The bounding box of point cloud data is divided into a plurality of divisional areas. A divisional area position shift amount is the difference between the minimum coordinates of the bounding box of point cloud data and the minimum coordinates of a divisional area. An individual position shift amount is the difference between the minimum coordinates of a divisional area and the minimum coordinates of the bounding box of divisional data, which is point cloud data included in the divisional area.

Note that, although an example is shown here in which the common position shift amount and the divisional area position shift amount are separately defined, there does not need to be the common position shift amount. Alternatively, the divisional area position shift amount may be a sum of the common position shift amount and the divisional area position shift amount shown in FIG. 122. Alternatively, the individual position shift amount may be a vector obtained by summing the divisional area position shift amount and the individual position shift amount shown in FIG. 122.

Figure 123:
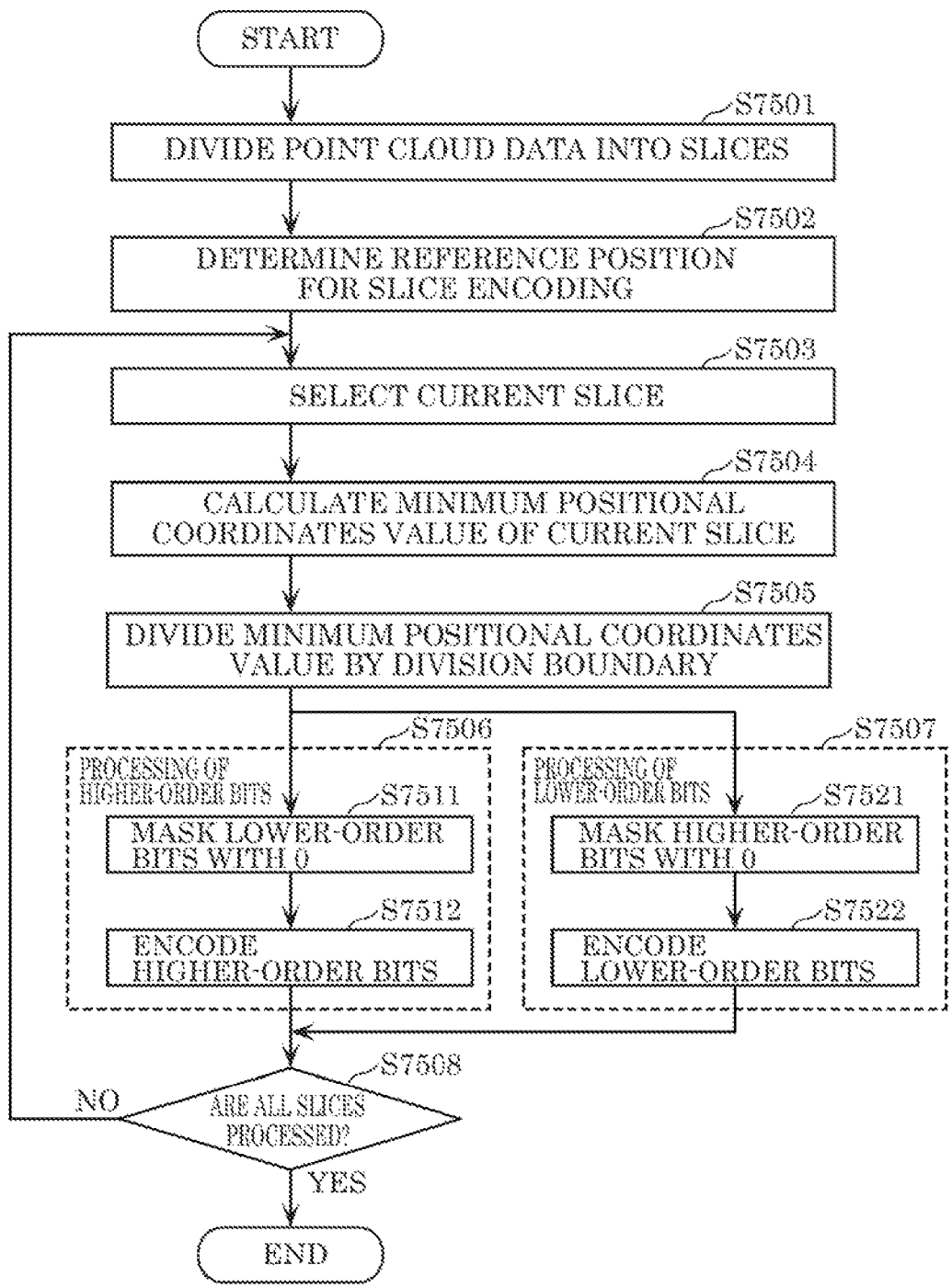

FIG. 123 is a flowchart of a process of calculating the divisional area position shift amount and the individual position shift amount according to this embodiment. First, the three-dimensional data encoding device divides point cloud data into slices, which are divisional data (S7501). Note that any dividing method can be used. The plurality of divisional areas does not need to overlap and may overlap with each other.

The three-dimensional data encoding device then determines to designate a minimum value (minimum coordinates) of the bounding box of point cloud (three-dimensional point) data forming each slice as a reference position (origin coordinates) for slice encoding (S7502).

The three-dimensional data encoding device then selects a current slice to be processed from among the plurality of slices, and starts processing of each slice (S7503). First, the three-dimensional data encoding device calculates a minimum positional coordinates value of the bounding box of the point cloud data (divisional data) forming the current slice (S7504). Here, the individual position shift amount is the difference between the minimum positional coordinates value of the bounding box of the point cloud data forming the current slice and the minimum coordinates value (that is, the common position shift amount) of the bounding box of the point cloud data, and corresponds to the sum of the divisional area position shift amount and the individual position shift amount shown in FIG. 122.

The three-dimensional data encoding device then divides the minimum positional coordinates value by a division boundary (S7505). For example, the division boundary may be common to or different between all axes (x, y, z) of all slices. The division boundary may be common in a slice or may be common to two or more arbitrary axes.

Figure 124:
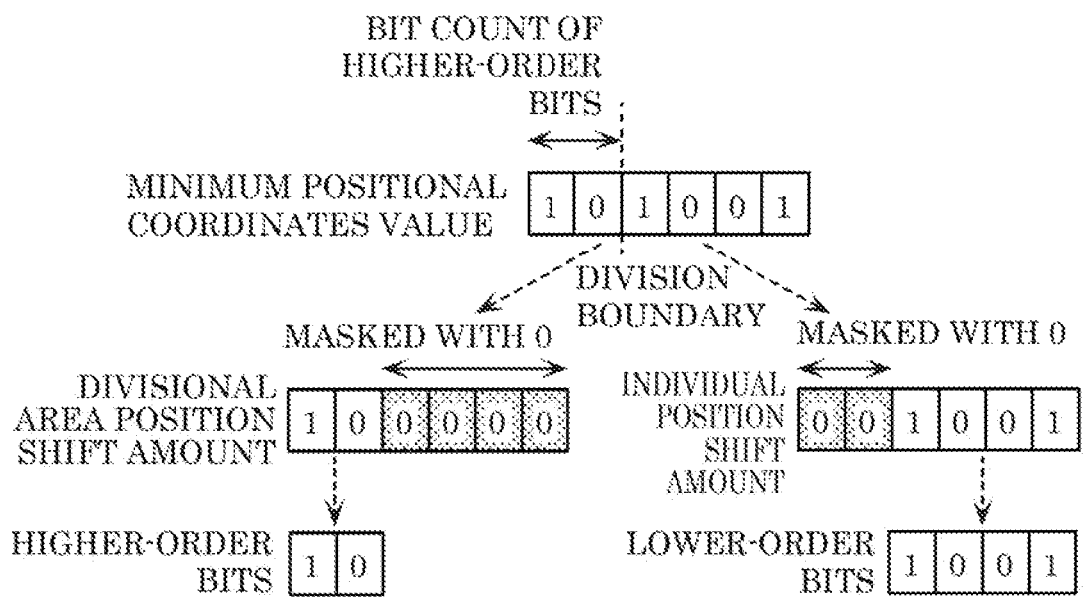

FIG. 124 is a diagram schematically showing a process of dividing a minimum positional coordinates value. As shown in FIG. 124, a minimum positional coordinates value is divided into higher-order bits and lower-order bits by a division boundary.

For example, the bit count of the higher-order bits indicating the division boundary is set at int(k*N). Here, N represents the bit count of the minimum positional coordinates value, k (k<=1) is a fixedly or adaptively set coefficient. In this way, the division boundary is determined based on the bit count of the minimum positional coordinates value. In this way, the minimum positional coordinates value can be divided into the divisional area position shift amount and the individual position shift amount by dividing the minimum positional coordinates value into higher-order bits and lower-order bits.

The three-dimensional data encoding device then performs processing of the higher-order bits (S7506). Specifically, the three-dimensional data encoding device masks the lower-order bits with 0 (S7511). In this way, the number of bits can be reduced. The three-dimensional data encoding device then extracts the higher-order bits, and encodes the extracted higher-order bits (S7512).

The three-dimensional data encoding device also performs processing of the lower-order bits (S7507). Specifically, the three-dimensional data encoding device masks the higher-order bits with 0 (S7521). The three-dimensional data encoding device then extracts the lower-order bits, and encodes the extracted lower-order bits (S7522).

If processing of all the slices is not completed (if No in S7508), the three-dimensional data encoding device selects a next slice as a current slice (S7503), and performs step S7504 and the following steps again. If processing of all the slices is completed (if Yes in S7508), the three-dimensional data encoding device ends the process.

The three-dimensional data encoding device also moves (shifts) the positions of a plurality of three-dimensional points in the current slice according to the minimum positional coordinates value (the sum of the divisional area position shift amount and the individual position shift amount), and encodes the positions of the plurality of moved three-dimensional points, for example. That is, the three-dimensional data encoding device encodes the differences between the minimum positional coordinates and the positions of the plurality of three-dimensional points in the current slice.

Figure 125:
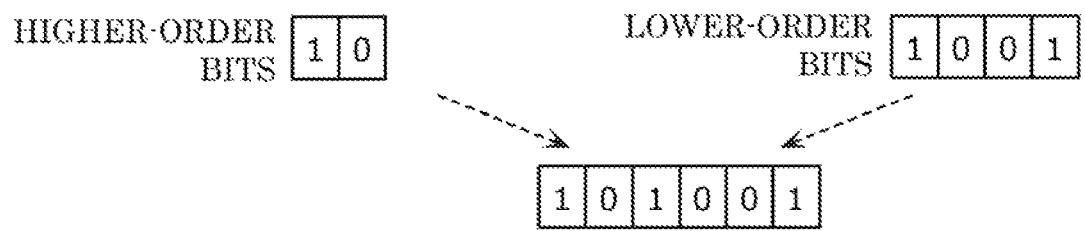

FIG. 125 is a diagram showing an example of the calculation of a shift amount in the three-dimensional data decoding device. The three-dimensional data decoding device decodes the lower-order bits and the higher-order bits from the bitstream, and calculates the minimum positional coordinates value by combining the obtained lower-order bits and higher-order bits.

The three-dimensional data decoding device also decodes the positions of the plurality of moved (shifted) three-dimensional points from the bitstream, for example. The three-dimensional data decoding device moves (shifts) the positions of the plurality of moved three-dimensional points in the current slice according to the calculated minimum positional coordinates value (sum of the divisional area position shift amount and the individual position shift amount) to reproduce the positions of the plurality of three-dimensional points. Note that the movement made in the three-dimensional data decoding device is a movement in the opposite direction to the movement made in the three-dimensional data encoding device.

Figure 126:
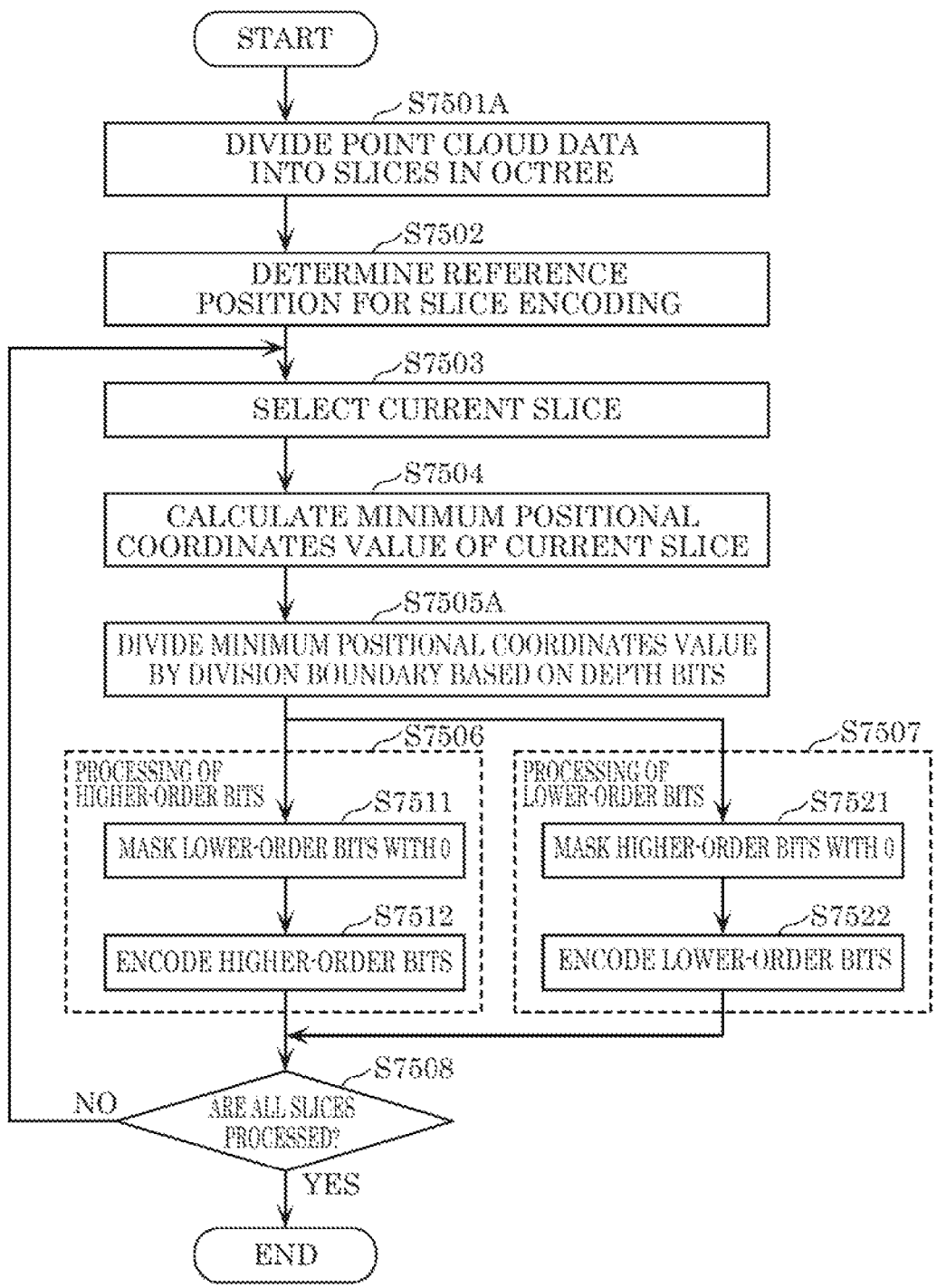

Next, a method of calculating the individual position shift amount and the divisional area position shift amount in the case where an octree dividing method is used will be described. FIG. 126 is a flowchart of a process of calculating the divisional area position shift amount and the individual position shift amount in this case. Note that the process shown in FIG. 126 differs from the process shown in FIG. 123 in that S7501 is replaced by S7501A, and S7505 is replaced by S7505A.

First, the three-dimensional data encoding device divides point cloud data into slices using an octree dividing method (S7501A). Note that steps S7502 to S7504 are the same as those in FIG. 123.

The three-dimensional data encoding device then divides the minimum positional coordinates value by a division boundary based on depth bits (S7505A). For example, the division boundary is set at the m-th bit from the top of the minimum positional coordinates value, where m represents a value of the depth bits. Here, the depth bits indicate the depth of the layer in the octree.

Figure 127:
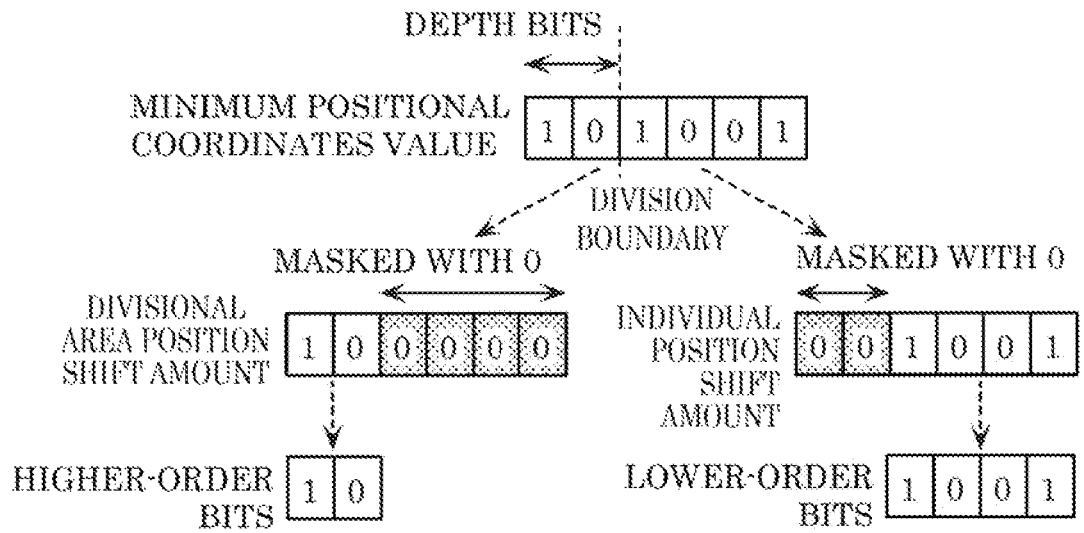

FIG. 127 is a diagram schematically showing a process of dividing the minimum positional coordinates value in this case. As shown in FIG. 127, the division boundary is set at the m-th bit from the top of the minimum positional coordinates value, where m represents a value of the depth bits.

For example, the division is performed for all slices and all axes using a division boundary based on a common depth bit. In this case, the minimum positional coordinates value whose lower-order bits are masked with a value 0 indicates the divisional area position shift amount. The value of the higher-order bits is equivalent to the Morton order that indicates the order of the divisional areas. The lower-order bits are likely to be 0, and the coding efficiency can be improved. Note that step S7506 and the following steps are the same as those in FIG. 123.

Note that the three-dimensional data encoding device may perform the process in multiples steps by further dividing one or both of the higher-order bits and the lower-order bits into higher-order bits and lower-order bits.

Figure 128:
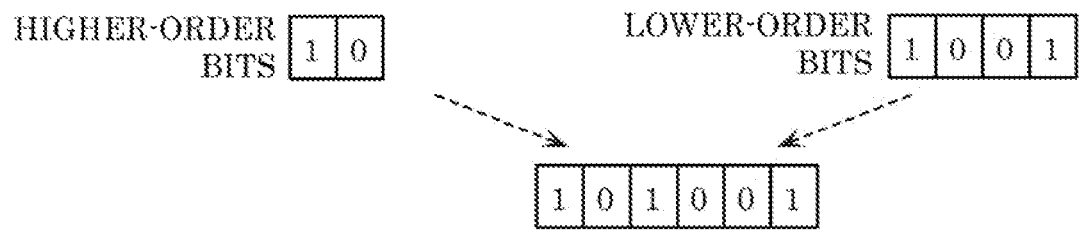

FIG. 128 is a diagram showing an example of the calculation of a shift amount in the three-dimensional data decoding device. The three-dimensional data decoding device decodes the lower-order bits and the higher-order bits from the bitstream, and calculates the minimum positional coordinates value by combining the obtained lower-order bits and higher-order bits.

Next, a method of transmitting boundary information indicating the division boundary will be described. The boundary information may indicate the bit count of the higher-order bits or the bit count of the lower-order bits.

When a different division boundary (bit count) is used for each slice or each axis, the boundary information indicates each division boundary (bit count). When a common division boundary is used, boundary information common to a plurality of slices that indicates a common division boundary may be stored in the bitstream. Alternatively, boundary information that indicates a slice or axis division boundary for each slice or each axis may be provided, and a plurality of pieces of boundary information may indicate the same division boundary. Furthermore, a flag may be used to switch between these methods.

The three-dimensional data encoding device may compare the bit count of higher-order bits and the bit count of lower-order bits, and the boundary information may indicate the smaller bit count of the bit count of higher-order bits and the bit count of lower-order bits. In that case, the three-dimensional data encoding device stores, in the bitstream, a flag that indicates which of the bit count of higher-order bits and the bit count of lower-order bits is indicated by the boundary information. The three-dimensional data decoding device determines, based on the flag, which of the bit count of higher-order bits and the bit count of lower-order bits is indicated by the boundary information, and changes the method of calculating the position shift amount.

Note that, when the three-dimensional data encoding device encodes and transmits the lower-order bits, the three-dimensional data encoding device does not need to transmit the bit count of lower-order bits, because the three-dimensional data decoding device can calculate the bit count of lower-order bits based on the lower-order bits.

The three-dimensional data encoding device may change the method of determining the division boundary (the bit count of higher-order bits or the bit count of lower-order bits) according to the dividing method. For example, the three-dimensional data encoding device uses the depth bits when using the octree division, and sets the bit count of higher-order bits to be int(k*N) when using another dividing method, for example.

In the following, another example of the calculation of the shift amount will be described. The three-dimensional data encoding device may transmit the higher-order bits and does not need to transmit the lower-order bits. For example, the three-dimensional data encoding device may transmit the higher-order bits and does not need to transmit the lower-order bits when the divisional area agrees with the encoding area. Note that the three-dimensional data encoding device may also transmit the higher-order bits and does not need to transmit the lower-order bits when the divisional area does not agree with the encoding area.

When the three-dimensional data encoding device does not transmit the lower-order bits, the three-dimensional data encoding device transmits the bit count that indicates the division boundary. The transmission method is the same as the method of transmitting both the higher-order bits and the lower-order bits, for example.

Figure 129:
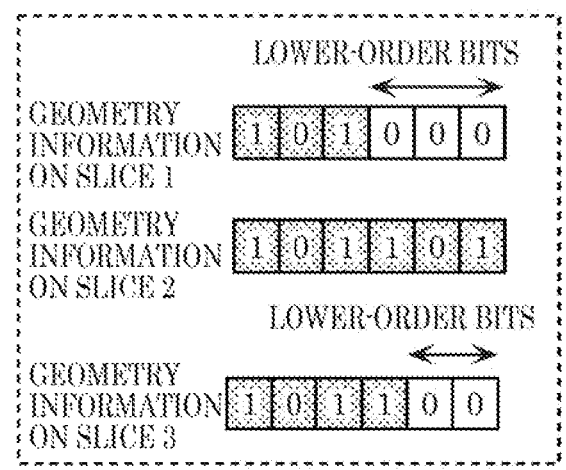

When the three-dimensional data encoding device does not transmit the lower-order bits, the three-dimensional data encoding device may count the lowest-order consecutive bits of the value 0 of the geometry information (minimum positional coordinates value), and set the lowest-order consecutive bits of the value of 0 as the lower-order bits. In this way, the number of bits can be reduced without changing the value of the geometry information. FIG. 129 is a diagram showing an example of the setting of the lower-order bits in this case. For slice 1 shown in FIG. 129, the lowest-order three bits are 0, and therefore, these three bits are set as lower-order bits. For slice 2 shown in FIG. 129, the lowest-order bit is 1, and therefore, no lower-order bits are set. For slice 3 shown in FIG. 129, the lowest-order two bits are 0, and therefore, these two bits are set as lower-order bits.

When the bit count is shared between slices, the three-dimensional data encoding device may count the number of the lowest-order consecutive bits of the value 0 of each of the x-coordinate, y-coordinate, and z-coordinate of each slice, and set the smallest number as the bit count of lower-order bits. That is, the three-dimensional data encoding device may set the lowest-order consecutive bits of the x-coordinate, y-coordinate, and z-coordinate all of which are 0 as lower-order bits. In that case, the number of bits can be reduced without changing the minimum positional coordinates value. When all the bits are 0, the three-dimensional data encoding device does not need to perform the processing, and may transmit the value 0 as it is.

The three-dimensional data encoding device may transmit the total bit count and the bit count of higher-order bits. In that case, the three-dimensional data decoding device may calculate the bit count of lower-order bits by subtracting the bit count of higher-order bits from the total bit count.

The three-dimensional data encoding device may set bits including a bit of the value 1 as lower-order bits. In that case, the lower-order bits are not transmitted, so that the geometry information obtained by decoding is different from the value of the original geometry information. That is, the geometry information is quantized.

Figure 130:
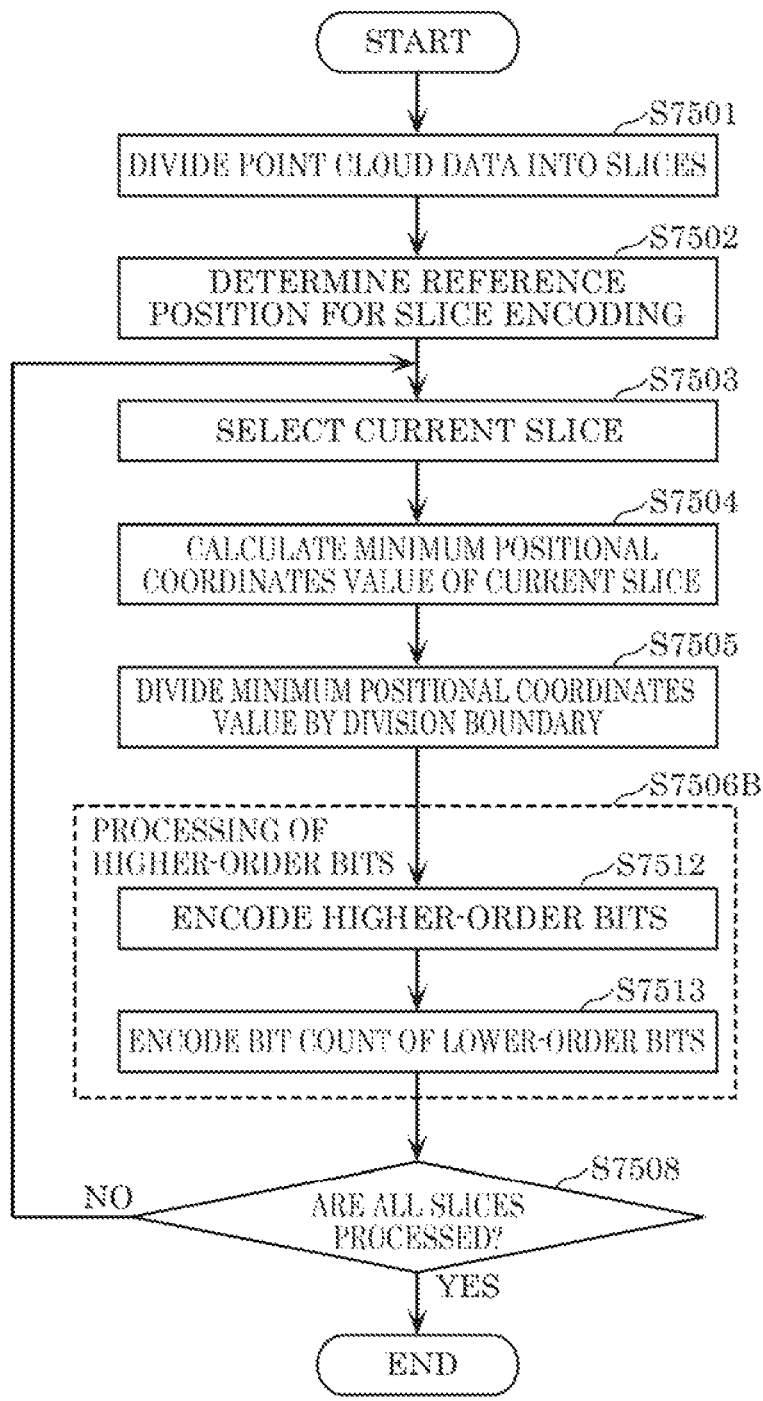

FIG. 130 is a flowchart of a process of calculating the shift amount in the case where lower-order bits are not transmitted. The process shown in FIG. 130 differs from the process shown in FIG. 123 in that S7506 is replaced by S7506B, and S7507 is omitted.

Following step S7505, the three-dimensional data encoding device performs processing of the higher-order bits (S7506B). Specifically, the three-dimensional data encoding device extracts the higher-order bits, and encodes the extracted higher-order bits (S7512). The three-dimensional data encoding device then encodes the bit count of lower-order bits (referred to also as a lower-order bit count) (S7513). That is, the three-dimensional data encoding device stores information indicating the bit count of lower-order bits in the bitstream.

For example, the three-dimensional data encoding device moves (shifts) the positions of a plurality of three-dimensional points in the current slice according to the minimum positional coordinates value with all the lower-order bits replaced with 0 (the divisional area position shift amount), and encodes the positions of the plurality of moved three-dimensional points. That is, the three-dimensional data encoding device encodes the differences between the positions of a plurality of three-dimensional points in the current slice and the minimum positional coordinates value with all the lower-order bits replaced with 0.

For example, the three-dimensional data decoding device decodes the positions of the plurality of moved three-dimensional points from the bitstream. The three-dimensional data decoding device also calculates the shift amount (divisional area position shift amount), which is constituted by higher-order bits having values of the decoded higher-order bits and lower-order bits all having the value of 0 indicated by the lower-order bit count. The three-dimensional data decoding device moves (shifts) the positions of the plurality of moved three-dimensional points in the current slice according to the calculated shift amount (divisional area position shift amount) to reproduce the positions of the plurality of three-dimensional points. Note that the movement made in the three-dimensional data decoding device is a movement in the opposite direction to the movement made in the three-dimensional data encoding device.

FIG. 131 is a flowchart of a process of calculating the shift amount in the case where lower-order bits are not transmitted in the case where the octree dividing method is used. Note that the process shown in FIG. 131 differs from the process shown in FIG. 126 in that S7506 is replaced by S7506B, and S7507 is omitted.

In step S7505A, the three-dimensional data encoding device divides the minimum positional coordinates value by a division boundary based on depth bits. Here, since the lower-order bits are not encoded, this step is equivalent to quantizing the minimum positional coordinates value at the m-th bit from the top of the minimum positional coordinates value, where m represents a value of the depth bits. In the case of the octree division, the highest-order m bits are common to the coordinates of a plurality of points included in a divisional area, where m represents a value of the depth bits. Therefore, the three-dimensional data encoding device may extract, as the higher-order bits, the highest-order m bits of the points included in all of the plurality of point clouds forming a slice, where m represents a value of the depth bits.

The three-dimensional data encoding device then performs processing of the higher-order bits (S7506B). Specifically, the three-dimensional data encoding device extracts the higher-order bits, and encodes the extracted higher-order bits (S7512). The three-dimensional data encoding device also encodes the bit count of the lower-order bits (S7513). That is, the three-dimensional data encoding device stores, in the bitstream, information that indicates the bit count of the lower-order bits.

Next, syntax examples of the bitstream will be described. FIG. 132 is a diagram showing a syntax example of a geometry information parameter set (GPS). GPS is a parameter set (control information) of geometry information on a frame basis, and is a parameter set common to a plurality of slices (divisional areas).

A GPS includes gheader_origin_present_flag, gheader_origin2_present_flag, origin_shift_bit_present_flag, and origin_shift_bit.

gheader_origin_present_flag is a flag that indicates whether a geometry information header (Geometry_header) includes first shift geometry information or not. The first shift geometry information indicates the value of a higher-order bit, for example. The geometry information header is a header of geometry information on a slice (divisional area) basis.

gheader_origin2_present_flag is a flag that indicates whether the geometry information header includes second shift geometry information or not. The second shift geometry information indicates the value of a lower-order bit, for example.

origin_shift_bit_present_flag is a flag that indicates the bit count (the bit count of the lower-order bits, for example) indicating the division boundary is included in the GPS or in the geometry information header. For example, when using a division boundary (bit count) common to a plurality of slices, the three-dimensional data encoding device sets origin_shift_bit_present_flag to be on (a value of 1, for example), and stores the bit count (origin_shift_bit) in the GPS. On the other hand, when using different division boundaries (bit counts) for a plurality of slices, the three-dimensional data encoding device sets origin_shift_bit_present_flag to be off (a value of 0, for example), and stores the bit count (origin_shift_bit) in the geometry information header for each slice.

origin_shift_bit indicates the bit count (the bit count of the lower-order bits) indicating the division boundary. origin_shift_bit is included in the GPS when origin_shift_bit_present_flag is on (the value of 1, for example), and is not included in the GPS when origin_shift_bit_present_flag is off (the value of 0, for example).

FIG. 133 is a diagram showing a syntax example of the geometry information header (Geometry_header). The geometry information header includes BB_origin_x, BB_origin_y, BB_origin_z, origin_shift_bit, BB_origin2_x, BB_origin2_, BB_origin2_z, and origin2_shift_bit.

BB_origin_x, BB_origin_y, and BB_origin_z indicate values of the higher-order bits of the shift amount (minimum positional coordinates value). BB_origin_x, BB_origin_y, and BB_origin_z are included in the geometry information header when gheader_origin_present_flag is on (the value of 1, for example), and is not included in the geometry information header when gheader_origin_present_flag is off (the value of 0, for example).

Origin_shift_bit indicates the bit count (the bit count of the lower-order bits) indicating the division boundary. origin_shift_bit is included in the geometry information header when gheader_origin_present_flag is on (the value of 1, for example) and origin_shift_bit_present_flag is off (the value of 0, for example), and is not included in the geometry information header otherwise.

BB_origin2_x, BB_origin2_y, and BB_origin2_z indicate the lower-order bits of the shift amount. BB_origin2_x, BB_origin2_y, and BB_origin2_z are included in the geometry information header when gheader_origin2_present_flag is on (the value of 1, for example), and is not included in the geometry information header when gheader_origin2_present_flag is off (the value of 0, for example).

origin2_shift_bit is included in the geometry information header when the lower-order bits are to be further divided into higher-order bits and lower-order bits. origin2_shift_bit indicates the bit count of the lower-order bits obtained by the further division of the lower-order bits. origin2_shift_bit is included in the geometry information header when gheader_origin2_present_flag is on (the value of 1, for example), and is not included in the geometry information header when gheader_origin2_present_flag is off (the value of 0, for example).

As described above, when gheader_origin2_present_flag is 1, the second shift geometry information is included in addition to the first shift geometry information. Note that the three-dimensional data encoding device first uses the first shift geometry information and then uses the second shift geometry information. That is, the three-dimensional data encoding device does not transmit the second shift geometry information without transmitting the first shift geometry information.

Next, examples of combinations of the methods of determining the shift amount will be described. The three-dimensional data encoding device may switch between transmission methods based on the dividing method, or switch between transmission methods based on another method than the dividing method. For example, the three-dimensional data encoding device may use a method of transmitting both higher-order bits and lower-order bits when the octree dividing method is used, and use a method of transmitting higher-order bits but not transmitting lower-order bits when another dividing method is used.

FIG. 134 is a flowchart showing an example of the process of transmitting the shift amount in this case. First, the three-dimensional data encoding device determines a data dividing method (S7531). When the determined data dividing method is a method other than the octree dividing method (if No in S7532), the three-dimensional data encoding device transmits the higher-order bits but does not transmit the lower-order bits (S7533). The three-dimensional data encoding device transmits the bit count of the lower-order bits (S7534). On the other hand, if the determined data dividing method is the octree dividing method (if Yes in S7532), the three-dimensional data encoding device transmits both the higher-order bits and the lower-order bits (S7535). The three-dimensional data encoding device does not transmit the bit count of the lower-order bits (S7536).

Note that although an example has been described here in which both the higher-order bits and the lower-order bits are transmitted when the octree dividing method is used, the three-dimensional data encoding device may transmit the higher-order bits but does not transmit the lower-order bits when the octree dividing method is used, and transmit both the higher-order bits and the lower-order bits when a method other than the octree dividing method is used. The three-dimensional data encoding device may transmit the bit count of the lower-order bits when both the higher-order bits and the lower-order bits are transmitted.

The three-dimensional data encoding device may switch between quantization methods or between methods of calculating the bit count for the division boundary based on the dividing method. FIG. 135 is a flowchart of a process of calculating the shift amount in this case. First, the three-dimensional data encoding device determines a data dividing method (S7541).

If the determined data dividing method is not the octree dividing method (if No in S7542), the three-dimensional data encoding device calculates the individual position shift amount (the minimum value of an individual BB, for example) for each piece of divisional data (each slice), and quantizes the calculated individual position shift amount for each piece of divisional data in a predetermined method (S7543). For example, the three-dimensional data encoding device performs the quantization by extracting higher-order bits of the individual position shift amount. Note that the three-dimensional data encoding device may use a method that does not involve the quantization. The three-dimensional data encoding device describes the bit count for the division boundary used for the quantization in the header of each piece of divisional data (S7544).

On the other hand, if the determined data dividing method is the octree dividing method (if Yes in S7542), the three-dimensional data encoding device quantizes the individual position shift amount for all divisional data using depth information (depth bits, for example) in the octree division (S7545). The three-dimensional data encoding device also describes the bit count for the division boundary used for the quantization in metadata common to a plurality of pieces of divisional data (S7546).

As stated above, the three-dimensional data encoding device according to the present embodiment performs the process shown by FIG. 136. The three-dimensional data encoding device encodes point cloud data indicating three-dimensional positions in a three-dimensional space. The three-dimensional data encoding device divides the point cloud data into pieces of sub point cloud data (e.g., slices) by dividing the three-dimensional space into subspaces (e.g., divisional areas) (S7551). Next, the three-dimensional data encoding device shifts each of the pieces of sub point cloud data in accordance with a predetermined shift amount (e.g., a divisional area position shift amount) (S7552). Then, the three-dimensional data encoding device generates a bitstream by encoding the pieces of sub point cloud data shifted (S7553). The bitstream includes first control information (e.g., GPS) common to the pieces of sub point cloud data, and pieces of second control information (geometry information headers) for each of the pieces of sub point cloud data, the first control information including first information (e.g., origin_shift_bit) about a shift amount of each of the pieces of sub point cloud data.

With such a configuration, the three-dimensional data encoding device is capable of notifying the three-dimensional data decoding device of a shift amount via the first information. In addition, since the first information is common to a plurality of pieces of sub point cloud data, the code amount can be reduced.

For example, the shift amount is based on one of the pieces of sub point cloud data or one of subspaces including the sub point cloud data.

For example, the shift amount includes higher-order bits and lower-order bits. The first information is common to the pieces of sub point cloud data and indicates a bit count of the lower-order bits. Each of the pieces of second control information includes second information (e.g., BB_origin_x, BB_origin_y, BB_origin_z) indicating a value of the higher-order bits included in the shift amount of one of the pieces of sub point cloud data corresponding to the second control information.

With such a configuration, the three-dimensional data encoding device is capable of notifying the three-dimensional data decoding device of a shift amount via the first information and the second information. In addition, since the first information is common to a plurality of pieces of sub point cloud data, the code amount can be reduced.

For example, the first control information includes a flag (e.g., origin_shift_bit_present_flag) that indicates whether information indicating the bit count of the lower-order bits is included in the first control information or each of the pieces of second control information. When the flag indicates that the information indicating the bit count of the lower-order bits is included in the first control information, the first control information includes the first information, and each of the pieces of second control information does not include the information indicating the bit count of the lower-order bits. When the flag indicates that the information indicating the bit count of the lower-order bits is included in each of the pieces of second control information, the second control information includes third information (e.g., origin_shift_bit) indicating the bit count of the lower-order bits included in the shift amount of one of the pieces of sub point cloud data corresponding to the second control information.

With such a configuration, since the three-dimensional data encoding device is capable of selecting whether to share the first information between a plurality of pieces of sub point cloud data, the three-dimensional data encoding device is capable of performing encoding appropriately.

For example, all bits included in the lower-order bits have a value of zero, and the bitstream does not include information indicating a value of the lower-order bits.

For example, the three-dimensional data encoding device includes a processor and memory, and the processor performs the above-described process using the memory.

The three-dimensional data decoding device according to the present embodiment performs the process shown by FIG. 137. The three-dimensional data decoding device decodes, from a bitstream, pieces of sub point cloud data (e.g., slices) each shifted in accordance with a predetermined shift amount (e.g., divisional area position shift amount), the pieces of sub point cloud data being pieces of data into which point cloud data indicating three-dimensional positions is divided by dividing a three-dimensional space into subspaces (e.g., divisional areas) (S7561). In addition, the three-dimensional data decoding device obtains first information (e.g., origin_shift_bit) about a shift amount of each of the pieces of sub point cloud data from first control information (e.g., GPS) that is included in the bitstream and is common to the pieces of sub point cloud data (S7562).

Next, the three-dimensional data decoding device calculates the shift amounts of the pieces of sub point cloud data using the first information (S7563). Then, the three-dimensional data decoding device reproduces the pieces of sub point cloud data by shifting each of the pieces of sub point cloud data decoded and shifted, in accordance with one of the shift amounts corresponding to the sub point cloud data (S7564).

With such a configuration, the three-dimensional data decoding device is capable of calculating a shift amount using the first information. In addition, since the first information is common to a plurality of pieces of sub point cloud data, the code amount can be reduced.

For example, the shift amount is based on one of the pieces of sub point cloud data or one of subspaces including the sub point cloud data.

For example, the shift amount includes higher-order bits and lower-order bits, and the first information is common to the pieces of sub point cloud data and indicates a bit count of the lower-order bits. The three-dimensional data decoding device obtains, from pieces of second control information (e.g., geometry information headers) for each of the pieces of sub point cloud data included in the bitstream, pieces of second information (e.g., BB_origin_x, BB_origin_y, BB_origin_z) indicating a value of the higher-order bits of the shift amount of each of the pieces of sub point cloud data. In the calculating, the three-dimensional data decoding device calculates the shift amounts of the pieces of sub point cloud data using the first information and the pieces of second information. Specifically, the three-dimensional data decoding device calculates shift amounts of pieces of current sub point cloud data using the first information and pieces of second information of the pieces of current sub point cloud data.

With such a configuration, the three-dimensional data decoding device is capable of calculating a shift amount using the first information. In addition, since the first information is common to a plurality of pieces of sub point cloud data, the code amount can be reduced.

For example, the first control information includes a flag (e.g., origin_shift_bit_present_flag) that indicates whether information indicating the bit count of the lower-order bits is included in the first control information or each of the pieces of second control information. When the flag indicates that the information indicating the bit count of the lower-order bits is included in the first control information, the three-dimensional data decoding device obtains the first information from the first control information, and calculates the shift amounts of the pieces of sub point cloud data using the first information and the pieces of second information. On the other hand, when the flag indicates that the information indicating the bit count of the lower-order bits is included in each of the pieces of second control information, the three-dimensional data decoding device obtains pieces of third information from each of the pieces of second control information, the pieces of third information indicating the bit count of the lower-order bits of the shift amount of each of the pieces of sub point cloud data, and calculates the shift amounts of the pieces of sub point cloud data using the pieces of second information and the pieces of third information. Specifically, the three-dimensional data decoding device calculates shift amounts of pieces of current sub point cloud data using pieces of second information and pieces of third information obtained from pieces of second control information of the pieces of current sub point cloud data.

With such a configuration, since the three-dimensional data decoding device is capable of selecting whether to share the first information between a plurality of pieces of sub point cloud data, the three-dimensional data decoding device is capable of performing decoding appropriately.

For example, in the calculating (S7563), the three-dimensional data decoding device sets all bits included in the lower-order bits to a value of zero.

For example, the three-dimensional data decoding device includes a processor and memory, and the processor performs the above-described process using the memory.

A three-dimensional data encoding device, a three-dimensional data decoding device, and the like according to the embodiments of the present disclosure have been described above, but the present disclosure is not limited to these embodiments.

Note that each of the processors included in the three-dimensional data encoding device, the three-dimensional data decoding device, and the like according to the above embodiments is typically implemented as a large-scale integrated (LSI) circuit, which is an integrated circuit (IC). These may take the form of individual chips, or may be partially or entirely packaged into a single chip.

Such IC is not limited to an LSI, and thus may be implemented as a dedicated circuit or a general-purpose processor. Alternatively, a field programmable gate array (FPGA) that allows for programming after the manufacture of an LSI, or a reconfigurable processor that allows for reconfiguration of the connection and the setting of circuit cells inside an LSI may be employed.

Moreover, in the above embodiments, the structural components may be implemented as dedicated hardware or may be realized by executing a software program suited to such structural components. Alternatively, the structural components may be implemented by a program executor such as a CPU or a processor reading out and executing the software program recorded in a recording medium such as a hard disk or a semiconductor memory.

The present disclosure may also be implemented as a three-dimensional data encoding method, a three-dimensional data decoding method, or the like executed by the three-dimensional data encoding device, the three-dimensional data decoding device, and the like.

Also, the divisions of the functional blocks shown in the block diagrams are mere examples, and thus a plurality of functional blocks may be implemented as a single functional block, or a single functional block may be divided into a plurality of functional blocks, or one or more functions may be moved to another functional block. Also, the functions of a plurality of functional blocks having similar functions may be processed by single hardware or software in a parallelized or time-divided manner.

Also, the processing order of executing the steps shown in the flowcharts is a mere illustration for specifically describing the present disclosure, and thus may be an order other than the shown order. Also, one or more of the steps may be executed simultaneously (in parallel) with another step.

A three-dimensional data encoding device, a three-dimensional data decoding device, and the like according to one or more aspects have been described above based on the embodiments, but the present disclosure is not limited to these embodiments. The one or more aspects may thus include forms achieved by making various modifications to the above embodiments that can be conceived by those skilled in the art, as well forms achieved by combining structural components in different embodiments, without materially departing from the spirit of the present disclosure.

Although only some exemplary embodiments of the present disclosure have been described in detail above, those skilled in the art will readily appreciate that many modifications are possible in the exemplary embodiments without materially departing from the novel teachings and advantages of the present disclosure. Accordingly, all such modifications are intended to be included within the scope of the present disclosure.

INDUSTRIAL APPLICABILITY

The present disclosure is applicable to a three-dimensional data encoding device and a three-dimensional data decoding device.

What is claimed is:

1. A three-dimensional data encoding method of encoding point cloud data indicating three-dimensional positions in a three-dimensional space, the three-dimensional data encoding method comprising:
    dividing the point cloud data into pieces of sub point cloud data by dividing the three-dimensional space into subspaces;
    shifting a position of each of the pieces of sub point cloud data in accordance with a predetermined position shift amount; and
    generating a bitstream by encoding the pieces of sub point cloud data shifted,
    wherein the bitstream includes first control information common to the pieces of sub point cloud data, and pieces of second control information for each of the pieces of sub point cloud data, the first control information including first information indicating common information with respect to each of position shift amounts corresponding to a different one of the pieces of sub point cloud data.

2. The three-dimensional data encoding method according to claim 1,
    wherein the position shift amount is based on one of the pieces of sub point cloud data or one of subspaces including the sub point cloud data.

3. The three-dimensional data encoding method according to claim 1,
    wherein the position shift amount includes higher-order bits and lower-order bits,
    the first information is common to the pieces of sub point cloud data and indicates a bit count of the lower-order bits, and
    each of the pieces of second control information includes second information indicating a value of the higher-order bits included in the position shift amount of one of the pieces of sub point cloud data corresponding to the second control information.

4. The three-dimensional data encoding method according to claim 3,
    wherein the first control information includes a flag that indicates whether information indicating the bit count of the lower-order bits is included in the first control information or each of the pieces of second control information,
    when the flag indicates that the information indicating the bit count of the lower-order bits is included in the first control information, the first control information includes the first information, and each of the pieces of second control information does not include the information indicating the bit count of the lower-order bits, and
    when the flag indicates that the information indicating the bit count of the lower-order bits is included in each of the pieces of second control information, the second control information includes third information indicating the bit count of the lower-order bits included in the position shift amount of one of the pieces of sub point cloud data corresponding to the second control information.

5. The three-dimensional data encoding method according to claim 3,
    wherein all bits included in the lower-order bits have a value of zero, and
    the bitstream does not include information indicating a value of the lower-order bits.

6. A three-dimensional data decoding method, comprising:
    decoding, from a bitstream, pieces of sub point cloud data each shifted in accordance with a predetermined position shift amount, the pieces of sub point cloud data being pieces of data into which point cloud data indicating three-dimensional positions is divided by dividing a three-dimensional space into subspaces;
    obtaining first information indicating common information with respect to each of position shift amounts corresponding to a different one of the pieces of sub point cloud data from first control information that is included in the bitstream and is common to the pieces of sub point cloud data;
    calculating each of the position shift amounts of the pieces of sub point cloud data using the first information; and
    reproducing the pieces of sub point cloud data by shifting each of the pieces of sub point cloud data decoded and shifted, in accordance with one of the position shift amounts corresponding to the sub point cloud data.

7. The three-dimensional data decoding method according to claim 6,
    wherein the position shift amount is based on one of the pieces of sub point cloud data or one of the subspaces including the sub point cloud data.

8. The three-dimensional data decoding method according to claim 6,
    wherein the position shift amount includes higher-order bits and lower-order bits,
    the first information is common to the pieces of sub point cloud data and indicates a bit count of the lower-order bits,
    the three-dimensional data decoding method further comprises:
    obtaining, from pieces of second control information for each of the pieces of sub point cloud data included in the bitstream, pieces of second information indicating a value of the higher-order bits of the position shift amount of each of the pieces of sub point cloud data, and
    in the calculating, the position shift amounts of the pieces of sub point cloud data are calculated using the first information and the pieces of second information.

9. The three-dimensional data decoding method according to claim 8,
    wherein the first control information includes a flag that indicates whether information indicating the bit count of the lower-order bits is included in the first control information or each of the pieces of second control information, and when the flag indicates that the information indicating the bit count of the lower-order bits is included in the first control information, the first information is obtained from the first control information, and the position shift amounts of the pieces of sub point cloud data are calculated using the first information and the pieces of second information; and when the flag indicates that the information indicating the bit count of the lower-order bits is included in each of the pieces of second control information, pieces of third information are obtained from each of the pieces of second control information, the pieces of third information indicating the bit count of the lower-order bits of the position shift amount of each of the pieces of sub point cloud data, and the position shift amounts of the pieces of sub point cloud data are calculated using the pieces of second information and the pieces of third information.

10. The three-dimensional data decoding method according to claim 8, wherein in the calculating, all bits included in the lower-order bits are set to a value of zero.

11. A three-dimensional data encoding device that encodes point cloud data indicating three-dimensional positions in a three-dimensional space, the three-dimensional data encoding device comprising:

a processor; and memory, wherein using the memory, the processor:

divides the point cloud data into pieces of sub point cloud data by dividing the three-dimensional space into subspaces;

shifts a position of each of the pieces of sub point cloud data in accordance with a predetermined position shift amount; and generates a bitstream by encoding the pieces of sub point cloud data shifted, wherein the bitstream includes first control information common to the pieces of sub point cloud data, and pieces of second control information for each of the pieces of sub point cloud data, the first control information including first information indicating common information with respect to each of position shift amounts corresponding to a different one of the pieces of sub point cloud data.

12. A three-dimensional data decoding device, comprising:

a processor; and memory, wherein using the memory, the processor:

decodes, from a bitstream, pieces of sub point cloud data each shifted in accordance with a predetermined position shift amount, the pieces of sub point cloud data being pieces of data into which point cloud data indicating three-dimensional positions is divided by dividing a three-dimensional space into subspaces;

obtains first information indicating common information with respect to each of position shift amounts corresponding to a different one of the pieces of sub point cloud data from first control information that is included in the bitstream and is common to the pieces of sub point cloud data;

calculates each of the position shift amounts of the pieces of sub point cloud data using the first information; and reproduces the pieces of sub point cloud data by shifting each of the pieces of sub point cloud data decoded and shifted, in accordance with one of the position shift amounts corresponding to the sub point cloud data.

* * * * *